(12) United States Patent
Horita et al.

(10) Patent No.: US 7,634,653 B2
(45) Date of Patent: Dec. 15, 2009

(54) EVENT-ORDERING CERTIFICATION METHOD

(75) Inventors: Eiichi Horita, Mitaka (JP); Satoshi Ono, Tokyo (JP); Hidetaka Ishimoto, Tokorozawa (JP); Akira Takura, Kanagawa (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 10/587,132

(22) PCT Filed: Aug. 18, 2005

(86) PCT No.: PCT/JP2005/015085

§ 371 (c)(1),
(2), (4) Date: Aug. 26, 2008

(87) PCT Pub. No.: WO2006/019143

PCT Pub. Date: Feb. 23, 2006

(65) Prior Publication Data

US 2008/0307221 A1    Dec. 11, 2008

(30) Foreign Application Priority Data

Aug. 19, 2004  (JP)  ............................. 2004-239465
Aug. 24, 2004  (JP)  ............................. 2004-244178

(51) Int. Cl.
*H04L 29/06* (2006.01)
*H04L 9/32* (2006.01)

(52) U.S. Cl. ...................... 713/156; 713/175

(58) Field of Classification Search .............. 713/156, 713/175

See application file for complete search history.

(56) References Cited

U.S. PATENT DOCUMENTS

2004/0249817 A1*  12/2004  Liu et al. .................. 707/9

(Continued)

FOREIGN PATENT DOCUMENTS

JP    2005-110225    4/2005

(Continued)

OTHER PUBLICATIONS

Masashi Une, Kanta Matsuura, Akira Takura, "Digital Timestamp Gijyutsu no Genjyo to Kadai", IMES Discussion Paper Series, Discussion Paper No. 99-J-36, Institute for Monetary and Economic Studies, Bank of Japan, Oct. 1999, pp. 7 to 20, 26 to 28, 40 to 42, http://www.imes.boj.or.jp/jdps99/99-J-36.pdf.

(Continued)

*Primary Examiner*—Shin-Hon Chen
(74) *Attorney, Agent, or Firm*—Kilpatrick Stockton LLP

(57) ABSTRACT

An event-ordering certification system 100 includes a certification apparatus 1, a plurality of user apparatuses $2i$ (i=a, b, . . . , n), an audit apparatus 3 for performing an audit of an event-ordering receipt published by the certification apparatus 1 and a network 4 for connecting these elements with each other. In response to an event-ordering request from one user apparatus $2i$, the certification apparatus 1 publishes the event-ordering receipt and sends it to the user apparatus $2i$. If a mistrust is produced in the event-ordering receipt, the user apparatus $2i$ verifies the event-ordering receipt with the use of data published by the certification apparatus 1 and an audit result by the audit apparatus 3.

73 Claims, 77 Drawing Sheets

U.S. PATENT DOCUMENTS

2004/0250076 A1* 12/2004 Kung ...................... 713/175
2005/0076203 A1* 4/2005 Thornton et al. ............ 713/156

FOREIGN PATENT DOCUMENTS

JP          2005-130488          5/2005

OTHER PUBLICATIONS

Eiichi Hotta, Satoshi Ono, and Hidetaka Ishimoto, "Implementation Mechanics of Scalable Event-Ordering System without Single Point of Attack" ("Scalable de Tan'itsu Kogekiten no Nai Ivent Junjo Shomei System Jitsugen Kiko"), The Institute of Electronics, Information and Communication Engineers Gijutsu Kenkyu Hokoku ISEC 2004-85-97, The Institute of Electronics, Information and Communication Engineers, Nov. 2, 2004, vol. 104, No. 422, pp. 1 to 8.

Shingo Orihara, Satoshi Ono, Eiichi Hotta, and Hidetaka Ishimoto, "Threat analysis of Event-Ordering Systems" ("Ivent Junjo Shomei System no Kyoi Bunseki"), The Institute of Electronics, Information and Communication Engineers Gijyutsu Kenkyu Hokoku ISEC2004-98-105, The Institute of Electronics, Information and Communication Engineers, Dec. 10, 2004, vol. 104, No. 527, pp. 39 to 45.

Stuart Haber and W. Scott Stornetta, "How to Time-Stamp a Digital Document", Journal of Cryptology, vol. 3, No. 2, pp. 99-111, 1991.

J.-J. Quisquater, H. Massias, J. Serret Avila, B. Preneel, and B. Van Rompay, "Specification and implementation of a timestamping system", Technical Report of Universite Catholique de Louvain, 1999, URL: http://www.dice.ucl.ac.be/crypto/TIMESEC/TR4.tgzl.

Ahto Buldas, Helger Lipmaa, and Berry Schoenmakers, "Optimally Efficient Accountable Time-Stamping", in Proceedings of Public Key Cryptography 2000 (PKC2000), eds. Y. Zheng and H. Imai, pp. 293-305, Springer-Verlag, Jan. 2000.

Ahto Buldas, Peeter Laud, Helger Lipmaa, and Jan Villemson, "Time-Stamping with Binary Linking Schemes", in Proceedings of Advances on Cryptology (CRYPTO'98), ed. H. Krawczyk, pp. 486-501, Springer-Verlag, 1998.

Masashi Une, Kanta Matsuura, and Akira Takura; "The Present Situation and Future Prospects of Digital Time Stamp Technology," IMES Discussion Paper Series 99-J-36, Oct. 1999, Eight Pages, http://www.imes.boj.or.jp/jdps99/99-j-36.pdf.

* cited by examiner

FIG. 6

| ITEM | SIGN | REQUIRED |
|---|---|---|
| Original Data | y | ○ |
| Sequentially Assigned Data-item | z | ○ |
| Sequential Aggregation Tree No. | n | ○ |
| Sequential Aggregation Tree Leaf No. | i | ○ |
| Immediate Complementary Data (Positional Info. Assigned Value) | HK | |
| Digital Signature | DS | |

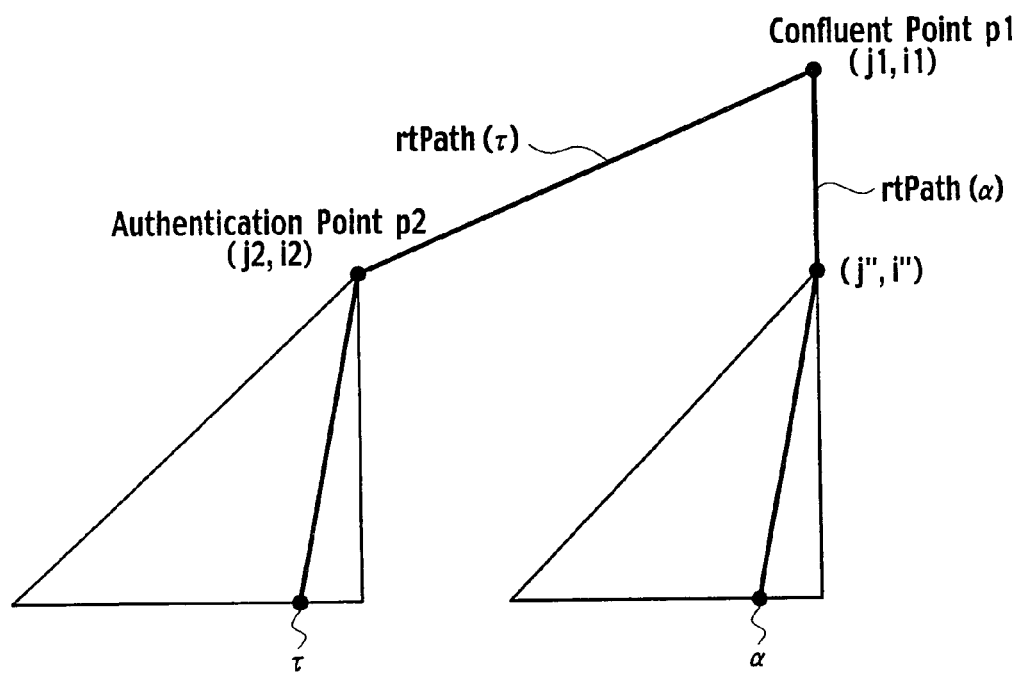

FIG. 27

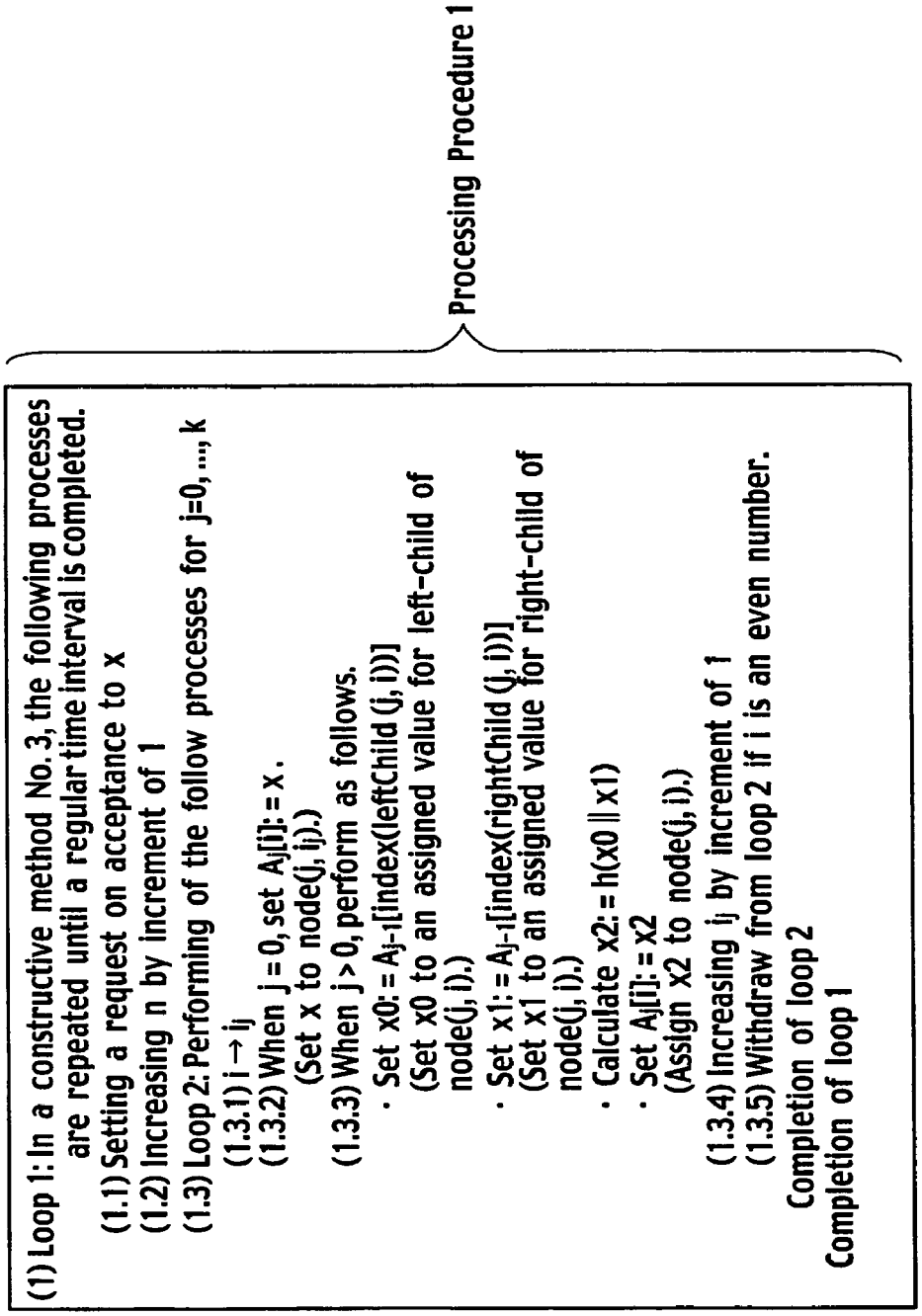

(1) Loop 1: In a constructive method No. 3, the following processes are repeated until a regular time interval is completed.
  (1.1) Setting a request on acceptance to x
  (1.2) Increasing n by increment of 1
  (1.3) Loop 2: Performing of the follow processes for $j=0,...,k$
    (1.3.1) $i \rightarrow i_j$
    (1.3.2) When $j = 0$, set $A_j[i] := x$.
      (Set x to node(j, i).)
    (1.3.3) When $j > 0$, perform as follows.
      • Set $x0 := A_{j-1}[\text{index}(\text{leftChild}(j,i))]$
       (Set x0 to an assigned value for left-child of node(j, i).)
      • Set $x1 := A_{j-1}[\text{index}(\text{rightChild}(j,i))]$
       (Set x1 to an assigned value for right-child of node(j, i).)
      • Calculate $x2 := h(x0 \| x1)$
      • Set $A_j[i] := x2$
       (Assign x2 to node(j, i).)
    (1.3.4) Increasing $i_j$ by increment of 1
    (1.3.5) Withdraw from loop 2 if i is an even number.
  Completion of loop 2
Completion of loop 1

Processing Procedure 1

FIG. 28

> (2) Performing of the following processes after withdrawing from loop 1 on reaching finish time.
>   (2.1) Set k:= ceiling($\log_2(n)$)).
>   (2.2) Calculate rtPath(k, 0, n−1) and Set ((0, r(0)), ..., k(, r(k))) to the calculation result.
>   (2.3) Loop 3:Performing of the follow processes for j=0, ..., k
>     (2.3.1) i → $i_j$
>     (2.3.2) Case of j = 0:
>       (2.3.2.1) When i is an odd number:
>         • Produce a dummy r: = R(0, i)
>         • Set $A_j$[i]: = r
>         (Assign r to node(0, i).)
>         • Set $b_j$: = true.
>         • Increase $i_j$ by increment of 1.
>     (2.3.3) Case of 0<j≦k:
>       (2.3.3.1) When i = r(j):
>         (when node(j, i) is on rtPath(k, 0, n−1)):
>       (2.3.3.1.1) x0:= $A_{j-1}$[index(leftChild (j, i))]
>         (Set x0 to an assigned value for left-child of node(j, i).)
>       (2.3.3.1.2) x1: = $A_{j-1}$[index(rightChild (j, i))]
>         (Set x1 to an assigned value for right-child of node(j, i).)
>       (2.3.3.1.3) Calculate x2: = h(x0 ∥ x1)
>       (2.3.3.1.4) Set $A_j$[i]: = x2
>         (Assign x2 to node(j, i).)
>       (2.3.3.1.5) When i is an even number and j < k:
>         • Increase i by increment of 1.
>         • Calculate r: = R(j, i) and Set $A_j$[i]: = r
>         (Assign r to node(j, i).)
>         • Set $b_j$: = true.
>         • Set $i_j$ : = i + 1
>       (2.3.3.2) When i = r(j) + 1, an odd number and j < k:
>         • Calculate r: = R(j, i) and Set $A_j$[i]: = r
>           (Assign r to node(j, i).)
>         • Set $b_j$: = true.
>         • Increase $i_j$ by increment of 1.
>   Completion of loop 3

Processing Procedure 2

FIG. 43

| ITEM | SIGN | REQUIRED | |
|---|---|---|---|
| Original Data | y | ○ | Event-ordering Receipt EOC(y) |
| Sequentially Assigned Data-item | z | ○ | |
| Sequential Aggregation Tree No. | n | ○ | |
| Sequential Aggregation Tree Leaf No. | i | ○ | |
| Immediate Complementary Data of Registration Point (Positional Information Assigned Value) | SK | ○ | |
| Late Complementary Data of Immediately-preceding Registration Point (Positional Information Assigned Value) | TK2 | ○ | |

FIG. 44

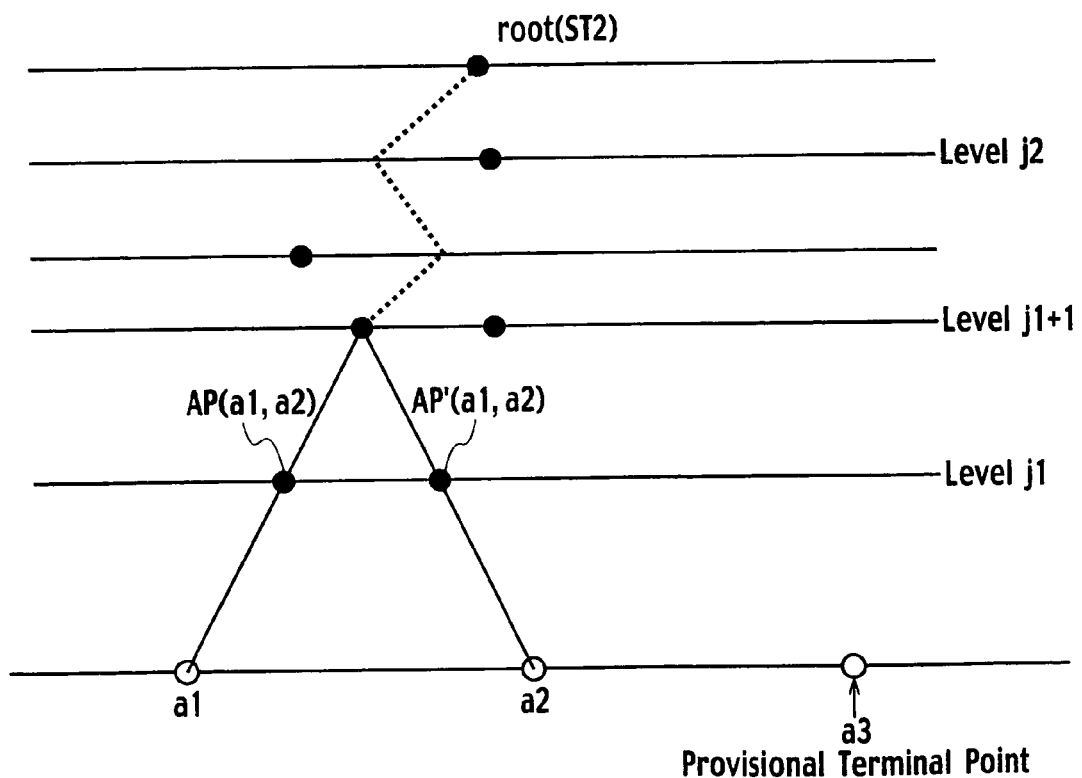

FIG. 45

| Registration Point | a1 | a2 | a3 | a4 | a5 |
|---|---|---|---|---|---|
| Immediate Complementary Data | a1 | a2 | a3 | a4 | a5 |
| Late Complementary Data | | a2~P2<br>a1~P3 | a2~P1<br>a1 ← P4 | a3~P6<br>a3 → a2 → a1 | a4~P5<br>a4 → a3 → a2 → a1<br>a2~P7 |

EVENT-ORDERING CERTIFICATION METHOD

TECHNICAL FIELD

The present invention relates to an event-ordering certification technology for certifying an occurrence order of events accompanied with generation of digital data.

BACKGROUND OF ART

The event-ordering certification technology contains a technology for certifying the occurrence order of a plurality of events accompanied with generation of digital data and a technology for certifying contents of the digital data generated by the events.

With activisation of Web-based commerce on the Internet and magnified availability in managing digital documents in recent years, there is required a mechanism of electronic authentication for a third party to certify who and when the digital data was generated and/or communicated and what the digital data was formed by. The electronic authentication includes various functions of: specifying transmitter/receiver of the digital data; confirming arrival of the data; certifying context of digital documents, such as transmission/reception; detecting a tamper; storing electronic documents and so on. The event-ordering certification technology accomplishes the functions of certifying the context of digital documents and detecting the tamper.

FIG. 1 is a diagram explaining an event-ordering certification system employing this event-ordering certification technique. In an event-ordering certification system 900 shown in FIG. 1, when a user (demander, verifier, etc.) 30 transmits data objective of event-ordering certification to an event-ordering certification apparatus 10, it generates an event-ordering receipt certificate having data representing a receiving order of the objective data required by the user 30 and sends the event-ordering receipt certificate to the user 30. When adopting a digital signature as major anti-counterfeit/certification means in accordance with PKI (Public Key Infrastructure), the event-ordering receipt certificate is generally constructed to involve a digital signature for objective data for signature where the receiving order is attached to the objective data sent from the user 30. Note that in the following descriptions, the terminology "event-ordering receipt certificate" will be referred to as "event-ordering receipt", after.

As for this event-ordering certification system adopting the digital signature as a main base for authenticity of this event-ordering receipt, there are pointed out various problems in view of falseness in the event-ordering certification apparatus 10, term of validity of the event-ordering receipt, aspects of system operation and so on. Therefore, there is also proposed an event-ordering certification method that does not adopt the digital signature as the main base for authenticity of this event-ordering receipt. For instance, a method with Linear Linking Protocol is disclosed in nonpatent literatures No. 1 (S. Haber and W. Stornetta, How to Time-Stamp a Digital Document, Journal of Crytology, Vol. 3, No. 2, pp 99-111, 1991) and No. 2 (J.-J. Quisquater, H. Massias, J. S. Avila, B. Van Rompay: Specification and implementation of a tims-tamping System, Technical Report of Universite Cathoilique de Louvain, 1999, URL: www dice.ucl.ac.be/crpto/TIMESEC/TR4.tgzl). With this method with Linear Linking Protocol, it is possible to provide the system as a whole with high safety even if the event-ordering certification apparatus 10 is not reliable. FIG. 2 is a diagram to explain an event-ordering certification system by Linear Linking Protocol that does not rely upon PKI. In FIG. 2, the event-ordering certification system 910 is constructed so as to produce a link information $L_n$ correlating a plurality of users' data (hash values) objective of event-ordering certification with each other and send event-ordering receipts including the link information $L_n$ to the users 30. Each of the event-ordering receipts is adapted so as to depend on all of the event-ordering receipts that have been produced previously. Then, as parts $(L_M, L_N)$ of the link information are published on mass-media (e.g. newspapers) periodically, it is possible to prevent falseness of the event-ordering certification apparatus 10, whereby the reliability of the whole system can be improved.

However, the above-mentioned method of Linear Linking Protocol requires mutual collaboration among the users 30 in order to detect the falseness of the event-ordering certification apparatus 10. Additionally, in order to allow the users 30 to verify the obtained event-ordering receipts and verify that the published information is related to the event-ordering receipts in an orderly manner, the users 30 are required to gobble down great volume of data from the event-ordering certification apparatus 10.

Methods for solving part of the above-mentioned problems partially are also proposed. For example, in nonpatent literatures No. 3 (A. Buldas, P. Land, H Lipmaa and J. Villemson: Time-stamping with binary linking schemes, in Processings of Advances on Cryptology (CRYPTO'98), ed. H. Krawczyk, pp. 486-501, Springer-Verlag, 1998) and No. 4 (A. Buldas, H Lipmaa and B. Schoenmakers, Optimally efficient accountable time-stamping, in Proceedings of Public Key Crytography 2000 (PKC2000), eds. Y Zheng and H. Imai, pp. 293-305, Springer-Verlag, January 2000), there is proposed a method of adopting a tree structure in place of the linear lists used in the nonpatent literatures Nos. 1 and 2, in order to calculate publication data collecting up event-ordering requests processed by an event-ordering certification apparatus for a certain period, thereby remarkably reducing the amount of data required for the user 30 to verify an event-ordering receipt, from the amount of data proportional to the number of event-ordering requests accepted for the certain period to the amount of data proportional to a logarithm (base 2) of the former amount.

DISCLOSURE OF THE INVENTION

In the above-mentioned method described in the nonpatent literatures Nos. 3 and 4, however, there are problems as follows.

Assuming that two different users send their respective event-ordering requests to an event-ordering certification apparatus and subsequently, these event-ordering requests are accepted by the event-ordering certification apparatus, it is impossible to provide evidence that the acceptance of one event-ordering request by the first user has been carried out before the acceptance of another event-ordering request by the second user unless the publication data collecting up the event-ordering requests is published with a completion of the above certain period. Thus, the above method is inferior to users' convenience against the event-ordering certification system. Additionally, if the event-ordering certification apparatus has a malfunction, then it becomes impossible for the users to verify the event-ordering receipts.

In order to solve the above-mentioned problem, an object of the present invention is to provide, in an event-ordering certification system for certifying an event-ordering with the use of a tree structure, an event-ordering certification method, an event-ordering certification audit method, certification and audit apparatuses in an event-ordering certification system and programs for event-ordering certification, event-ordering certification audit, validation of event-ordering certificates and validation of event-times, all of which can verify event-ordering receipts published by an event-ordering certification organization without using publication data collecting up event-ordering requests.

According to a first aspect of the present invention, there is provided an event-ordering certification method for an event-ordering certification system having a user apparatus performing an event-ordering request for certifying a chronological sequence of a certain event in time-series events generating a designated digital information, a certification apparatus for drafting a certificate for the event-ordering request of the user apparatus, an audit apparatus for auditing authenticity of the certificate and a communication network for connecting the user apparatus, the certification apparatus and the audit apparatus with each other, the method comprising: an event-ordering request receiving step where the certification apparatus receives the event-ordering request from the user apparatus; a sequentially assigned data-item calculating step where the certification apparatus drafts a sequentially assigned data-item from the digital information included in the event-ordering request in accordance with a predetermined procedure; an event-ordering request aggregating step where, in sequential aggregation trees each of which is completed at regular time intervals by sequentially assigning a series of sequentially assigned data-items to leaves of a directed tree from left thereof, the certification apparatus calculates assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected; a certificate drafting step where the certification apparatus drafts a certificate containing the sequentially assigned data-item and a first sequential aggregation tree specifying information for specifying the sequential aggregation tree and a leaf thereof both having the sequentially assigned data-item assigned thereto; a certificate sending step where the certification apparatus sends the certificate to the user apparatus; assuming that: a leaf of the sequential aggregation tree to which the event-ordering request is assigned is defined as a registration point; an information about nodes necessary to calculate a root value of the sequential aggregation tree from the registration point is defined as a complementary information of the certificate; and in the complementary information, a complementary information acquirable at a point of assigning the event-ordering request to the sequential aggregation tree is defined as an immediate complementary information, an audit certificate drafting step where after assigning the event-ordering request to the sequential aggregation tree, the certification apparatus assigns a first audit request to the sequential aggregation tree thereby drafting a first audit certificate in the same way as drafting the certificate, acquires a first immediate complementary information for audit at the point of assigning the first audit request to the sequential aggregation tree, from the sequential aggregation tree and incorporates the first immediate complementary information into the first audit certificate; an audit certificate sending step where the certification apparatus sends the first audit certificate to the audit apparatus; a complementary information request receiving step where after assigning the first audit request to the sequential aggregation tree, the certification apparatus receives a request of the complementary information of the certificate from the user apparatus; a late complementary information drafting step where the certification apparatus acquires a second sequential aggregation tree specifying information for specifying the sequential aggregation tree and a leaf thereof both having the request of the complementary information assigned thereto and a complementary information acquirable at the point of assigning the request of the complementary information, from the sequential aggregation tree, thereby forming a late complementary information; and a late complementary information sending step where the certification apparatus sends the late complementary information about the certificate to the user apparatus.

According to the second aspect of the present invention, there is also provided an event-ordering certification audit method for an event-ordering certification system having at least one user apparatus performing an event-ordering request for certifying a chronological sequence of a certain event in time-series events generating a designated digital information, a certification apparatus for drafting a certificate for the event-ordering request of the user apparatus, an audit apparatus for auditing authenticity of the certificate and a communication network for connecting the user apparatus, the certification apparatus and the audit apparatus with each other, the method comprising: an event-ordering request receiving step where the certification apparatus receives a first event-ordering request from the user apparatus; a sequentially assigned data-item calculating step where the certification apparatus drafts a sequentially assigned data-item from a digital information included in the first event-ordering request in accordance with a predetermined procedure; an event-ordering request aggregating step where, in sequential aggregation trees each of which is completed at regular time intervals by sequentially assigning a series of sequentially assigned data-items to leaves of a directed tree from left thereof, the certification apparatus calculates assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected; a certificate drafting step where the certification apparatus drafts a first certificate containing the sequentially assigned data-item and a first sequential aggregation tree specifying information for specifying the sequential aggregation tree and a leaf thereof both having the sequentially assigned data-item assigned thereto; a certificate sending step where the certification apparatus sends the first certificate to the user apparatus; assuming that: a leaf of the sequential aggregation tree to which the first event-ordering request is assigned is defined as a registration point; an information about nodes necessary to calculate a root value of the sequential aggregation tree from the registration point is defined as a complementary information of the first certificate; and in the complementary information, a complementary information acquirable at a point of assigning the first event-ordering request to the sequential aggregation tree is defined as an immediate complementary information, an audit certificate drafting step where the certification apparatus assigns a plurality of audit requests to the sequential aggregation tree thereby drafting a plurality of audit certificates in the same way as drafting the certificate, acquires immediate complementary information for audit at the point of assigning the respective audit requests to the sequential aggregation tree, from the sequential aggregation tree and incorporates the immediate complementary information for audit into the respective audit certificates; an audit certificate sending step where the certification apparatus sends the audit certificates to the audit apparatus; a complementary information request receiving step where after sending the first certificate to the user apparatus, the certification apparatus receives a request of the complementary information of the first certificate from the user apparatus; a late complementary information drafting step where the certification apparatus acquires a second sequential aggregation tree specifying information for specifying the sequential aggregation tree and a leaf thereof both having the request of the complementary information assigned thereto and a complementary information acquirable at the point of assigning the request of the complementary information, from the sequential aggregation tree, thereby forming a late complementary information; a late complementary information sending step where the certification apparatus sends the late complementary information about the first certificate to the user apparatus; an audit certificate receiving step where the audit apparatus receives the audit certificates from the certification apparatus; an audit request receiving step where the audit apparatus receives an audit request for the first certificate from the user apparatus, the audit request containing the first certificate and the late complementary information about the first certificate; a first audit certificate selecting step where the audit apparatus selects an audit certificate from the audit certificates on a basis of the first and second sequential aggregation tree specifying information in the audit request for the first certificate, the one audit certificate being generated after the first certificate and before the late complementary information in chronological sequence; a first certificate audit step where the audit apparatus audits validity of the first certificate by verifying, for a specified node in the sequential aggregation tree, whether an assigned value for the specified node contained in the audit certificate selected at the first audit certificate selecting step coincides with an assigned value for the specified node calculated from the audit request for the first certificate or not and, where the audit apparatus further certifies a temporal context between a receipt time of the event-ordering request for the first certificate and a receipt time of the audit request for the audit certificate selected at the first audit certificate selecting step; and an audit result sending step where the audit apparatus sends an audit result of the first certificate to the user apparatus.

According to the third aspect of the present invention, there is also provided an event-ordering certification apparatus connected to both a user apparatus performing an event-ordering request for certifying a chronological sequence of a certain event in time-series events generating a designated digital information thereby promoting the event-ordering certification apparatus to draft a certificate and an audit apparatus for auditing authenticity of the certificate through a communication network mutually, for drafting the certificate, for the event-ordering request of the user apparatus, the event-ordering certification apparatus comprising: event-ordering request receiving means configured to receive the event-ordering request from the user apparatus; sequentially assigned data-item calculating means configured to draft a sequentially assigned data-item from a digital information included in the event-ordering request in accordance with a predetermined procedure; event-ordering request aggregating means configured, in sequential aggregation trees each of which is completed at regular time intervals by sequentially assigning a series of sequentially assigned data-items to leaves of a directed tree from left thereof, to calculate assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected; certificate drafting means configured to draft a certificate containing the sequentially assigned data-item and a first sequential aggregation tree specifying information for specifying the sequential aggregation tree and a leaf thereof both having the sequentially assigned data-item assigned thereto; certificate sending means configured to send the certificate to the user apparatus; assuming that: a leaf of the sequential aggregation tree to which the event-ordering request is assigned is defined as a registration point; an information about nodes necessary to calculate a root value of the sequential aggregation tree from the registration point is defined as a complementary information of the certificate; and in the complementary information, a complementary information acquirable at a point of assigning the event-ordering request to the sequential aggregation tree is defined as an immediate complementary information, audit certificate drafting means configured, after assigning the event-ordering request to the sequential aggregation tree, to assign a first audit request to the sequential aggregation tree thereby drafting a first audit certificate in the same way as drafting the certificate, acquire a first immediate complementary information for audit at the point of assigning the first audit request to the sequential aggregation tree, from the sequential aggregation tree and incorporate the first immediate complementary information into the first audit certificate; audit certificate sending means configured to send the first audit certificate to the audit apparatus; complementary information request receiving means configured, after assigning the first audit request to the sequential aggregation tree, to receive a request of the complementary information of the certificate from the user apparatus; late complementary information drafting means configured to acquire a second sequential aggregation tree specifying information for specifying the sequential aggregation tree and a leaf thereof both having the request of the complementary information assigned thereto and a complementary information acquirable at the point of assigning the request of the complementary information, from the sequential aggregation tree, thereby forming a late complementary information; and complementary information sending means configured to send the late complementary information about the certificate to the user apparatus.

According to the fourth aspect of the present invention, there is also provided an event-ordering certification audit apparatus connected to both at least one user apparatus performing an event-ordering request for certifying a chronological sequence of a certain event in time-series events generating a designated digital information and a certification apparatus for drafting a certificate for the event-ordering request of the user apparatus, through a communication network, for auditing authenticity of the certificate, wherein the certification apparatus comprises: event-ordering request receiving means configured to receive a first event-ordering request from the user apparatus; sequentially assigned data-item calculating means configured to draft a sequentially assigned data-item from a digital information included in the first event-ordering request in accordance with a predetermined procedure; event-ordering request aggregating means configured, in sequential aggregation trees each of which is completed at regular time intervals by sequentially assigning a series of sequentially assigned data-items to leaves of a directed tree from left thereof, to calculate assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected; certificate drafting means configured to draft a first certificate containing the sequentially assigned data-item and a first sequential aggregation tree specifying information for specifying the sequential aggregation tree and a leaf thereof both having the sequentially assigned data-item assigned thereto; certificate sending means configured to send the first certificate to the user apparatus; assuming that: a leaf of the sequential aggregation tree to which the first event-ordering request is assigned is defined as a registration point; an information about nodes necessary to calculate a root value of the sequential aggregation tree from the registration point is defined as a complementary information of the first certificate; and in the complementary information, a complementary information acquirable at a point of assigning the first event-ordering request to the sequential aggregation tree is defined as an immediate complementary information, audit certificate drafting means configured to assign a plurality of audit requests to the sequential aggregation tree thereby drafting a plurality of audit certificates in the same way as drafting the certificate, acquire immediate complementary information for audit at the point of assigning the respective audit requests to the sequential aggregation tree from the sequential aggregation tree and incorporate the immediate complementary information for audit into the respective audit certificates; audit certificate sending means configured to send the audit certificates to the audit apparatus; complementary information request receiving means configured, after sending the first certificate to the user apparatus, to receive a request of the complementary information of the first certificate from the user apparatus; late complementary information drafting means configured to acquire a second sequential aggregation tree specifying information for specifying the sequential aggregation tree and a leaf thereof both having the request of the complementary information assigned thereto and a complementary information acquirable at the point of assigning the request of the complementary information, from the sequential aggregation tree, thereby forming a late complementary information; and late complementary information sending means configured to send the late complementary information about the first certificate to the user apparatus, and wherein the event-ordering certification audit apparatus comprises: audit certificate receiving means configured to receive the audit certificates from the certification apparatus; audit request receiving means configured to receive an audit request for the first certificate from the user apparatus, the audit request containing the first certificate and the late complementary information about the first certificate; first audit certificate selecting means configured to select an audit certificate from the audit certificates on a basis of the first and second sequential aggregation tree specifying information in the audit request for the first certificate, the audit certificate being generated after the first certificate and before the late complementary information in chronological sequence; first certificate audit means configured to audit validity of the first certificate by verifying, for a specified node in the sequential aggregation tree, whether an assigned value for the specified node contained in the audit certificate selected by the first audit certificate selecting means coincides with an assigned value for the specified node calculated from the audit request for the first certificate or not and, also configured to further certify a temporal context between a receipt time of the event-ordering request for the first certificate and a receipt time of the audit request for the audit certificate selected by the first audit certificate selecting means; and audit result sending means configured to send an audit result of the first certificate to the user apparatus.

The fifth aspect of the present invention resides in the provision of an event-ordering certification program that allows the certification apparatus to perform respective steps of the above-mentioned event-ordering certification method.

The sixth aspect of the present invention resides in the provision of an event-ordering certification audit program that allows the certification apparatus to perform respective steps of the above-mentioned event-ordering certification audit method.

According to the seventh aspect of the present invention, there is also provided a program for validation of event-ordering certificates for a user apparatus in an event-ordering certification audit system where at least one user apparatus performing an event-ordering request for certifying a chronological sequence of a certain event in time-series events generating a designated digital information, a certification apparatus for drafting a certificate for the event-ordering request of the user apparatus and an audit apparatus for auditing authenticity of the certificate are connected with each other through a communication network, wherein the certification apparatus comprises: event-ordering request receiving means configured to receive a first event-ordering request from the user apparatus; sequentially assigned data-item calculating means configured to draft a sequentially assigned data-item from a digital information included in the first event-ordering request in accordance with a predetermined procedure; event-ordering request aggregating means configured, in sequential aggregation trees each of which is completed at regular time intervals by sequentially assigning a series of sequentially assigned data-items to leaves of a directed tree from left thereof, to calculate assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected; certificate drafting means configured to draft a first certificate containing the sequentially assigned data-item and a first sequential aggregation tree specifying information for specifying the sequential aggregation tree and a leaf thereof both having the sequentially assigned data-item assigned thereto; certificate sending means configured to send the first certificate to the user apparatus; assuming that: a leaf of the sequential aggregation tree to which the first event-ordering request is assigned is defined as a registration point; an information about nodes necessary to calculate a root value of the sequential aggregation tree from the registration point is defined as a complementary information of the first certificate; and in the complementary information, a complementary information acquirable at a point of assigning the first event-ordering request to the sequential aggregation tree is defined as an immediate complementary information, audit certificate drafting means configured to assign a plurality of audit requests to the sequential aggregation tree thereby drafting a plurality of audit certificates in the same way as drafting the certificate, acquire immediate complementary information for audit at the point of assigning the respective audit requests to the sequential aggregation tree from the sequential aggregation tree and incorporate the immediate complementary information for audit into the respective audit certificates; audit certificate sending means configured to send the audit certificates to the audit apparatus; complementary information request receiving means configured, after sending the first certificate to the user apparatus, to receive a request of the complementary information of the first certificate from the user apparatus; late complementary information drafting means configured to acquire a second sequential aggregation tree specifying information for specifying the sequential aggregation tree and a leaf thereof both having the request of the complementary information assigned thereto and a complementary information acquirable at the point of assigning the request of the complementary information, from the sequential aggregation tree, thereby forming a late complementary information; and late complementary information sending means configured to send the late complementary information about the first certificate to the user apparatus, and wherein the audit apparatus comprises: audit certificate receiving means configured to receive the audit certificates from the certification apparatus; audit request receiving means configured to receive an audit request for the first certificate from the user apparatus, the audit request containing the first certificate and the late complementary information about the first certificate; first audit certificate selecting means configured to select an audit certificate from the audit certificates on a basis of the first and second sequential aggregation tree specifying information in the audit request for the first certificate, the audit certificate being generated after the first certificate and before the late complementary information in chronological sequence; first certificate audit means configured to audit validity of the first certificate by verifying, for a specified node in the sequential aggregation tree, whether an assigned value for the specified node contained in the audit certificate selected by the first audit certificate selecting means coincides with an assigned value for the specified node calculated from the audit request for the first certificate or not and, also configured to further certify a temporal context between a receipt time of the event-ordering request for the first certificate and a receipt time of the audit request for the audit-certificate selected by the first audit certificate selecting means; and audit result sending means configured to send an audit result of the first certificate to the user apparatus, and wherein the event-ordering certification program allows the user apparatus to perform: an event-ordering request sending step of sending the first event-ordering request to the certification apparatus; a certificate receiving step of receiving first event-ordering request from the certification apparatus; a complementary information request sending step of sending the request of the complementary information of the first certificate to the certification apparatus; a complementary information receiving step of receiving the complementary information of the first certificate from the certification apparatus; an audit request sending step of sending the audit request to the audit apparatus; and an audit result receiving step of receiving the audit result for the first certificate.

According to the eighth aspect of the present invention, there is also provided a program for validation of event-ordering certificates for allowing a computer to verify authenticity of certificates, the computer being connected to first and second user apparatuses, each of which performs an event-ordering request for certifying a chronological sequence of a certain event in time-series events generating a designated digital information, and an event-ordering certification apparatus for drafting the certificates for a plurality of event-ordering requests of the first and second user apparatuses through a communication network, wherein the event-ordering certification apparatus comprises: event-ordering request receiving means configured to receive the event-ordering requests from the first and second user apparatuses; sequentially assigned data-item calculating means configured to draft sequentially assigned data-items from digital information included in the event-ordering requests in accordance with a predetermined procedure; event-ordering request aggregating means configured, in sequential aggregation trees each of which is completed at regular time intervals by sequentially assigning a series of sequentially assigned data-items to leaves of a directed tree from left thereof, to calculate assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected; sequential aggregation tree storing means configured to store an information about the sequential aggregation trees produced by the event-ordering request aggregating means; assuming that: a leaf of the sequential aggregation tree to which the sequentially-assigned data-item drafted from each of the event-ordering requests is assigned is defined as a registration point; an information about nodes necessary to calculate a root value of the sequential aggregation tree from the registration point is defined as a complementary information of the registration point; in the complementary information, a complementary information acquirable at a point of assigning each of the sequentially assigned data-item to the sequential aggregation tree is defined as an immediate complementary information, while a complementary information acquirable after the point of assigning each of the sequentially assigned data-item to the sequential aggregation tree is defined as a late complementary information; the late complementary information of a leaf a1 determined at a point of completing an assignation for a leaf a2 on the right of the leaf a1 in the sequential aggregation tree is defined as "late complementary information of the leaf a1 at the leaf a2"; and further a leaf of the sequential aggregation tree to which the sequential assigned data-item drafted by a new event-ordering request is defined as a new registration point, registration point storing means configured to store an information about the registration points of the event-ordering requests with respect to each of the user apparatuses; certificate drafting means configured to integrate, from the information stored in the respective storing means, a sequentially assigned data-item for the new registration point, a sequential aggregation tree specifying information for specifying the sequential aggregation tree and a leaf thereof both having the sequentially assigned data-item assigned thereto, an immediate complementary information about the new registration point and a late complementary information of all past registration points of each of the user apparatuses, thereby drafting a certificate for the new registration point; and certificate sending means configured to send the certificates to the user apparatuses; wherein each of the user apparatuses comprises: event-ordering request sending means configured to send the event-ordering requests to the event-ordering certification apparatus; certificate receiving means configured to receive the certificates for the event-ordering requests from the event-ordering certification apparatus; certificate storing means configured to store the certificates received; validation request sending means configured to send a certificate for validation to the computer; and validation result receiving means configured to receive a validation result of the certificate for validation from the computer; wherein the program for validation of event-ordering certificates allows the computer to perform: a certificate receiving step of receiving two certificates for validation from the first and second user apparatuses respectively or two certificates for validation from the first user apparatus; assuming that one of the two certificates judged as being temporally former in publishing order is a first certificate, while the other of the two certificates judged as being temporally latter in publishing order is a second certificate, based on the sequential aggregation tree specifying information of the two certificates received, a sequential aggregation tree specifying information sending step of sending the sequential aggregation tree specifying information in the second certificate to the user apparatus receiving the first certificate; a late complementary information receiving step of receiving the late complementary information about the first certificate at a registration point after publishing the second certificate, from the user apparatus receiving the first certificate; a validation step of verifying, for a specified node in the sequential aggregation tree, whether an assigned value for the specified node contained in the second certificate coincides with an assigned value for the specified node calculated from the first certificate and the late complementary information or not, thereby certifying validity of the first and second certificates and that the registration point of the first certificate is temporally ahead of the registration point of the second certificate, based on a validation result; and a validation result sending step of sending the validation result to both or either of the first and second user apparatuses.

According to the ninth aspect of the present invention, there is also provided a program for validation of event-ordering certificates for allowing a computer to verify authenticity of certificates, the computer being connected to first and second user apparatuses, each of which performs an event-ordering request for certifying a chronological sequence of a certain event in time-series events generating a designated digital information, and an event-ordering certification apparatus for drafting the certificates for a plurality of event-ordering requests of the first and second user apparatuses through a communication network, wherein the event-ordering certification apparatus comprises: event-ordering request receiving means configured to receive the event-ordering requests from the first and second user apparatuses; sequentially assigned data-item calculating means configured to draft sequentially assigned data-items from digital information included in the event-ordering requests in accordance with a predetermined procedure; event-ordering request aggregating means configured, in sequential aggregation trees each of which is completed at regular time intervals by sequentially assigning a series of sequentially assigned data-items to leaves of a directed tree from left thereof, to calculate assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected; sequential aggregation tree storing means configured to store an information about the sequential aggregation trees produced by the event-ordering request aggregating means; assuming that: a leaf of the sequential aggregation tree to which the sequentially-assigned data-item drafted from each of the event-ordering requests is assigned is defined as a registration point; an information about other nodes necessary to calculate a root value of the sequential aggregation tree from the registration point is defined as a complementary information of the registration point; in the complementary information, a complementary information acquirable at a point of assigning each of the sequentially assigned data-item to the sequential aggregation tree is defined as an immediate complementary information, while a complementary information acquirable after the point of assigning each of the sequentially assigned data-item to the sequential aggregation tree is defined as a late complementary information; the late complementary information of a leaf a1 determined at a point of completing an assignation for a leaf a2 on the right of the leaf a1 in the sequential aggregation tree is defined as "late complementary information of the leaf a1 at the leaf a2"; and further a leaf of the sequential aggregation tree to which the sequential assigned data-item drafted by a new event-ordering request is defined as a new registration point, registration point storing means configured to store an information about an immediately preceding registration point with respect to each of the user apparatuses; certificate drafting means configured to integrate, from the information stored in the respective storing means, a sequentially assigned data-item for the new registration point, a sequential aggregation tree specifying information for specifying the sequential aggregation tree and a leaf thereof both having the sequentially assigned data-item assigned thereto, an immediate complementary information about the new registration point and a late complementary information about the immediately preceding registration point of each of the user apparatuses at the new registration point, thereby drafting a certificate for the new registration point; and certificate sending means configured to send the certificates to the user apparatuses; defining that a rightmost registration point of the respective registration points of each of the user apparatuses is referred to as a provisional terminal point and that to calculate all of the complementary information about a designated registration point acquirable at a point of completing an assignment for the provisional terminal point is referred to as an incremental completion for a certificate of the designated registration point, wherein each of the user apparatuses comprises: event-ordering request sending means configured to send the event-ordering requests to the event-ordering certification apparatus; certificate receiving means configured to receive the certificates for the event-ordering requests from the event-ordering certification apparatus; certificate storing means configured to store the certificates received; incremental completion means configured to perform the incremental completion to a certificate for validation of the plural certificates received and stored; validation request sending means configured to send a certificate for validation to the computer; and validation result receiving means configured to receive a validation result of the certificate for validation from the computer; wherein the program for validation of event-ordering certificates allows the computer to perform: a certificate receiving step of receiving two certificates for validation from the first and second user apparatuses respectively or two certificates for validation from the first user apparatus; assuming that one of the two certificates judged as being temporally former in publishing order is a first certificate, while the other of the two certificates judged as being temporally latter in publishing order is a second certificate, based on the sequential aggregation tree specifying information of the two certificates received, a sequential aggregation tree specifying information sending step of sending the sequential aggregation tree specifying information in the second certificate to the user apparatus receiving the first certificate; a late complementary information receiving step of receiving the late complementary information about the first certificate at a registration point after publishing the second certificate, from the user apparatus receiving the first certificate; a validation step of verifying, for a specified node in the sequential aggregation tree, whether an assigned value for the specified node contained in the second certificate coincides with an assigned value for the specified node calculated from the first certificate and the late complementary information or not, thereby certifying validity of the first and second certificates and that the registration point of the first certificate is temporally ahead of the registration point of the second certificate, based on a validation result; and validation result sending step of sending the validation result to both or either of the first and second user apparatuses.

According to the tenth aspect of the present invention, there is also provided an event-time validation program readable by a computer for verifying a time that the user apparatus executing the above-mentioned program for validation of event-ordering certificates applies on the event-ordering request.

BRIEF DESCRIPTION OF THE DRAWINGS

FIG. 6 is a diagram showing a structure of an event-ordering certification receipt in the present invention.

FIG. 11 is a diagram explaining a relationship between a user point and an audit point in the event-ordering certification system in accordance with the first embodiment of the present invention.

FIG. 12 is a diagram explaining an event-ordering certification verification result in the event-ordering certification system in accordance with the first embodiment of the present invention.

FIG. 27 is a diagram explaining the algorithm of a method of forming the sequential aggregation tree incrementally.

FIG. 28 is another diagram explaining the algorithm of the method of forming the sequential aggregation tree incrementally.

FIG. 43 is a diagram showing the structure of an event-ordering certification receipt of the event-ordering certification system of the fifth embodiment of the present invention.

FIG. 44 is a diagram explaining a perfection diffusion process in the event-ordering certification system of the fifth embodiment of the present invention.

FIG. 45 is a diagram showing the possibility of calculating a proof response in a sequence complementary procedure from a proof response in a chain complementary procedure by using the perfection diffusion process in the event-ordering certification system of the fifth embodiment of the present invention.

PREFERRED EMBODIMENTS FOR EMBODYING THE INVENTION

Embodiments of the present invention will be described below in detail, with reference to drawings.

1st. Embodiment

1-1. System Structure

Figure 1:
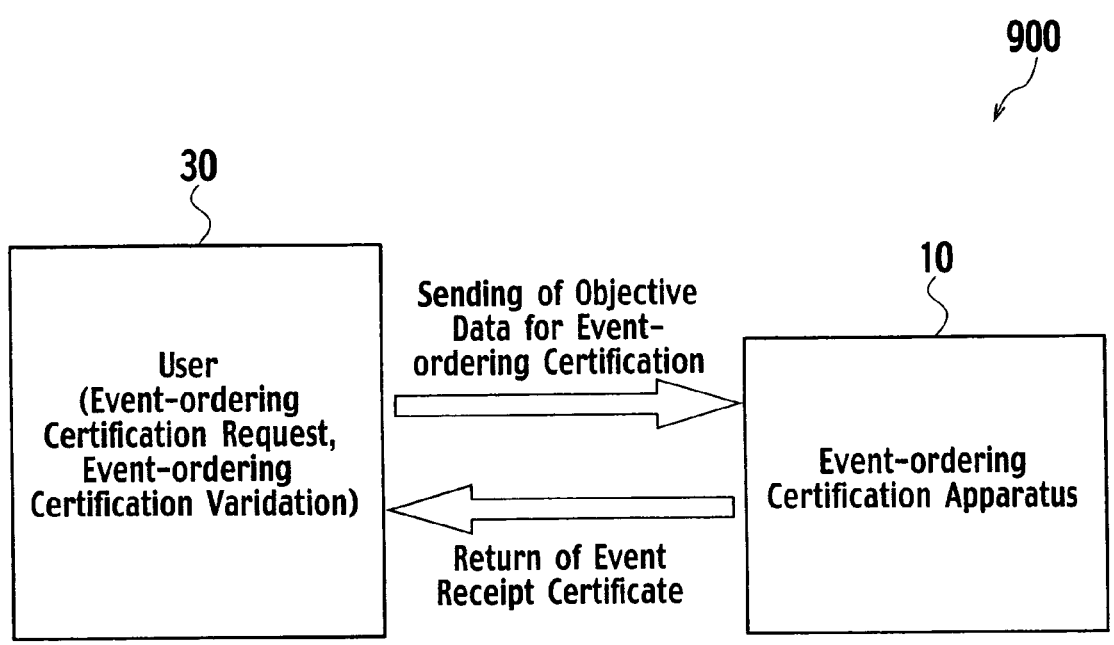
FIG. 1 is a diagram explaining the concept of an event-ordering certification system.
Figure 2:
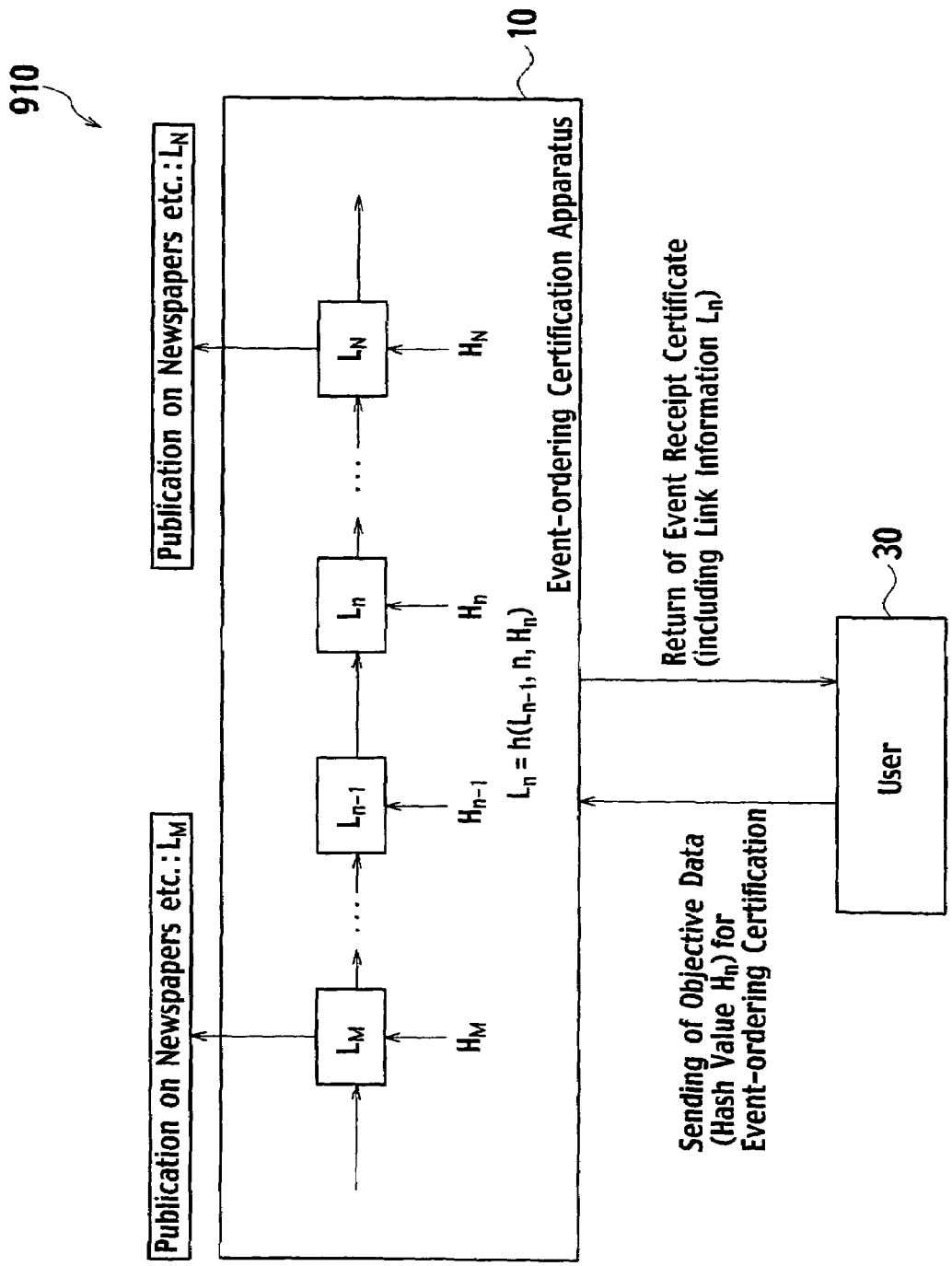
FIG. 2 is a diagram explaining the concept of the event-ordering certification system using linear linking protocol.
Figure 3:
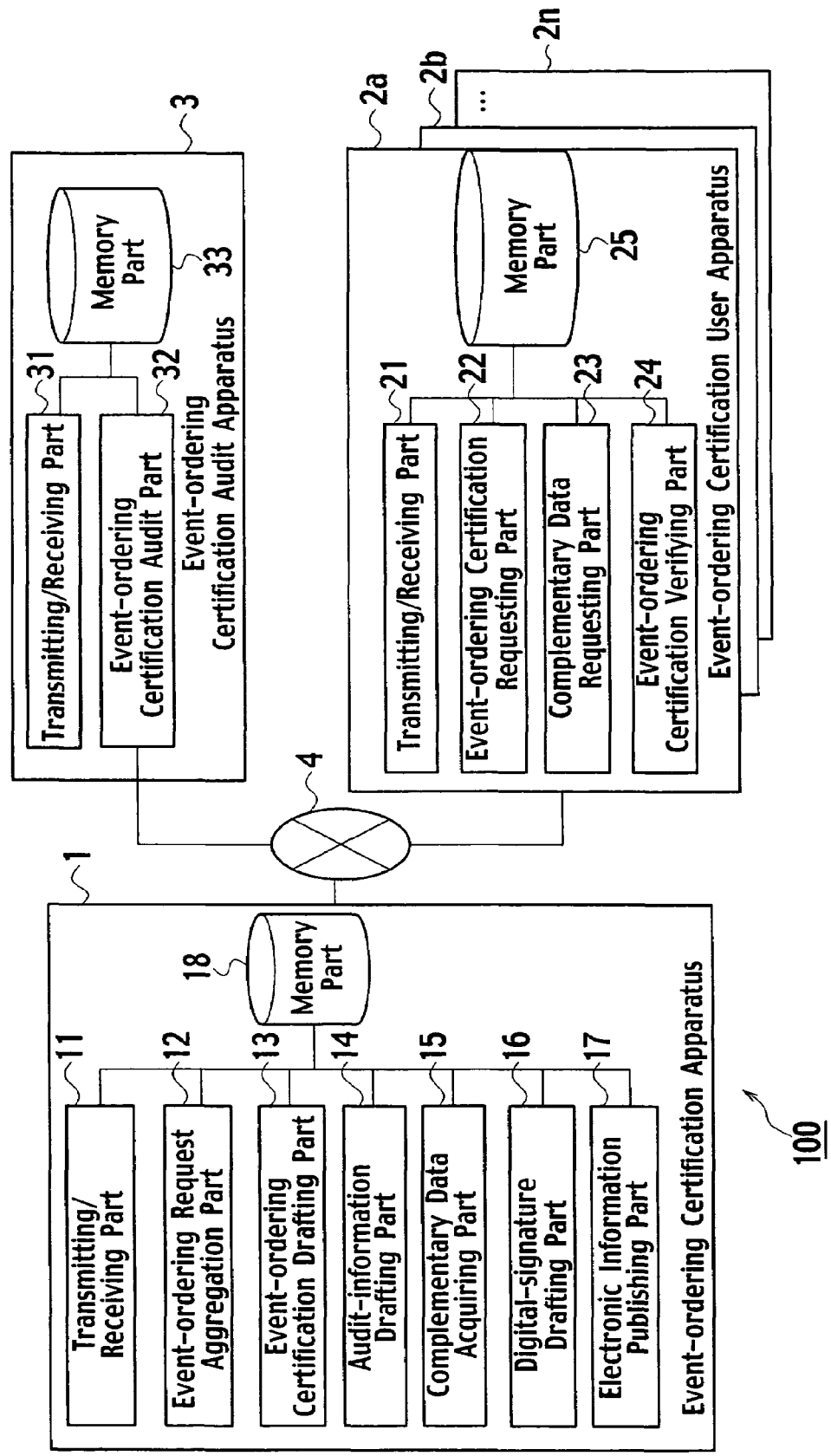
FIG. 3 is a system architecture diagram of an event-ordering certification system in accordance with a first embodiment of the present invention.

FIG. 3 is a system architecture diagram of an event-ordering certification system 100 in accordance with the first embodiment of the present invention. The event-ordering certification system 100 includes an event-ordering certification apparatus (referred to as "certification apparatus" below) 1, a plurality of event-ordering certification user apparatuses (referred to as "user apparatuses" below) 2$i$ (i=a, b, . . . , n), an event-ordering certification audit apparatus (referred to as "audit apparatus" below) 3 for auditing an event-ordering receipt (referred to as "receipt" below) issued by the certification apparatus 1 and a computer network 4 formed by e.g. internet, telephone network, etc. In operation, the certification apparatus 1 publishes a receipt in response to an event-ordering certification request (referred to as "event-ordering request" below) from each of the user apparatuses 2$i$ and successively sends the receipt to the user apparatus 2 in question. If the receipt is believed to be doubtful, then the user apparatus 2$i$ can verify the receipt with the use of data published by the certification apparatus 1 and an audit result by the audit apparatus 3.

Figure 4:
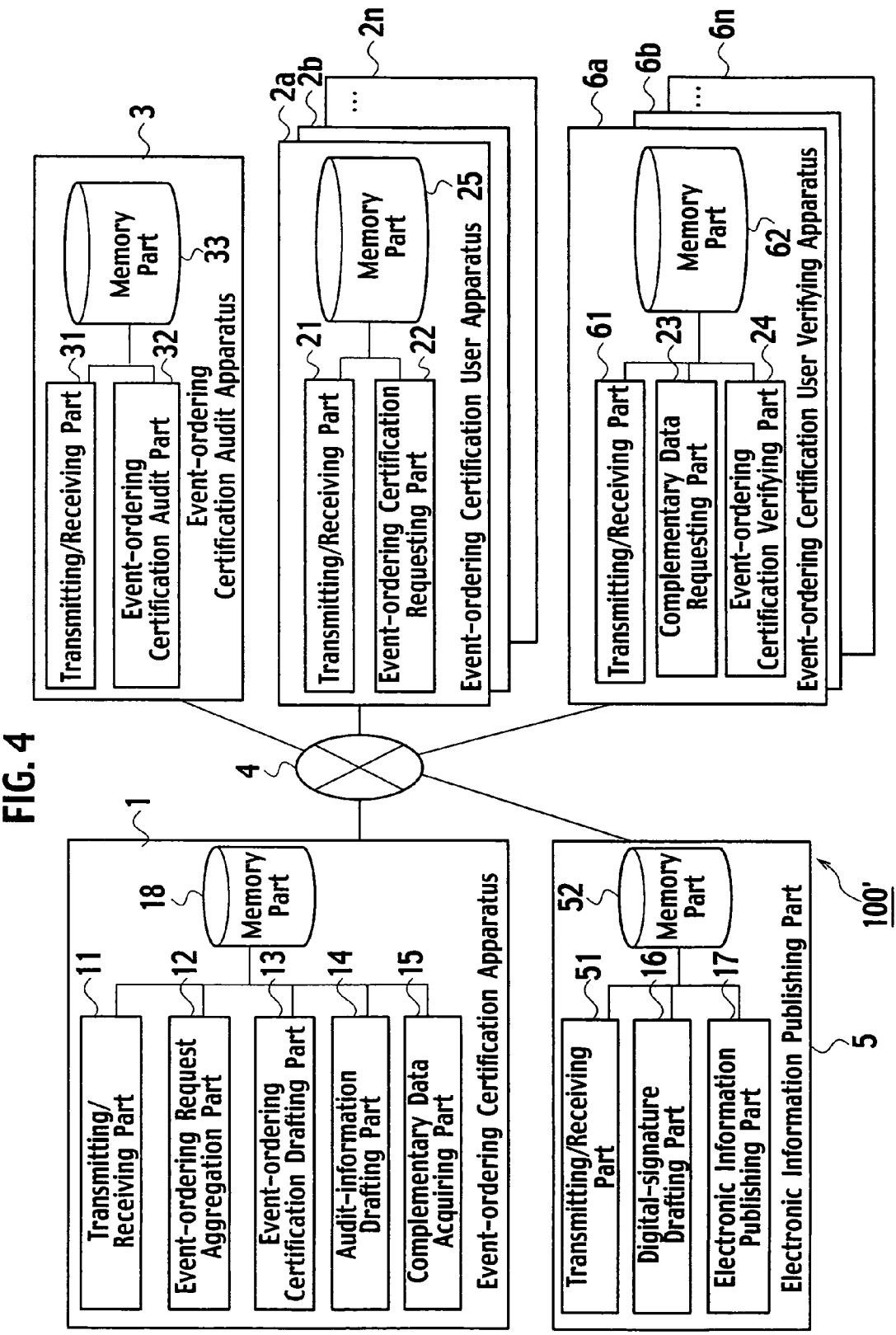
FIG. 4 is another system architecture diagram of the event-ordering certification system in accordance with the first embodiment of the present invention.

Note that the system architecture of the event-ordering certification system 100 is not limited to this only and therefore, it may be modified to various forms so long as its identity in function. For instance, as shown in FIG. 4, event-ordering certification user verifying apparatuses (referred to as "user verifying apparatuses" below) 6$i$ (i=a, b, . . . , n) may verify the receipts in place of the user apparatuses 2$i$. Additionally, in place of the user apparatuses 2$i$, an electronic-information publication apparatus 5 may obtain published data from the certification apparatus 1 and discloses the published data. Moreover, the computer network 4 may be replaced by other communicating means, such as postal mail. Note that the constitution and operation of the event-ordering certification system will be described with reference to the system 100 of FIG. 3.

The certification apparatus 1 comprises a transmitting/receiving part 11 for transmitting and receiving data to and from the user apparatuses 2$i$ and the audit apparatus 3 through the computer network 4, an event-ordering request aggregation part 12 for arranging digital data (as event-ordering requests) transmitted from the user apparatuses 2$i$ with the use of a sequential aggregation tree, an audit-information drafting part 14 for drafting audit information to be transmitted to the audit apparatus 3, a complementary data acquiring part 15 for acquiring complementary data in response to complementary data requests from the user apparatuses 2*i*, a digital-signature drafting part 16 for attaching attach a high-intensity digital signature to data where respective contents of plural receipts issued by the certification apparatus 1 for a constant period are associated with each other, an electronic information publishing part 17 for giving publicity to the data having the high-intensity digital signature and a memory part 18 for memorizing the receipts and information about the event-ordering certification.

Figure 5:
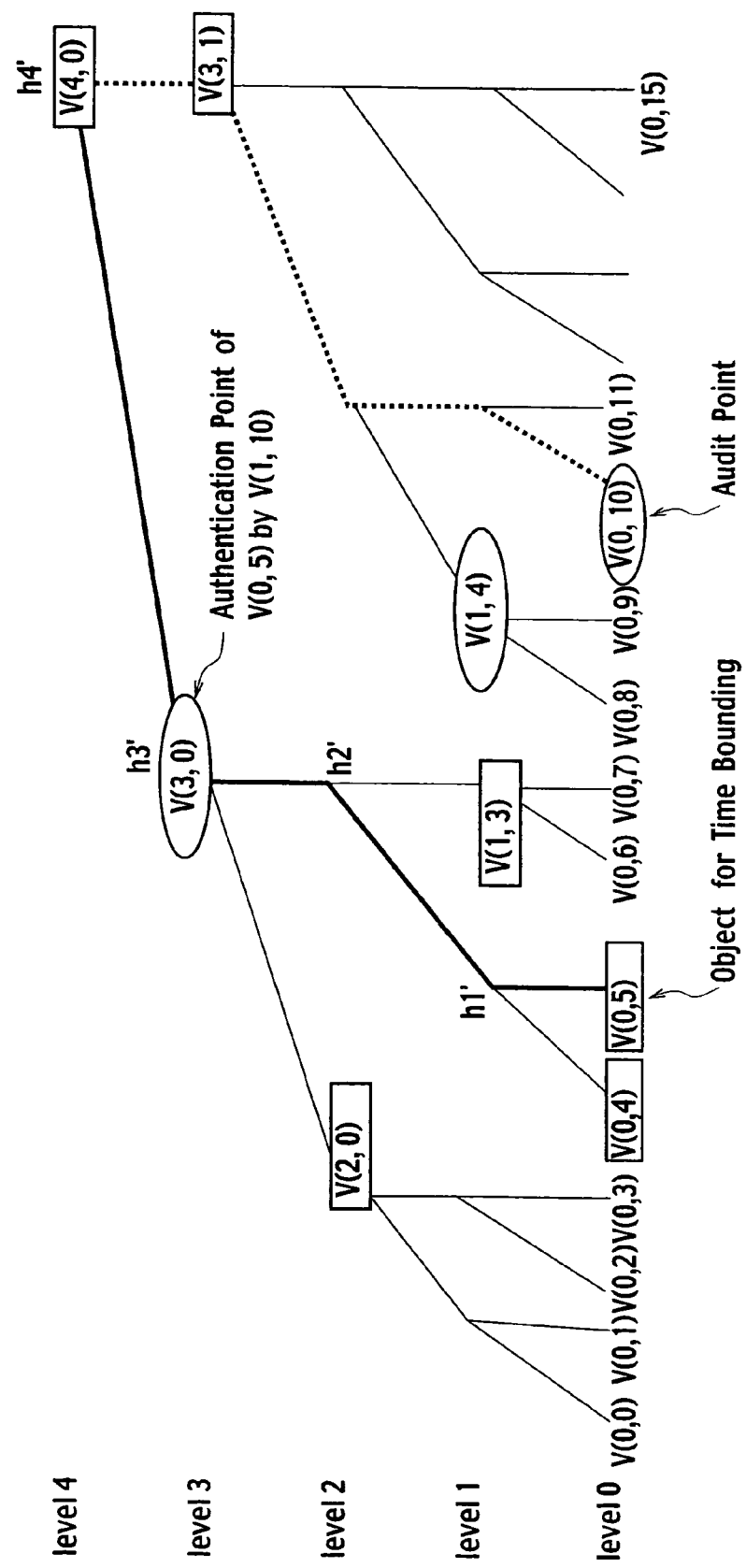
FIG. 5 is a diagram explaining a structure of a sequential aggregation tree used in the present invention.

As mentioned above, the event-ordering request aggregation part 12 operates to aggregate the event-ordering requests with the use of the sequential aggregation tree. This sequential aggregation tree will be described with reference to FIG. 5. The sequential aggregation tree of FIG. 5 is a sequential aggregation tree that is completed for a certain period (e.g. one week, a cycle for the ordering apparatus 1 to give publicity to coordinating data, which will be referred to as "sequential aggregation period"). In the sequential aggregation tree, digital data produced from all or part of digital data included in the event-ordering requests from the users' apparatuses 2*i* in accordance with a designated "sequentially assigned data" calculating procedure is sequentially assigned to respective leaves from the left side with time (note: the assigned digital data will be referred to as "sequentially assigned data-item", for example, a hash value of the digital data included in the event-ordering request).

A calculating method of values assigned to respective nodes (except leaf) in the sequential aggregation tree is as follows. An assigned value of a parent in the sequential aggregation tree is obtained by calculating a hash value as a result of connecting an assigned value H' of a left-side child with an assigned value H'' of a right-side child (conjunction between a bit row and a bit row) and further applying a designated "collision-resistant" one-way hash function. Here, the resultant value is expressed by $h(H'\|H'')$. In this way, it is performed to calculate an assigned value at high level by assigned values at low level and finally calculate an assigned value (root value) at the highest level (root).

We now describe an example of a sequential aggregation tree having sixteen leaves, as shown in FIG. 5. The number of leaves of the sequential aggregation tree and its height do not become definite unless the sequential aggregation period is completed. Further, in the sequential aggregation tree, the assignment of values to the leaves is carried out from left, in sequence. The assignments of values to nodes higher than level 0 (i.e. non-leaves) are carried out incrementally if possible. Accordingly, for a plurality of nodes on the same vertical line of FIG. 5, the assignments of values to the nodes are carried out at about the same time in the same processing unit. Under the notation that a node at level j and numbered (index) i is represented by (j, i) and an assigned value of (j, i) is represented by V(j, i), the concrete example of FIG. 5 will be described.

Suppose a situation that sequential assigned data is assigned to node (0, 5), in other words, a hash value to be assigned to a certain "sequential aggregation tree" leaf is represented by V(0, 5). Then, in order to calculate a root value H (=V(4, 0)) from this hash value V(0, 5), it has only to link V(0, 4) to V(0, 5) from the left side thereby calculating a hash value h1'; V(1, 3) to the hash value h1' from the right side thereby calculating a hash value h2'; V(2, 0) to the hash value h2' from the left side thereby calculating a hash value h3'; and link V(3, 1) to the hash value h3' from the right side thereby calculating a hash value H(=V(4, 0)), in order. With the above procedure, when it becomes possible to calculate the root value H from V(0, 5) and its complementary data (e.g. V(0, 4), V(1, 3), V(2, 0), V(3, 1) in this case), we can say "V(0, 5) links with the root value H through the hash function h". Additionally, the complementary data of V(0, 5) in the sequential aggregation tree (referred to as "sequentially-aggregated complementary data") is given by

[(V(0, 4), L), (V(1, 3), R), (V(2, 0), L), (V(3, 1), R)]

where L and R represent "to link from the left side in linking two digital data" and "to link from the right side in linking two digital data", respectively.

The event-ordering reply drafting part 13 drafts a certification reply containing a receipt EOC(y) as shown in FIG. 6 and sends it to the user apparatus 2*i*. The receipt EOC(y) is constructed so as to contain: digital data y sent from a user; sequentially assigned data-item z calculated from the digital data y by the above-mentioned calculation procedure for sequentially assigned data-item; a "sequential-aggregation" tree number enabling a sequential aggregation tree having the data-item z assigned to be identified uniquely; a "sequential aggregation tree" leaf number enabling a "sequential aggregation tree" leaf having the data-item z assigned to be identified uniquely; and a part HK of sequentially-aggregated complementary data acquirable at that time. The above data part HK will be referred to as "immediate complementary data". In the modification, the receipt EOC(y) may be constructed on deletion of the immediate complementary data HK.

The event receipt EOC(y) is allowed to be sent with a digital signature using a secret key (secret key for signature) of a public key cryptosystem key-pair that the certification apparatus 1 prepares in advance. In this case, it is established that the user apparatus 2*i* has access to a public key of the public key cryptosystem key-pair by means of a public-key cryptography board or the like.

Note that sequential aggregation complementary data acquirable after publishing a receipt EOC(y) in question will be referred to as "late complementary data". That is, at that stage of drafting the receipt EOC(y), only the immediate complementary data is transmitted to the user apparatus 2*i*, while the late complementary data is transmitted to the user apparatus 2*i* when it is required after publishing the receipt EOC(y) in question. In FIG. 5, for instance, node assigned values V(2, 0) and V(0, 4) constitute the immediate complementary data about node (0, 5), while node assigned values V(1, 3) and V(3, 1) constitute the late complementary data acquirable on and after node (0, 15) has been assigned. For a sequential aggregation tree leaf number i, V(0, i) may be represented by V(i) in short.

In operation, when the complementary data acquiring part 15 receives a request for the above-mentioned late complementary data from the user apparatus 2*i*, the part 15 sends back all of the information at the present moment (i.e. tree number and leaf number to which the relevant request is assigned) and the sequential aggregation complementary data (positional information, assigned value) which has been already determined at this moment, to the user apparatus 2*i*.

Figure 7:
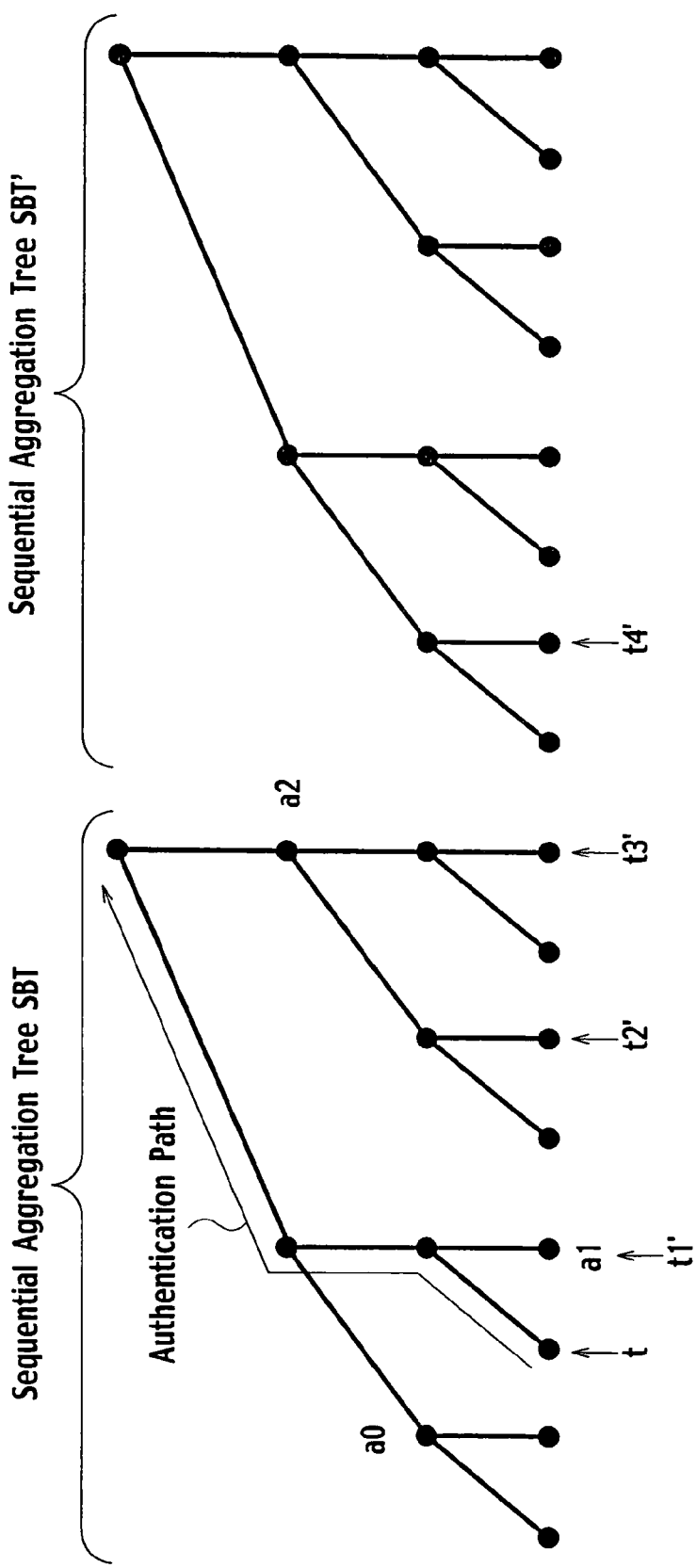
FIG. 7 is a diagram explaining an authentication path of the sequential aggregation tree used in the present invention.

Referring to FIG. 7, the contents of the sequential aggregation complementary data will be described in detail.

As for one leaf t of the sequential aggregation tree, its complementary data CToken(t, t') at another leaf t' positioned on the right of the leaf t will be defined as follows.

A path extending from the leaf t up to a root of the sequential aggregation tree is called "root path of t". Further, a row of nodes consisting of brotherly nodes for nodes belonging to the above root path of t but the root itself is called "authentication path of t". Note that a detailed definition of the authentication path will be described later. In respective constituents (nodes) of an authentication path, a row of constituents whose assigned values have already become definite at the point of the establishment of an assigned value for a leaf t1 on the right of t will be referred to as "authPathD(t, t1)" and also called "authentication path for t at t1" hereinafter. In connection, one resulting from adding the information about assigned values to the above row of constituents will be referred to as "authPathDV(t, t1)" and also called "valued authentication path for t at t1" hereinafter.

From above, it will be understood that authPathDV(t, t') constitutes the complementary data CToken(t, t') while involving even information that the receipt EOC(y) does not involve.

Even when t' is one leaf of a next sequential aggregation tree SBT' produced after completing a generative period (i.e. sequential aggregation period) of the preceding sequential aggregation tree SBT containing t, authPathDV(t, t') involves only the information about the tree SBT. At this time, CToken (t, t') in combination with the receipt EOC(y) contains information enough to calculate the root value of the sequential aggregation tree for the relevant sequential aggregation period.

In FIG. 7, for instance, CToken(t, t4') contains one row composed of a first pair of positional information of a1 and its assigned value (pair: ((0, 3), V(a1))) and a second pair of positional information of a2 and its assigned value (pair: ((2, 1), V(a2))). The row is represented by [((0, 3), V(a1)), ((2, 1), V(a2))].

In the following descriptions, we define complementary data that allows a root value of a sequential aggregation tree to be calculated in combination with an assigned value of the sequential aggregation tree contained in a receipt as "complete complementary data of the receipt". In connection, we refer to complementary data that would allow the root value of the sequential aggregation tree to be calculated in combination with the assigned value and the immediate complementary data contained in the receipt as "complete late complementary data".

The audit information drafting part 14 acquires audit information from the sequential aggregation tree and sends it to the audit apparatus 3. More in detail, the audit information is formed by an event-ordering receipt certificate for audit, which is produced at an audit point in the sequential aggregation tree as follows. Note that the terminology "event-ordering receipt certificate for audit" will be referred to as—audit receipt—below. Here, the audit point designates a leaf in a sequential aggregation binary tree that an event-ordering request for audit from the audit apparatus 3 is assigned. Note that the terminology "event-ordering request for audit" will be referred to as—audit request—below.

Although a single audit point is shown in FIG. 5, it is a matter of course that there may be provided some audit points in accordance with a designated algorithm. For the purpose of a later-mentioned audit against a receipt for an event-ordering request, the audit point may be positioned in anyplace so long as it coincides with one leaf (e.g. node (0, 5) in FIG. 3) corresponding to the event-ordering request or another leaf on the right (temporally behind).

The format of an audit receipt is identical to that of a receipt to be sent to the user apparatus 2i. Note that digital data y as a basis of calculating a sequentially assigned data-item may be data that was sent from the audit apparatus 3 to the certification apparatus 1, as an audit request. Alternatively, the digital data y may be produced by the relevant certification apparatus 1 in accordance with a predetermined procedure for the audit apparatus 3 in question. Additionally, on the assumption of drafting a digital document as an object of event-ordering certification in the audit receipt in accordance with a predetermined procedure, a hash value as a result of applying a predetermined hash function on the digital document may be adopt as the digital data for calculating the sequentially assigned data-item.

The user apparatus 2i comprises a transmitting/receiving part 21 for transferring data to and from the certification apparatus 1 and the audit apparatus 3 through the computer network 4, an event-ordering certification requesting part 22 for performing the event-ordering requests containing designated digital data, a complementary data requesting part 23 for requesting complementary data for a receipt (receipt certificate) acquirable at the point of requesting, an event-ordering certification verifying part 24 for verifying the receipt and a memory part 25 for storing the information about event-ordering certification containing the receipt.

Here, it is noted that the event-ordering certification verifying part 24 has the following validation functions for the receipt.

First, the event-ordering certification verifying part 24 has the zeroth ($0^{-th}$.) validation function to perform a digital-signature validation to a digital signature if it is included in the receipt.

As the first validation function, it is performed to verify whether the sequentially assigned data-item contained in the receipt is linked with the public information published with assured authenticity, such as high-intensity digital signature by the certification apparatus 1.

As described below, the event-ordering certification verifying part 24 has the second function of verifying the validity of the receipt by using the audit apparatus 3 even before publishing the public information from the certification apparatus 1.

The audit apparatus 3 comprises a transmitting receiving part 31 for transferring data to and from the certification apparatus 1 and the user apparatuses 2i through the computer network 4, an event-ordering certification audit part 32 that verifies a receipt by using both audit request information from the user apparatus 2i and part's own audit information when receiving an audit request for the receipt from the user apparatus 2i and sends a result of validation to the user apparatus 2i, and a memory part 33 for storing audit information including the audit receipt.

Here, we now describe the function of the event-ordering certification audit part 32 with reference to FIG. 5. In FIG. 5, because of an audit point (0, 10), the audit information that the audit apparatus 3 receives at this point of time comprises V(3, 0) and V(1, 4) as mentioned above. On the other hand, the user apparatus 2i sends, as the audit request information, V(0, 5) and V(0, 4), V(1, 3) and V(2, 0) as the sequential aggregation complementary data. Regarding the incorporation of V(1, 3) into the audit request information, it is noted that it becomes possible for the user apparatus 2i to acquire V(1, 3) (not included in the immediate complementary data) from the certification apparatus 1 at the point of requesting the validation (i.e. on and after the audit point (0, 10) temporally behind the issue of the point (0, 5)) and therefore, the user apparatus 2i actually acquires V(1, 3) as the late complementary data from the certification apparatus 1 and incorporates it into the audit request information. In this way, the event-ordering certification audit part 32 verifies whether its own audit information V(3, 0) coincides with V(3, 0) introduced by the audit request information from the user apparatus 2i.

Hereinafter, a "sequential aggregation tree" leaf to which a sequentially assigned data-item drafted by an event-ordering request from the user apparatus 2i is assigned will be referred to as "user point", while a "sequential aggregation tree" leaf to which a sequentially assigned data-item drafted by an audit request from the audit apparatus 3 is assigned will be referred to as "audit point".

We refer to a node ((3, 0) in FIG. 5) in the sequential aggregation tree to be verified comparatively as "authentication point", after. Generally, when a certain user point number is smaller than an audit point number, a label (assigned value) for the authentication point is included in the audit information. Further, the label for the authentication point is included in a label calculable from the late complementary data that the user apparatus 2i could receive on and after the point of completing an event-ordering certification process at the audit point. In a sequential aggregation tree, therefore, if there are sequentially arranged a user point, an audit point and a request point for late complementary data in order from left, the above-mentioned validation could be accomplished constantly. This reason of accomplishment will be described later (see later-mentioned Feature 2 of Sequential Aggregation Tree, Item 3).

In order for the user apparatus 2i to ask the audit apparatus 3 to perform the second validation for a certain receipt, an audit point of the audit apparatus 3 has to be present between one leaf $\tau$ where an event-ordering request for the above receipt is assigned and another leaf $\tau'$ where a request of late complementary data for the above receipt is assigned (including also leaves $\tau$, $\tau'$).

Note that the above apparatuses are formed by electronic apparatuses each having a CPU (Central Processing Unit) having at least a calculating function and a control function, a main memory having a function to store programs and data, such as RAM (Random Access Memory), and a secondary memory capable of continuing to memorize data even at powered-off, such as HD) (Hard Disc). The operations of respective parts of the certification apparatus 1 (i.e. the event-ordering request aggregating part 11, the event-ordering drafting part 13, the audit information drafting part 14, the complementary data acquiring part 15, the digital signature drafting part 16 and the electronic information publishing part 17), the operations of respective parts of the user apparatus 2i (i.e. the event-ordering requesting part 22, the complementary data requesting part 23 and the event-ordering verifying part 24) and the operation of the event-ordering certification audit part 32 of the audit apparatus 3, are nothing but respective crystallizations of the above calculating/control functions of the above central processing unit. Additionally, the memory part 18 of the certification apparatus 1, the memory part 25 of the user apparatus 2i and the memory part 33 of the audit apparatus 3 are respectively equipped with the above-mentioned functions of either the main memory or the secondary memory.

Each program for executing a variety of processes in this embodiment is stored in either the main memory or the secondary memory mentioned above. In connection, this program may be recorded in a computer-readable recording medium (e.g. hard disc, flexible disc, CD-ROM, MO, DVD-ROM, etc.) or delivered through a communication network.

1-2. System Operation

Figure 8:
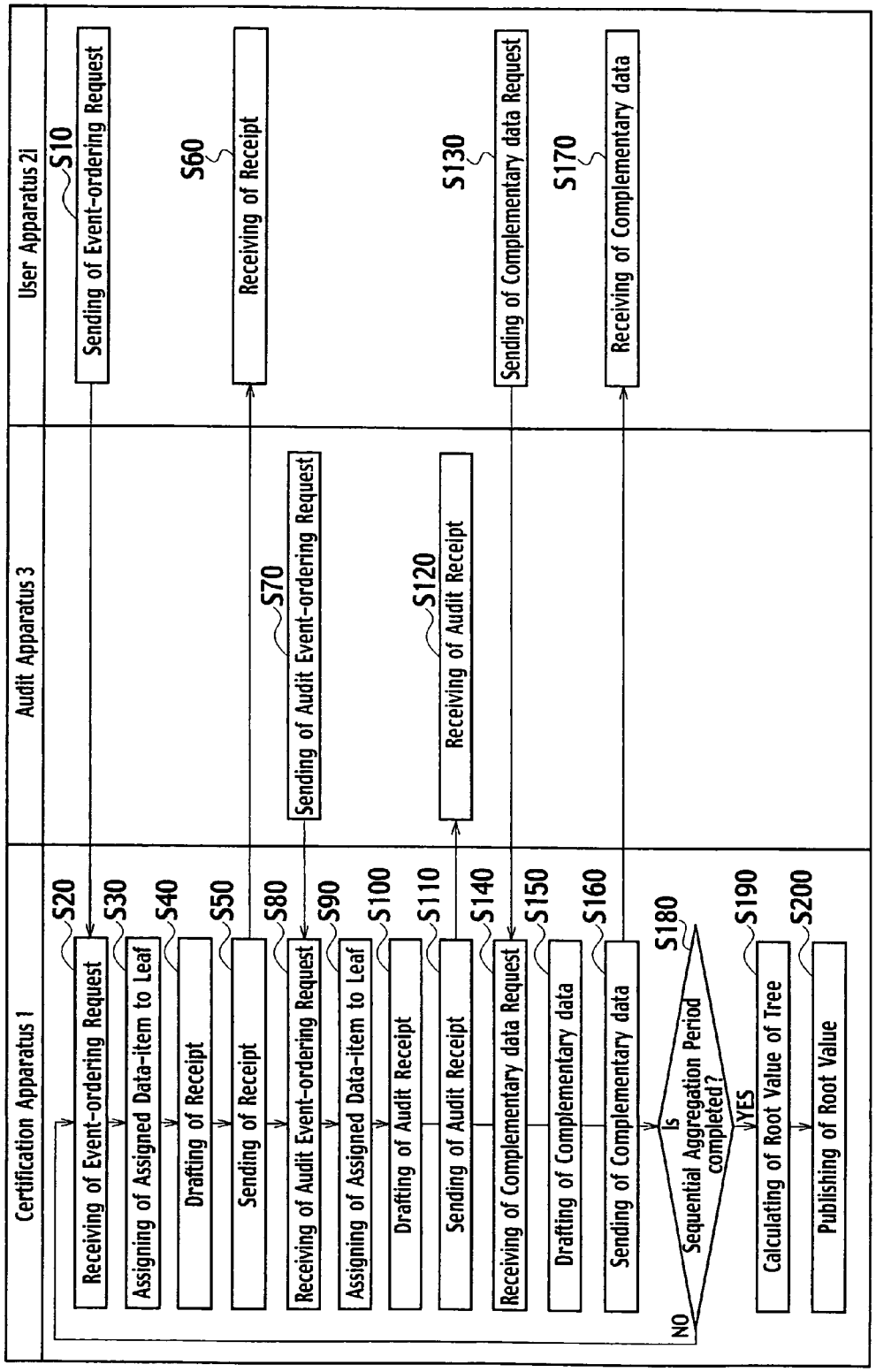
FIG. 8 is a sequence diagram explaining an event-ordering certification method by the event-ordering certification system in accordance with the first embodiment of the present invention.
Figure 9:
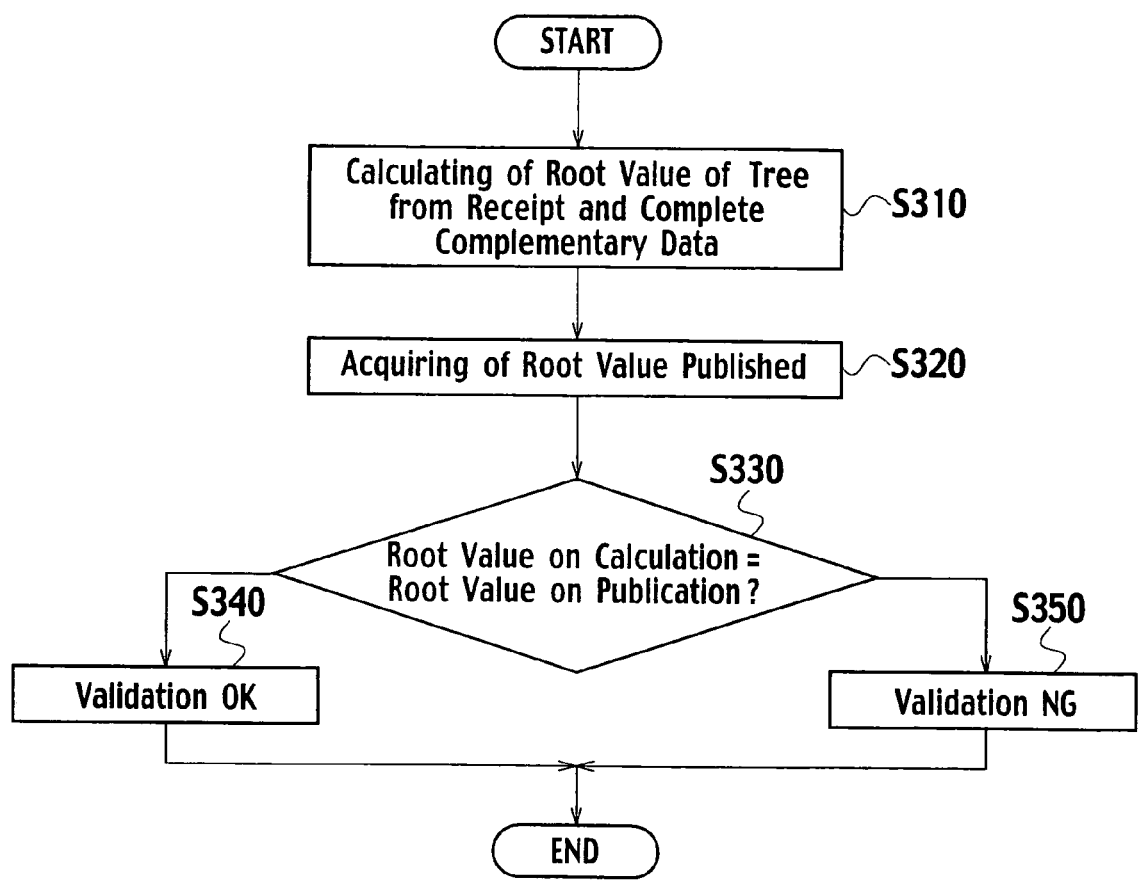
FIG. 9 is a sequence diagram explaining an event-ordering certification verification method by the event-ordering certification system in accordance with the first embodiment of the present invention.
Figure 10:
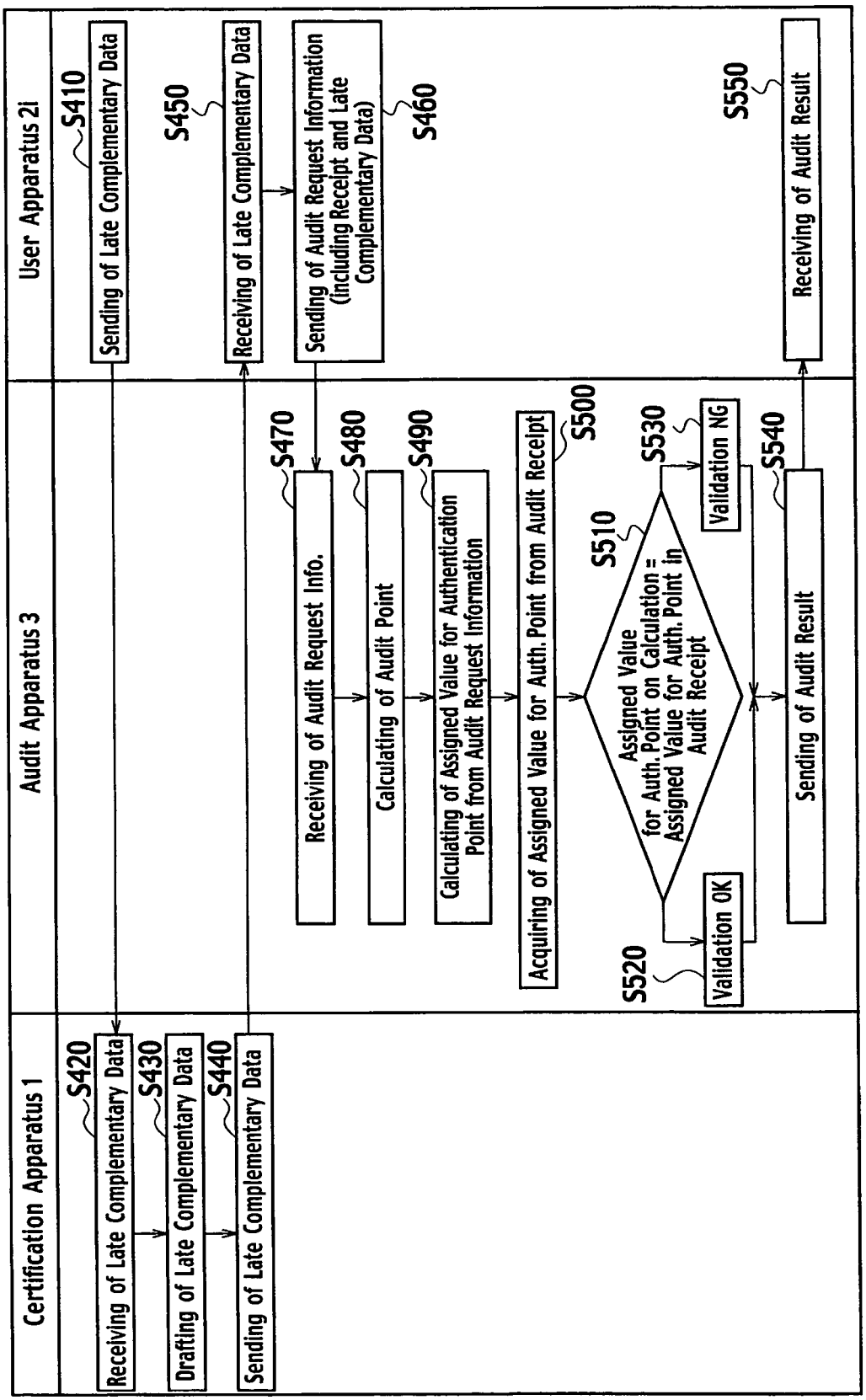
FIG. 10 is another sequence diagram explaining the event-ordering certification verification method by the event-ordering certification system in accordance with the first embodiment of the present invention.

In the event-ordering certification system 10 constructed above, an event-ordering certification method and an event-ordering certification validation method will be described with reference to FIGS. 8 to 10. In the figures, FIG. 8 is a sequence diagram to explain the operation of the certification apparatus 1 to draft a receipt (i.e. a receiving certificate) and an audit receipt (i.e. a receiving certificate for audit) for one sequential aggregation period. FIG. 9 is a flow chart to explain the operation of the user apparatus 2i to apply a first validation on the receipt. FIG. 10 is a sequence diagram to explain the operation of the user apparatus 2i to apply a second validation on the receipt.

First of all, the event-ordering certification method will be described with reference to FIG. 8.

When the user apparatus 2i sends an event-ordering request including digital data $\underline{y}$ to the event-ordering certification apparatus 1, it receives the event-ordering request including the digital data y through the transmitting/receiving part 11 (steps S10, S20).

Next, the event-ordering request aggregation part 12 calculates a sequentially-assigned data-item z from the digital data y as partial or all input and further assigns the sequentially-assigned data-item z to a "sequential aggregation tree" leaf to construct a sequential aggregation tree incrementally. While, the event-ordering certification drafting part 13 drafts a receipt EOC(y) and successively sends it to the user apparatus 2i through the transmitting/receiving part 11 (steps S30, S40, S50).

In this way, the user apparatus 2i can acquire the receipt EOC(y) (step S60). In connection, the user apparatus 2i may incorporate immediate complementary data acquirable at that time into the receipt EOC(y). However, it should be noted that the receipt EOC(y) does not include the late complementary data.

In the same way, when the audit apparatus 3 sends an audit event-ordering request, the event-ordering certification apparatus 1 receives the audit event-ordering request including through the transmitting/receiving part 11 (steps S70, S80).

Next, the event-ordering request aggregation part 12 assigns a sequentially assigned data-item for audit calculated by the audit event-ordering request to a sequential aggregation-tree leaf to construct a sequential aggregation-tree incrementally. While, the audit-information drafting part 14 drafts a receipt certificate for audit (referred to as "audit receipt" after) and successively sends it to the audit apparatus 3 through the transmitting/receiving part 11 (steps S90, S100, S110).

In this way, the audit apparatus 3 can obtain the audit receipt (step S120).

Next, when the user apparatus 2i sends a request of late complementary data for the obtained receipt to the event-ordering certification apparatus 1, it receives the request of late complementary data through the transmitting/receiving part 11 (steps S130, S140).

Then, the complementary-data acquiring part 15 of the certification apparatus 1 acquires complementary data for the receipt, which can be acquired at that time and further sends this late complementary data to the user apparatus 2i through the transmitting/receiving part 11 (steps S150, S160).

In this way, the user apparatus 2i can acquire the late complementary data necessary for audit (step s170).

The above-mentioned operation of the certification apparatus 1 is repeated in a certain period for sequential aggregation (i.e. sequential aggregation period). When the sequential aggregation period is completed, a root value in the sequential aggregation tree is calculated. Then, the electronic-information publishing part 17 gives publicity to the root value (steps S180, S190, S200). In connection, in view of assuring the authenticity of the information, the electronic-information publishing part 17 may disclose published information having a high-intensity digital signature with the use of the "high-intensity" digital-signature drafting part 16.

According to the event-ordering certification method of FIG. 8, the audit apparatus 3 transmits the request of audit information to the certification apparatus 1 and correspondingly, it transmits the audit information to the audit apparatus 3. Alternatively, the certification apparatus 1 may send the audit information to the audit apparatus 3 automatically.

Referring to FIG. 9, we now describe a method for validation of event-ordering certificates utilizing the published information disclosed electronically. This corresponds to the first validation function of the user apparatus 1.

First, the user apparatus $2i$ calculates a root value "Rhcal" in the sequential aggregation tree by the digital data y as the request of certification that the apparatus $2i$ has sent to the certification apparatus 1, the receipt EOC(y), the sequential aggregation complementary data included in the late complementary data (note: At this point, all sequential aggregation complementary data can be acquired) (step S310).

Next, it is executed to acquire a root value RH for the same sequential aggregation period published with the high-intensity digital signature electronically and further, it is executed to judge whether this root value RH is identical to the calculated root value "Rhcal" (steps S320, S330).

If the above validation is completed in success, then it is possible to confirm that the receipt is not subjected to tamper (step S340). On the other hand, if the above validation is failed, it is possible to confirm that the receipt is subjected to tamper (step S350). Consequently, after the information is published electronically while ensuring the authenticity by means of the high-intensity digital signature, it is possible to verify that the receipt published by the certification apparatus 1 is one which has been issued, during said sequential aggregation period, in an order distinguishable with a "sequential aggregation tree" leaf number included in the receipt, against original data included in the receipt.

Referring to FIG. 10, we now describe the method for validation of event-ordering certificates using the audit apparatus 3. This corresponds to the second validation function of the user apparatus $2i$.

Before an audit request, the user apparatus $2i$ requests late complementary data of a receipt objective of validation for the certification apparatus 1 (step S410). When the certification apparatus 1 receives this request through the transmitting/receiving part 11, complementary-data acquiring part 15 acquires either the late complementary data obtained by subtracting instant complementary data from all of the late complementary data acquirable at that time (case: the instant complementary data is included in the receipt) or all of the late complementary data acquirable at that time (case: no instant complementary data is included in the receipt) and successively, the part 15 sends the so-acquired late complementary data to the user apparatus $2i$ through the transmitting/receiving part 11 (steps S420, S430, S440). With this acquirement of the complementary data by the user apparatus $2i$, the event-ordering certification verifying part 24 sends audit request information including the receipts received in advance to the audit apparatus 3 (steps S450, S460).

The audit apparatus 3 receives the audit request information through the transmitting/receiving part 31 (step S470). In respective leaves of a sequential aggregation tree where audit receipts on previous reception are assigned, the event-ordering certification audit part 32 calculates an audit point a between a "sequential aggregation tree" leaf $\tau$ that the receipt in the above audit request information on this reception is assigned and a leaf $\tau'$ included in the late complementary information (step S480). Next, the audit apparatus 3 calculates a certification point for the leaf $\tau$ by the audit point $\alpha$ from the audit request information and further calculates an assigned value "Acal" for the so-calculated certification point (step S490). On the other hand, the event-ordering certification audit part 32 acquires an assigned value A of this certification point that the apparatus 3 has already acquired as the audit information, from the memory part 33 and judges whether the assigned value A of the certification point coincides with the assigned value "Acal" of the certification point on calculation (steps S500, S510).

If the above validation is completed in success, then it is possible to confirm that the receipt is not subjected to tamper (step S520). On the other hand, if the above validation is failed, it is possible to confirm that the receipt is subjected to tamper (step S530). The event-ordering certification audit part 32 sends this audit result to the user apparatus $2i$ through the transmitting/receiving part 31, while the user apparatus $2i$ receives the audit result (step S540, S550).

Consequently, even before publication an electronic publishing organization, each user apparatus $2i$ can absolutely verify that the receipt published by the certification apparatus 1 is one that was issued, during said sequential aggregation period, in an order distinguishable with a "sequential aggregation tree" leaf number included in the receipt, against original data included in the receipt. Note that the above audit result may contain an identifier of the audit point $\alpha$. In this case, the user apparatus $2i$ can obtain an assurance that the registration of an event-ordering request corresponding to the receipt requiring the above audit was carried out before the registration of an audit event-ordering request corresponding to the audit point $\alpha$, from the audit apparatus 3.

Note that in the process at step S540, it may be carried out for the audit apparatus 3 to attach a digital signature to the information containing the complementary data that the audit apparatus 3 has received, with the use of a signature secret key of the certification audit apparatus 3. Then, the result of validation with the digital signature is transmitted to the user apparatus $2i$. Consequently, even if an effective digital signature is not available for the root value of the sequential aggregation tree on the presupposition that the digital signature by the audit apparatus 3 is credible, it becomes possible for a user using the user apparatus $2i$ to certify the validity of event-ordering certification using the above receipt against a third person, objectively.

1-3. Method of Auditing Event Ordering

Next, we describe the second validation, that is, a validation method of event-ordering certification using the audit apparatus 3, in detail.

Note that the following description is based on the premise that a point of time of starting the service of the event-ordering certification system 100 coincides with an origin of time; one parameter (e.g. one second, one milli-second, etc.) is established as a clocking unit; and a time point is represented by an integral number as a result of clocking a passage of time since the above origin of time by the above clocking unit.

Here, some preliminary definitions are given to explain the validation method of event-ordering certification.

In a sequential aggregation tree SBT, one node is identified by its level j and its in-level number i. As for this node p, its level and number are expressed by "level(p)" and "index(p)", respectively.

Additionally, "leaf(SBT, i)" represents a leaf in the sequential aggregation tree SBT, which is identified with the leaf number i in the sequential aggregation tree. A series of processes of accepting an event-ordering request forming the origin of assigning assigned values to the leaf(SBT, i) sequentially and further assigning an assigned value to the same leaf will be referred to as "processing round" and represented by "round(SBT, i)". When it is obvious from the context that which of sequential aggregation tress is being discussed now, they may be represented by "leaf(i)" and "round(i)" simply.

Identification numbers starting from zero are applied to sequential aggregation trees in order of generation. This number will be referred to as "sequential aggregation tree number" hereinafter. The number of leaves in an $n^{th}$ sequential aggregation tree will be represented by "N(n)".

Both sequential aggregation tree-number n and sequential aggregation tree leaf-number i are given to each receipt. Thus, a sequential aggregation tree leaf having the receipt issued can be designated with these two numbers in pairs. The order between two extended leaf identifiers $\upsilon 1=(n1, i1)$ and $\upsilon 2=(n2, i2)$ is defined with the use of lexicographic order. That is, $\upsilon 1<\upsilon 2$ defines either $n1<n2$ or $n1=n2$ and $i1<i2$. Further, $\upsilon 1<\upsilon 2$ defines either $\upsilon 1<\upsilon 2$ or $\upsilon 1=\upsilon 2$. "$\upsilon=(n, i)$" designates an extended leaf identifier. If there exists sequential aggregation tree leaf identified with this extended leaf identifier, then this leaf is represented by leaf($\upsilon$)=leaf(n, i). In some cases, "leaf($\upsilon$)" may be referred to as "leaf $\upsilon$" simply. In case of an audit point (or user point), "leaf($\upsilon$)" may be referred to as "audit point (or user point) $\upsilon$".

Additionally, as for a leaf(SBT, i) in a sequential aggregation tree SBT in question, the receipt time of an event-ordering request forming the origin of assigning assigned values to respective leaves of the above sequential aggregation tree SBT will be referred to as "time corresponding to the leaf" and represented by "time(SBT, i)" or "time(i)" simply. Similarly, as for the leaf($\upsilon$), the receipt time of an event-ordering request forming the origin of assigning an assigned value to this leaf is represented by "time($\upsilon$)".

In order to allow the user apparatus $2i$ to perform the second validation against one receipt with the use of the audit apparatus 3, the audit point $\alpha$ of the audit apparatus 3 has to be present between a sequential aggregation tree leaf $\tau$ corresponding to the receipt and another sequential aggregation tree leaf $\tau'$ corresponding to a request of late complementary data for the receipt as mentioned above (also including leaves $\tau$ and $\tau'$). For this purpose, it is good enough if three following conditions (1) to (3) for a positive integer are fulfilled:

(1) The time of a first audit point of the audit apparatus 3 is smaller than T;

(2) Let one optional audit point by the audit apparatus 3 and the next point be $\alpha$ and $\alpha'$ respectively. Then, $$\text{time}(\alpha')-\text{time}(\alpha) \leq T$$

is satisfied.

(3) Assume that after receiving a receipt by a sequential aggregation tree leaf of the extended leaf identifier $\tau$, the user apparatus $2i$ receives the late complementary data for the receipt at a certain sequential aggregation tree leaf $\tau'$. Then, $$\text{time}(\tau')-\text{time}(\tau) \geq T$$

is satisfied.

Note that the reason for sufficiency of these conditions will be described later (see items (1) and (2) in Feature 3 of Next Aggregation Tree mentioned later).

It is assumed that the audit apparatus 3 receives an audit receipt at an audit point $\alpha$ belonging to a certain sequential aggregation tree shown in FIG. 11. Then, the audit receipt contains instant complementary data at the audit point $\alpha$. In spite of positioning on the left side of the audit point $\alpha$ in an optional leaf $\tau$ in the sequential aggregation tree SBT, the above instant complementary data incorporates an assigned value V($\tau$) in the following sense. Thus, an assigned value V(p2) of a certification point p2 for $\tau$ by $\alpha$ is included in the above instant complementary data. This assigned value at the certification point can be calculated by starting from V($\tau$) and linking assigned values of some nodes belonging to an auth-Path($\tau$) with each other be means of hash function (reason for establishment: see item (1) in Feature 2 of Sequential Aggregation Tree mentioned later).

Consequently, by judging whether the above value V(p2) is included in the instant complementary data in the audit receipt received at the audit point $\alpha$, it is possible to verify that both transmission of a request underlying the receipt acquired at the user point $\tau$ by a user and acceptance of the request by the certification apparatus 1 are in advance of the reception of the audit receipt by the audit apparatus 3 at the audit point $\alpha$ (referred to as "validation result No. 1". See FIG. 12).

Here, we now describe serialisablity of the certification apparatus 1. The serialisablity of the certification apparatus 1 is defined as a situation that in case of a plurality of event-ordering requests, the certification apparatus 1 sequentially accepts these requests in accordance with a certain ordering for arranging a plurality of requests in series and sequentially sends receipts in response to these requests in accordance with the certain ordering.

The serialisablity of the certification apparatus is an important requirement. According to this embodiment, the certification apparatus is provided with means for ensuring serialisablity. In detail, the means for ensuring serialisablity may be formed by a serialisablity audit apparatus that is constructed so as to monitor a situation where if the certification apparatus 1 accepts a single event-ordering request, then the apparatus 1 firstly sends a receipt for this event-ordering request and subsequently, the apparatus 1 accepts a next request.

If adopting the serialisablity, then it is possible to form a conclusion that the ordering relationship between the user point and the audit point is stronger than that of the validation result No. 1. Provided that the serialisablity of the certification apparatus 1 is ensured until the reception of the receipt by the apparatus 3 at the audit point $\alpha$, for instance, it is possible to form a conclusion that the acceptance of the event-ordering request corresponding to the user point $\tau$ has been carried out previously to the acceptance of the audit event-ordering request corresponding to the audit point $\alpha$, owing to the above validation (referred to as "varidation result No. 2". See FIG. 12). This reason is as follows. Let's say that in the serialized process of event-ordering requests, the acceptance of the audit event-ordering request corresponding to the audit point $\alpha$ has been carried out previously to the acceptance of the event-ordering request corresponding to the user point $\tau$. In this case, it means that the receipt EOC($\alpha$) for the point $\alpha$ is transmitted previously to the acceptance of the audit receipt EOC($\tau$) for the point $\tau$, so that it becomes impossible to allow the receipt EOC($\alpha$) to include data that an event value included in the EOC($\tau$) is incorporated through the hash function. From above, when expecting the serialisablity of the certification apparatus 1 until the reception of the audit receipt by the audit apparatus 3 at the audit point $\alpha$, it can be presumed that the acceptance of the event-ordering request corresponding to the user point $\tau$ was carried out previously to the acceptance of the audit event-ordering request corresponding to the audit point $\alpha$. Hereinafter, this operation will be referred to as "future bounding of user point".

It should be noted that the above argument couldn't be effected unless the audit apparatus 3 receives the instant complementary data forming the receipt in part despite that the serialisablity of the certification apparatus 1 is ensured until the reception of the audit receipt by the apparatus 3 at the audit point $\alpha$. Because it is impossible to eliminate a possibility that the certification apparatus 1 changes an assigned value at T after the reception of the audit receipt by the apparatus 3 at the audit point α.

According to the event-ordering certification system 100 of the first embodiment, when accepting an event-ordering request from the user apparatus 2*i*, the certification apparatus 1 operates to publish a receipt (incl. a sequential assigned value calculated from the digital data in the event-ordering request, positional information of a sequential aggregation tree where the sequentially assigned data-item is assigned) and its complementary data and additionally, the apparatus 1 publishes the information electronically while ensuring the authenticity, for instance, by means of attaching a high-intensity digital signature to a root value forming a sequential aggregation tree for complementary information. Therefore, the user apparatus 2 can verify the receipt from the published information and the complementary data with ease. In addition, even before electronically publishing the root value in the sequential aggregation tree, the audit apparatus 3 can audit the receipt on acceptance of an audit request from the user apparatus 2*i* since the same apparatus 3 possesses the audit information about an audit point in the sequential aggregation tree.

As a result, when the legality of the receipt can be validated, then it is possible to certify that the operation of the apparatus 1 to receive the event-ordering request for a receipt objective of audit was carried out before the operation to receive the event-ordering request for an audit receipt used in the audit.

$2^{nd}$. Embodiment

2-1. System Structure

Figure 13:
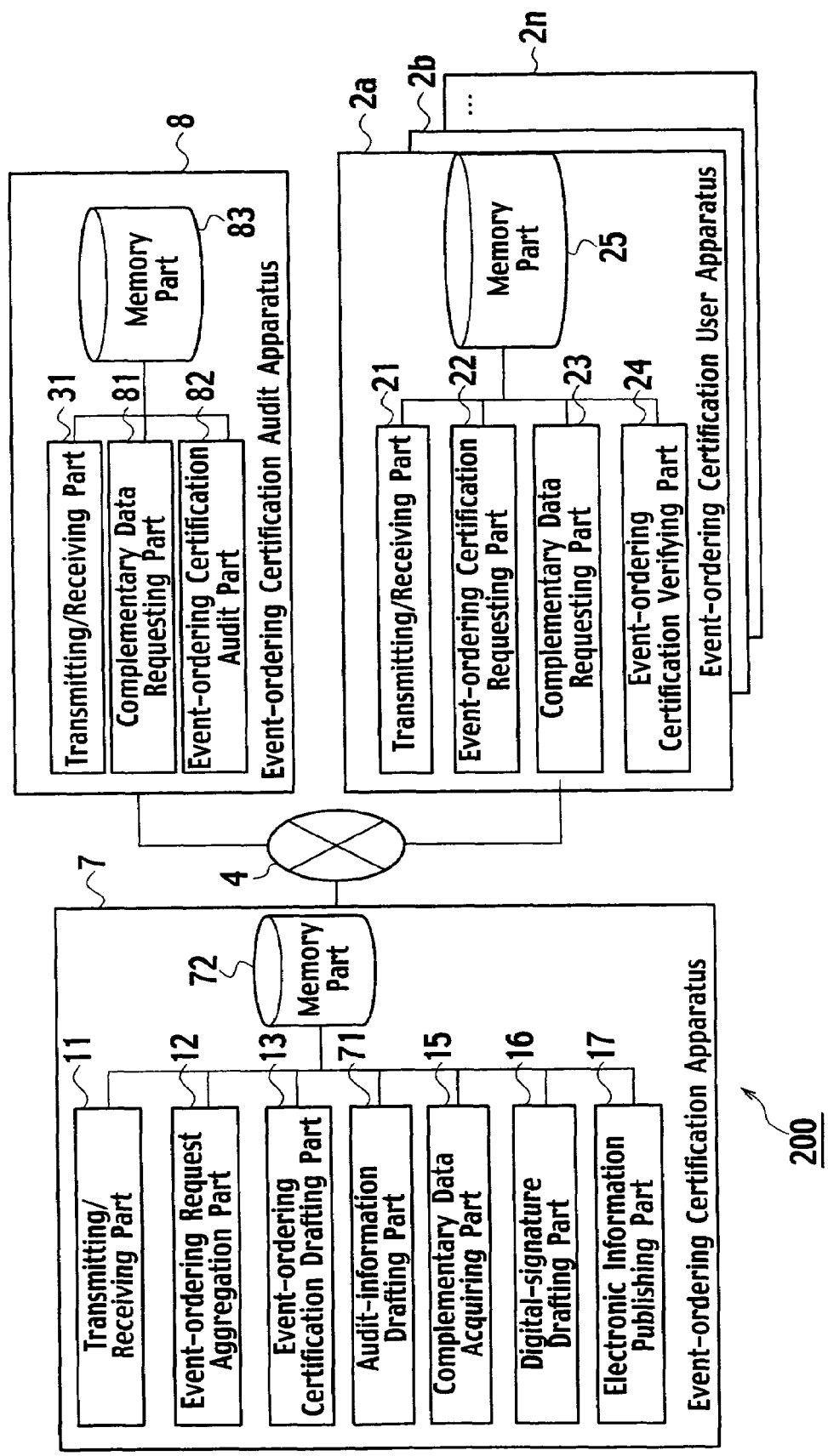
FIG. 13 is a system architecture diagram of an event-ordering certification system in accordance with a second embodiment of the present invention.

FIG. 13 is a system architecture diagram of an event-ordering certification system 200 in accordance with the second embodiment of the present invention. The event-ordering certification system 200 includes an event-ordering certification apparatus (referred to as "certification apparatus" below) 7, the event-ordering certification user apparatuses (referred to as "user apparatuses" below) 2*i* (i=a, b, . . . , n), an event-ordering certification audit apparatus (referred to as "audit apparatus" below) 8 for auditing an event-ordering receipt (referred to as "receipt" below) issued by the certification apparatus 7 and the computer network 4 formed by e.g. internet, telephone network, etc. In operation, the certification apparatus 7 publishes a receipt in response to an event-ordering certification request (referred to as "event-ordering request" below) from each of the user apparatuses 2*i* and successively sends the receipt to the user apparatus 2 in question. If the receipt is believed to be doubtful, then the user apparatus 2*i* can verify the receipt with the use of data published by the certification apparatus 7 and an audit result by the audit apparatus 8.

The system structure of the second embodiment is similar to that of the first embodiment. The second embodiment differs from the first embodiment in that after completing each of sequential aggregation periods (or based on a pre-contract), the audit apparatus 8 requests completed late complementary data for each audit receipt, which has been acquired for the sequential aggregation period, to the certification apparatus 7 and subsequently, the audit apparatus 8 acquires the completed late complementary data from the apparatus 7. Note that in this embodiment, constitutions and functions different from those of the first embodiment will be described. Regarding the other constitutions and functions, their descriptions are eliminated while elements identical to those of the first embodiment are indicated with the same reference numerals, respectively.

Similarly to the first embodiment, the system architecture of the event-ordering certification system 200 is not limited to this only and therefore, it may be modified to various forms so long as its identity in function. For instance, as shown in FIG. 4, event-ordering certification user validation apparatuses (referred to as "user validation apparatuses" below) 6*i* (i=a, b, . . . , n) may verify the receipts in place of the user apparatuses 2*i*. Additionally, in place of the certification apparatus 7, the electronic-information publication apparatus 5 of FIG. 4 may obtain published data from the certification apparatus 7 and release the published data to the public. Moreover, the computer network 4 may be replaced by other communicating means, such as postal mail.

The certification apparatus 7 comprises the transmitting/receiving part 11 for transmitting and receiving data to and from the user apparatuses 2*i* and the audit apparatus 3 through the computer network 4, the event-ordering request aggregation part 12 for arranging digital data transmitted from the user apparatuses 2*i* with the use of a sequential aggregation tree, an audit-information drafting part 71 for drafting audit information to be transmitted to the audit apparatus 8, the complementary-data acquiring part 15 for acquiring complementary data in response to complementary-data requests from the user apparatuses 2*i*, the digital-signature drafting part 16 for attaching attach a high-intensity digital signature to data where respective contents of plural receipts issued by the certification apparatus 7 for a constant period are associated with each other, the electronic-information publishing part 17 for giving publicity to the data having the high-intensity digital signature and a memory part 72 for memorizing the receipts and information about the event-ordering certification.

The audit-information drafting part 71 drafts not only the audit receipts at the respective audit points through the sequential aggregation tree but also the completed late complementary data of the respective audit receipts acquired for the sequential aggregation period.

The audit apparatus 8 comprises the transmitting/receiving part 31 for transmitting and receiving data to and from the certification apparatus 7 and the user apparatuses 2*i* through the computer network 4, a complementary-data requesting part 81 for requesting the completed late complementary data of each audit receipt to the certification apparatus 7, an event-ordering certification audit part 82 and a memory part 83. In detail, when receiving an audit request for one receipt from the user apparatus 2*i*, the event-ordering certification audit part 82 verifies the receipt with the use of the audit respect information transmitted from the user apparatus 2*i* and the audit information (incl. the audit receipt and its completed late complementary data) and subsequently sends the audit result to the user apparatus 2*i*. Note that the memory part 83 stores the audit information including the receipt certificate for audit (i.e. audit receipt).

In addition to the function of the event-ordering certification audit part 32 of the first embodiment (i.e. future bounding of user point), the event-ordering certification audit part 82 has a function of "past bounding of user point" mentioned later. This means that the same part 82 is capable of auditing not only the positioning of a certain user point on the left side of one audit point (namely, former positioning with time) but the positioning of a certain user point on the right side of one audit point (namely, later positioning with time).

Figure 14:
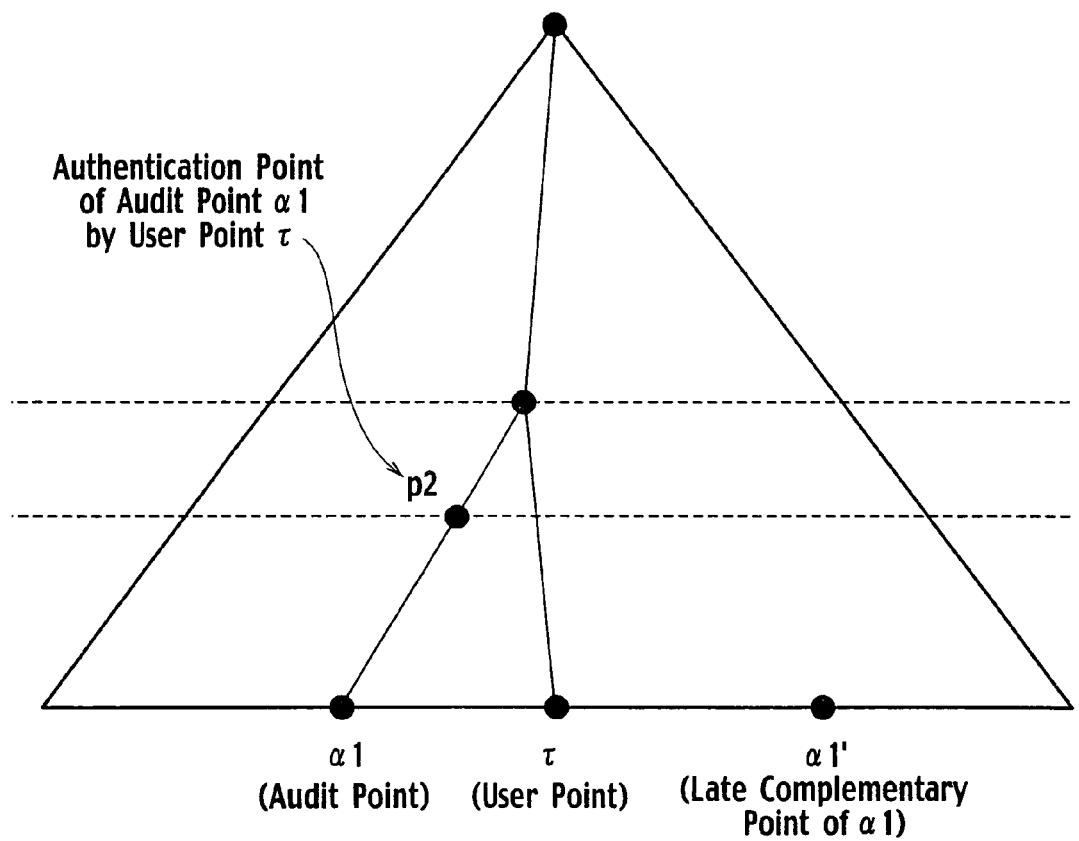
FIG. 14 is a diagram explaining a relationship between a user point and an audit point in the event-ordering certification system in accordance with the second embodiment of the present invention.

Referring to FIG. 14, the meaning of "past bounding of user point" will be described below.

In the following descriptions, the above-mentioned operation of the audit apparatus 8 to acquire, after completing each sequential aggregation period, the completed late complementary data for each of audit receipts that the apparatus 8 acquired in the relevant sequential aggregation period, will be referred to as "the audit apparatus 9 carries out combined complete complement".

In this embodiment, as the audit apparatus 8 acquires the completed late complementary data for the audit receipts received for the sequential aggregation period with respect to each completion of the sequential aggregation periods, this combining of the instant complementary data included in the audit receipts with the late complementary data allows the audit apparatus 8 to acquire full complementary data for the audit "event" receipts received for the sequential aggregation period.

Suppose that the user apparatus $2i$ and the audit apparatus 8 satisfy with the conditions (1) to (3) mentioned in the first embodiment. Let $\tau$ be a user point by the user apparatus $2i$. Suppose that $T \leq time(\tau)$ is satisfied. Under this condition $T \leq time(\tau)$, by the above condition (1), there exist audit points by the audit apparatus 8 on the left side (namely, former positioning with time) of $\tau$. Let one of such audit points be $\alpha 1$. Alternatively, $\alpha 1$ may be defined as being a rightmost one of audit points satisfying with the above conditions. The audit will be carried out in accordance with the following procedure.

(1) The user apparatus $2i$ sends the receipt (sequential aggregation tree number, instant complementary data) acquired at the user point $\tau$ to the audit apparatus 8.

(2) The audit apparatus 8 picks up the sequential aggregation tree number from the receipt sent from the user apparatus $2i$, specifies a sequential aggregation tree leaf $\tau$ corresponding to the receipt and selects an audit receipt, which corresponds to one sequential aggregation tree leaf positioned on the left of the leaf $\tau$, from the audit receipts that the apparatus 8 has acquired. In the audit receipts on the left of the leaf $\tau$, alternatively, there may be selected an audit receipt whose corresponding sequential aggregation tree leaf is positioned on the rightmost side. This sequential aggregation tree leaf corresponding to such a selected audit receipt will be called "$\alpha 1$".

(3) Performing the above-mentioned combined complete complement, the audit apparatus 8 acquires completed late complementary data of an audit receipt corresponding to the audit point $\alpha 1$. A sequential aggregation tree leaf corresponding to the completed late complementary data is identical to the leaf $\tau$ or positioned on the right of the leaf $\tau$ (namely, later positioning with time).

(4) By the audit receipt corresponding to the audit point $\alpha 1$ and the corresponding late complementary data, the audit apparatus 8 can calculate an assigned value of a validation point p2 by the user point $\tau$ of the audit point $\alpha 1$.

(5) Therefore, the audit apparatus 8 can audit that the point $\alpha 1$ is positioned on the left of the point $\tau$ by verifying the calculated assigned value of the validation point p2 by the user point $\tau$ of the audit point $\alpha 1$ is included in the instant complementary data in the receipt corresponding to the sequential aggregation tree leaf $\tau$, which was sent from the user apparatus $2i$.

All one can firstly say from this validation result is as follows. Let t1, t2 and t2' denote a time when the audit event-ordering request of the audit apparatus 8 corresponding to the audit point $\alpha 1$ is received by the certification apparatus 7, a time when the event-ordering request of the user apparatus $2i$ corresponding to the user point $\tau$ is received by the certification apparatus 7 and a time when the receipt against the event-ordering request is transmitted from the certification apparatus 7, respectively. Then, the inequality t1<t2' is satisfied.

It is noted that the serialisablity of the certification apparatus 7 is ensured in this embodiment as well. That is, assuming that the serialisablity of the certification apparatus 7 is ensured until the point of time t2', there could be concluded another inequality t1<t2, furthermore. From above, when expecting the serialisablity of the certification apparatus 7 until the time when the certification apparatus 7 sends the receipt corresponding to the user point $\tau$ to the user apparatus $2i$, it can be presumed that the acceptance of the audit event-ordering request corresponding to the audit point $\alpha$ was carried out previously to the user apparatus' acceptance of the event-ordering request corresponding to the user point $\tau$.

It should be noted that the above argument couldn't be effected unless the user apparatus $2i$ receives the instant complementary data forming the receipt despite that the serialisablity of the certification apparatus 7 is ensured until the time t2'. Because it is impossible to eliminate a possibility that the certification apparatus 7 changes an assigned value at $\alpha 1$ after the time t2'.

Note that the above apparatuses are formed by electronic apparatuses each having a CPU (Central Processing Unit) having at least a calculating function and a control function, a main memory having a function to store programs and data, such as RAM (Random Access Memory), and a secondary memory capable of continuing to memorize data even at powered-off, such as HD (Hard Disc). The operation of the audit information drafting part 71 of the certification apparatus 7, the operation of the complementary data requesting part 81 of the audit apparatus 8 and the operation of the event-ordering certification audit part 82 of the audit apparatus 8 are nothing but respective crystallizations of the above calculating/control functions of the above central processing units. Additionally, the memory part 72 of the certification apparatus 7 and the memory part 83 of the audit apparatus 8 are equipped with the above-mentioned functions of either the main memory or the secondary memory.

Each program for executing a variety of processes in this embodiment is stored in either the main memory or the secondary memory mentioned above. In connection, this program may be recorded in a computer-readable recording medium (e.g. hard disc, flexible disc, CD-ROM, MO, DVD-ROM, etc.) or delivered through a communication network.

2-2. System Operation

In the event-ordering certification system 200 constructed above, the event-ordering certification method and the event-ordering certification validation method will be described with reference to FIGS. 15 and 16. In these figures, FIG. 15 is a sequence diagram to explain the operation of the certification apparatus 7 to draft an event receipt and an audit receipt for one sequential aggregation period, while FIG. 16 is a sequence diagram to explain the operation of one user apparatus $2i$ to carry out the second validation against the even receipt.

Figure 15:
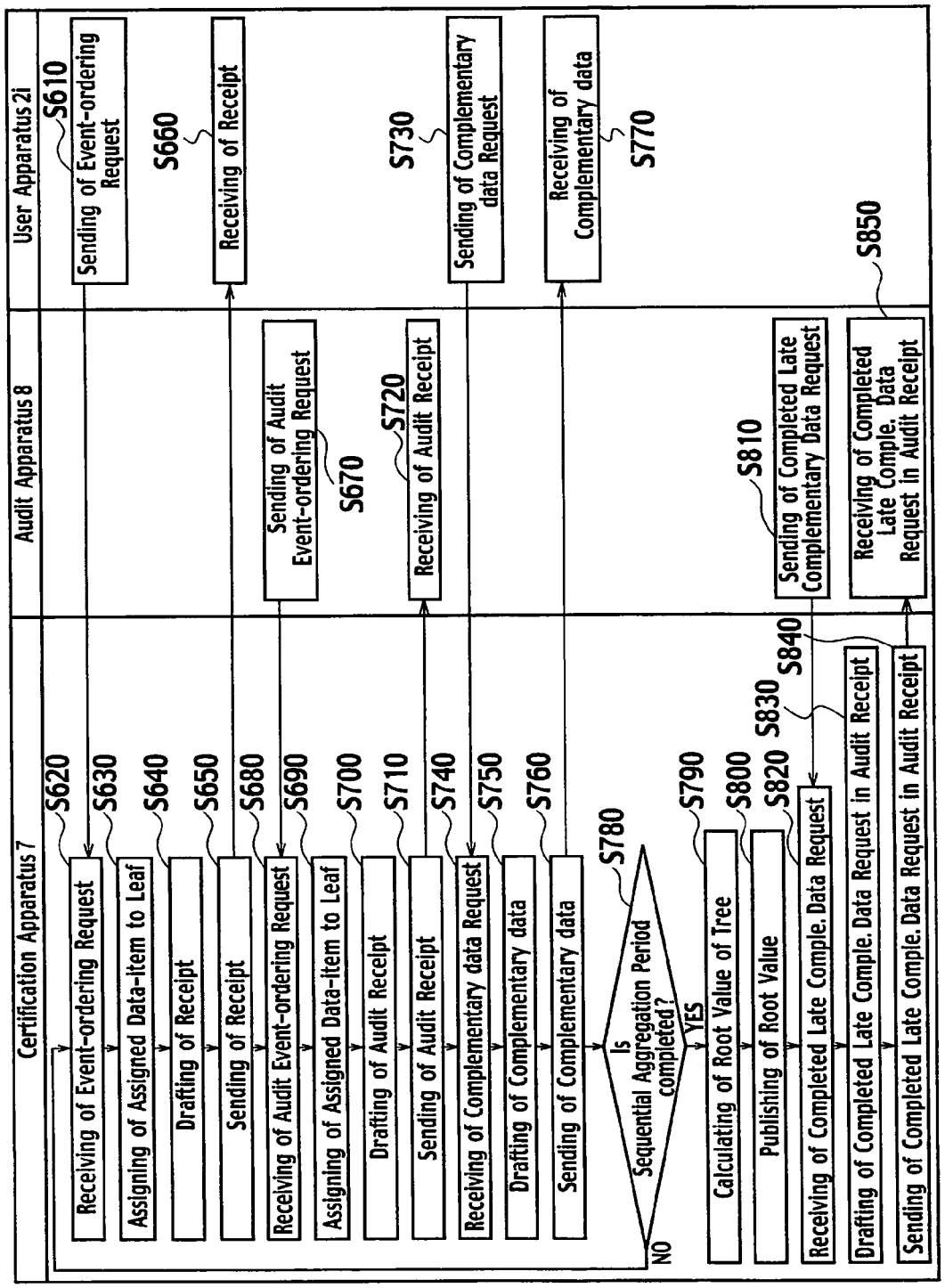
FIG. 15 is a sequence diagram explaining an event-ordering certification method by the event-ordering certification system in accordance with the second embodiment of the present invention.
Figure 16:
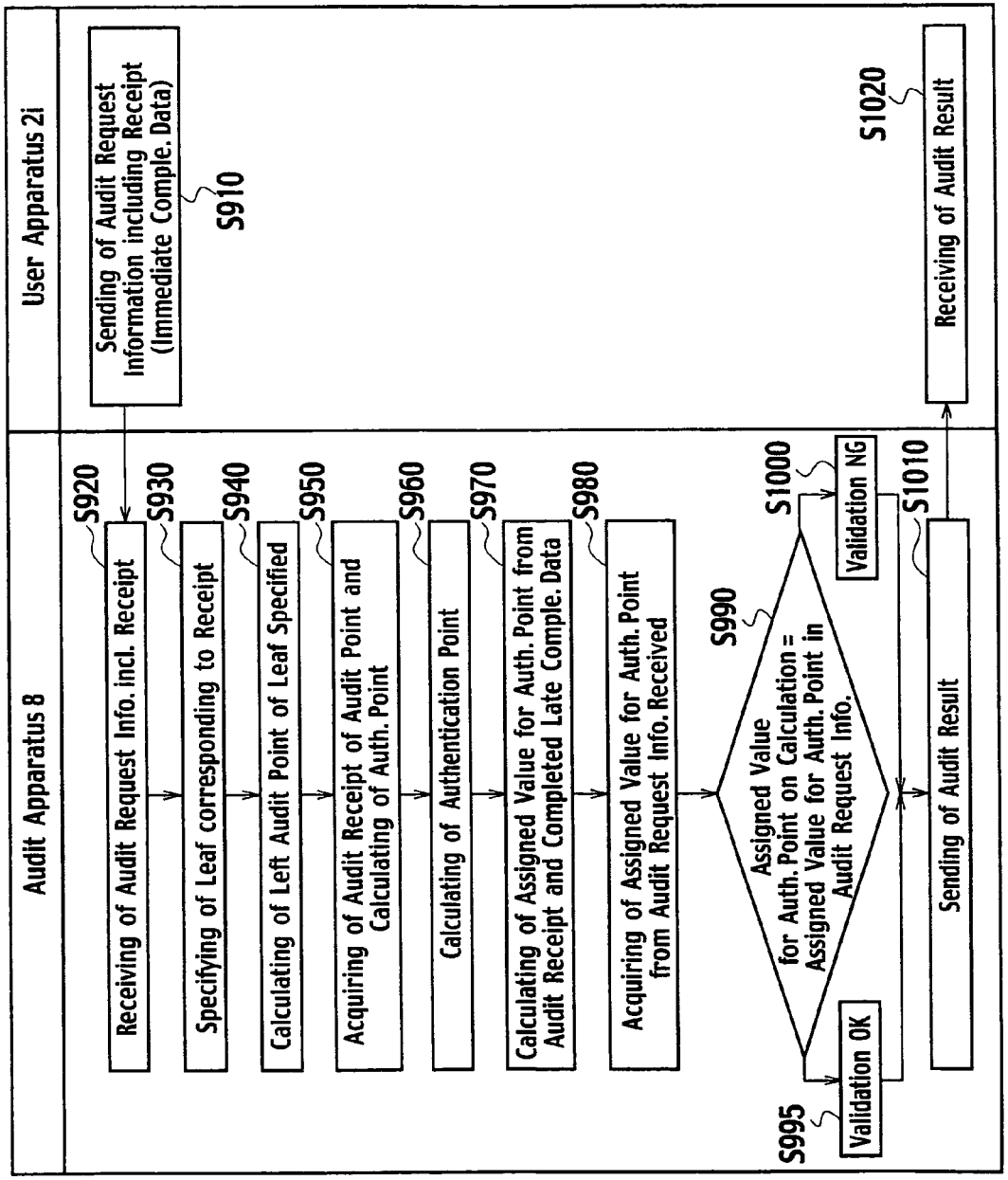
FIG. 16 is a sequence diagram explaining an event-ordering certification verification method by the event-ordering certification system in accordance with the second embodiment of the present invention.

We first describe the event-ordering certification method of FIG. 15. As for the event-ordering certification method of the second embodiment, constituent processes are almost similar to those of the first embodiment. Thus, the operations at steps S10 to S200 of FIG. 8 are identical to those at steps S610 to S800 of the FIG. 15. The event-ordering certification method of the second embodiment differs from that of the first embodiment in the addition of subsequent steps S810 to S850. The following description is directed to these steps S810 to S850.

On completion of the constant period for sequential aggregation, the audit information drafting part 71 of the audit apparatus 7 acquires the completed late complementary data of respective audit receipts issued for this aggregation period in response to the completed late complementary data request from the audit apparatus 8 and successively sends the data to the audit apparatus 8 (steps S810, S820, S830, S840).

Then, the audit apparatus 8 receives the completed late complementary data of the respective audit receipts (step S850).

In connection with the above-mentioned event-ordering certification method of FIG. 15 where the audit apparatus 8 sends the completed late complementary data request to the certification apparatus 7 and it subsequently sends the completed late complementary data to the audit apparatus 8, the method may be modified in a manner that the certification apparatus 7 sends the completed late complementary data to the audit apparatus 8 automatically.

Next, the event-ordering certification validation method using the audit apparatus 8 will be described with reference to FIG. 16. This method corresponds to the second validation function of the user apparatus 2i. The second validation function of the user apparatus 2i is identical to the validation function of the first embodiment (i.e. future bounding of user point) plus a new validation function (i.e. past bounding of user point). FIG. 16 illustrates this new validation function. In this embodiment, the validation processes about "future bounding of user point" are identical to those of the first embodiment of FIG. 10 and therefore, their descriptions are eliminated. Additionally, the validation method corresponding to the first validation function of the user apparatus 2i is identical to that of the first embodiment and therefore, its descriptions are eliminated similarly.

In FIG. 16, the user apparatus 2i sends audit request information including a receipt as an audit target (but including the instant complementary data) to the audit apparatus 8 (steps S910, S920).

Then, when the audit apparatus 8 receives the audit request information through the transmitting/receiving part 31, the event-ordering certification audit part 32 specifies a sequential aggregation tree leaf $\tau$ where the receipt in the audit request information is assigned and calculates an audit point $\alpha 1$ positioned on the left of the so-specified leaf $\tau$ (steps S930, S940). Next, the audit apparatus 8 acquires an audit receipt of the audit point $\alpha 1$ and completed late complementary data for the audit receipt (step S950).

In succession, the audit apparatus 3 calculates a certification point for the audit point $\alpha 1$ by the leaf $\tau$ and further calculates an assigned value "Acal" of the above certification point from the audit receipt of the audit point $\alpha 1$ and completed late complementary data for the audit receipt (steps S960, S970). On the other hand, the event-ordering certification audit part 82 acquires an assigned value A of this certification point that the part 82 has already received as the audit request information and verifies whether the assigned value A of the certification point coincides with the assigned value Acal on calculation (steps S980, S990).

If the above validation is completed in success, then it is possible to confirm that the receipt is not subjected to tamper (step S995). On the other hand, if the above validation is failed, it is possible to confirm that the receipt is subjected to tamper (step S1000). The event-ordering certification audit part 82 sends this audit result to the user apparatus 2i through the transmitting/receiving part 31, while the user apparatus 2i receives the audit result (step S1010, S1020).

Consequently, even before publishing by an electronic publishing organization, each user apparatus 2i can absolutely verify that the receipt published by the certification apparatus 7 is one that was issued during the relevant sequential aggregation period and also issued against original data included in the receipt, in order identified by a "sequential aggregation tree" leaf number included in the receipt. Additionally, the apparatus 2i can verify the past bounding of the user point. Note that the above audit result may contain an identifier of the audit point $\alpha 1$. In this case, the user apparatus 2i can obtain an assurance that the registration of an event-ordering request corresponding to the receipt requiring the above audit was carried out before the registration of an audit event-ordering request corresponding to the audit point $\alpha 1$, from the audit apparatus 3 absolutely.

Note that the above description is related to the operation of validation about the past bounding of a user point. Besides, the audit apparatus may perform a validation about "past bounding of user point" together with the future bounding of a user point. In this case, the receipt and the late complementary data in the first embodiment would be required as the audit information.

According to the event-ordering certification system 200 of the second embodiment, it is possible to bring about the same effects as the first embodiment. In addition, when the legitimacy of a receipt can be verified, it is possible to certify that the certification apparatus' receiving of an event-ordering request of the receipt as audit target has occurred behind the same apparatus' receiving of an event-ordering request of the audit receipt temporally.

Regarding the second embodiment mentioned above, various modifications and changes can be made. Such modifications of the second embodiment will be described below.

2-3. $1^{st}$. Modification of $2^{nd}$. Embodiment

Figure 17:
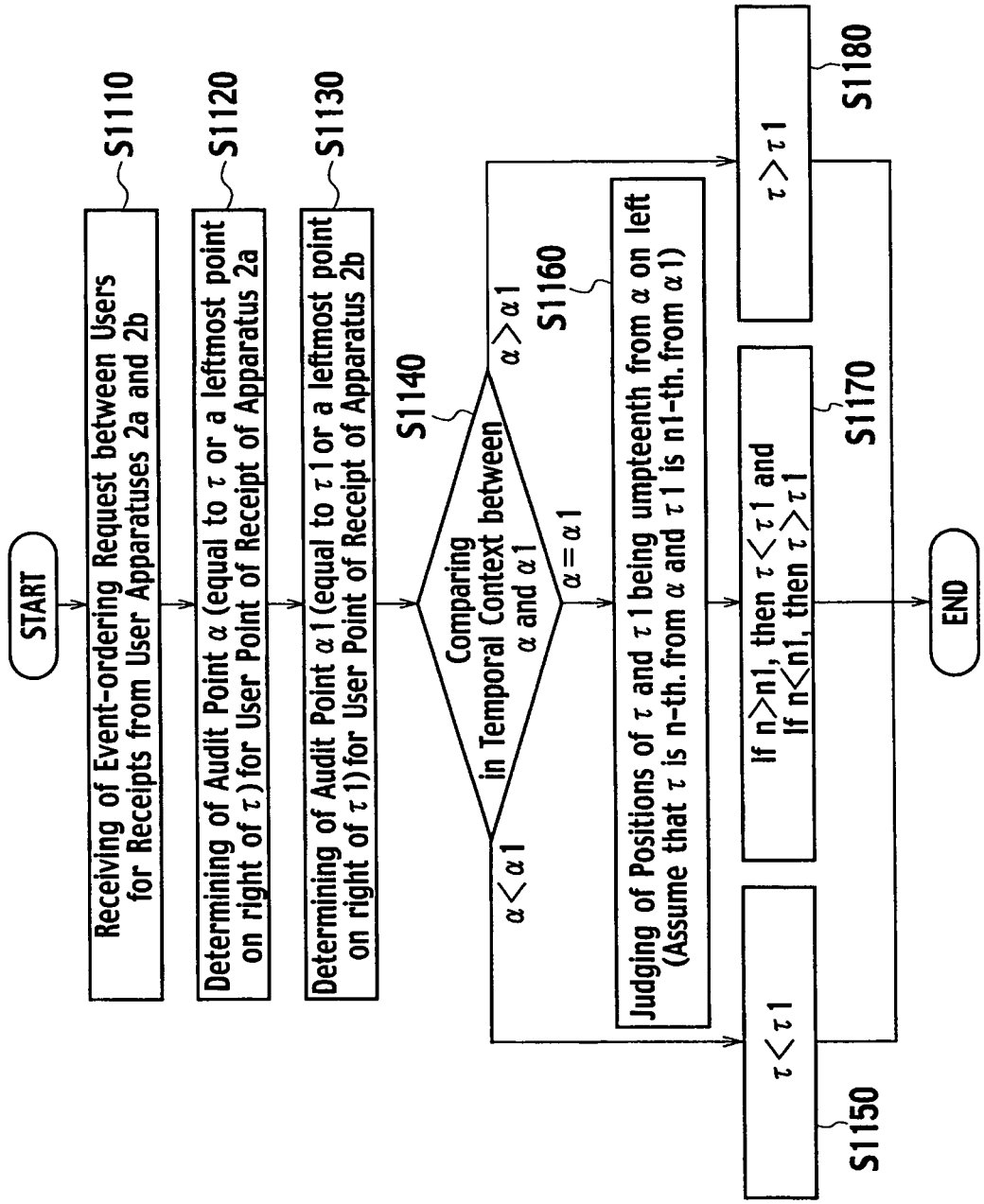
FIG. 17 is a flow chart explaining an operation to judge the order between two users of the event-ordering certification system in accordance with the second embodiment of the present invention.

The audit apparatus 8 is also capable of judging the sequential order between two user points owing to the above-mentioned functions of "future bounding of user point" and "past bounding of user point". Suppose, two user apparatuses 2a and 2b acquire receipts at sequential aggregation tree leaves $\tau$ and $\tau 1$, respectively. We now describe a method of the audit apparatus 8 for auditing the temporal context between $\tau$ and $\tau 1$ with reference to FIG. 17. FIG. 17 is a flow chart showing the operation of the audit apparatus 8 for auditing the temporal context between $\tau$ and $\tau 1$.

In the following descriptions about the sequential aggregation tree leaves $\tau$ and $\tau 1$, a terminology "time point $\tau$ (or $\tau 1$)" represents a point of time when an event-ordering request assigned to $\tau$ (or $\tau 1$) is received. Therefore, $\tau \leqq \tau 1$ represents that the time point $\tau 1$ is present after the time point $\tau$. Assume in the following descriptions $\tau 2$ represents a larger one in $\tau$ and $\tau 1$, and additionally, the serialisablity of the certification apparatus 7 is ensured until its transmission of a receipt against an event-ordering request received at the leaf $\tau 2$.

Suppose that the user apparatuses 2a, 2b and the audit apparatus 8 respectively satisfy with the conditions (1) to (3) described in "future bounding of user point" of the first embodiment.

When the audit apparatus 8 receives judgment requests of the sequential order of the receipts between the users from the user apparatuses 2a and 2b, it is determined to let either a point equal to $\tau$ or a leftmost point of the audit points on the right of $\tau$ be represented by $\alpha$ and also let a point equal to $\tau 1$ or a leftmost point of the audit points on the right of τ1 be represented by "α1" (steps S1110, S1120, S1130).

Next, the temporal context between α and α1 is verified (step S1140). This operation is accomplished by judging both sequential aggregation tree number and sequential aggregation tree leaf number of the audit receipts of the respective audit points.

If α<α1, then τ<τ1 is introduced in accordance with the method of "future bounding of user point" of the first embodiment and the above-mentioned method of "past bounding of user point", as follows (step S1150).

Let a point equal to τ1 or a rightmost point of the audit points on the left of τ1 be represented by α2. Then, α≦α2 is established. Additionally, as τ≦α2 is shown by the method of "future bounding of user point" while α2≦τ1 is shown by the method of "past bounding of user point", τ<α≦α2<τ1 is established and therefore τ<τ1 is introduced.

Similarly, if α1<α, then τ1<τ is introduced (step S1180).

If α=α1, then the judgment in temporal context between τ and τ1 is carried out in the following procedures (1) to (3).

(1) From information that the user apparatus 2a has acquired at τ and its late complementary point τ', the position of a certification point for the user point τ by the audit point α and an assigned value of the certification point are calculated. If this assigned value of the certification point is included in instant complementary data in the audit receipt acquired at the audit point α by the audit apparatus 8, then it judges that τ is present on the left of the point α and further verifies how far τ is apart from α to the left (i.e. by the number of points). Assume here, τ is present at an $n^{-th}$. point to the left of a (step S1160).

(2) Similarly, from information that the user apparatus 2b has acquired at τ1 and its late complementary point τ1', the position of a certification point for the user point τ1 by the audit point α and an assigned value of the certification point are calculated. If this assigned value of the certification point is included in instant complementary data in the audit receipt acquired at the audit point α by the audit apparatus 8, then it judges that τ1 is present on the left of the point α and further verifies how far τ1 is apart from α to the left (i.e. by the number of points). Assume here, τ1 is positioned at an $n1^{-th}$. point to the left of α (step S1160).

If n>n1, then the audit apparatus 8 can exhibit that the user point τ by the user apparatus 2a is present on the left of the user point τ1 by the user apparatus 2b (step S1170). While, if n<n1, then the audit apparatus 8 can exhibit that the user point τ by the user apparatus 2a is present on the right of the user point τ1 by the user apparatus 2b (step S1170).

According to the first modification of the second embodiment, it is possible to judge the temporal context of receipts in addition to the effects of the second embodiment.

2-4. $2^{nd}$. Modification of $2^{nd}$. Embodiment

Alternatively, after completion of each sequential aggregation period, the audit apparatus 8 may acquire the completed late complementary data of respective audit receipts acquired for the sequential aggregation period, simultaneously calculate a root value in the sequential aggregation tree from each audit receipt and its complete complementary data and verify whether the so-calculated root value coincides with a root value on publication. This operation of the audit apparatus 8 will be referred to as "root-value validation by combined completion".

Figure 18:
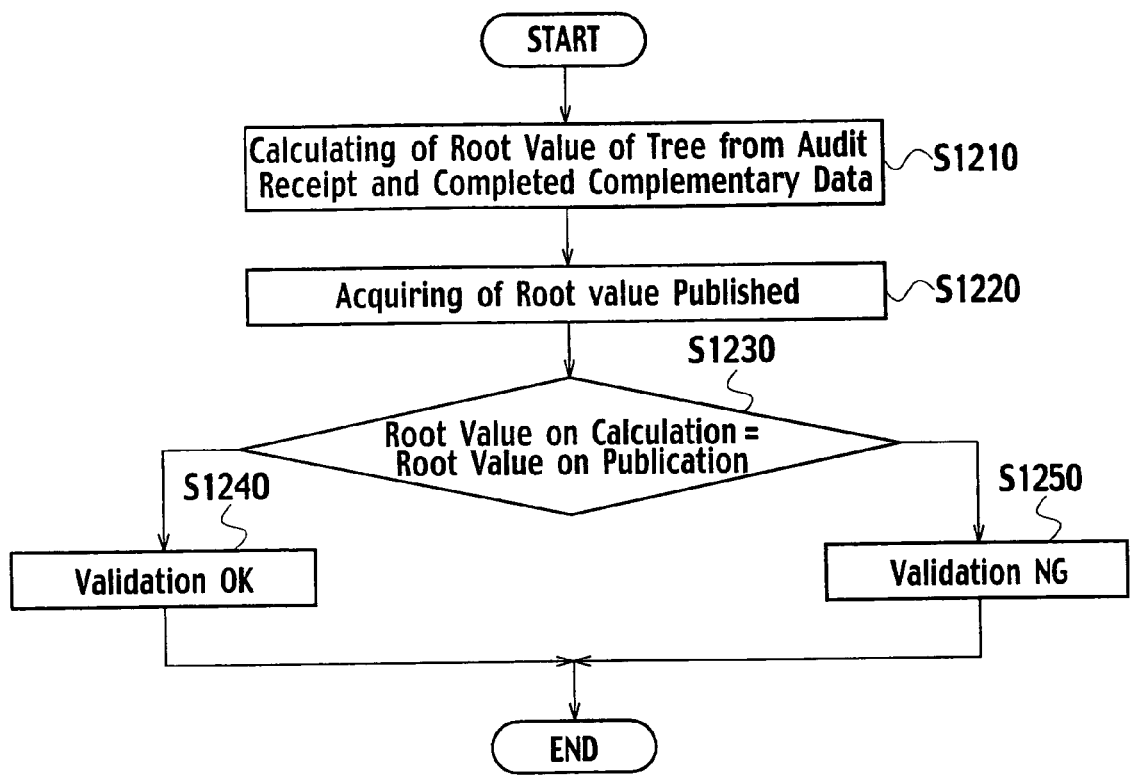
FIG. 18 is a flow chart explaining an operation to verify a root value by a combined perfection of the event-ordering certification system in accordance with the second embodiment of the present invention.

The above-mentioned operations of the audit apparatus 8 are direct to an aim to verify that no falseness is carried out by the certification apparatus 7, as shown in FIG. 18 (steps S1210, S1220, S1230, S1240, S1250).

Additionally, the audit apparatus 8 can verify the legitimacy of audit request information included in the audit request of the user apparatus 2i due to the function of "root-value validation by combined completion".

Suppose, after completing to form a sequential aggregation tree, the user apparatus 2i changes the assigned value for a leaf(0, τ) from an intrinsic assigned value V(τ) to an assigned value v' and argues that this assigned value v' links V(root (SBT)) by hash function. Then, in order to allow a third person to admit this argument, the user apparatus 2i has to prepare complementary data for the leaf(0, τ):

[(v(0), LR(0)), (v(1), LR(1)), . . . , (v(k−1), LR(k−1))]

and further exhibit that V(root (SBT)) can be calculated by combining v' with the complementary data by hash function h in a designated method. In the course of this calculation, an assigned value v2' of the certification point (p2 of FIG. 11) for the user point τ by the audit point α is also calculated. The value v2' is different from an assigned value V(p2) for p2 sent to the audit apparatus 8 in round (α) by the collision-resistance of the hash function (excepting practically-negligible probability). While, starting from V(α), the audit apparatus 8 calculates V (root (SBT)) by linking an assigned value of a node belonging to authPath(α) through the hash function h. As p2 belongs to authPath(α), V(p2) is also one of values to be combined. Here, as v2'≠V(p2) (excepting practically-negligible probability), due to collision-resistance of the hash function again, the assigned value of root(SBT) exhibited by the calculation of the user apparatus 2a becomes different from the assigned value for root(SBT) calculated by the audit apparatus' root-value validation by combined completion (excepting practically-negligible probability). In this regard, see later-mentioned Feature 4 of sequential aggregation tree. Therefore, the audit apparatus 8 can detect that the argument of the user apparatus 2a is false.

Thus, according to the second modification of the second embodiment, it is possible to verify the legitimacy of a root value of the sequential aggregation tree published by an electronic-information publishing organization in addition to the effect of the second embodiment. Additionally, even if there arises a falseness in either the certification apparatus 1 or the user apparatus 2i, it is possible to curve the falseness due to the root-value validation function of the audit apparatus 8.

2-5. $3^{rd}$. Modification of $2^{nd}$. Embodiment

Additionally, the audit apparatus 8 has a function of providing each of the user apparatuses 2i with the complete complementary data. Below, this operation will be referred to as "complementary data completion". This function will operate effectively if the certification apparatus 7 stops its service due to an obstacle or the like. Further, even if the certification apparatus 7 does not stop the service, the function would be of assistance to lightening of burden on the apparatus 7 when the public data is published or the requests for complementary data irrupt temporarily.

The complementary data completion will be described with reference to FIG. 19.

Figure 19:
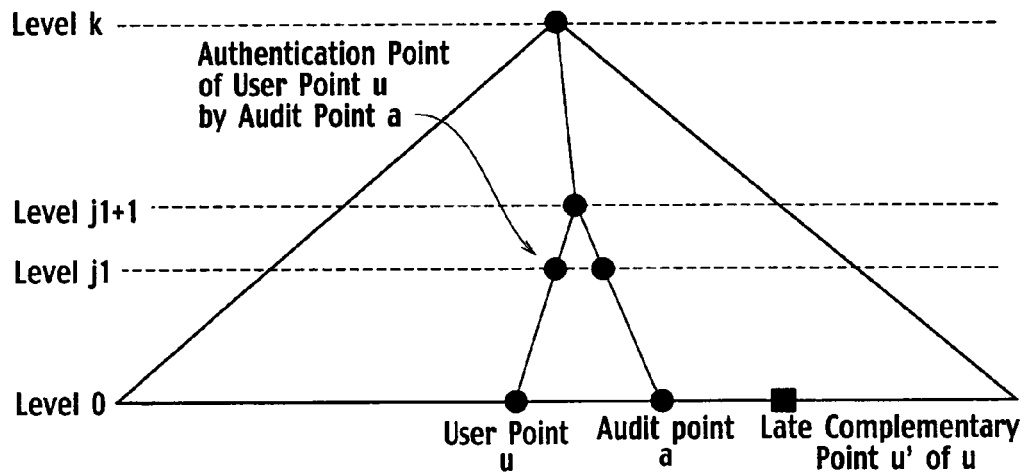
FIG. 19 is a diagram explaining an supplemental-data perfection of the event-ordering certification system in accordance with the second embodiment of the present invention.

Assume in FIG. 19, the audit apparatus 8 possesses complete complementary data for an audit point a. In this case, by combining the complete complementary data with information that the user apparatus 2i can acquire at a user point u to obtain an event-ordering receipt and another point u' to obtain its late complementary data, it is possible for the user apparatus 2*i* to calculate complete complementary data for the user point u. Note that this possibility will be referred to as "feature P1" after.

In FIG. 19, let j1 be a level of a certification point for the user point u by the audit point a. The reason about the apparatus' possibility is that in the authentication path information at the user point u, the information about nodes each lower than the level j1 is acquired by the user, while the information about a node higher than the level j1 and lower than a level k is acquired by the audit apparatus 8.

Consider as one example, we are given an "one-day type" audit apparatus 8 disclosing at one-week intervals (i.e. acquiring the audit information at least one time per day, thereby acquiring the complete complementary data of each audit point). Provided that the audit apparatus 8 acquires late complementary data after the lapse of one or more days since the user apparatus 2*i* receives a receipt, then it becomes possible to construct complete complementary data for the receipt by combining the information acquired by the user apparatus 2*i* with the information acquired by the audit apparatus 8 (due to the above feature P1).

Figure 20:
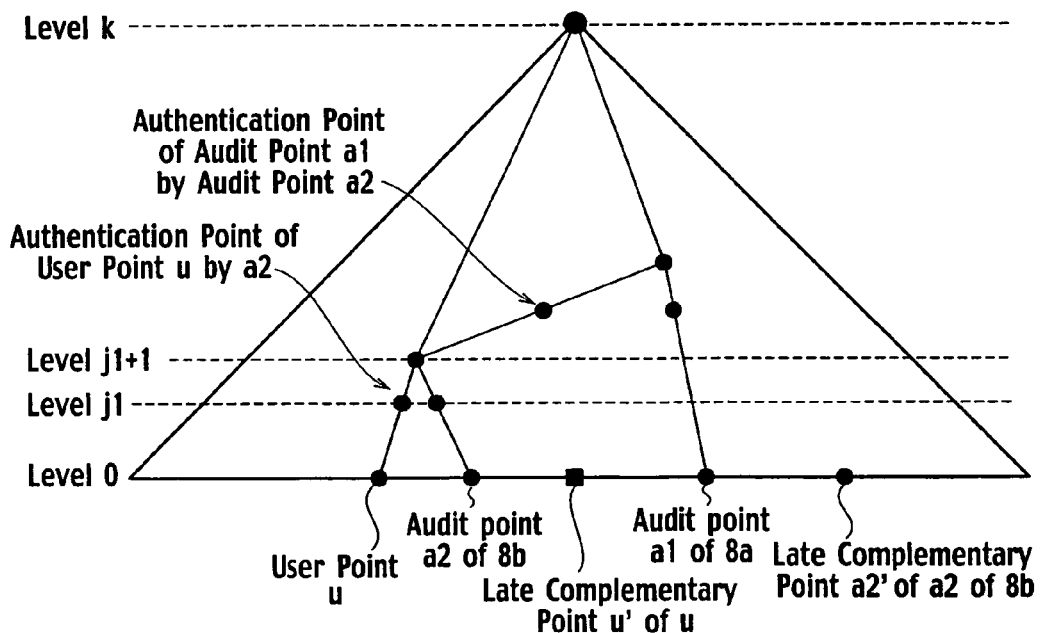
FIG. 20 is another diagram explaining the supplemental-data perfection of the event-ordering certification system in accordance with the second embodiment of the present invention.

Referring to FIG. 20, a method for the user apparatus 2*i* to acquire complete complementary data through two or more audit apparatuses 8*i* (i=a, b, n) will be described. Suppose as the audit apparatuses 8*i*, we are given an "one-day type" audit apparatus 8*a* (i.e. acquiring the audit information at least one time per day, thereby acquiring the complete complementary data of each audit point) mentioned above and an "one-hour type" audit apparatus 8*b* (i.e. acquiring the audit information at least one time per hour and establishing respective late complementary-data points of respective audit points so as to interleave the audit point of the audit apparatus 8*a*) which depends on the apparatus 8*a*.

In the above supposition, the user apparatus 2*i* acquires late complementary data after the lapse of one or more hours since receiving a receipt. In such a case, by combining the information acquired by the user apparatus 2*i* with the information acquired by the audit apparatus 8*b* and the information acquired by the audit apparatus 8*a*, it becomes possible to construct complete complementary data of the user point.

This possibility can be accomplished represented by using the above feature P1 repeatedly. First, by combining the information acquired by the audit apparatus 8*a* with that by the audit apparatus 8*b*, authentication path information for an audit point a2 is obtained. Thus, as similar to the case of FIG. 17, there can be acquired authentication path information for a user point u.

As for the audit points of the above-mentioned audit apparatuses 8*a* and 8*b*, for instance, the "one-hour type" audit apparatus 8*b* depending on the audit apparatus 8*a* may acquire the late complementary data for one's own each audit point after the lapse of one or more days since the user apparatus' reception of the receipt. Alternatively, so long as it is recognized that the audit point of the one-day type audit apparatus 8*a* is acquired at the fixed time in one day (e.g. AM 0:00), the late complementary data for the audit point everyday may be collected up after the end of each day. Although there are adopted two audit apparatuses 8*i* in the above example, three or more audit apparatuses 8*i* may be adopted in modifications.

3$^{rd}$. Embodiment

3-1. System Structure

Figure 21:
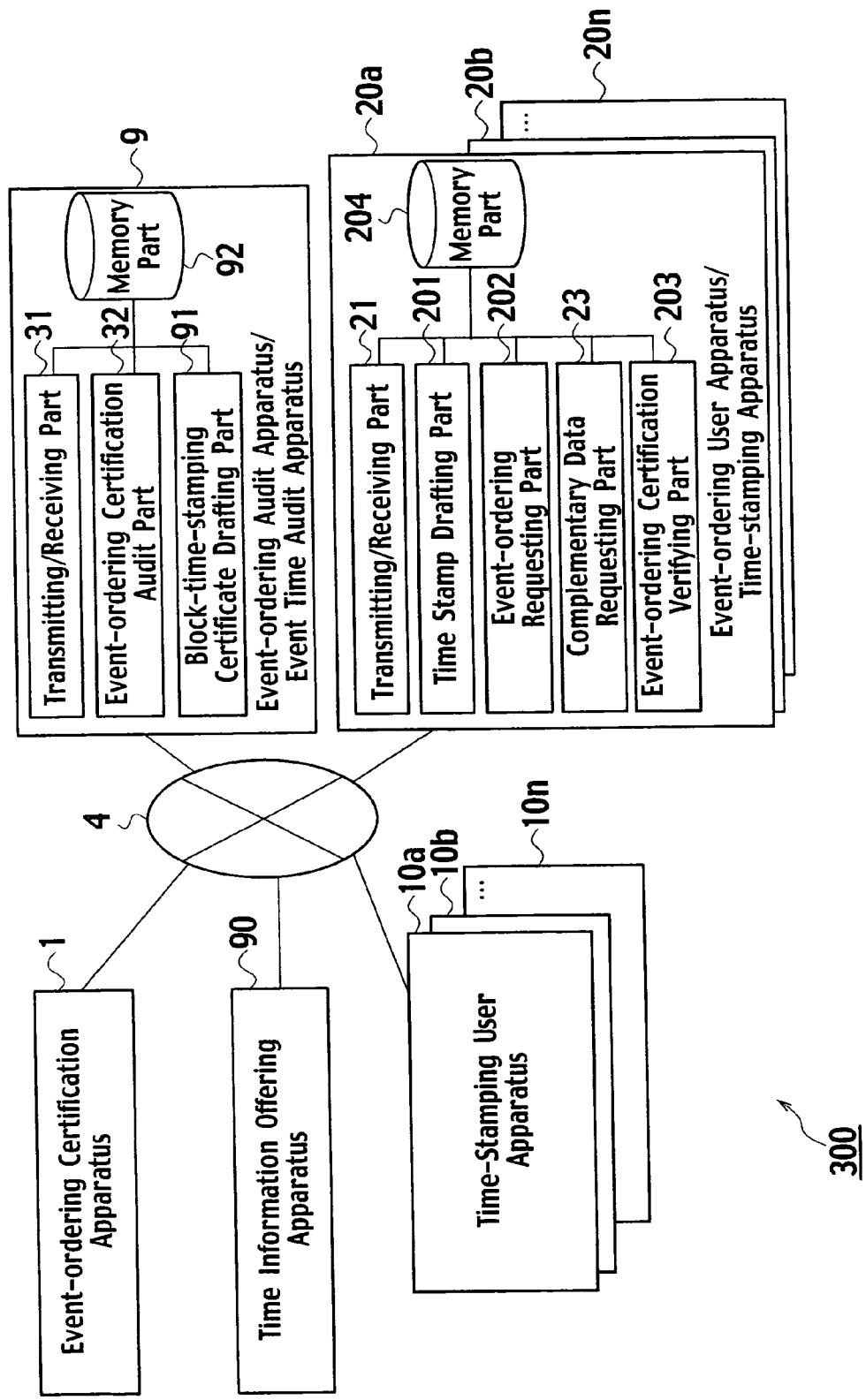
FIG. 21 is a system architecture diagram of an event-ordering certification system in accordance with a third embodiment of the present invention.

FIG. 21 is a system architecture diagram of an event-ordering certification system 300 in accordance with the third embodiment of the present invention. The event-ordering certification system 300 includes an event-ordering certification apparatus (referred to as "certification apparatus" below) 1, a time information offering apparatus 90, a plurality of time-stamping user apparatuses (referred to as "user apparatuses" below) 10*j* (j=a, b, . . . , n), a plurality of event-ordering user apparatuses/time-stamping apparatus (referred to as "user time-stamping apparatuses" below) 20*i* (j=a, b, . . . , n), an event-ordering audit apparatus/event time audit apparatus (referred to as "audit apparatus" below) 9 and the computer network 4 formed by e.g. internet, telephone network, etc. Thus, the event-ordering certification system 300 constitutes a computer system to perform both event-ordering certification and time stamping. The user time-stamping apparatus 20*i* has a function of the time-stamping apparatus performing time stamping in addition to the function of the user apparatus 2*i* of the above embodiment. That is, the user time-stamping apparatus 20*i* publishes a time receipt in response to a time-stamping request from the user apparatus 10*j* and further sends back the time receipt to the user apparatus 10*j*. While, when the user time-stamping apparatus 20*i* transmits an event-ordering request containing a digest of the above time receipt (referring to as "event-ordering request" below) to the certification apparatus 1, it publishes an event-ordering receipt (referred to as "receipt" below) and sends back it to the user time-stamping apparatus 20*i*. If this receipt is believed to be doubtful, then the user time-stamping apparatus 20*i* can verify the receipt with the use of data published by the certification apparatus 7 and the audit result by the audit apparatus 8 and additionally, the apparatus 20*i* can acquire a block-time certificate due to the correspondence between the receipt and the time receipt.

Note that in this embodiment, constitutions and functions different from those of the above embodiments will be described. Regarding the other constitutions and functions, their descriptions are eliminated while elements identical to those of the first embodiment are indicated with the same reference numerals, respectively.

Similarly to the first embodiment, the system architecture of the event-ordering certification system 300 is not limited to this only and therefore, it may be modified to various forms so long as its identity in function. For instance, user validation apparatuses (time-stamping apparatuses) 60*i* may verify the receipts in place of the user time-stamping apparatuses 20*i*. Additionally, in place of the certification apparatus 1, the electronic-information publication apparatus 5 may obtain published data from the certification apparatus 1 and release the published data to the public. Moreover, the computer network 4 may be replaced by other communicating means, such as postal mail.

Assume also in this embodiment, the serialisablity of the certification apparatus 7 is ensured as similar to the first embodiment. As ensuring means, a serialisablity audit apparatus may be employed as similar to the first embodiment.

The time information offering apparatus 90 retains accurate time information and supplies the user time-stamping apparatuses 20*i* and the audit apparatus 9 with the time information.

Each user apparatus 10*j* requests a time stamping containing designated data to the corresponding user time-stamping apparatus 20*i* and subsequently acquires a time receipt having the time information from the user time-stamping apparatus 20*i*.

The user time-stamping apparatus 20*i* has the function of a time-stamping apparatus in addition to the function of the user apparatus 2*i*, as mentioned above. The user time-stamping apparatus 20*i* comprises a transmitting/receiving part 21 for transferring data to and from the audit apparatus 9, the user apparatus 10j and the time information offering apparatus 90, a time stamp drafting part 201 for drafting a time receipt on acceptance of a time-stamping request from the user apparatus 10j, an event-ordering requesting part 202 for requesting a certification containing a time receipt digest, a complementary data requesting part 23 for requesting complementary data of a receipt, which is acquirable at the present moment, an event-ordering certification verifying part 203 for verifying the receipt and a memory part 204 for storing information about event-ordering certification including the receipt and information about time-stamping including the time receipt. Note that although this embodiment adopts a user apparatus doubling as a time-stamping apparatus, there may exists a user apparatus that does not double as the time-stamping apparatus, allowing provision of a system structure where the user time-stamping apparatuses 20 and the user apparatuses 2i are mixed together.

In detail, the time stamp drafting part 201 accepts the time-stamping request including designated digital data transmitted from the user apparatus 10j and successively drafts the time receipt where the time information from the time information offering apparatus 90 is attached to the digital data.

The event-ordering requesting part 202 operates to incorporate the time receipt digest (i.e. a hash value of the time receipt drafted for the time-stamping request from the user apparatus 10j) into an event-ordering request. In detail, this time receipt digest corresponds to a result of applying a "collision-resistant" one-way hash function, which is prepared by the user time-stamping apparatus 20i in advance, on the time receipt. Accordingly, the receipt that the user time-stamping apparatus 20i receives from the certification apparatus 1 has a structure shown in FIG. 6. However, as mentioned above, the original digital data $\underline{y}$ in the certificate contains the time receipt digest.

In addition to the function of the audit apparatus 3 of the first embodiment, the audit apparatus 9 of this embodiment has a function as a time auditing apparatus. The audit apparatus 9 comprises the transmitting/receiving part 31, the event-ordering certification audit part 32, a block-time-stamping certificate drafting part 91 and a memory part 92. In detail, the transmitting/receiving part 31 transfers data to and from the certification apparatus 1, the user time-stamping apparatuses 20i and the time information offering apparatus 90 through the computer network 4. When receiving the audit request for a certain receipt from the user time-stamping apparatus 20i, the event-ordering certification audit part 32 verifies the receipt while using the audit request information transmitted from the user time-stamping apparatuses 20i and the audit information and sends the audit result to the user time-stamping apparatuses 20i. The block-time-stamping certificate drafting part 91 drafts a block-time-stamping certificate for certifying a time block including the time attached on the time receipt corresponding to the receipt on audit. The memory part 92 stores the audit information including the audit receipt and the block-time certificate. Note that although this embodiment adopts, as the event-ordering certification audit apparatus, an audit apparatus doubling as an event-time audit apparatus, there may exist an audit apparatus that does not double as the event-time audit apparatus, allowing provision of a system structure where the audit apparatus 9 and the audit apparatus 3 are mixed together.

The block-time-stamping certificate drafting part 91 acquires the time of its receiving an audit receipt from the certification apparatus 1, from the time information offering apparatus 30 and further attaches the time to the block-time certificate. Thus, in this embodiment, the block-time certificate drafted by the block-time-stamping certificate drafting part 91 includes a time stamp bounding on the future side. As previously mentioned in the first embodiment, since the validation of an event-ordering certificate using the audit apparatus 3 (i.e. the second validation by the user apparatus 2i) makes it possible to certify that the leaf of the sequential aggregation tree where the event-ordering request is assigned is temporally former of the leaf of the audit point, the time stamp bounding on the future side certifies nothing but the acceptance of a time stamping request from the user apparatus 10i having its origin in requesting the event-ordering certificate is temporally former of the time when the audit apparatus 9 received the audit receipt. This block-time certificate in this embodiment will be referred to as "the first-class block-time certificate" after.

Note that the above apparatuses are formed by electronic apparatuses each having a CPU (Central Processing Unit) having at least a calculating function and a control function, a main memory having a function to store programs and data, such as RAM (Random Access Memory), and a secondary memory capable of continuing to memorize data even at powered-off, such as HD (Hard Disc). The operations of respective parts of the user time-stamping apparatus 20i (i.e. the time stamp drafting part 201, the event-ordering requesting part 202, the complementary data requesting part 23, the event-ordering certification verifying part 203) and the operation of the block-time-stamping certificate drafting part 91 of the audit apparatus 9 are nothing but respective crystallizations of the above calculating/control functions of the above central processing unit. Additionally, the memory part 204 of the user time-stamping apparatus 20i and the memory part 92 of the audit apparatus 9 are respectively equipped with the above-mentioned functions of either the main memory or the secondary memory.

Each program for executing a variety of processes in this embodiment is stored in either the main memory or the secondary memory mentioned above. In connection, this program may be recorded in a computer-readable recording medium (e.g. hard disc, flexible disc, CD-ROM, MO, DVD-ROM, etc.) or delivered through a communication network.

3-2. System Operation

In the event-ordering certification system 300 constructed above, the event-ordering certification method and the event-ordering certification validation method will be described with reference to FIGS. 22 to 25.

Figure 22:
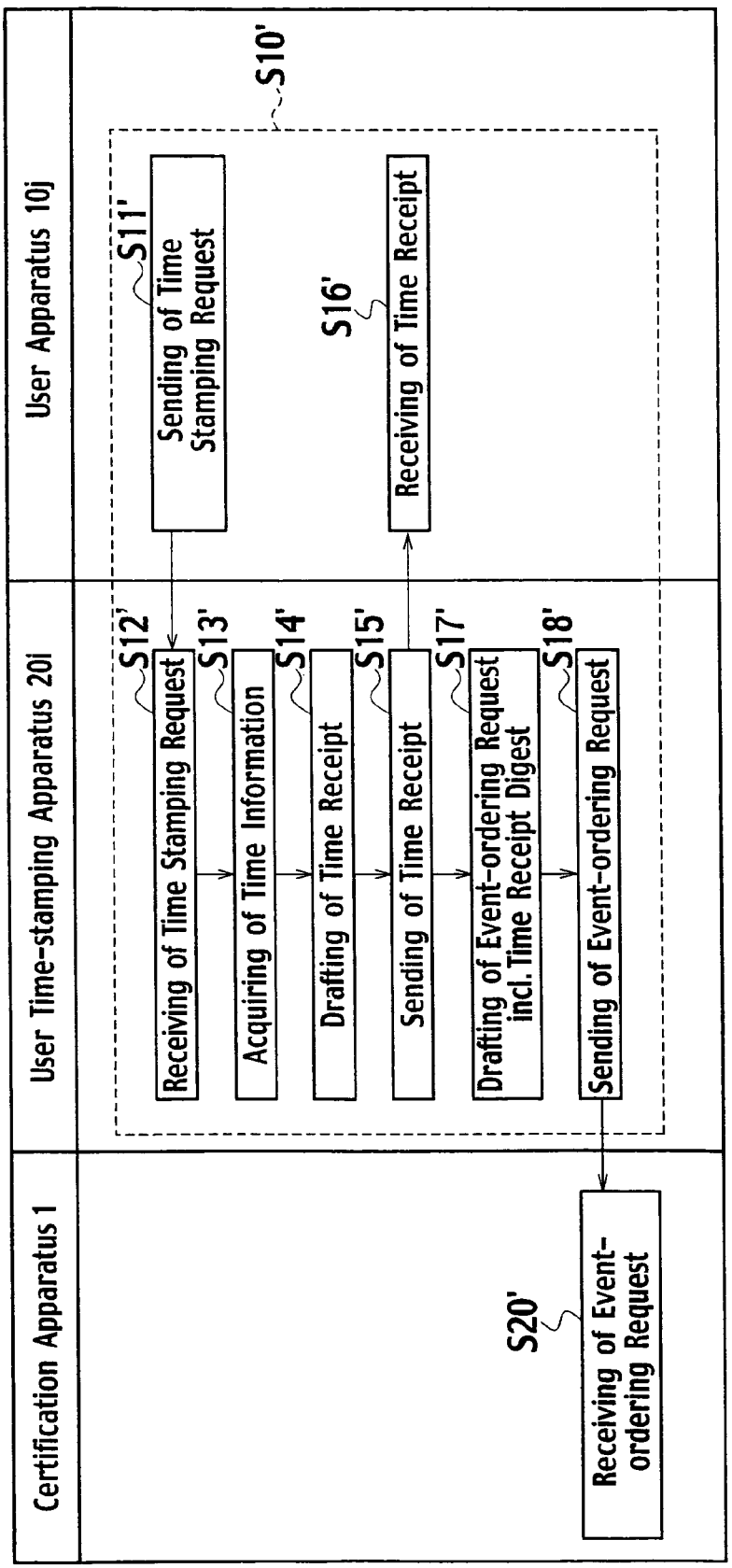
FIG. 22 is a sequence diagram explaining an event-ordering requesting step of an event-ordering certification method by the event-ordering certification system in accordance with the third embodiment of the present invention.
Figure 23:
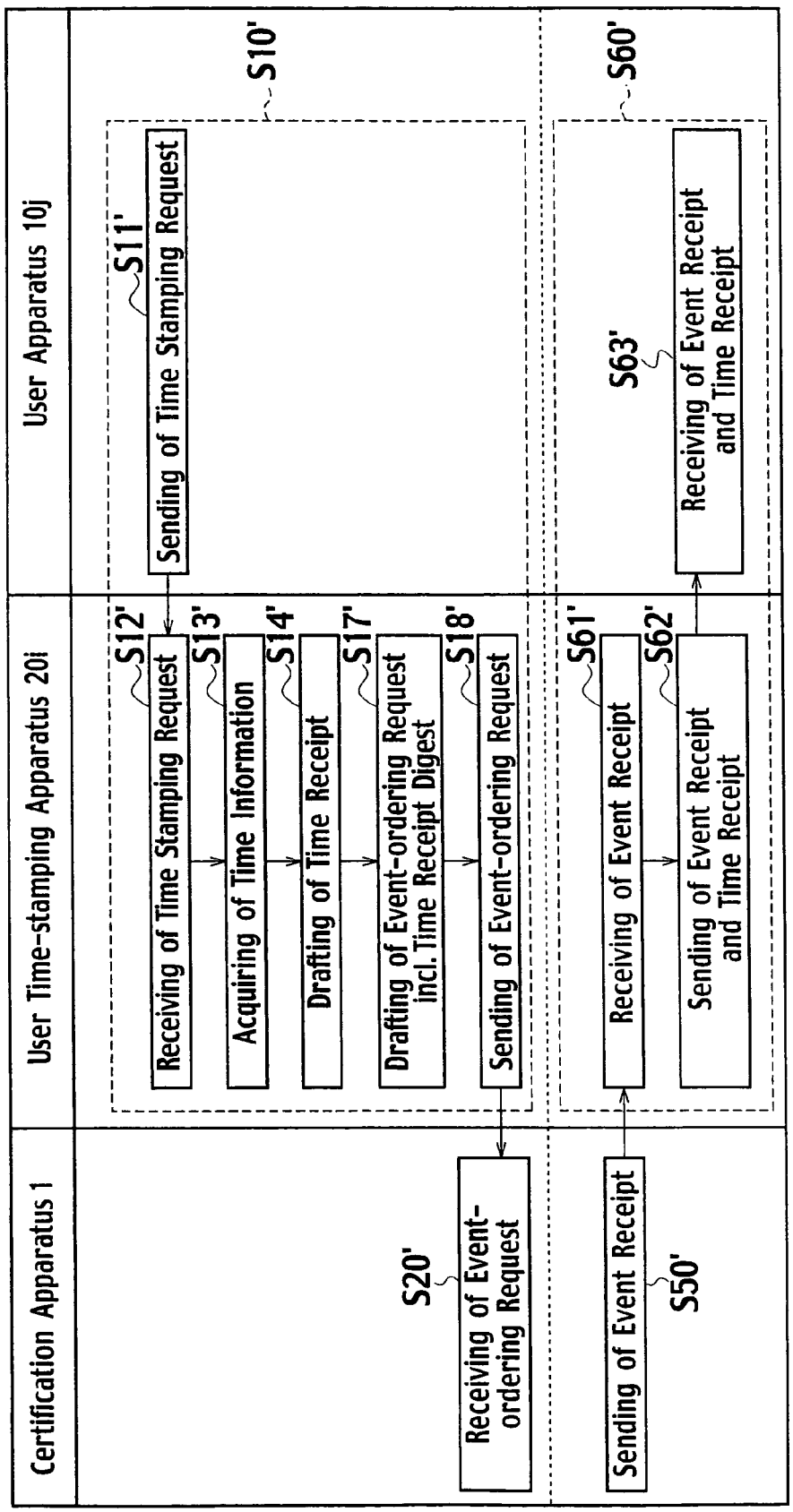
FIG. 23 is another sequence diagram explaining an event-ordering requesting step of an event-ordering certification method by the event-ordering certification system in accordance with the third embodiment of the present invention.
Figure 24:
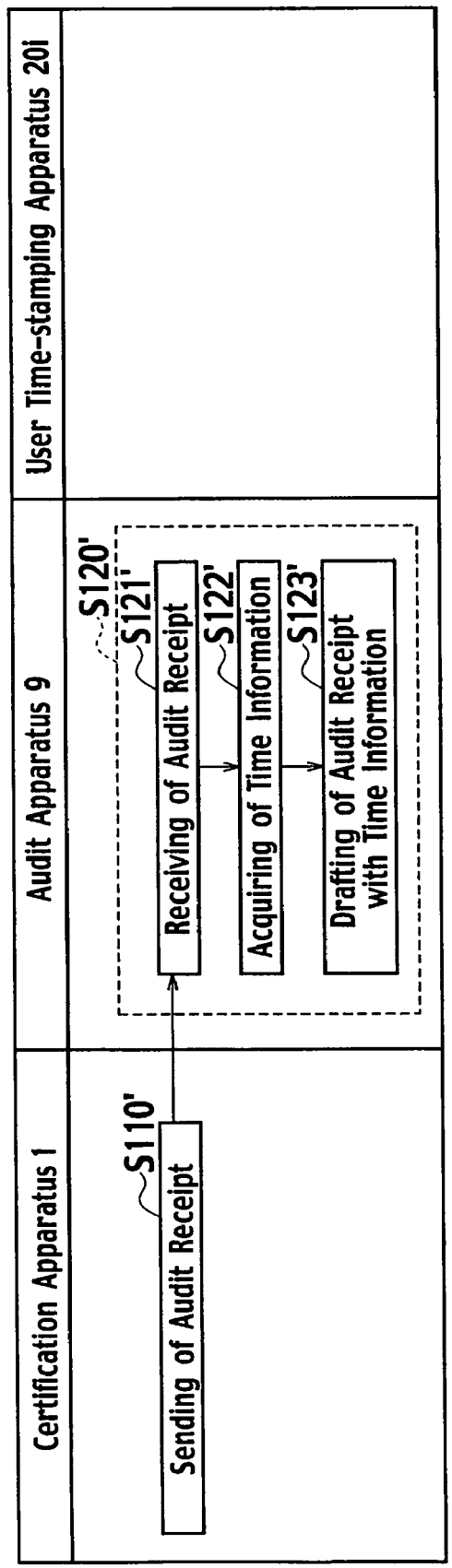
FIG. 24 is a sequence diagram explaining an audit-receipt receiving step of the event-ordering certification method by the event-ordering certification system in accordance with the third embodiment of the present invention.

Regarding the event-ordering certification method, its overall operation is substantially the same as the operation of FIG. 8, assuming that the user time-stamping apparatuses 20i and the audit apparatus 9 correspond to the user apparatuses 2i and the audit apparatus 3, respectively. Therefore, the following descriptions are mainly directed to an interaction between the user time-stamping apparatus 20i and the user apparatus 10j, which is different from the operation of FIG. 8. FIGS. 22 and 23 are sequence diagrams to closely explain the operation of step S10' to send an event-ordering request, corresponding to step S10. Note that FIG. 22 also contains step S60' for receiving the receipt, corresponding to step S60 of FIG. 8. Further, FIG. 24 is a sequence diagram to closely explain the operation of step S12' to receive a receipt certificate for audit (referred to as "audit receipt" later), corresponding to step S120 of FIG. 8.

Figure 25:
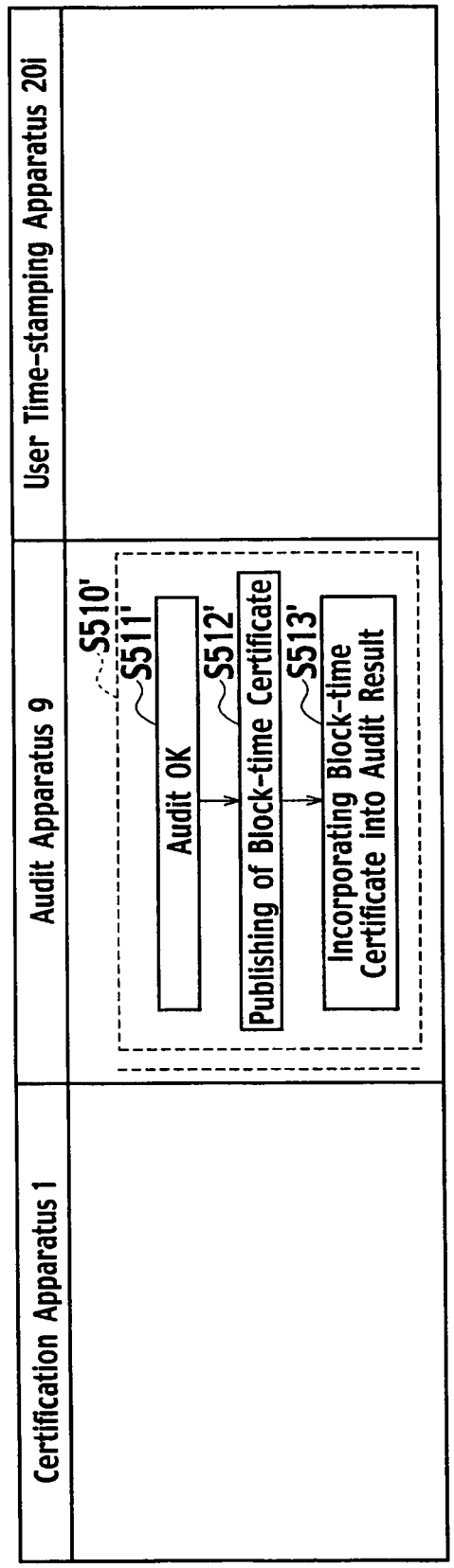
FIG. 25 is a sequence diagram explaining a block-time certification step of the event-ordering certification method by the event-ordering certification system in accordance with the third embodiment of the present invention.

Further, in the first validation of the event-ordering validation method, if assuming that the user time-stamping apparatus 20i corresponds to the user apparatus 2i, then the operation of validation is identical to that of FIG. 9 and therefore, its description is eliminated. In the second validation of the event-ordering validation method, if assuming that the audit apparatus 9 corresponds to the audit apparatus 3, then the operation of validation is identical to that of FIG. 10 and therefore, we now explain the drafting of a block-time certificate by the audit apparatus 9, which is different from the operation of FIG. 10. FIG. 25 is a sequence diagram explaining step S520' in case of succeeding the validation of an event receipt corresponding to step S520 of FIG. 10, in detail.

Referring to FIG. 22, we first describe step S10' of sending an event-ordering request of the event-ordering certification method.

When the user apparatus 10j sends a time stamping request including digital data to the user time-stamping apparatus 20i, it receives the time stamping request including digital data through the transmitting/receiving part 21 (steps S11', S12'). Next, the time stamp drafting part 201 of the apparatus 20i acquires the time of receiving the time stamping request from the time information offering apparatus 90, drafts a time receipt certificate (referred to as "time receipt" after) having the time applied on the digital data and send the time receipt to the user apparatus 10j (steps S13', S14', S15). In this way, the user apparatus 10j can acquire the time receipt (step S20').

Next, the event-ordering requesting part 202 of the user time-stamping apparatus 20i drafts a digest of the time receipt, further drafts an event-ordering request including this "time receipt" digest and sends it to the certification apparatus 1 (steps S17', S18'). In this way, the certification apparatus 1 receives the event-ordering request through the transmitting/ receiving part 11 (step S20').

Although only the time receipt is sent to the user apparatus 10i in the above-mentioned method, there may be expected a method of sending a receipt in addition to the time receipt to the user apparatus 10j.

In FIG. 23, at the event-ordering requesting step (step S10'), it is not executed to send back the time receipt. Instead, at the event receipt receiving step (step S60') corresponding to step S60 of FIG. 8, it is executed to send back the time receipt and the receipt. That is, the user time-stamping apparatus 20i sends the receipt and the corresponding time receipt to the user apparatus 10j when receiving the receipt from the certification apparatus 1 (steps S61', S62'). In this way, the user apparatus 10j receives both the receipt and the time receipt (step S63').

Referring to FIG. 24, we now describe the operation of step S120' to receive the audit receipt.

When receiving the audit receipt from the certification apparatus 1 through the transmitting/receiving part 31, the audit apparatus 9 acquires the time of receiving the audit receipt from the time information offering apparatus 30 and memorizes the time in the memory part 93 while coordinating the audit receipt (steps S121', S122', S123').

Referring to FIG. 25, we now describe the operation of step S520' when the audit apparatus 9 succeeds in verifying an event receipt.

The event-ordering certification audit part 32 of the audit apparatus 9 audits a receipt in response to the audit request from the user time-stamping apparatus 20i. When the audit result is well (OK), the audit part 32 publishes the first-class block-time certificate by the time accompanied with the audit receipt and incorporates the first-class block-time certificate into the audit result (steps S511', S512', S513').

Accordingly, according to the event-ordering certification system 300 of the third embodiment, it is possible to bring about the same effect as the first embodiment. Additionally, owing to the publication of the first-class block-time certificate, it is possible to provide a time stamp bounding on the future side.

3-3. Modification of $3^{rd}$. Embodiment

In the third embodiment, the audit apparatus 9 having a function as the time audit apparatus is employed in place of the audit apparatus 3 of the first embodiment. In one modification of the third embodiment, an audit apparatus 9' having the function of the time audit apparatus may be employed in place of the audit apparatus 8 of the second embodiment.

According to the modification of the third embodiment, the block-time-stamping certificate drafting part 91' acquires the time of its sending the audit event-ordering request to the certification apparatus 7, from the time information offering apparatus 30 and further attaches the time to the block-time certificate. Thus, in this modification, the block-time certificate drafted by the block-time-stamping certificate drafting part 91' includes a time stamp bounding on the past side As previously mentioned in the second embodiment, since the validation of an event-ordering certificate using the audit apparatus 8 (i.e. the second validation by the user apparatus 2i makes it possible to certify that the leaf of the sequential aggregation tree where the event-ordering request is assigned is temporally later of the leaf of one audit point, the time stamp bounding on the future side certifies nothing but the transmission of the time receipt by the user time-stamping apparatus 20i against a time stamping request from the user apparatus 10i having its origin in requesting the event-ordering certification is temporally former of the time when the audit apparatus 9' sent the audit event-ordering request. This block-time certificate in this embodiment will be referred to as "the second-class block-time certificate" after.

In this modification, since the audit apparatus 9' has a function to publish "the first-class block-time certificate" justifiably, it is possible to publish "the third-class block-time certificate" being a block-time certificate having time stamps bounding on the future and past sides. This is provided to certify that the acceptance of a time stamping request from the user apparatus 10i having its origin in requesting the event-ordering certificate is temporally former of the time when the audit apparatus 9 received the audit receipt and that the transmission of a time receipt by the user time-stamping apparatus 20i against the time stamping request of the user apparatus 10i is temporally later of the time when the audit apparatus 9 sent the audit event-ordering request.

In a further modification of the third embodiment, an event-ordering system 300' may be provided with an event-time validation apparatus (not shown in FIG. 19). In operation, this event-time validation apparatus operates to acquire a time receipt published by each of the user time-stamping apparatuses 20i and one or more block-time certificates for certifying a temporally-former boundary of the time applied on the time receipt, a temporally-later boundary of the time or both boundaries of the time. Based on the so-acquired certificates, the event-time validation apparatus judges the validity of the time applied on the time receipt. In detail, if a probability that the time applied on the time receipt is included in a time block certified by the block-time certificates with a predetermined allowable error is larger than a predetermined value, then the event-time validation apparatus judges the validity of the time applied on the time receipt.

The certification apparatuses 1, 7 and the electronic information publishing part 17 were not explained in the above descriptions in detail. Nevertheless, preferably, information publishing in the computerized society is required to meet with the following requirements.

(1) A plurality of independent entities publishes the same information.

(2) Anybody can have access to each of the above entities at any time.

(3) When each of the above entities acquires information to be published, an entity certification of a resource center is provided, while the perfectibility of information on provision is ensured by the resource center.

In these requirements, the requirement (1) could be realized since some service organizations provide their occupations with a certain category of information. It is noted that the above-mentioned embodiment fills the requirement (1) since the certification apparatus and the plural audit apparatuses provide, as their occupations, the information about the root value etc. of the sequential aggregation tree.

The requirement (2) can be accomplished due to information provision through WWW (World Wide Web) in widespread use of recent years.

The requirement (3) can be accomplished by applying a digital signature based on the public key cryptosystem to information for provision. In this application, it is necessary that the digital signature has sufficient intensity and the effectiveness of a private key for signature and a public key pairing with this at that time is ensured by PKI (Public Key Infrastructure) with the use of a public-key certificate, CRL (Certificate Revocation List), OCSP (Online Certificate Status Protocol) service, etc. The pair of keys are adequate so long as being effective at the point of acquiring the information by an information demandant. By renewing the pair of keys as needed, it is possible to maintain the effectiveness of the key pair. In replacing one key pair KP1=(SK1, PK1) by a new key pair KP2=(SK2, PK2), it is not indispensable to create a digital signature by the private key SK2 of the key pair KP2 within an available period of the key pair KP1. Required is that when a user has access to the above entities, a digital signature is produced by using a key pair that is effective at that time.

Hitherto, it has been carried out to make the information public to mass-media, such as newspapers, as means for information publishing. However, it should be noted that this publishing method is not necessarily appropriate as measure for information publishing in this computer-controlled society. Because it is difficult to meet the requirement (2) since it is not easy for a user using the above method to access information published on a specific mass-media, for example, 10 years after. Even if possible to access, it is impossible for the user to acquire the information while meeting the above requirement (3).

(Constitution and Feature of Sequential Aggregation Tree)

As for the sequential aggregation tree employed in the above-mentioned embodiments in common, its dynamic constitutive method and feature will be described below. On the assumption, we first explain a basic function essential to the constitution of the sequential aggregation tree.

(Basic Function)

A sequential aggregation tree of height k is formed by respective nodes at levels 0 to k. Since the number of nodes at level j (j=0, 1, ..., k) is $2^{(k-j)}$, under the notation that (j, i) denotes a node at level j and by number i, then i=0, 1, ..., $2^{(k-j)}-1$.

Assume ceiling(x) denotes a minimum integer more than x and floor(x) denotes a maximum integer less than x for a real number x.

Since a parent of node (j, i) where j<k is represented by (j+1, floor(i/2)), the parent is defined as parent(j,i)=(j+1,floor(i/2)).

Further, since a left child of node (j, i) where 0<j is represented by (j+1, floor(i/2)) and the right child of node (j, i) is represented by (j−1, ·i+1), they are defined as leftChild(j,i)=(j−1, 2·i), rightChild(j,i)=(j−1, 2·i+1), respectively. Now, a root path rtPathk(j, i) represents a row of nodes from node (j, i) to the root. Then, the root path rtPathk(j, i) of node (j, i) where $0 \leq i < 2^{(k-j)}$ of the sequential aggregation tree of height k can be represented as rtPathk(j, i)=[j, r(j)), ..., (k, r(k))]

where r(j)=1, r(j'+1)=floor(r(j')/2) for j'<k, and r(j') is already determined. Note here that (k, r(k)) represents the root of the sequential aggregation tree under the condition r(k)=0.

Let V(j, i) be an assigned value of node (j, i), and V(0, i) be expressed by V(i). Further, assume that L is a negative integer satisfying L≦k and SBT is a certain sequential aggregation tree. Then, it is defined "a subgraph B of SBT is a partial tree at level L" as "there exists a certain node p at level L belonging to SBT so that B is a subgraph of SBT composed of the node p and its descendants".

Assume that B is a partial tree of SBT. Then, leafs(B) represents a set of leaves forming the tree B. Assume that X is a non-empty set composed of leaves of SBT. Then, first(X) represents a leftmost leaf in the set X and last(X) represents a rightmost leaf in the set X.

Let [i1 ... i2] be the set (interval) of integers i satisfying i1≦i≦i2 for two integers i1 and i2; [i1 ... i2] be the set (interval) of integers i satisfying i1<i≦i2; (i1 ... i2) be the set (interval) of integers i satisfying i1≦i<i2; and [i1 ... i2] be the set (interval) of integers i satisfying i1<i<i2.

(Method of Forming Sequential Aggregation Tree)

1$^{st}$. Method of Forming Sequential Aggregation Tree

In accordance with the above definitions about the basic function, we now describe a first method of forming an aggregation tree dynamically. In the first method, a difference in depth is suppressed less than 1 and no dummy node is produced.

Assume that the number of event-ordering requests to be accepted for an aggregation period (e.g. one week) is previously fixed by a method of some kind. Let n be the fixed number of requests. Then, the height of the aggregation tree is k=ceiling($\log_2(n)$). Here, the maximum number of leaves in the tree of height k is $2^k$. Thus, on condition d=$2^k$−n, if only eliminating nodes at level 0 in the number of 2d, then it becomes possible to assign the event-ordering requests (number: n) to respective leaves without producing any dummy node. The reason is as follows: If the number of leaves at level 0 is reduced by number 2d, then new leaves at level 1 (number: n) are produced. As a result, due to a reduction in the number of leaves by number d, the total number of leaves results in n=$2^k$−d.

Let L1W=$2^{(k-1)}$ (the number of nodes at level 1), L1L=$2^{(k-1)}$−d (the number of nodes at level 1 having children), and L0L=2($2^{(k-1)}$−d) (the number of nodes at level 0). If for n event-ordering requests (n: the number of requests) first arranging L0L requests at level 0 first and subsequently arranging while the remaining requests at level 1, then a function place(i) representing a destination of an $i^{-th}$ event-ordering request can be described as place(i)=(0, i) (0≦i<L0L),
place(i)=(1, L1L+i−L0L) (L0L<i≦n)

where place(i)=(level, number).

Figure 26:
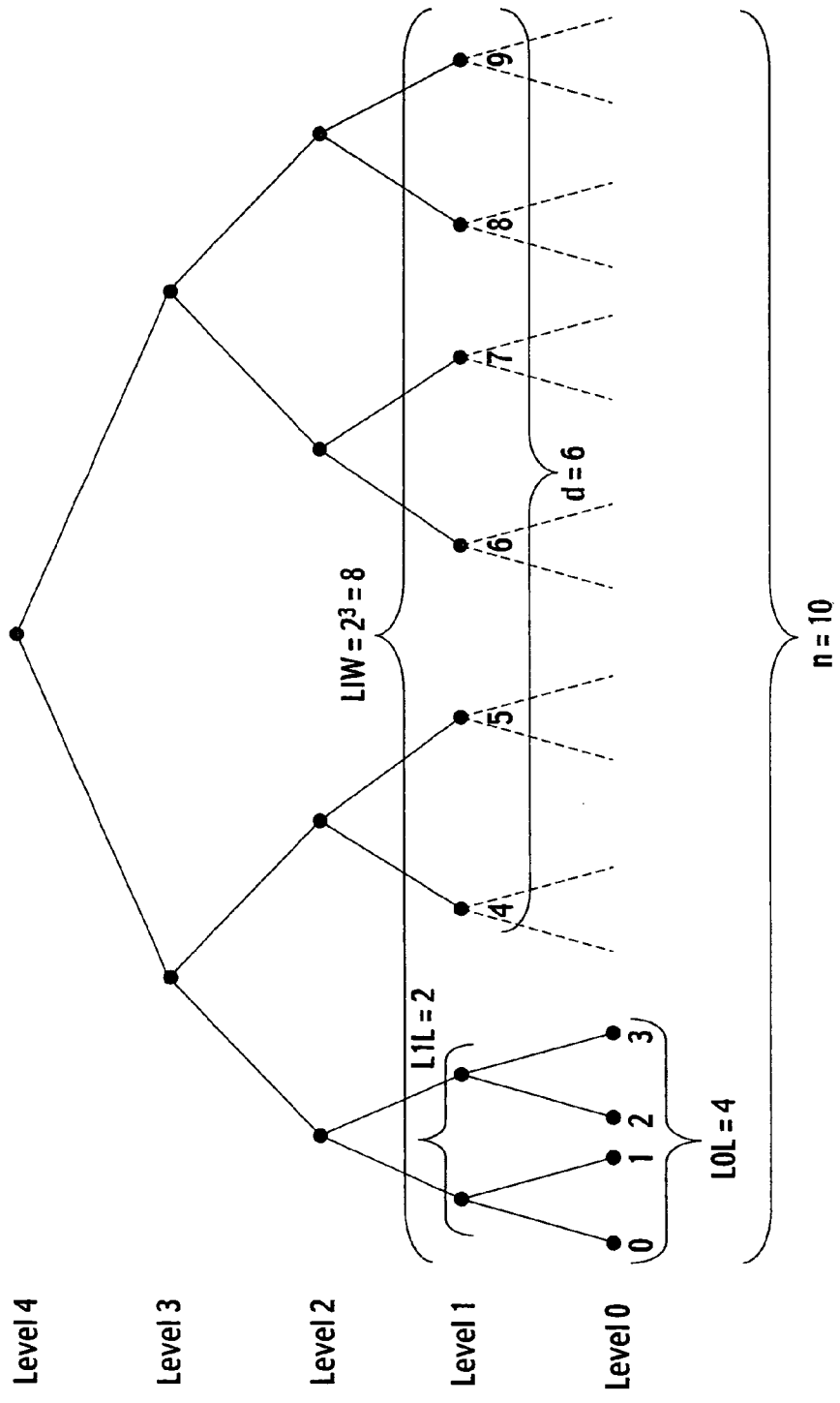
FIG. 26 is a diagram explaining a constitutive method of a dynamic sequential aggregation tree suppressing a difference in depth less than 1 and producing no dummy node.

FIG. 26 shows a concrete example of the first method of dynamically forming the sequential aggregation tree in case of n=10. In this case, as shown in FIG. 26, there is established k=ceiling($\log_2(10)$)=4, and therefore the height becomes 4. Then, as d=$2^4$−10=6, the leaves at level 0 in the number of 12=6×6 are deleted. As a result, L1W=$2^3$=8, L1L=8−6=2, L0L=2×2. The numbers of leaves are: 4 leaves at level 0; 6 leaves at level 1; and total number n=10. Consequently, the aggregation tree shown in FIG. 24 can be formed dynamically. When possible, it is carried out to assign values to respective nodes whose levels are more than 0 incrementally.

$2^{nd}$. Method of Forming Sequential Aggregation Tree

Next the second method of forming a sequential aggregation tree will be described. The second method is the same as the first method in terms of forming the sequential aggregation tree incrementally and differs from the first method in point of assuming that the number of event-ordering requests to be accepted at predetermined intervals (every sequential aggregation period) cannot be anticipated.

Here, the above terminology "incremental" means that it is executed with respect to each acceptance of the event-ordering requests to calculate a part of the sequential aggregation tree that could be calculated by the acceptance. Although the number of event-ordering requests on acceptance cannot be anticipated, we describes on the assumption that the upper limit N can be estimated. Assume in this method, the event-ordering requests are all assigned at level 0 and a dummy node is employed to calculate a root value for a binary tree.

In forming a sequential aggregation tree by this method, if representing the number of event-ordering requests accepted for a designated aggregation period (e.g. one week) by N, then a height k of the sequential aggregation tree is represented by k=ceiling($\log_2(N)$). As the number of the sequential aggregation tree of height k is $2^k$ at the maximum, n event-ordering requests (0, 1, ..., n−1) are assigned to respective nodes at level 0 (i.e. from node(0, 0) to node(0, n−1)).

Assume, for a rightmost one (0, n−1) of the nodes at level 0, its root path rtPathk(j, i) is represented by rtPathk(j, i)=[j, r(j)), ..., (k, r(k))].

In general, rtPathk(j, i) is represented by rtPathk(j, i)=[(j, r(j)), ..., (k, r(k))]. Assume here that r(j1)=floor(i/$2^{(j1-j)}$) for j1∈[j ... k]. Then, at respective levels j (j=0, ..., k−1), the followings are established:

If r(j) is an even number, nodes (j, r(j)+1) become dummy nodes and respective nodes (j, i) for i under r(j)+1>i>$2^{(k-j)}$ are eliminated;

If r(j) is an odd number, respective nodes (j, i) under r(j)+1>i>$2^{(k-j)}$ are eliminated.

In the sequential aggregation tree based on the above method, the dummy node appears only on the right end at each level. The number of dummy nodes drafted is less than k.

FIGS. 27 and 28 show an algorithm of the second method of forming the sequential aggregation tree. In accordance with the algorithm, the sequential aggregation tree is formed incrementally. We define the followings:

K=ceiling($\log_2(N)$);

n is an integer variable, representing the number of event-ordering request on acceptance. The initial value of n is 0;

k is a variable representing a height of the sequential aggregation tree when the fixed interval (aggregation period) is completed;

A row of (K+1) counters are represented by i0, ..., iK. The initial value of "ij" is 0 (j=0, ..., K). The "ij" represents the number of nodes already produced at level j and simultaneously represents a number of a node at level j, which will be next produced;

A row of (K+1) Boolean variables are represented by b0, ..., bK. The initial value of "bj" is "false" (j=0, ..., K). The "bj" represents whether a dummy node is present at level j or not;

A row of (K+1) alignments are represented by A0, ..., bK. Each alignment has a length of $2^{(K-j)}$ and retains values to be assigned to nodes at level j (j=0, ..., K);

r is a variable to store dummy values assigned to dummy nodes;

R(j, i) is a function to calculate a dummy value to be assigned to node (j, i) for two arguments i, j;

x, x0, x1, and x2 are variables representing values assigned to nodes;

x1||x2 is a junction of two values represented by a row of bits; and h(x) is a "collision-resistant" one-way hash function.

Under the above definitions, when a processing procedure 1 of FIG. 27 is completed (namely, when the designated sequential aggregation period is completed), n, k, ij, bj, and Aj represent the number of time-processing requests, the height of a so-formed sequential aggregation tree, the number of nodes at level j, whether or not there is a dummy node at level j and an alignment of values assigned to the nodes at level j, respectively.

Figure 29:
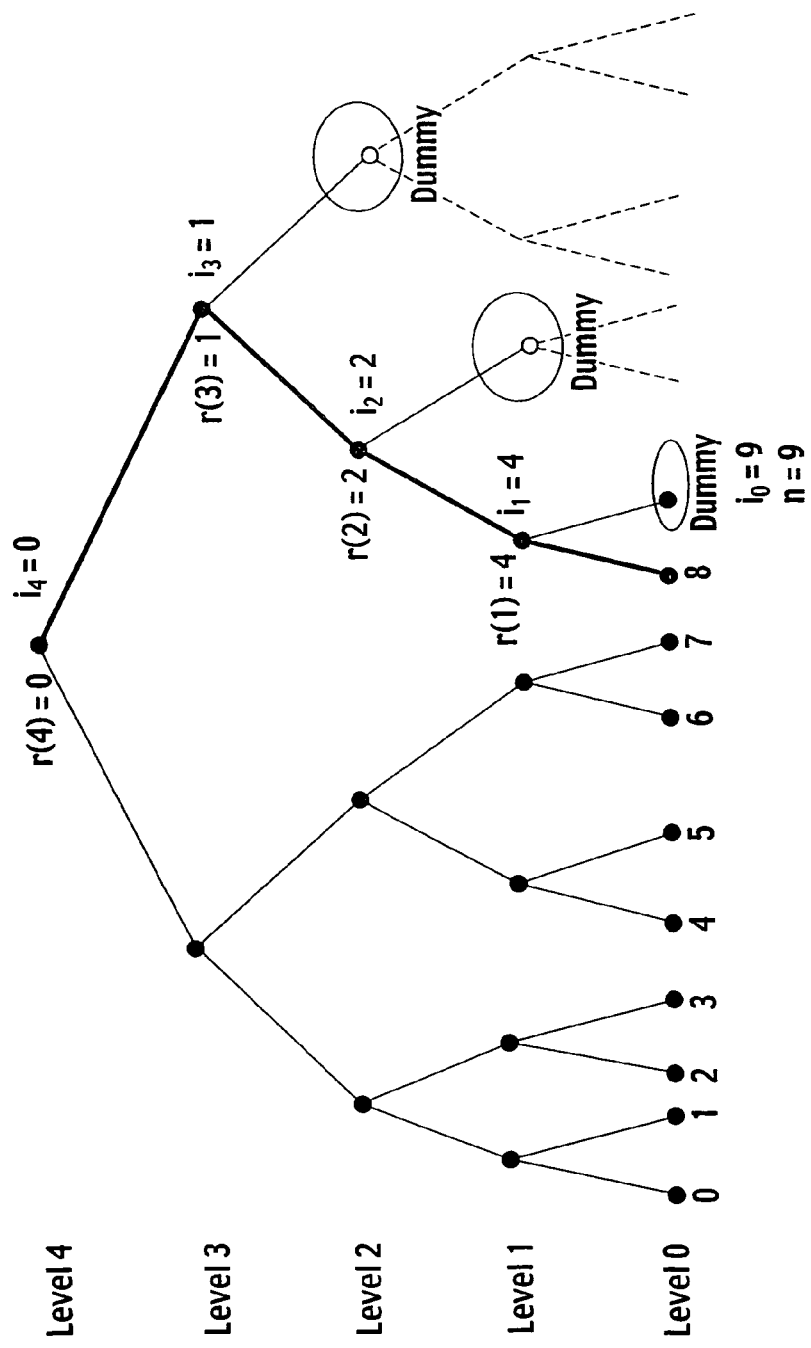
FIG. 29 is a diagram explaining the method of forming the sequential aggregation tree incrementally.

FIG. 29 is a diagram showing a concrete example of the second method of forming a sequential aggregation tree dynamically in case of n=9. That is, assume that n=9 when a predetermined sequential aggregation period is completed. Then, there is established k=ceiling($\log_2(9)$)=4, forming the sequential aggregation tree of 4 in height. Note that n event-ordering requests from "0" up to "n−1" are already assigned to node (0, 0), ..., node (0, n−1) in accordance with the processing procedure 1. Additionally, by the processing procedure 1, there are established i0=9, i1=4, i2=2, i3=1, and i4=0.

Then, by (2.2) of the processing procedure 2, root path rtPath4(0, 8) of node (0, 8) is represented by rtPath4(0, 8)=[(0, 8), (1, 4), (2, 2), (3, 1), (4, 0)].

Thus, the procedures at respective levels are as follows.

At level 0, node (0, 9) becomes a dummy node by step (2.3.2.1). At level 1, a value is assigned to node (1, 4) by step (2.3.3.2.5), so that node (1, 5) forms a dummy node. At level 2, a value is assigned to node (0, 2) by step (2.3.3.1.5), so that node (0, 3) forms a dummy node. At level 3, a value is assigned to node (3, 1) by step (2.3.3.1). At level 4, a value is assigned to node (4, 0) by step (2.3.3.1).

As a result, the sequential aggregation tree as shown in FIG. 29 can be constructed incrementally. At each level, there is only one dummy node at most. It is necessary to assign a dummy label (assigned dummy value) to the dummy node in accordance with any procedure determined in advance. As a simple definition of such a procedure, there exists a method of defining a dummy label as the function of level. Thus, this method may be adopted.

Figure 30:
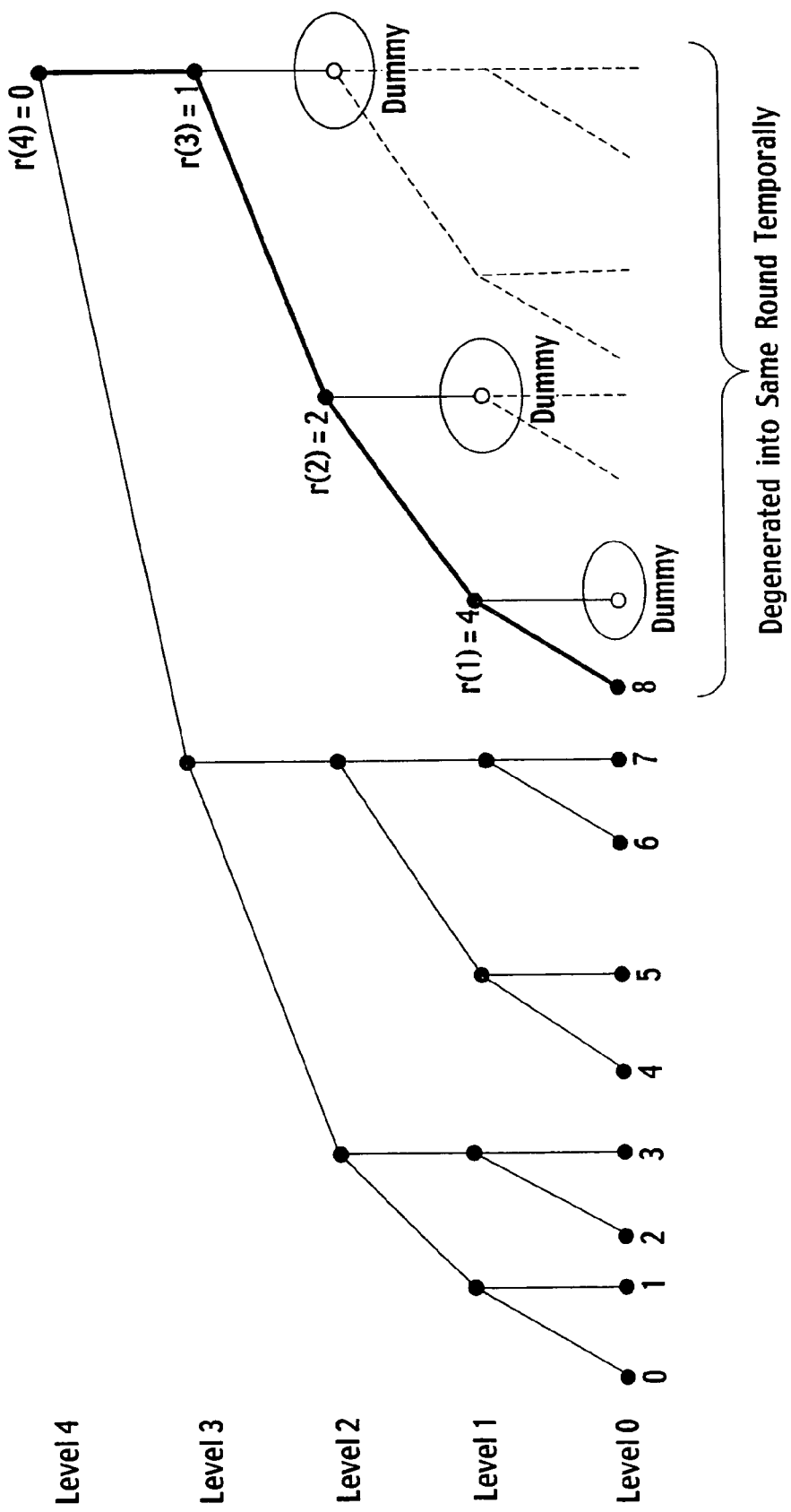
FIG. 30 is a diagram explaining the timing of allocating values to respective nodes in accordance with the method of forming the sequential aggregation tree incrementally.

FIG. 30 shows the timing of assigning values to respective nodes in the above-mentioned method of forming the sequential aggregation tree incrementally.

The first to third embodiments mentioned above are provided on the assumption that the sequential aggregation tree is completed with the use of dummy nodes on each occasion of publishing information. However, the other method may be adopted as one concrete method of forming a sequential aggregation tree.

In detail, the event-ordering certification systems 100, 200 and 300 in the above-mentioned embodiments can employ any one of the above-mentioned methods of dynamically forming the sequential aggregation tree. Therefore, due to the possibility of coping with quantitative alteration in the number of even-ordering requests from the user apparatuses with flexibility, it is possible to build an even-ordering certification system having improved scalability.

(Definition of Authentication Path and Calculation Method of Root Value by Definition)

For nodes in an incrementally-formed sequential aggregation tree having no predetermined height, it is possible to define a root path and an authentication path at a certain point of time as follows. Note that this definition is applicable for a situation such that the number of requests accepted during a predetermined sequential aggregation period cannot be anticipated in advance, in the first to third embodiments.

Assume that $\kappa(m) = \min\{h | m+1 \leq 2^h\}$ when a maximum value in the leaf number at the present moment is m ($\geq 0$) (and therefore the number of leaves is m+1), and curSBT(m) denote a sequential aggregation tree having height $\kappa(m)$.

Assume that $p = (i, j) \in \text{curSBT}(m)$ and a row of nodes from p to a root of curSBT(m) is represent by a root path "rtPath(p, m)".

"rtPath(p, m)" represents a row of nodes whose assigned values are to be determined at the point when an assigned value for an $m^{-th}$ leaf of leaves belonging to the root path rtPath(p, m) is determined.

If rtPath(p, m)=[(0, i(0)), . . . , (k, i(k))], then there exists k1 satisfying $0 \leq k1 \leq k$, and rtPathD(p, m)=[(0, i(0)), . . . , (k1, i(k1)))

is satisfied.

"rtPathDV(p, m)" is rtPathD(p, m) having respective nodes where assigned values are assigned.

If rtPathD(p, m)=[(0, i(0)), . . . , (k1, i(k1))], then rtPathDV (p, m) is represented as rtPathDV(p, m)=[((0, i(0), v(0)), . . . , ((k1, i(k1)), v(k1))).

An aggregate of nodes p'=(j', i') essential to calculate a root value of curSBT(m) from node p=(j, i) will be called "authentication path of the node" and represented by "authPathT(p, m)". Note that for each node belonging to an authentication path it includes information about a direction (left or right) junctural to the node, in the form of tags.

If $\kappa(m) = k$, and rtPath(p, m)=[(j, r(j)), . . . , (k, r(k))], then "authPathT(p, m)" can be expressed by using "rtPath(p, m)" as follows:

authPath$T(p,m)$=[((J,a(j)), LR(j)), . . . , ((k-1,a(k-1), LR(k-1)))

where when r(j') is an even number, a(j')=r(j')+1, LR(j')=R, and when r(j') is an odd number, a(j')=r(j')-1, LR(j')=L, (for j'$\in$[j . . . k-1]).

As for the element ((j, a(j)), LR(j)) of "authathT(p, m)", part "LR(j)" will be called "(LR)tag". Further, regarding the element (j, r(j)) of "rtPath(p, m)", (j, r(j))+1) in case of an even number of r(j) will be called "right complementary point of (j, r(j))", while (j, r(j))-1) in case of an odd number of r(j) will be called "left complementary point of (j, r(j))", after.

Then, authPathT(p, m) consists of right or left complementary points of points except the root of rtPath(p, m).

The "authPathT(p, m)" except for information of LR-tag will be called "authPathT(p,m)". That is, if authPath$T(p,m)$=[(j,a(j)), LR(j)), . . . , ((k-1,a(k-1)), LR(k-1))], then authPath(p,m)=[(j,a(j)), . . . , (k-1,a(k-1))]

is established. On the contrary, if authPath$T(p,m)$=[((j,a(j)), LR(j)), . . . , ((k-1,a(k-1)), LR(k-1))], is given, then authPathT(p, m) can be calculated as follows: For j1$\in$[j . . . k), a node at level j1 forming rtPath(p, m) is presented by (j1, floor(i/$2^{(j1-j)}$)).

Therefore, setting up "LR(j1)=R" in case of an even number in floor(i/$2^{(j1-j)}$) and "LR(j1)=L" in case of an odd number in floor(i/$2^{(j1-j)}$), authPath(p, m) may be represented by authPath$T(p,m)$=[((j,a(j)), LR(j)), . . . , ((k-1,a(k-1)), LR(k-1))].

In this way, it is possible to calculate "authPathT(p, m)" from "authPath(p, m)" and vice versa.

For authPath(p, m) and authPathT(p, m), respective aggregates of nodes, that their assigned values have been already determined at that time when an assigned value of $m^{-th}$ leaf becomes definite, are defined as authPathD(p,m) and authPathTD(p,m), respectively. When authPath(p, m) and authPathT(p, m) are expressed as above, there exist k satisfying "k1$\leq$k-j", and nonnegative integers j(0), . . . , j(k1-1) satisfying j$\leq$j(0)<j(1)< . . . <j(k1-1).

They are expressed as follows:

authPath$D(p,m)$=[(j(0), a(j(0))), . . . (j(k1-1), a(j(k1-1)))], and authPath$TD(p,m)$=[((j(0), a(J(0))), LR(j(0))), . . . ((j(k1-1), a(j(k1-1))), LR(j(k1-1)))].

Additionally, assume that authPathDV(p, m) and authiPathTDV(p, m) represents authPathD(t, m) and authPathTD(t, m) plus assigned values of respective nodes belonging to authPathD(p, m) and authPathTD(p, m), respectively. In detail, when authPathDV(p, m) and authPathTDV (p, m) are expressed as above, there are established:

authPath$DV(p, m)$=[((j(0), a(j(0)), v(j(0)), . . . , ((j(k1-1), a(j(k1-1))), v(j(k1-1)))], and authPath$TDV(p, m)$=[((j(0), a(j(0)), v(j(0)), . . . , ((j(k1-1), a(j(k1-1))), v(j(0)), . . . , ((j(k1-1), a(j(k1-1))), LR(j(k1-1)), v(j(k1-1)))]

where v'(j)=V(j, a(j')) for each j'$\in$\{j(0), . . . , j(k1-1)\}.

On condition that a relevant sequential aggregation tree is completed at that stage of assigning an assigned value to a leaf numbered "m" in accordance with any of the above-mentioned forming methods and that authPathTDV(p, m) is represented as above, it is possible to calculate a root value of the sequential aggregation tree by an assigned value V(p) of node p (=(j, i)) and also authPathTDV(p, m) in the following manner. For j1∈[j . . . k], v'(j1) is defined by the following (1) and (2) recursively. Then, v'(k) becomes a root value of the sequential aggregation tree.

(1) v'(j)=V(j, i),
(2) Assume that v'(j) is defined for j1∈[j . . . k]. When LR(j1)=L, $$v'(j1+1)=h(v(j1)\|v(j1))$$

is defined, and when LR(j1)=R, $$v'(j1+1)=h(v'(j1)\|v(j1))$$

is defined.

Suppose that m1, m2 denote respective leaf-numbers of leaves in a sequential aggregation tree where m1≦m2. Then, $$curSBT(m1) \subseteq curSBT(m2)$$

is satisfied.

Assume that p=(j, i)∈curSBT(m1). Then, the followings (1), (2), and (3) are established:

(1) rtPath(p, m1)⊆rtPath(p, m2);
(2) authPath(p, m1)⊆authPath(p, m2); and
(3) authPathD(p, m1)⊆authPathD(p, m2).

<Various Features of Sequential Aggregation Tree>

In the following descriptions, assuming that "m" represents a maximum value of leaf-numbers at the present moment about an incrementally-formed sequential aggregation tree, the terminologies:

"rtPath((0, i), m)", "rtPathD((0, i), m)", and "rtPathDV((0, i), m)" may be abbreviated to "rtPath(i, m)", "rtPathD(i, m)", and "rtPathDV(i, m)", respectively. Similarly, the terminologies:

authPath((0, i), m), authPathT((0, i), m), authPathD((0, i), m), authPathTD((0, i), m), authPathDV((0, i), m), and authPathTDV((0, i), m) may be abbreviated to authPath(i, m), authPathT(i, m), authPathD(i, m), authPathTD(i, m), authPathDV(i, m), and authPathTDV(i, m), respectively.

We now explain an algorithm to calculate an authentication point of a user point by an audit point in the sequential aggregation tree. Let "k" denote a height of a sequential aggregation tree, "i0" an identification number of the user point and let "i1" denote an identification number of the audit point where i0<i1. For node (0, i) of the sequential aggregation tree, generally, rtPath((0, i), m) can be calculated as $$rtPath((0,i),m)=[(0,r(0)), \ldots, (k,r(k))]$$

where k=κ(m), and r(j)=floor(i/2$^j$) for j∈[0 . . . k].

By this procedure, it is carried out to calculate both root path rtPath((0, i0), m) for node (0, i0) and root path rtPath((0, i1), m) for node (0, i1). As a result, rtPath((0, i0), m) comes to coincide with rtPath((0, i1), m) since a certain element. Then, the element where rtPath((0, i0), m) coincides with rtPath((0, i1), m) at first is called "confluent point" between node (0, i0) and node (0, i1). Further, a left child of the confluent point is referred to as "authentication point of node (0, i0) (i.e. user point) by node (0, i1) (i.e. audit point)".

Described above is the definition of an authentication point where a user point and an audit point belong to an identical sequential aggregation tree together. Nevertheless, in case that a sequential aggregation tree that another sequential aggregation tree containing the audit point does belong to, is produced after the formation of a sequential aggregation tree SBT that the user point belongs to, a root of SBT is defined as "authentication point of the user point by the audit point".

(Feature 1 of Sequential Aggregation Tree)

Let "B" be a partial sequential aggregation tree forming a certain sequential aggregation tree. Also assume that the processing of a round corresponding to last(leafs(B)) has been already completed at a certain point of time. At that point of time, assigned values for respective nodes belonging to "B" have been calculated and assigned to these nodes.

Certification of Feature 1

In accordance with the method of FIGS. 27 and 28 to form a sequent aggregation tree incrementally, it is executed at each completion of respective rounds to calculate all assigned values for other nodes (except leaves calculable by assigned values for leaves acquired until the round in question) and assign the calculated values to these nodes.

At the point of finishing the processing of the round corresponding to last(leafs(B)), there are already determined assigned values of respective leaves belonging to leafs(B), allowing assigned values of each node forming the partial tree B to be calculated. Thus, at this stage, the assigned values of respective nodes forming the tree B are calculated and assigned to the nodes. For the sequential aggregation tree whose height is not determined yet and which is formed incrementally, a feature 2 will be established as follows.

(Feature 2 of Sequential Aggregation Tree)

Let C, Z, i0 and i1 denote a user apparatus, an audit apparatus and two "sequential aggregation tree" leaf numbers respectively, where i0<i1. Assume that C received a receipt at round(i0), while Z received an audit receipt at round(i1). Then, an authentication point of "i0" by "i1" has characteristics as follows.

(1) An assigned value of the authentication point is included in complementary data in the receipt at the audit point, that is, node (0, i1).

(2) If the above authentication point is expressed by (j', i'), then assigned values for nodes belonging to authPath((0, i0), j1) and each having its level smaller than j' are included in either late complementary data that a user receiving a receipt at a round corresponding to node (0, i1) could receive after the above round or complementary data in the receipt.

That is, if i1≦i2, then assigned values for nodes belonging to authPath((0, i0), j1) and each having its level smaller than j' are included in either EOC(i0) or CToken(i0, i2).

(3) The assigned value of the above authentication point and the assigned values of nodes belonging to rtPath((0, i0), i2), whose level is smaller than the level of the authentication point can be calculated from the receipt (incl. in-receipt complementary data) that a user has received at node (0, i0) and the late complementary data that the user receives on and after a round corresponding to node (0, i1).

Certification of Feature 2

We now describe a case of incorporating in-receipt complementary data (immediate complementary data) into a receipt to be delivered to a user. Even when not incorporating the in-receipt complementary data into the receipt but instead incorporating the same information into late complementary data, the same conclusion could be attained with similar argument.

Figure 31:
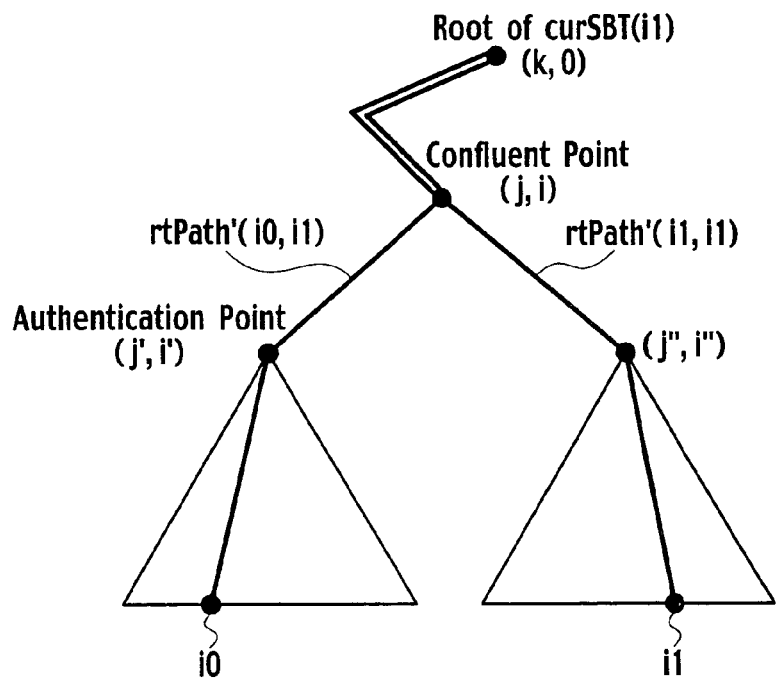
FIG. 31 is a diagram explaining that quotas of authentication points are included in in-receipt supplemental data at an audit point.

(1) First, an item (1) will be described with reference to FIG. 31. Assume here, (j, i) denotes a confluent point. Let (j', i') be an authentication point being a left child of the above confluent point. In rtPath((0, i1), i1) of node (0, i1) in surSBT (i1), it is assumed that (j", i") represents a node originating in node (0, i1) and just before the confluent point. Then, the authentication point coincides with a left complementary point of (j", i"). Thus, according to the definition of the authentication path authPathT(i1, i1), ((j', i'), L) is included in the authentication path of node (0, i1) in curSBT(i1). The assignment of a value for node (j', i') has been completed before round(i1). Therefore, ((j', i'), L, V(j', i')) is included in an in-receipt complementary data against node (0, i1).

(2) Item (2) will be described with reference to FIGS. 32 and 33.

Assume that $k=\kappa(i1)$.

The authentication point (j', r(j')) is included in root path rtPath((0, i0), i1) for node (0, i0). Assume here that $$rtPath((0,i0),i1)=[(0,r(0)), \ldots, (j',r(j')), (j'+1), \ldots, (k,r(k)))].$$

Further, an array (row) of nodes formed by elements of authPath((0, i0), j1) and having each level smaller than j' is represented by $$[(0, s(0)), \ldots, (j'-1, s(j'-1))].$$

Then, it has only to certify that V(j1, r(j1)) is included in either EOC(i0) or CToken(i0, i2) for each j1 (i.e. j1∈[0 ... j'−1]).

By the definition of authPath((0, i0), i1), it is noted that an element p2=(j1, s(j1)) at level j1 of authPath((0, i0), i1) is either a right of an element p3 at level j1+1 of rtPath((0, i0), i1) and the left child. We describe both cases respectively.

Figure 32:
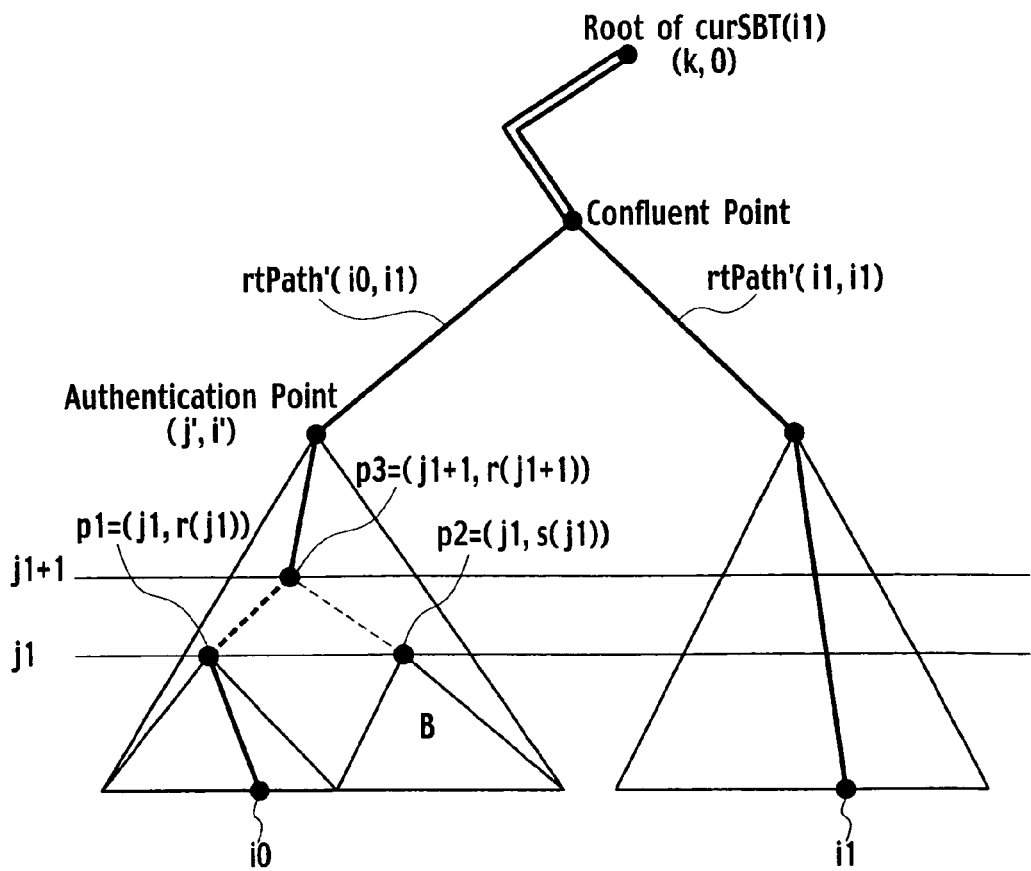
FIG. 32 is a diagram explaining that an authentication path node lower than the authentication point is included in either delay supplemental data or the in-receipt supplemental data.

(Case 1) When p2 is the right child of p3, an assigned value V(p2) for p2 is included in the late complementary data CToken(i0, i2) that the apparatus C can receive at i2 satisfying i1≦j2, as shown in FIG. 32. The reason is as follows. By the feature 1 of the sequential aggregation tree, when the event-ordering certification process on the round corresponding to leaf (0, i1) is completed, it has already become possible to calculate an assigned value for a partial tree of curSBT(i1) indicated with B of FIG. 32. As a matter of fact, the assigned values have been already calculated and assigned. Accordingly, the late complementary data published on and after the above point of completion contains the assigned value V(p2) for the root p2 of the partial tree B.

Figure 33:
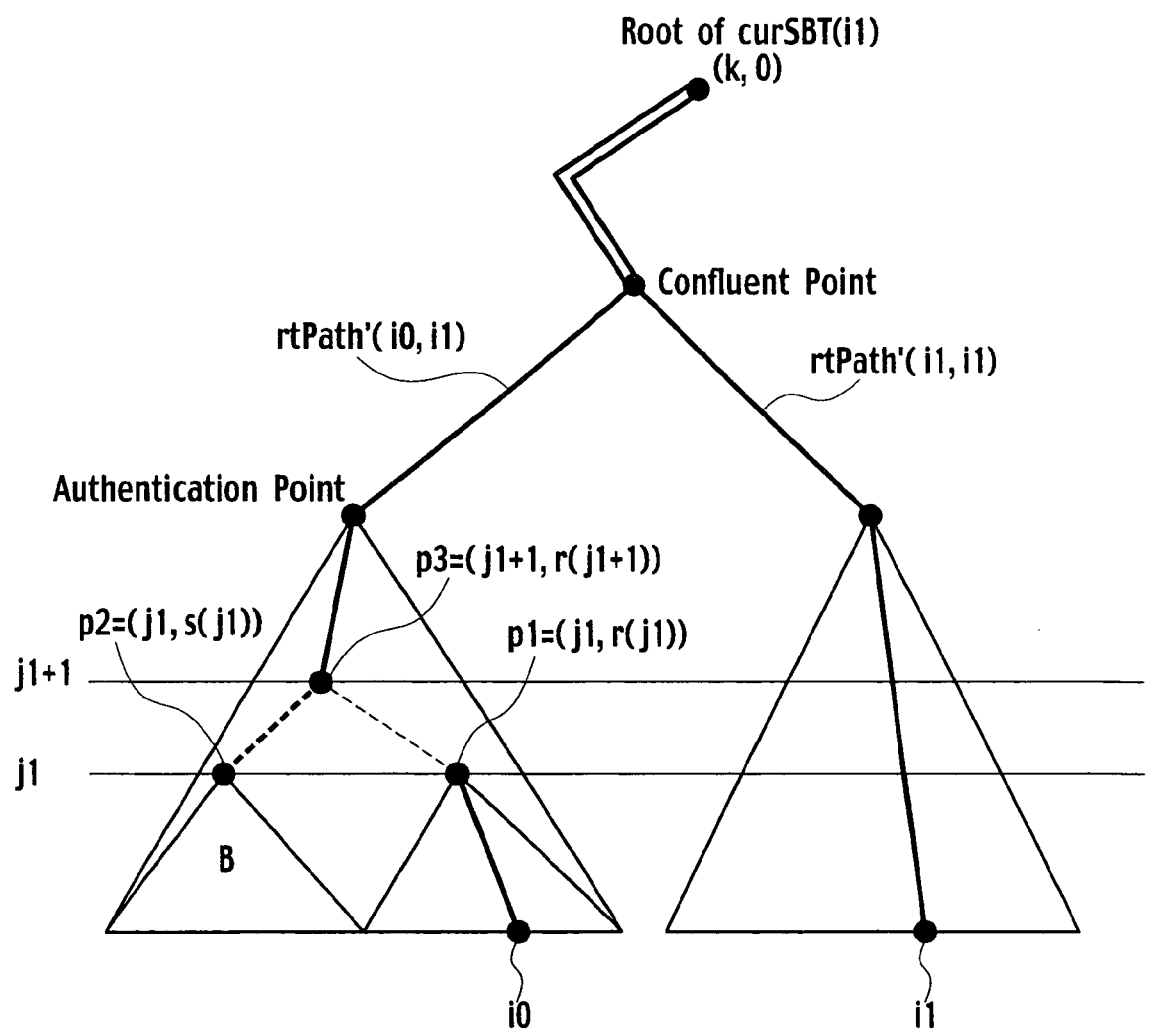
FIG. 33 is another diagram explaining that an authentication path node lower than the authentication point is included in either the delay supplemental data or the in-receipt supplemental data.

(Case 2) When p2 is the left child of p3, an assigned value V(p2) for node p2 is included in an in-receipt complementary data for event-ordering demanders on the round(i0), as shown in FIG. 33. The reason is that $$\forall i \in leafs(B) \ [i<i0]$$

is satisfied for the partial tree B having the root p2 of FIG. 33.

Accordingly, at the start of a round distinguished by i0 under B⊆curSBT(i0), an assigned value for leafs(B) has become definite already. Thus, according to the feature 1 of the sequential aggregation tree, an assigned value for p2=root (B) has become definite at the round distinguished by i0. Therefore, p2 is included in authPathD((0, i0)).

(3) By the definition of authentication path and item (2), it is possible to calculate V(j1, r(j1)) for each j1∈[0 ... j'] recursively, as follows:

First, assume that V(0, r(0)) denotes an assigned value for node (0, i0) included in an event receipt.

Assume that (V(j1, r(j1)) was calculated for j1∈[0 ... j'−1]. Then, V(j1+1, r(j1+1)) is calculated as follows:

$$V(j1+1,r(j1+1))=h(V(j1,r(j1))\|V(j1,s(j1))) \text{ for } r(j1)<s(j1), \text{ and}$$

$$V(j1+1,r(j1+1))=h(V(j1,s(j1))\|V(j1,r(j1))) \text{ for } s(j1)<r(j1).$$

Note that the following description is based on the premise that a point of time of starting the service of the event-ordering certification system coincides with an origin of time; one parameter (e.g. one second, one milli-second, etc.) is established as a clocking unit; and a time point is represented by an integral number as a result of clocking a passage of time since the above origin of time by the above clocking unit. Assume furthermore, at a first audit point in each sequential aggregation period T, each audit apparatus Z receives not only audit information closed in the period T but also a previously-obtained root value. For instance, the previously-obtained root value is formed by a value V(root(T')) assigned to a root during a sequential aggregation period T' just before the first audit point.

For an incrementally-constructed sequential aggregation tree because of no predetermined height, there is established a next feature 3.

(Feature 3 of Sequential Aggregation Tree)

Below, let T be a positive integer and let $\alpha$, $\alpha 0$, $\tau$ and $\tau'$ be respective identifiers of extended leaves. Assuming that Z denotes an audit apparatus, at an audit point $\alpha 0$ of the audit apparatus Z, the following condition (*1) is satisfied:

$$time(\alpha 0)\in [0 \ldots T]. \tag{*1}$$

Additionally, assuming that $\alpha$ and $\alpha'$ represent one optional audit point of the audit apparatus and the next audit point, respectively, the following condition (*2) is satisfied:

$$time(\alpha')-time(\alpha) \leq T. \tag{*2}$$

Assuming that a user A sends a certain event-ordering request; $\tau$ denotes a leaf (of a sequential aggregation tree) against this request; subsequently, the user A requests late complementary data for its event receipt; $\tau'$ denotes another leaf against this request for late complementary data, the following condition (*3) is satisfied:

$$time(\tau')-time(\tau) \geq T. \tag{*3}$$

Assume, at a first audit point belonging to each sequential aggregation period on and after the second sequential aggregation period, the audit apparatus Z receives a root value of a preceding sequential aggregation period from an event-ordering certification organization.

Under the above assumption, the following items (1) to (4) are satisfied:

(1) There exists a certain audit point a by the audit apparatus Z, which satisfies $\alpha \in [\tau \ldots \tau']$;

(2) For the audit point $\alpha$ satisfying $\alpha \in [\tau \ldots \tau']$, an assigned value (label) for an authentication point of $\tau$ by $\alpha$ is included in an audit receipt that the audit apparatus Z receives at a certain leaf (e.g. $\tau'$) after the audit point $\alpha$.

(3) There exists an audit point $\alpha'$ by the audit apparatus Z for an optional leaf $\tau$, and the following condition (*4) is then satisfied:

$$time(\tau) \leq time(\alpha) < time(\tau)+T. \tag{*4}$$

(4) For an optional user point $\tau$ satisfying T≦time($\tau$), there exists an audit point $\alpha$ by the audit apparatus Z, which satisfies $\alpha<\tau$.

(Certification of Feature 3)

(1) Suppose that there exists no audit point $\alpha$ by the audit apparatus Z, which satisfies $\alpha \in [\tau \ldots \tau']$. Situations are classified depending on whether there exists an audit point $\alpha$ of the audit apparatus Z positioned on the left of $\tau$ or not.

(Case 1) The situation where there exists an audit point of Z on the left of $\tau$ is discussed. Assume that an audit point on the left of $\tau$ and also closest to $\tau$ is represented by $\alpha 1$ and another audit point on the right of $\tau'$ and also closest to $\tau'$ is represented by $\alpha 2$. Since $$\text{time}(\alpha 1) < \text{time}(\tau) \text{ and time}(\tau') < \text{time}(\alpha 2)$$

is satisfied depending on setting $\alpha 1$ and $\alpha 2$, time($\alpha 1$)<time($\tau$), that is, $-\text{time}(\alpha 1) > -\text{time}(\tau)$ is obtained.

Accordingly, $$\text{time}(\alpha 2) - \text{time}(\alpha 1) > \text{time}(\tau') - \text{time}(\tau) \geq T$$

is obtained. On the other hand, since there exists no audit point $\alpha$ satisfying time($\alpha$)$\epsilon$[time($\tau$) ... time($\tau$)], $\alpha 2$ is a next audit point of $\alpha 1$. Thus, by the above condition (*2), $$\text{time}(\alpha 2) - \text{time}(\alpha 1) \leq T$$

has to be satisfied. This leads to the following conclusion:

$$\text{time}(\alpha 2) - \text{time}(\alpha 1) > T \text{ and time}(\alpha 2) - \text{time}(\alpha 1) \leq T.$$

However, this conclusion contradicts the assumption of absence of an audit point $\alpha$ by Z satisfying time($\alpha$)$\epsilon$[time($\tau$) ... time($\tau'$)]. Consequently, there exists an audit point $\alpha$ satisfying $$\text{time}(\alpha)\epsilon[\text{time}(\tau) \ldots \text{time}(\tau')].$$

(Case 2) The situation where there exists no audit point of Z on the left of $\tau$ is discussed. Then, for the audit point $\alpha 0$ satisfying time($\alpha 0$)$\epsilon$[0 ... T], $$\alpha 0 \epsilon [\tau \ldots \tau']$$

is shown.

(2) It is led straightforward by the above Feature 2 of sequential aggregation tree and item (1).

(3) It is classified on whether there exists an audit point by Z before $\tau$.

(Case 1) The situation where there exists an audit point of Z before $\tau$ is discussed. Assume that an audit point before $\tau$ and latest to $\tau$ is represented by $\alpha$ and the time of the next audit point is represented by $\alpha'$. Then, $$\text{time}(\alpha) < \text{time}(\tau) \leq \text{time}(\alpha')$$

is satisfied. Thus, by the condition (*2), $$\text{time}(\alpha') - \text{time}(\tau) < \text{time}(\alpha') - \text{time}(\alpha) \leq T$$

is obtained. Therefore, $$\text{time}(\alpha') < \text{time}(\tau) + T$$

is satisfied. From above, the condition (*4) is obtained.

(Case 2) The situation where there exists no audit point of Z before $\tau$ is discussed. Then, by the assumption of Feature 3, there exists an audit point $\alpha 0$ by Z satisfying time($\alpha 0$)<T.

Thus, $$\text{time}(\tau) \leq \text{time}(\alpha 0) < T$$

is satisfied and thus $$\text{time}(\alpha 0) - \text{time}(\tau) < T - \text{time}(\tau) \leq T$$

is satisfied. Therefore, $$\text{time}(\alpha 0) < \text{time}(\tau) + T$$

is led. From above, by $\alpha' = \alpha 0$, the condition (*4) is obtained.

(4) It is led straightforward by the above assumption (*1) that there exists an audit point $\alpha 0$ of Z satisfying time($\alpha 0$)$\epsilon$ [0 ... T].

(Feature 4 of Sequential Aggregation Tree)

Let SBT be a sequential aggregation tree having a height k. Then, i represents a leaf-number of SBT. Assume that $k1 \leq k$ and "authPathTk1($i$)" denotes an array of first "k1" elements of "authPathTk($i$)" where "k1" is the number of elements.

Assume that authPathTk1($i$)=[((0, i(0)), LR(0)), ..., ((k1−1, i(k1−1))], LR(k1−1))]. Additionally, let v1 and v2 be different hash values. We are given AP1 and AP2 as follows:

$$AP1 = [(LR(0), v1'(0)), (LR(1), v1'(1)), \ldots, (LR((k1-1), v1'(k1-1))],$$

$$AP2 = [(LR(0), v2'(0)), (LR(1), v1'(2)), \ldots, (LR((k1-1), v2'(k1-1))].$$

Then, it is noted that v1"(k1) calculated from v1 and AP1 as below (*1) does not coincide with v2"(k1) calculated from v2 and AP2 as below (*2), excepting practically-negligible probability.

(*1) For each j'$\epsilon$[0 ... k1], v1'(j') is recursively defined as $$v1''(0) = v1.$$

If j'>0 and $LR(j'-1) = L$, then $$v1''(j') = h(v1'(j'-1) \| v1''(j'-1)).$$

If j'>0 and $LR(j'-1) = R$, then $$v1''(j') = h(v1''(j'-1) \| v1'(j'-1)).$$

(*2) For each j'$\epsilon$[0 ... k], v2"(j') is recursively defined as $$V2''(0) = v2.$$

If j'>0 and $LR(j'-1) = L$, then $$v2''(j') = h(v2'(j'-1) \| v2''(j'-1)).$$

If j'>0 and $LR(j'-1) = R$, then $$v2''(j') = h(v2''(j'-1) \| v2'(j'-1)).$$

Certification of Feature 4.

Assume that v1"(k1)=v2"(k1). A minimum of j' under j'$\epsilon$[0 ... k1] and v1"(j')=v2"(j') is represented by j1.

Since v1≠v2, that is, v1"(0)≠v2"(0), j1>0 is satisfied.

Assume that j0=j1−1.

Depending on whether LR(j0) is L or R, the situations are classified as follows:

(Case 1) This is a case with LR(j0)=L. Depending on setting j1 and j0, $$v1''(0) \neq v2''(0)$$

is shown.

Thus, $$v1'(j0) \| v1''(j0) \neq v1'(j0) \| v2''(j0)$$

is satisfied. Also, the conditions (*1), (*2) lead to $$v1''(j1) = h(v1'(j0) \| v1''(j0)),$$

$$v2''(j1) = h(v2'(j0) \| v2''(j0)).$$

Thus, $$h(v1'(j0) \| v1''(j0)) = h(v2'(j0) \| v2''(j0))$$

is satisfied, and thus v1'(j0)∥v1"(j0) and v2'(j0)∥v2"(j0) make a collision of the collision-resistant hash function h.

(Case 2) This is a case with LR(j0)=R. In the same way as case 1, it is led that v1"(j0)∥v1'(j0)) and (v2"(j0)∥v2'(j0)) make a collision of the collision-resistant hash function h.

From above, the collision of the collision-resistant hash function h appears in both cases. Such a situation is not meant to be (except a practically-negligible probability). Thus, a situation of v1"(k)=v2"(k) is not also meant to be (except a practically-negligible probability).

In connection with the first to third embodiments mentioned above, we now describe more practical embodiments of the event-ordering certification system and the event-ordering certification audit system. Concretely, these embodiments are more practical with respect to various conditions about both resource and performance of respective apparatuses forming the above systems and the same of the network connecting the apparatuses mutually. More in detail, we now cite an example of certifying the event ordering by using a nonrepeating oriented graph, such as tree structure. In order to realize the event-ordering certification with scalability such that the event-ordering could be accomplished even if the nonrepeating oriented graph cannot be stored in a computer memory, any of the apparatuses (i.e. an event-ordering certification apparatus and related user apparatuses) is required to concern the event-ordering certification by a method making it unnecessary to extract the nonrepeating oriented graph on the memory. Additionally, from the same view of scalability, it is required that even if the nonrepeating oriented graph gets large, communication traffic between the event-ordering certification apparatus and the user apparatuses would not become excessive. If the communication traffic between the apparatuses could be suppressed within the order of a logarithm of the number of nodes belonging to the corresponding nonrepeating oriented graph, this requirement would be satisfied. In general, there exists a trade-off relationship between communication traffic (i.e. traffic between memory capacity necessary for realizing a designated function by a computing system connected through a network and apparatuses) and individual processing throughput of the apparatuses. Therefore, in order to allow a system with a designated function to be applicable under various situations about memory quantity, processing capability of the apparatuses and transmission capacity of the network, it is valuable to provide an implementation method that a system throughput within a practical range reduces both memory quantity and communication traffic and another implementation method that both memory quantity and communication traffic within their practical ranges reduce the system throughput, conversely.

$4^{th}$. Embodiment 4-1. System Structure

Figure 34:
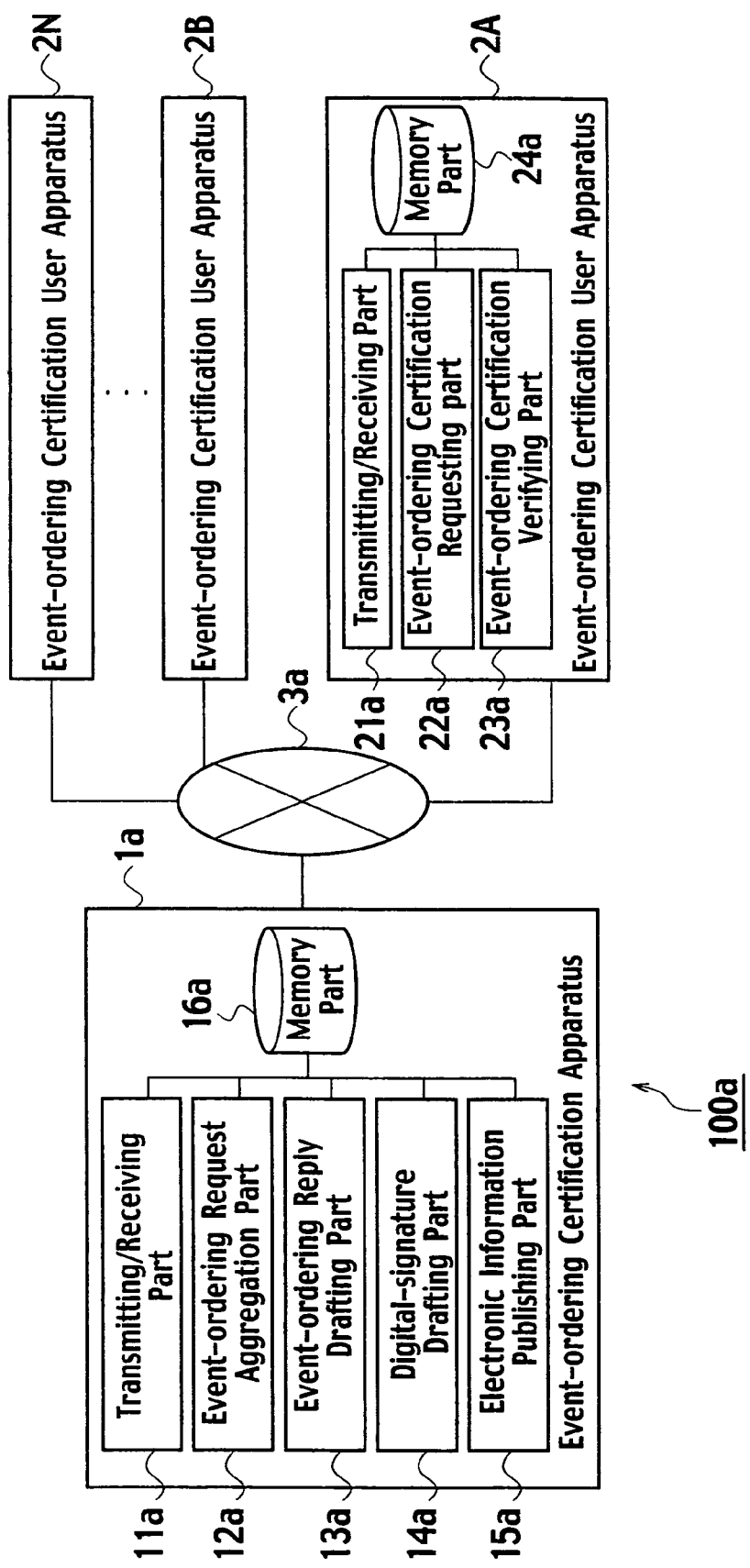
FIG. 34 is a system architecture diagram of an event-ordering certification system in accordance with a fourth embodiment of the present invention.

FIG. 34 is a system architecture diagram of an event-ordering certification system 100a in accordance with the fourth embodiment of the present invention. The event-ordering certification system 100a includes an event-ordering certification apparatus (referred to as "certification apparatus" below) 1a, a plurality of event-ordering user apparatuses (referred to as "user apparatuses" below) 2I (I=A, B, ... , N) and a computer network 3a formed by e.g. internet, telephone network, etc. In operation, in response to an event-ordering certification request (referred to as "event-ordering request" below) from the user apparatus 2I, the certification apparatus 1a sends back an event-ordering certification reply (referred to as "event-ordering reply" below) containing an event-ordering receipt (referred to as "receipt" below) to the user apparatus 2I. Then, the user apparatuses 2I can verify the receipt by a plurality of certification replies from the certification apparatus 1a.

The certification apparatus 1a comprises a transmitting/receiving part 11a for transmitting and receiving data to and from the user apparatuses 2I through the computer network 3a, an event-ordering request aggregation part 12a for arranging digital data (as event-ordering requests) transmitted from the user apparatuses 2I with the use of a sequential aggregation tree, an event-ordering reply drafting part 13a for drafting a certification reply containing the receipt, a digital signature drafting part 14a for applying a high-intensity digital signature on data where respective contents of a plurality of receipts published for a constant period by the certification apparatus 1a are aggregated, thereby forming publication data, an electronic information publishing part 15a for publishing the publication data electronically and a memory part 16a for storing the receipts and information about event-ordering certification.

Figure 35:
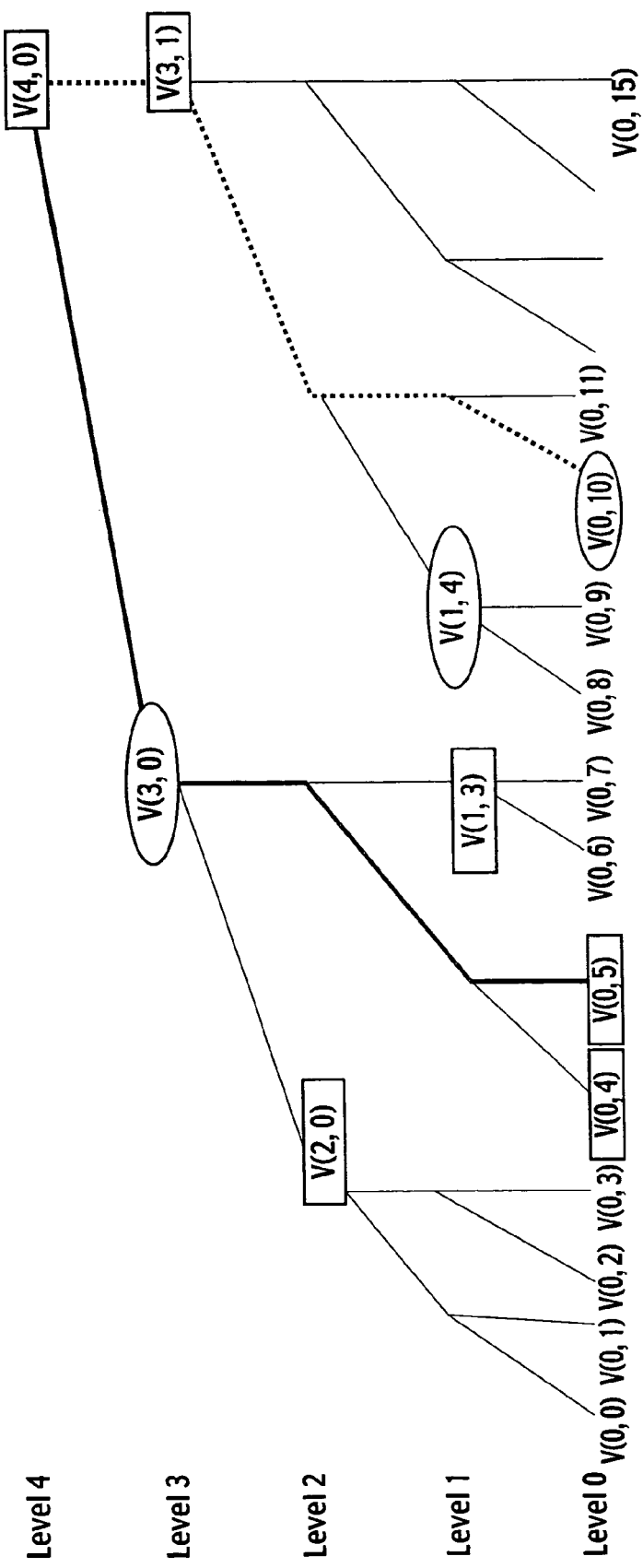
FIG. 35 is a diagram explaining the structure of a sequential aggregation tree used in the event-ordering certification system of the fourth embodiment of the present invention.

As mentioned above, the event-ordering request aggregation part 12a operates to aggregate the event-ordering requests with the use of the sequential aggregation tree. This sequential aggregation tree will be described with reference to FIG. 35. FIG. 35 shows one concrete example of a sequential aggregation tree where digital data is sequentially assigned from the left side with time during a certain period (e.g. one week, a cycle that the certification apparatus 1a publishes coordinated data, which will be referred to as "sequential aggregation period"). Note that the digital data is obtained by calculating all or part of digital data included in the event-ordering requests from the users' apparatuses 2I, in accordance with a designated "sequentially assigned data" calculating procedure. Note that the so-obtained data (e.g. hash values of the digital data included in the event-ordering requests) will be referred to as "sequentially assigned data-item". Note that a leaf of the sequential aggregation tree where each event-ordering request from the user apparatus 2I is assigned is also referred to as "registration point".

A calculating method of values assigned to respective nodes (except leaf) in the sequential aggregation tree is as follows. An assigned value of a parent in the sequential aggregation tree is obtained by calculating a hash value as a result of connecting an assigned value H' of a left child with an assigned value H" of a right child (conjunction between a bit row and a bit row) and further applying a designated "collision-resistant" one-way hash function h. Here, the resultant value is expressed by h(H'∥H"). In this way, it is performed to calculate a higher-leveled assigned value from lower-leveled assigned values, finally reaching a highest-leveled assigned value, namely, a root value H.

We now describe an example of a sequential aggregation tree having sixteen leaves, as shown in FIG. 35. The number of leaves of the sequential aggregation tree and its height do not become definite unless the sequential aggregation period is completed. Further, in the sequential aggregation tree, the assignment of values to the leaves is carried out from left, in sequence. The assignments of values to nodes higher than level 0 (i.e. non-leaves) are carried out incrementally if possible. Accordingly, for a plurality of nodes on the same vertical line of FIG. 35, the assignments of values to the nodes are carried out at about the same time in the same processing unit.

Assuming that a node of level j and number i is represented by (j, i) and an assigned value of (j, i) is represented by V(j, i), the concrete example of FIG. 35 will be described.

Suppose, the hash value to be assigned to a certain leaf is identical to V(0, 5) (i.e. a registration point of (0, 5)). In order to calculate a root value H (=V(4, 0)) from this hash value V(0, 5), it has only to link V(0, 4) to V(0, 5) from the left side thereby calculating a hash value h1'; V(1, 3) to the hash value h1' from the right side thereby calculating a hash value h2';

V(2, 0) to the hash value h2' from the left side thereby calculating a hash value h3'; and link V(3, 1) to the hash value h3' from the right side thereby calculating a hash value H (=V(4, 0)), in order. With the above procedure, when it becomes possible to calculate the root value H from V(0, 5) and its complementary data (e.g. V(0, 4), V(1, 3), V(2, 0), V(3, 1) in this case), we can say "V(0, 5) links with the root value H through the hash function h". Additionally, the complementary data of V(0, 5) in the sequential aggregation tree is given by

[(V(0, 4), L), (V(1, 3), R), (V(2, 0), L), (V(3, 1), R)].

where L and R represent "to link from the left side in linking two digital data" and "to link from the right side in linking two digital data", respectively.

Figure 36:
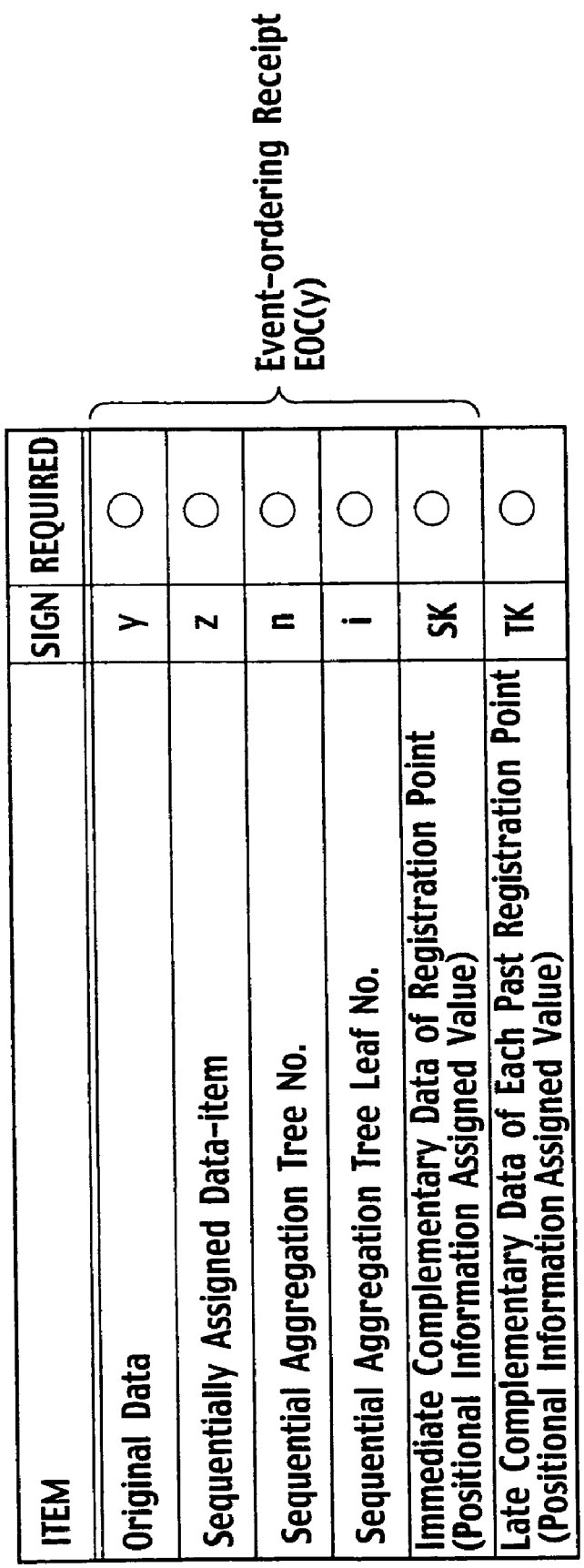
FIG. 36 is a diagram explaining the structure of an event-ordering certification receipt of the event-ordering certification system of the fourth embodiment of the present invention.

The event-ordering reply drafting part 13*a* drafts a certification reply containing a receipt EOC(y) as shown in FIG. 36 and sends it to the user apparatus 2I. The receipt EOC(y) is constructed so as to contain: digital data y sent from a user; sequentially assigned data-item z calculated from the digital data y by the above-mentioned calculation procedure for sequentially assigned data-item; a "sequential-aggregation" tree number enabling a sequential aggregation tree having the data-item z assigned to be identified uniquely; a "sequential aggregation tree" leaf number enabling a "sequential aggregation tree" leaf having the data-item z assigned to be identified uniquely; and both positional information and assigned value of sequential aggregation complementary data (part) SK acquirable at that time. The above data part SK will be referred to as "immediate complementary data of registration point".

Again, the certification reply is constructed so as to contain the positional information of late complementary data TK of respective registration points of the user apparatus 2I in the past and their assigned values. Note that the late complementary data TK designates sequential aggregation complementary data which is acquirable after publishing the certification reply in question. In FIG. 35, for instance, the late complementary data of V(0, 5) is formed by V(2, 0) and V(0, 4). While, V(1, 3) and V(3, 1) constitute the late complementary data that is acquirable on and after an assignment of V(0, 15). As for one leaf a1 and another leaf a2 on the right of the leaf a1, generally, late complementary data of the leaf a1 determined at the time of completing the assignment of the leaf a2 will be referred to as "complementary data of a1 at a2". In FIG. 35, the complementary data of node (0, 5) at node (0, 10) is formed by node (1, 3).

Figure 37:
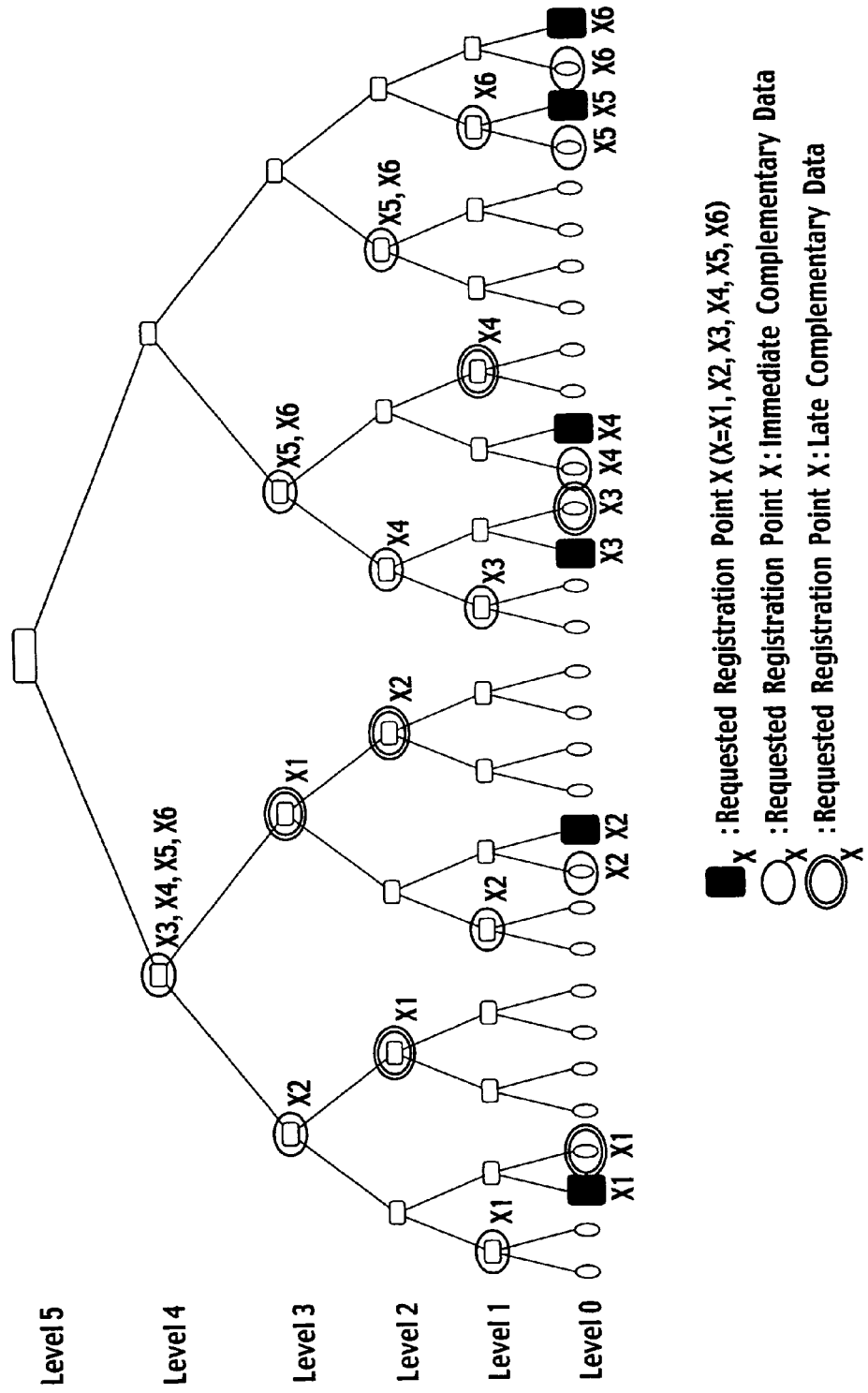
FIG. 37 is a diagram explaining respective registration points and their interpolation data in the event-ordering certification system of the fourth embodiment of the present invention.

Referring to FIG. 37, we now describe a concrete example of the certification reply in accordance with this embodiment. Note that the format of a certification reply in the embodiment will be referred to as "sequence complementary procedure" hereinafter. Suppose now, the registration points from a certain user apparatus 2I consist of X1(node (0, 2)), X2(node (0, 11)), X3(node (0, 18)), X4(node (0, 21)), X5(node (0, 29)) and X6(node (0, 31)).

In the sequence complementary procedure, it is executed at respective registration points to return the following data to the user apparatus 2I.

(1) For the certification reply at the point X1, there is returned immediate complementary data of the point X1 [i.e. assigned value of node (1, 0)).

(2) For the certification reply at the point X2, there are returned immediate complementary data of the point X2 and X1's late complementary data at point X2 [i.e. immediate complementary data of X2: assigned values of nodes (3, 0), (1, 4), (0, 10); X1's late complementary data at X2: assigned values of nodes (0, 3), (2, 1)].

(3) For the certification reply at the point X3, there are returned immediate complementary data of the point X3 and X1/X2's late complementary data at point X3 [i.e. immediate complementary data of X3: assigned, values of nodes (4, 0), (1, 8); X1's late complementary data at X3: assigned values of nodes (0, 3), (2, 1); X2's late complementary data at X3: assigned value of node (2, 3)].

(4) For the certification reply at the point X4, there are returned immediate complementary data of the point X4 and X1/X2/X3's late complementary data at point X4 [i.e. immediate complementary data of X4: assigned values of nodes (4, 0), (2, 4), (0, 20); X1's late complementary data at X4: assigned values of nodes(0, 3), (2, 1), (3, 1); X2's late complementary data at X4: assigned value of node (2, 3); X3's late complementary data at X4: assigned value of node (0, 19)].

Much the same will be true on the points X5 and X6. In this way, with respect to a certain registration point, the certification reply is formed so as to contain the immediate complementary data of this registration point and the late complementary data (data-items) of respective registration points at the registration point, which have been registered before the above registration point, in accordance with the sequence complementary procedure. Note that the respective certification replies are managed with respect to each user apparatus 2I.

The user apparatus 2I comprises a transmitting/receiving part 21*a* for transferring data to and from the certification apparatus 1*a* through the computer network 3*a*, an event-ordering certification requesting part 22*a* for performing the event-ordering requests containing designated digital data by several times, an event-ordering certification verifying part 23*a* for verifying a receipt contained in the certification reply in response to the event-ordering request and a memory part 24*a* for storing the certification reply containing the receipt and the information about event-ordering certification.

The event-ordering certification verifying part 23*a* has the following functions against the receipt.

As a first function of validation, the event-ordering certification verifying part 23*a* verifies that the sequential assigned data-item is linked with the information published through the digital signature drafting part 14*a* of the certification apparatus 1*a* and the electronic information publishing part 15*a*. In detail, it is executed to validate whether a value published as the root value of the sequential aggregation tree coincides with a root value calculated by the user apparatus 2I or not.

As a second function of validation, the event-ordering certification verifying part 23*a* verifies the temporal context of receipts among the user apparatuses 2I even before the information is published.

The second function of validation will be described with reference to FIG. 38. First, we now explain the relationship between a confluent point and an authentication point.

Regarding a leaf a in a certain sequential aggregation tree, a path from a to a root of the tree is called "root path of a" and represented by rtPath(a). Additionally, a row of sibling nodes for the nodes belonging to rtPath(a) but the root will be called "authentication path" and represented by authPath(a).

Suppose, we are given a certain sequential aggregation tree having two leaves a1 and a2 where the leaf a2 is positioned on the right of the leaf a1. Then, a point where a path traveling from a1 to the root intersects with a path traveling from a2 to the root will be referred to as "confluent point between a1 and a2". Additionally, a left child of the confluent point will be called "authentication point of a1 by a2" or "a1 authentication point of a1 by a2". For instance, in FIG. 37, an authentication point of the registration point X1 by X2 is a point (3, 0). Similarly, an authentication point of the registration point X2 by X3 is a point (4, 0).

Suppose, two user apparatuses 2A and 2B respectively acquire the certification replies of respective registration points by the sequence complementary procedure. In FIG. 38, let a, a1, a2 and af be respective registration points of the user apparatus 2A and let b be a registration point of the user apparatus 2B. Note that af is referred to as "temporary terminal point" and also positioned on the rightmost side of the registration points of the user apparatus 2A. In FIG. 38, there exist the registration point a of the user apparatus 2A, the registration point b of the user apparatus 2B on the right of the point a and the registration point af of the user apparatus 2A on the further right of the point b.

Here, according to the sequence complementary procedure, when the registration point a is positioned on the left of the registration point b, a label (assigned value) of the authentication point is included in a certification reply (immediate complementary data) of the registration point b. Additionally, on and after the event-ordering certification process at the registration point b is completed (e.g. position of the registration point af), the label of the authentication point is included in a label calculable from the late complementary data of the registration point a. Therefore, by verifying whether the assigned value of the authentication point calculated from the late complementary data of the registration point a at the registration point af coincides with the assigned value of the authentication point included in the immediate complementary data of the registration point b, it is possible to verify the temporal context between the registration point a and the registration point b (detail: see later-mentioned Feature of Sequential Aggregation, item (3)).

Figure 38:
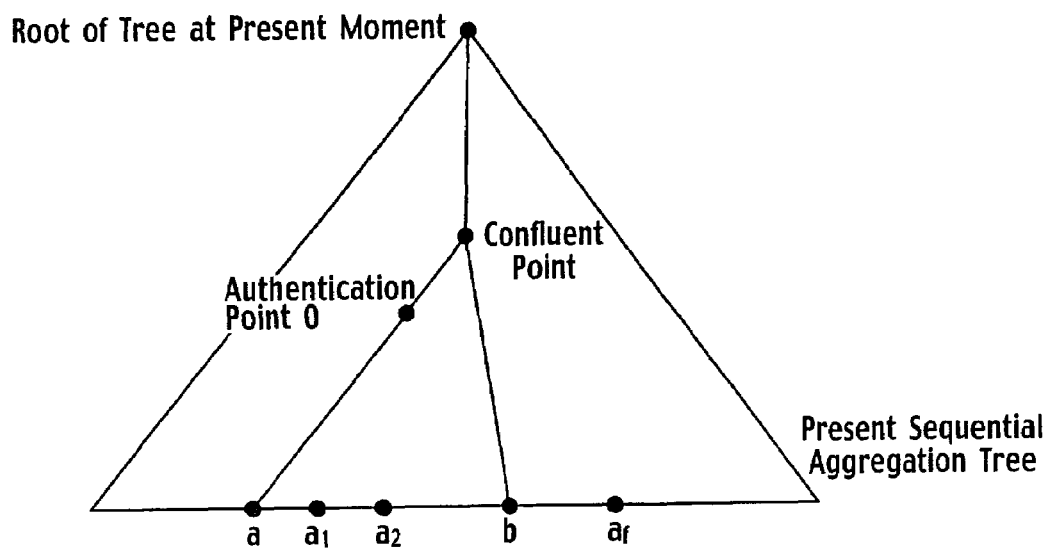
FIG. 38 is a diagram explaining a method of judging the event order in a user apparatus in the event-ordering certification system of the fourth embodiment of the present invention.

In FIG. 38, if only existing a coincidence about an assigned value V(o) for an authentication point o of the registration point a by the registration point b in the present sequential aggregation tree at the present moment (i.e. at the registration point af), it is possible to certify that the registration of the registration point a was carried out in advance of the registration of the registration point b, objectively. The event-ordering certification verifying part 23a verifies this temporal context due to its operation mentioned later.

Note that the above apparatuses are formed by electronic apparatuses each having a CPU (Central Processing Unit) having at least a calculating function and a control function, a main memory having a function to store programs and data, such as RAM (Random Access Memory), and a secondary memory capable of continuing to memorize data even at powered-off, such as HD (Hard Disc). The operations of the certification apparatus 1a (i.e. the event-ordering request aggregation part 12a, the event-ordering reply drafting part 13a, the digital signature drafting part 14a and the electronic information publishing part 15a) and the operations of the user apparatus 2I (i.e. the event-ordering requesting part 22a and the event-ordering certification validating part 23a) are nothing but respective crystallizations of the above calculating/control functions of the above central processing units. Additionally, the memory part 16a of the certification apparatus 1a and the memory part 24a of the user apparatus 2I are equipped with the above-mentioned functions of either the main memory or the secondary memory.

4-2 System Operation

Figure 39:
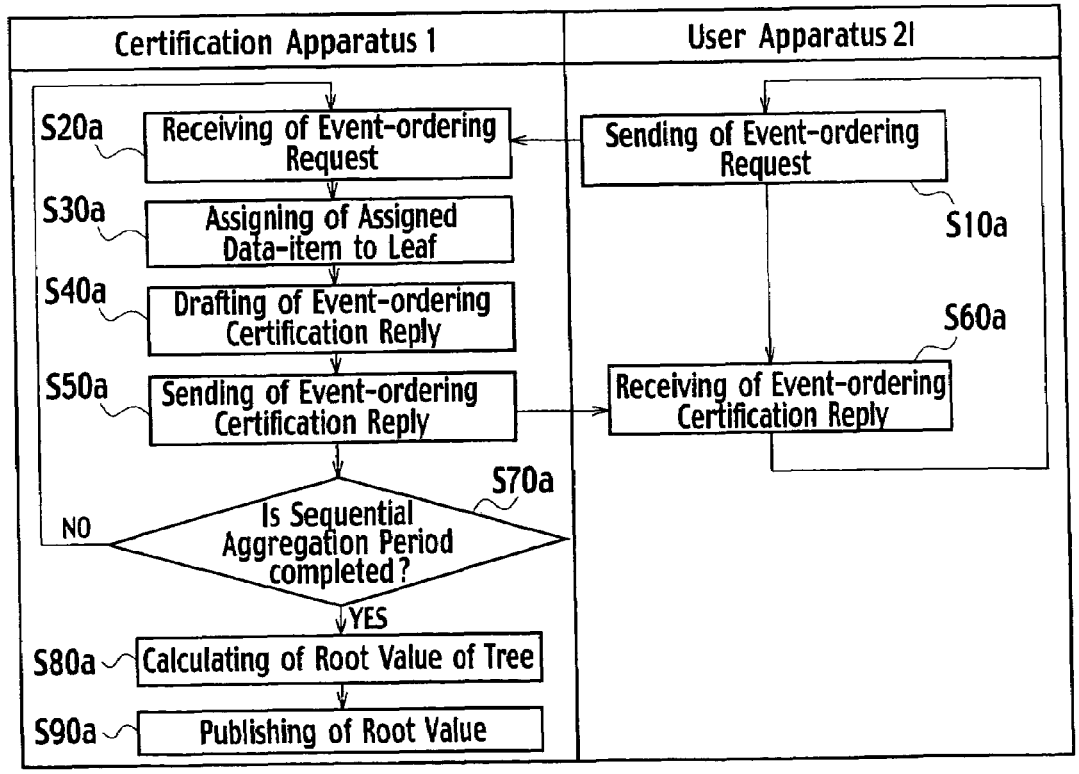
FIG. 39 is a sequence diagram explaining the operation of an event-ordering certification method by the event-ordering certification system of the fourth embodiment of the present invention.
Figure 40:
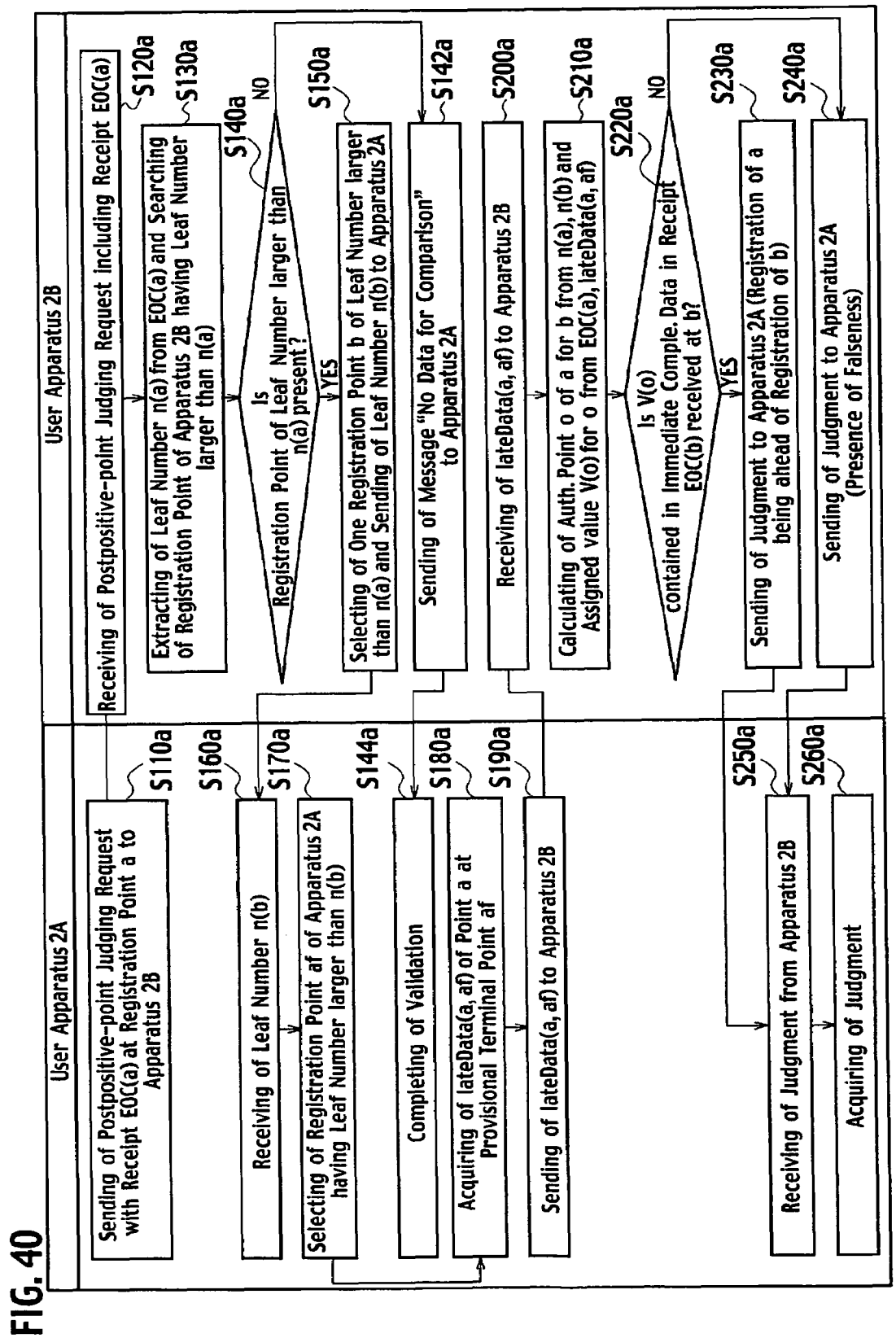
FIG. 40 is a sequence diagram explaining the operation of an event-ordering certification verification method by the event-ordering certification system in accordance with the first embodiment of the present invention.
Figure 41:
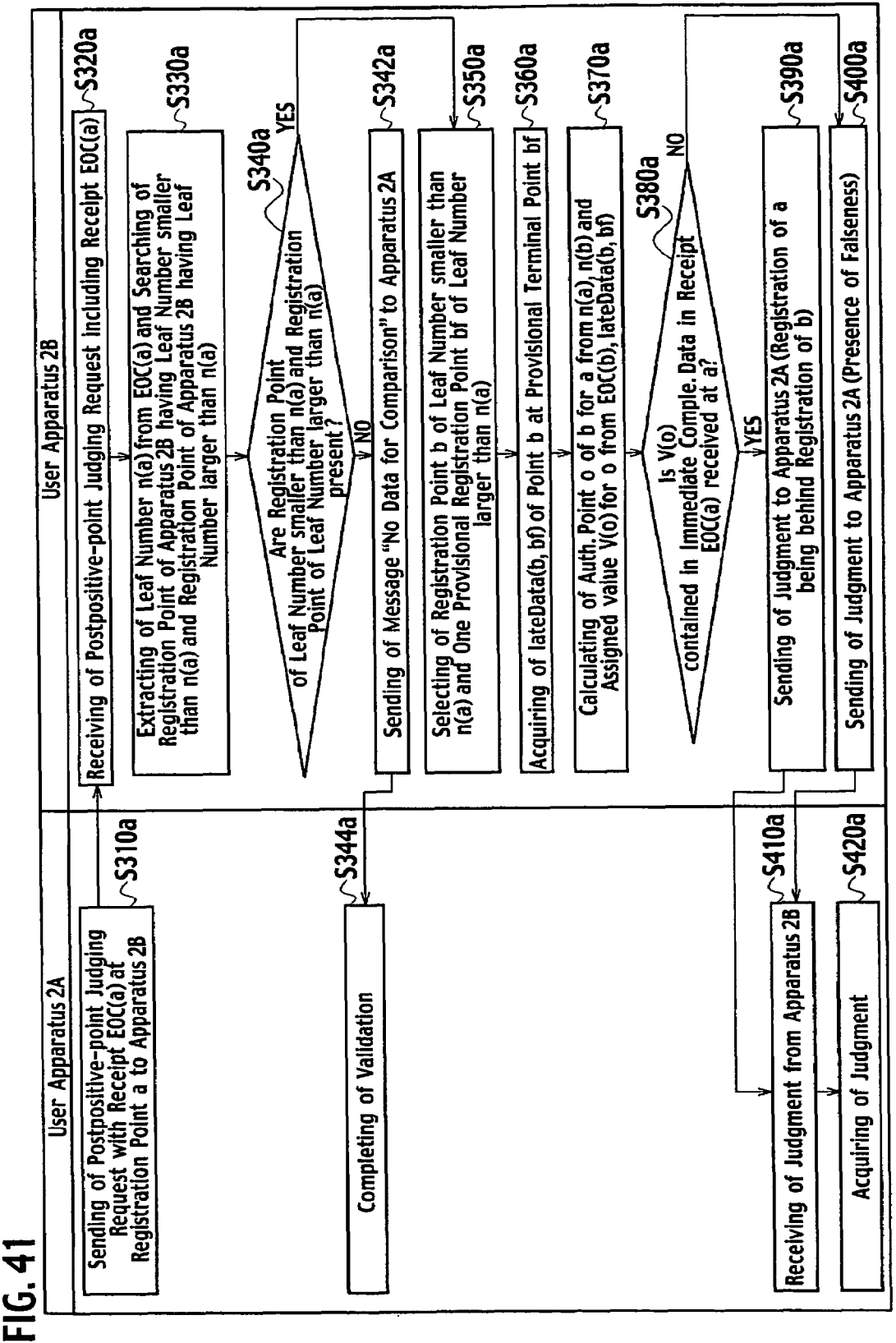
FIG. 41 is another sequence diagram explaining the operation of the event-ordering certification verification method by the event-ordering certification system in accordance with the first embodiment of the present invention.

In the event-ordering certification system 100a constructed above, an event-ordering certification method and an event-ordering certification validation method will be described with reference to FIGS. 39 to 41. In the figures, FIG. 39 is a sequence diagram to explain the operation of the certification apparatus 1a to draft a certification reply containing a receipt for one sequential aggregation period by the event-ordering certification apparatus 1. FIGS. 40 and 41 are sequence diagrams to explain the operation of the user apparatus 2I to perform a second validation for the receipt.

First of all, the event-ordering certification method will be described with reference to FIG. 39.

When the user apparatus 2I sends an event-ordering request including digital data y to the event-ordering certification apparatus 1a, it receives the event-ordering request including the digital data y through the transmitting/receiving part 11a (steps S10a, S20a).

Next, the event-ordering request aggregation part 12a calculates a sequentially-assigned data-item z from the digital data y as partial or all input and further assigns the sequentially-assigned data-item z to a "sequential aggregation tree" leaf to construct a sequential aggregation tree incrementally. While, the event-ordering reply drafting part 13a drafts the certification reply containing the receipt (sequence complementary procedure: immediate complementary data of a registration point and late complementary data of previous registration points at the above registration point, the previous registration points being registered before the above registration point) and successively sends the certification reply to the user apparatus 2i through the transmitting/receiving part 11a (steps S30a, S40a, S50a).

In this way, the user apparatus 2i can acquire the certification reply containing the receipt (step S60a). Subsequently, the user apparatus 2i repeats both transmitting of the certification reply at step S10a and receiving of the certification reply at step S60a.

In the certification apparatus 1a, meanwhile, the above-mentioned operation is repeated for a constant period for sequential aggregation (i.e. sequential aggregation period). When the sequential aggregation period is completed, the electronic information publishing part 17a calculates a root value of the sequential aggregation tree and publishes the root value electronically (steps S70a, S80a, S90a).

Referring to FIG. 40, the event-ordering certification validation method will be described. This corresponds to the second function of validation in the user apparatus 2I. FIG. 40 shows data interaction between the user apparatus 2A and the user apparatus 2B. Here, the user apparatus 2A requests judgment of a postpositive point to the user apparatus 2B. In detail, the user apparatus 2A asks the user apparatus B to judge the ordering of a postpositive receipt after the registration point of a receipt that the user apparatus 2A did receive.

First, the user apparatus 2A sends a postpositive-point judging request to the user apparatus 2B together with a receipt EOC(a) for validation (i.e. the receipt at a registration point a) (step S110a). Receiving the postpositive-point judging request, the user apparatus 2B extracts a leaf number n(a) out of the receipt EOC(a) and searches a larger leaf number than the leaf number n(a) from the registration points of the user apparatus 2B (steps S120a, S130a). If the registration points of the user apparatus 2B contains at least one registration point each having a leaf number larger than the leaf number n(a), then the user apparatus 2B selects one registration point b whose leaf number n(b) is larger than the leaf number n(a) and sends the leaf number n(b) to the user apparatus 2A (steps S140a, S150a). On the contrary, if the registration points of the user apparatus 2B does not contain a leaf number larger than the leaf number n(a), user apparatus 2B sends a message indicating "absence of comparable data" to the user apparatus 2A (step S142a).

Receiving the leaf number n(b) from the user apparatus 2B, the user apparatus 2A selects a provisional registration point af having a leaf number larger than the leaf number n(b), acquires late complementary data lateData(a, af) of the registration point a at the provisional registration point af and sends the data lateData(a, af) to the user apparatus 2B (steps S160a, S170a, S180a, S190a). When receiving the message indicating "absence of comparable data" from the user apparatus 2B, this validation is finished (step S144a).

After receiving the late complementary data lateData(a, af) from the user apparatus 2A, the user apparatus 2B calculates an authentication point o of the registration point a by the registration point b from the leaf "identifier" numbers n(a) and n(b) and further calculates an assigned value of the authentication point o from the receipt EOC(a) and the data lateData(a, af) (step S210a). Next, the user apparatus 2B verifies whether the calculated assigned value is included in late complementary data contained in a receipt EOC(b) of the registration point b or not. If the assigned value is included, the user apparatus 2B sends a judgment that the registration point a has been registered in advance of the registration point b to the user apparatus 2A (steps S220a, S230a). On the contrary, if the assigned value is not included, the user apparatus 2B sends a judgment that there exists any falseness due to the impossibility of certifying that the registration point a has been registered in advance of the registration point b, to the user apparatus 2A (steps S220a, S240a).

Consequently, the user apparatus 2A can verify the temporal context in publishing the receipt between the user apparatus 2A and the user apparatus 2B since the apparatus 2A acquires the judgment (steps S250a, S260a).

The above-mentioned event-ordering certification validation method is directed to the request for judgment of the postpositive point from the user apparatus 2A to the user apparatus 2B. In the modification, the user apparatus 2A may request judgment of a prepositive point to the user apparatus 2B. In detail, the user apparatus 2A may ask the user apparatus B to judge the ordering of a prepositive receipt before the registration point of a receipt that the user apparatus 2A did receive. FIG. 41 is a sequence diagram showing data interaction between the user apparatus 2A and the user apparatus 2B when the apparatus 2A requests the judgment of the prepositive point to the apparatus 2B.

First, the user apparatus 2A sends a prepositive-point judging request to the user apparatus 2B together with the receipt EOC(a) for validation (i.e. the receipt at the registration point a) (step S310a). Receiving the prepositive-point judging request, the user apparatus 2B extracts the leaf number n(a) out of the receipt EOC(a) and searches a smaller leaf number than the leaf number n(a) and a larger leaf number than the leaf number n(a) from the registration points of the user apparatus 2B (steps S320a, S330a). If the registration points of the user apparatus 2B contains a leaf number smaller than the leaf number n(a) and a leaf number larger than the leaf number n(a), then the user apparatus 2B selects one registration point b whose leaf number n(b) is smaller than the leaf number n(a) and another provisional registration point bf whose leaf number n(b) is larger than the leaf number n(a) (steps S340a, S350a). On the contrary, if the registration points of the user apparatus 2B contain neither a leaf number smaller than the leaf number n(a) nor a leaf number larger than the leaf number n(a), the user apparatus 2B sends a message indicating "absence of comparable data" to the user apparatus 2A (step S342a). When receiving the message indicating "absence of comparable data" from the user apparatus 2B, the user apparatus 2A finishes the validation (step S344a).

Next, the user apparatus 2B acquires late complementary data lateData(b, bf) of the registration point b at the provisional registration point bf, calculates an authentication point o of the registration point a by the registration point b from the leaf "identifier" numbers n(a) and n(b) and further calculates an assigned value of the authentication point o from the receipt EOC(a) and the data lateData(b, bf) (steps S360a, 370a). Next, the user apparatus 2B verifies whether the calculated assigned value is included in late complementary data contained in a receipt EOC(a) of the registration point a or not. If the assigned value is included, the user apparatus 2B sends a judgment that the registration point a has been registered after the registration point b to the user apparatus 2A (steps S380a, S390a). On the contrary, if the assigned value is not included, the user apparatus 2B sends a judgment that there exists any falseness due to the impossibility of certifying that the registration point a has been registered after the registration point b, to the user apparatus 2A (steps S380a, S400a).

Consequently, the user apparatus 2A can verify the temporal context in publishing the receipt between the user apparatus 2A and the user apparatus 2B since the apparatus 2A acquires the judgment (steps S410a, S420a).

In the above-mentioned event-ordering certification validation method, the user apparatuses 2A and 2B verify the temporal context of the publication of the receipts. The present invention is not limited to this and a third organization other than parties concerned (e.g. the event-ordering certification audit apparatus 3 of the first to third embodiments) may verify the temporal context. In this case, the user apparatuses 2A and 2B transmit information essential to validation to the third organization where the validation is carried out.

The fourth embodiment will be summarized as follows. In the event-ordering certification system 100a for certifying the event ordering with the use of a tree structure, the certification apparatus 1a on receipt of an event-ordering request from the user apparatus 2I publishes a certification reply in the sequence complementary method (the certification reply containing the immediate complementary data of a registration point and the late complementary data of respective registration points registered before the registration point at the registration point). Therefore, it is possible for the user apparatus 2I to verify the temporal context in publishing respective receipts between the user apparatuses 2I while using the certification reply. Therefore, even if this validation is carried out before publishing data collecting up the event-ordering requests is published electronically, it is possible to verify the validity of the receipts.

$5^{th}$. Embodiment 5-1. System Structure

Figure 42:
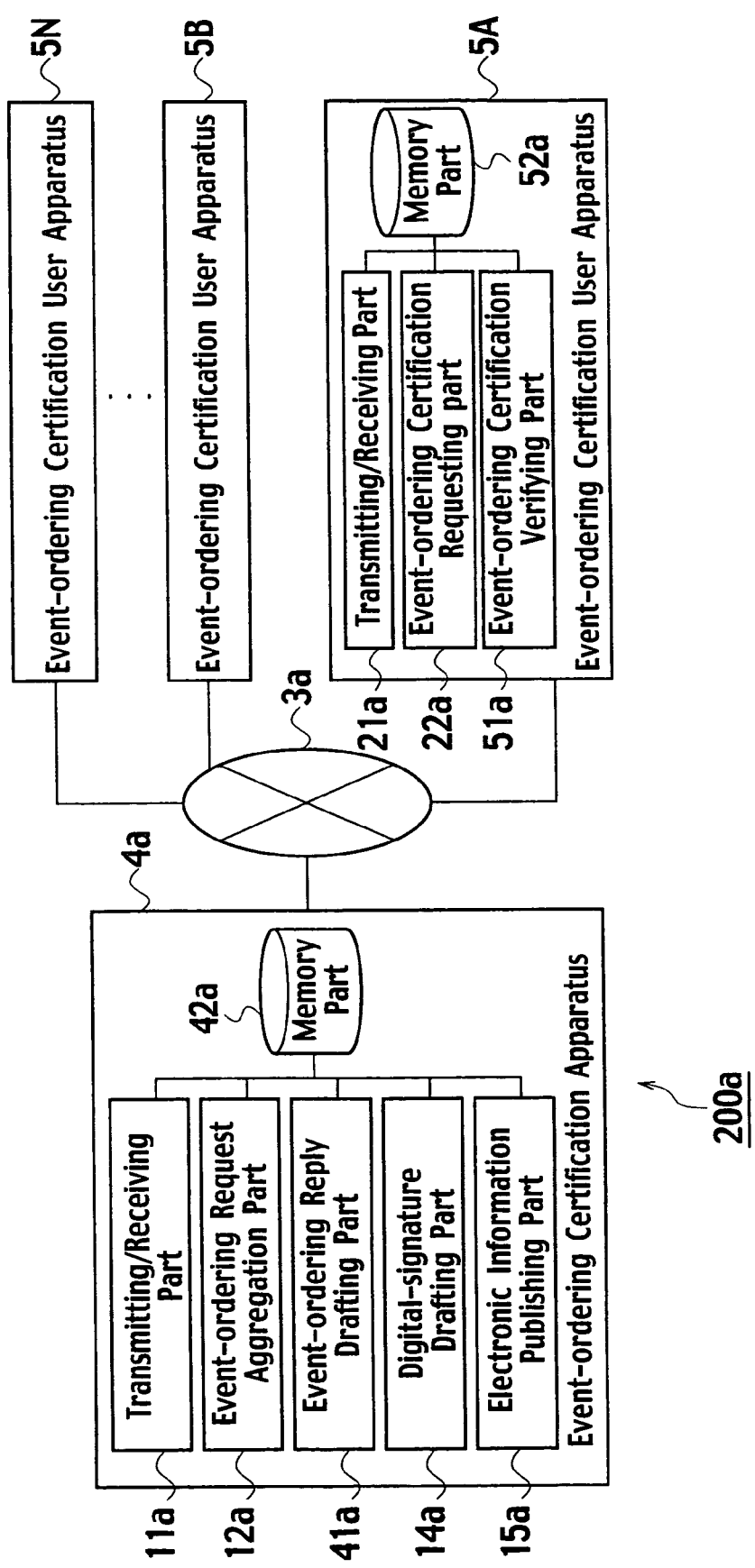
FIG. 42 is a system architecture diagram of an event-ordering certification system in accordance with a fifth embodiment of the present invention.

FIG. 42 is a system architecture diagram of an event-ordering certification system 200a in accordance with the fifth embodiment of the present invention. The event-ordering certification system 200a includes an event-ordering certification apparatus 4a, a plurality of user apparatuses 5I (I=A, B, . . . , N) and the computer network 3a for connecting the above elements with each other, such as internet and telephone network. In operation, in response to event-ordering requests from the user apparatuses 5I, the certification apparatus 1a sends back the certification replies to the user apparatuses 5I. Then, each user apparatus 2I can verify a receipt (i.e. a receipt certificate) by a plurality of certification replies from the certification apparatus 4a.

The fifth embodiment differs from the fourth embodiment with respect to the format of certification reply. According to the fifth embodiment, the certification reply is drafted in later-mentioned chain complementary procedure different from the above sequence complementary procedure. In the sequence complementary procedure mentioned above, at each registration point of one user apparatus 2I, the certification apparatus 1a has to return the late complementary data about all "past" registration points of the relevant use apparatus 2I to the same apparatus 2I. Therefore, the amount of data for the certification reply increases with an increase in the number of past registration points. On the contrary, according to the chain complementary procedure, the amount of data of the certification reply is suppressed from increasing. In the fifth embodiment, both constitutions and functions different from those in the previous embodiments will be described below. As to the other constitutions and functions, their descriptions are eliminated while applying the same reference numerals to the identical elements respectively.

The certification apparatus 4a comprises the transmitting/receiving part 11a for transmitting and receiving data to and from the user apparatuses 5I through the computer network 3a, the event-ordering request aggregation part 12a for arranging digital data (as event-ordering requests) transmitted from the user apparatuses 2I with the use of a sequential aggregation tree, an event-ordering reply drafting part 41a for drafting a certification reply containing a receipt (receipt certificate), the digital signature drafting part 14a for applying a high-intensity digital signature on data where respective contents of a plurality of receipts published for a constant period by the certification apparatus 4a are aggregated, thereby forming publication data, the electronic information publishing part 15a for electronically publishing the publication data having the high-intensity digital signature applied thereon and a memory part 42a for storing the receipts and information about event-ordering certification.

The event-ordering reply drafting part 41a drafts the certification reply containing a receipt EOC(y) as shown in FIG. 43 and sends it to the user apparatus 5I. The receipt EOC(y) is constructed so as to contain: digital data y sent from a user; sequentially assigned data-item z calculated from the digital data y by the above-mentioned calculation procedure for sequentially assigned data-item; a "sequential-aggregation" tree number enabling a sequential aggregation tree having the data-item z assigned to be identified uniquely; a "sequential aggregation tree" leaf number enabling a "sequential aggregation tree" leaf having the data-item z assigned to be identified uniquely; and both positional information and assigned value of sequential aggregation complementary data (part) SK acquirable at that time. The above data part SK will be referred to as "immediate complementary data of registration point".

Again, the certification reply is constructed so as to contain the positional information of late complementary data TK2 of an immediately-preceding registration point of the user apparatus 5I in the past and their assigned values.

Referring to FIG. 37, we now describe a concrete example of the certification reply in accordance with this embodiment Note that the format of the certification reply in the embodiment will be referred to as "chain complementary procedure" hereinafter. Suppose now, the registration points from a certain user apparatus 5I consist of X1(node(0, 2)), X2(node(0, 11)), X3(node(0, 18)), X4(node(0, 21)), X5(node(0, 29)), and X6(node(0, 31)).

In the chain complementary procedure, it is executed at respective registration points to return the following data to the user apparatus 5I.

(1) For the certification reply at the point X1, there is returned immediate complementary data of the point X1 [i.e. assigned value of node (1, 0)].

(2) For the certification reply at the point X2, there are returned immediate complementary data of the point X2 and X1's late complementary data at point X2 [i.e. immediate complementary data of X2: respective assigned values of nodes (3, 0), (1, 4), (0, 10); X1's late complementary data at X2: assigned values of nodes (0, 3), (2, 1)].

(3) For the certification reply at the point X3, there are returned immediate complementary data of the point X3 and X2's late complementary data at point X3 [i.e. immediate complementary data of X3: assigned values of nodes (4, 0), (1, 8); X2's late complementary data at X3: assigned value of node (2, 3)].

(4) For the certification reply at the point X4, there are returned immediate complementary data of the point X4 and X3's late complementary data at point X4 [i.e. immediate complementary data of X4: assigned values of nodes (4, 0), (2, 4), (0, 20); X3's late complementary data at X4: assigned value of node (0, 19)].

Much the same will be true on the points X5 and X6. Therefore, according to chain complementary procedure, as for a certain registration point, the certification reply is formed so as to contain the immediate complementary data of this registration point and the late complementary data (data-item) of an immediately-preceding registration point at the above registration point. Consequently, as the amount of data in the certification reply against the event-ordering request does not increase proportionally in spite of an increase in the number of past registration points, it is possible to reduce the amount of communication data between the certification apparatus 4a and the user apparatus 5I. Note that the respective certification replies are managed with respect to each user apparatus 5I.

In spite of the certification reply in the chain complementary procedure, the user apparatuses 5I can acquire data identical to the data in the sequence complementary procedure. The reason will be described with reference to FIGS. 44 and 45.

Assume that we are given a sequential aggregation tree ST2 where three leaves a1, a2 and a3 are arranged in this order from the left, as shown in FIG. 44. Then, from the late complementary data of a point a2 at a point a3, the immediate complementary data of a2 and the late complementary data of a1 at a2, the late complementary data of a1 at a3 is calculated as follows.

First, assume that j2 denotes a level of the highest node in the late complementary data of a2 at a3. Additionally, an authentication point of a1 by a2, a brotherly node of the authentication point and a level of the brotherly node are presented by AP(a1, a2), AP'(a1, a2), and j1, respectively.

On the above assumption, it is firstly noted that in authentication path nodes contained the late complementary data of a1 of a3, assigned values of nodes of level smaller than j1 are included in the late complementary data of a1 at a2.

Secondly, in the authentication path nodes contained the late complementary data of a1 of a3, assigned values of nodes of level equal to j1 can be calculated by the late complementary data of a2 at a3 and the immediate complementary data of a2.

Thirdly, in the authentication path nodes contained the late complementary data of a1 of a3, an aggregate of nodes of level larger than j1 is identical to an aggregate of nodes of level larger than j1 in the authentication path nodes contained the late complementary data of a2 at a3. Therefore, in the authentication path nodes contained the late complementary data of a1 at a3, assigned values of nodes of level larger than j1 can be calculated by the late complementary data of a2 at a3

From above, the late complementary data of a1 at a3 can be calculated from the following three data:
(1) the late complementary data of a2 at a3;
(2) the immediate complementary data of a2; and
(3) the late complementary data of a1 at a2.

Note, from above (1) to (3), a process of calculating the late complementary data of a1 at a3 will be referred to as "propagation procedure for completion" hereinafter.

With the use of propagation procedure for completion, the user apparatus 5I can calculate the certification reply in accordance with the sequence complementary procedure from the certification reply in accordance with the chain complementary procedure. FIG. 45 is a diagram showing this calculating method. FIG. 45 shows the immediate complementary data and the late complementary data essential to respective registration points in both the sequence complementary procedure and the chain complementary procedure. Note that both the immediate complementary data and the late complementary data in the certification replies in the chain complementary procedure are framed in by double-line of FIG. 45. In FIG. 45, respective arrows designate calculating directions. For instance, FIG. 45 shows that it is possible to calculate the late complementary data (P4) of a1 at a3 from the late complementary data (P1) of a2 at a3, the immediate complementary data (P2) of a2 and the late complementary data (P3) of a1 at a2.

Similarly, it is possible to calculate the late complementary data (P7) of a2 at a4 from the late complementary data (P5) of a3 at a4, the immediate complementary data (P6) of a3 and the late complementary data (P1) of a2 at a3. Then, by repeating this operation, it becomes possible to calculate all the late complementary data of FIG. 45 in spite of the chain complementary procedure, finally. This is no less the late complementary data than the certification replies in the sequence complementary procedure.

Accordingly, in spite of the chain complementary procedure of this embodiment, the user apparatuses 5I can carry out the validation similar to the first embodiment due to the propagation procedure for completion as shown in FIG. 45. Note that the propagation procedure for completion will be described as a later-mentioned incremental completion, in detail.

The user apparatus 5I comprises the transmitting/receiving part 21a for transferring data to and from the certification apparatus 4a through the computer network 3a, the event-ordering certification requesting part 22a for performing the event-ordering requests containing designated digital data by several times, an event-ordering certification verifying part 51a for verifying a receipt contained in the certification reply in response to the event-ordering request and a memory part 52a for storing the information about event-ordering certification and the certification reply containing the receipt.

In addition to the function of the event-ordering certification verifying part 23a of the fourth embodiment, the event-ordering certification verifying part 51a has a function of performing the incremental completion mentioned later and includes the following functions of validation against the receipt.

As a first function of validation, the event-ordering certification verifying part 51a verifies that the sequential assigned data-item is linked with the information published through the digital signature drafting part 14a of the certification apparatus 4a and the electronic information publishing part 15a. In detail, it is executed to validate whether a value published as the root value of the sequential aggregation tree coincides with a root value calculated by the user apparatus 5I or not.

As a second function of validation, the event-ordering certification verifying part 51a verifies the temporal context of receipts among the user apparatuses 5I even before the information is published.

The second function of validation will be described with reference to FIG. 39.

Suppose, two user apparatuses 5A and 5B respectively acquire the certification replies of respective registration points by the chain complementary procedure. In FIG. 39, let a, a1, a2 and af be respective registration points of the user apparatus 5A and let b be a registration point of the user apparatus 5B. Note that "af" is referred to as "temporary terminal point". In FIG. 39, there exist the registration point a of the user apparatus 5A, the registration point b of the user apparatus 5B on the right of the point a and the registration point af of the user apparatus 5A on the further right of the point b.

According to the embodiment, at first, the propagation procedure for completion of FIG. 45 is applied to the registration point a of the user apparatus 5A while establishing af as the temporary terminal point. Consequently, the certification reply identical to that of the sequence complementary procedure is obtained. Subsequently, by carrying out the same method as the fourth embodiment, it is possible verify the temporal context between the registration point a and the registration point b. Thus, also in this embodiment, if only there is a coincidence about an assigned value V(o) for an authentication point o of the registration point a by the registration point b in the present sequential aggregation tree at the present moment (i.e. at the registration point af), it is possible to verify that the registration of the registration point a was carried out in advance of the registration of the registration point b, objectively.

Note that the above apparatuses are formed by electronic apparatuses each having a CPU (Central Processing Unit) having at least a calculating function and a control function, a main memory having a function to store programs and data, such as RAM (Random Access Memory), and a secondary memory capable of continuing to memorize data even at powered-off, such as HD (Hard Disc). The operation of the event-ordering reply drafting part 41a in the certification apparatus 4a and the operation of the event-ordering certification verifying part 51a of the user apparatus 5I are nothing but respective crystallizations of the above calculating/control functions of the above central processing units. Additionally, the memory part 42a of the certification apparatus 4a and the memory part 52a of the user apparatus 5I are equipped with the above-mentioned functions of either the main memory or the secondary memory.

5-2 System Operation

As for the event-ordering certification method in the event-ordering certification system 200a constructed above, the description of the method is eliminated due to the identity achieved by replacing the certification apparatus 1a and the user apparatuses 2I of FIG. 39 with the certification apparatus 4a and the user apparatuses 5I, respectively. As for the method for varidation of event-ordering certificates, there is no difference between the fourth embodiment and the fifth embodiment but replacing the user apparatuses 2A, 2B of FIGS. 40 and 41 by the user apparatuses 5A, 5B, respectively. Further, if only executing a later-mentioned incremental completion process in each of the user apparatuses 5A and 5B as an advance step, subsequent operations of the apparatuses 5A and 5B would be the same as those of FIGS. 40 and 41. Therefore, an explanation about the method for varidation of event-ordering certificates is eliminated.

(2-3. Data Storing Method of Certification Apparatus 4a)

(1st. Method)

The data storing method of the certification apparatus 4a in the chain complementary procedure will be described in detail. First, the first method is a method A of accomplishing the above-mentioned chain complementary procedure since the certification apparatus 4a builds a sequential aggregation tree on the memory part 42a.

Figure 46:
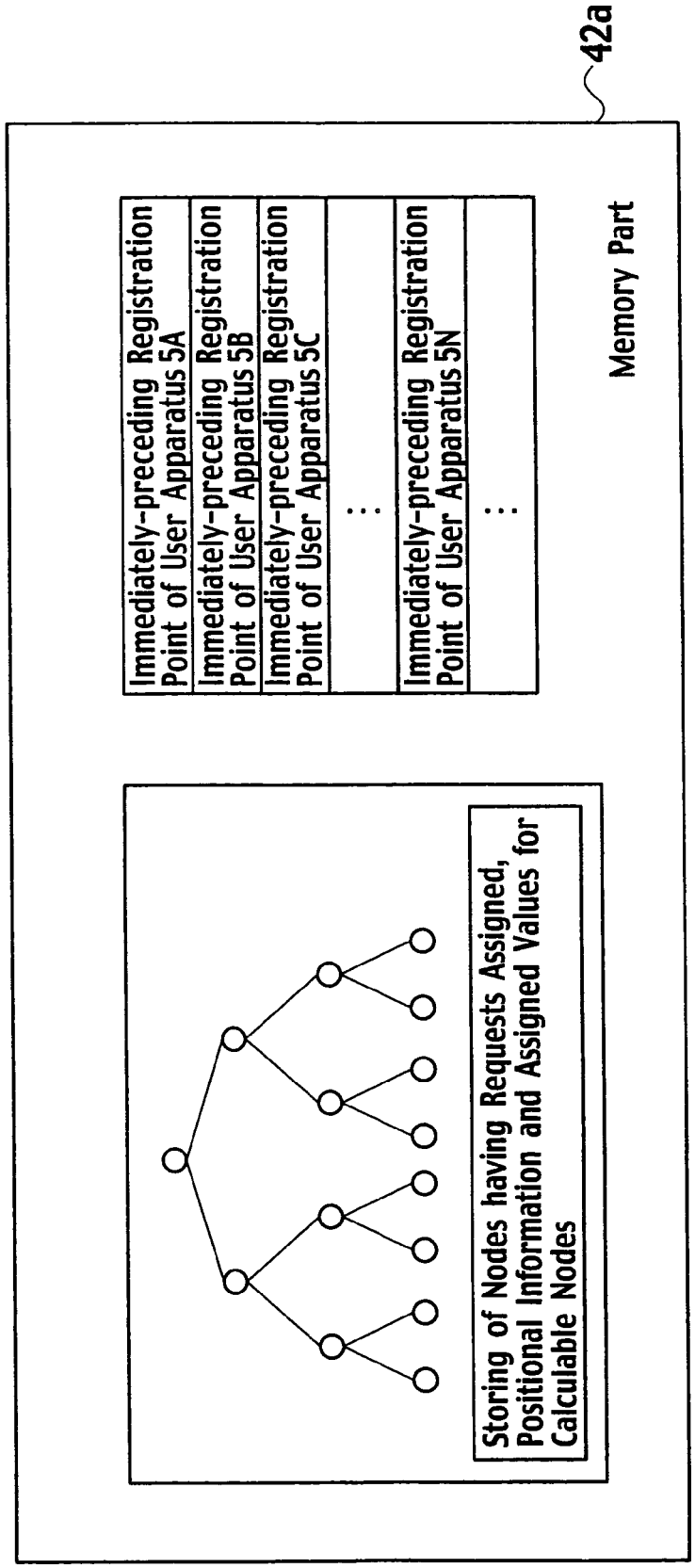
FIG. 46 is a diagram explaining a first chain complementary procedure in the event-ordering certification system of the fifth embodiment of the present invention.

FIG. 46 is a diagram showing a schematic structure of data stored in the memory part 42a when the above method A is employed. As shown in the figure, the memory part 42a stores a sequential aggregation tree itself, that is, the nodes where the event-ordering requests are assigned, both positional information about calculable nodes and their assigned values, and the positional information about an immediately-preceding registration point with respect to each of the user apparatuses 5I.

According to the method A, it is carried out to add a node at level 0 (i.e. a leaf) to the sequential aggregation tree on the memory part 42a whenever the certification apparatus 4a receives an event-ordering request. Additionally, for a node more than level 1 whose assigned value is calculable, the certification apparatus 4a adds the node and the assigned value to the sequential aggregation tree.

Figure 47:
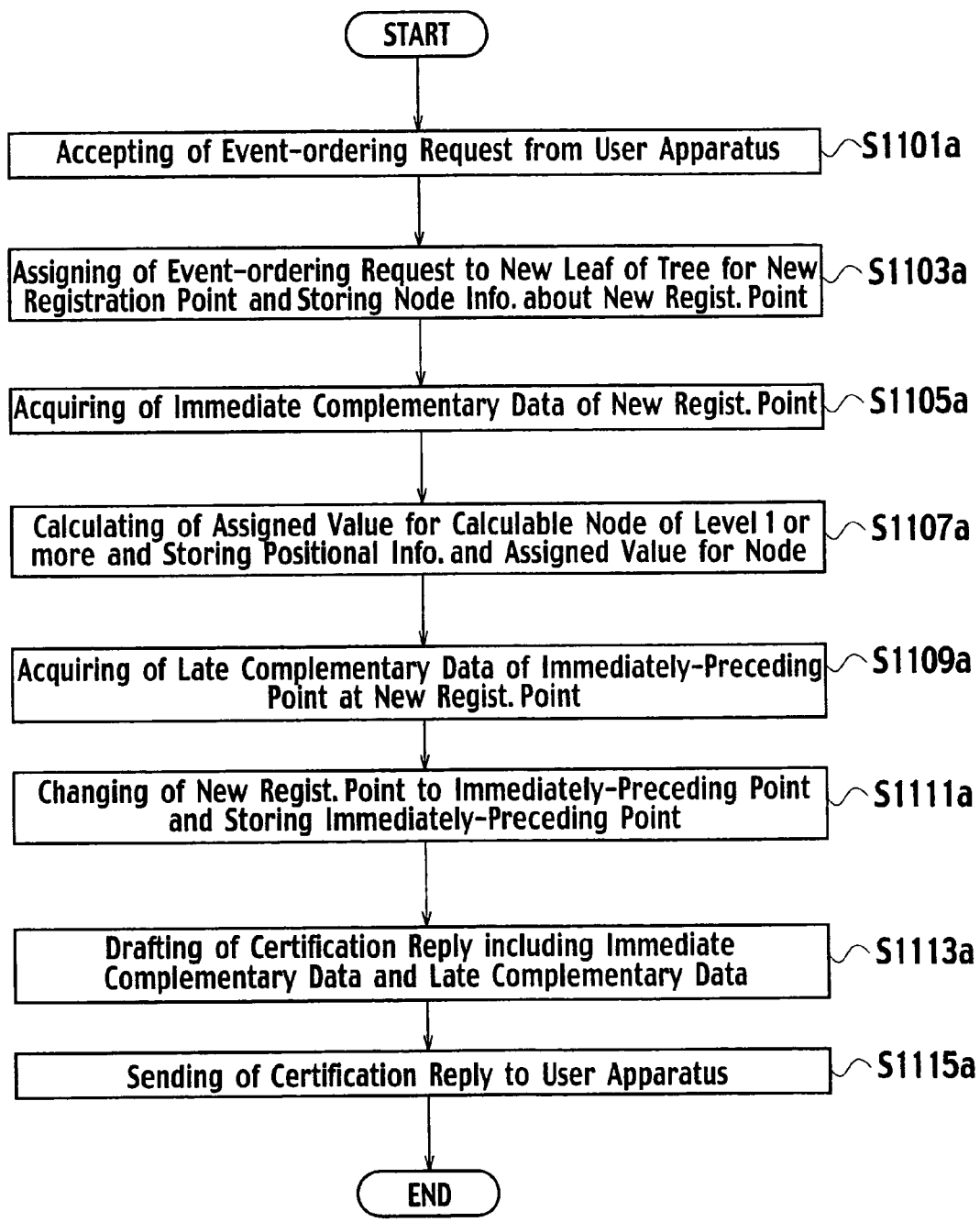
FIG. 47 is a flow chart explaining the operation of drafting a proof response by the first chain complementary procedure in the event-ordering certification system of the fifth embodiment of the present invention.

The operation of the certification apparatus 4a in the method A will be described with reference to FIG. 47. FIG. 47 is a flow chart showing the functions of the event-ordering request aggregation part 12a and the event-ordering reply drafting part 41a.

First, when receiving an event-ordering request from the user apparatus 5I, the certification apparatus 4a drafts a sequentially assigned data-item from the event-ordering request, assigns the data-item to a new leaf of the sequential aggregation tree to make a new registration point and stores node information (positional information and the assigned value) about the new registration point (steps S1101a, S1103a).

Next, in accordance with the definition of immediate complementary data, the certification apparatus 4a acquires immediate complementary data of the new registration point from the sequential aggregation tree stored in the memory part 42a (step S1105a).

Next, for a node at level more than 1 whose assigned value becomes calculable as a result of the addition of the new registration point, the certification apparatus 4a calculates the assigned value and stores the positional information of the node and the assigned value in the memory part 42a (step S1107a).

Next, in accordance with the definition of late complementary data, the certification apparatus 4a acquires late complementary data of an immediately-preceding registration point from the immediately-preceding registration point with respect to each user apparatus 5I and the sequential aggregation tree stored in the memory part 42a (step S1109a).

Next, the certification apparatus 4a replaces the immediately-preceding registration point with the new registration point and stores it as an immediately-preceding registration point for the user apparatus 5I, drafts a certification reply including the immediate complementary data and the late complementary data acquired at steps S1105a and S1109a, and sends the certification reply to the user apparatus 5I (steps S1111a, S1113a, S1115a).

(2nd. Method)

The second method is a method of accomplishing the above-mentioned chain complementary procedure by the certification apparatus's forming a stack structure in the memory part 42a in place of the formation of a sequential aggregation tree on the memory part 42a. The second method will be referred to as "method B" hereinafter. The method B is directed to an improvement of the above-mentioned method A where necessary memory capacity increases in substantially-proportional to the size of the sequential aggregation tree. Thus, according to the method B, since respective assigned values for the nodes in the sequential aggregation tree, the immediate complementary data for each event-ordering request and the late complementary data are calculated by using the stack structure, it is possible to reduce the necessary memory capacity, allowing a handling of a sequential aggregation tree whose size is so large that the memory part 42a cannot store.

Figure 48:
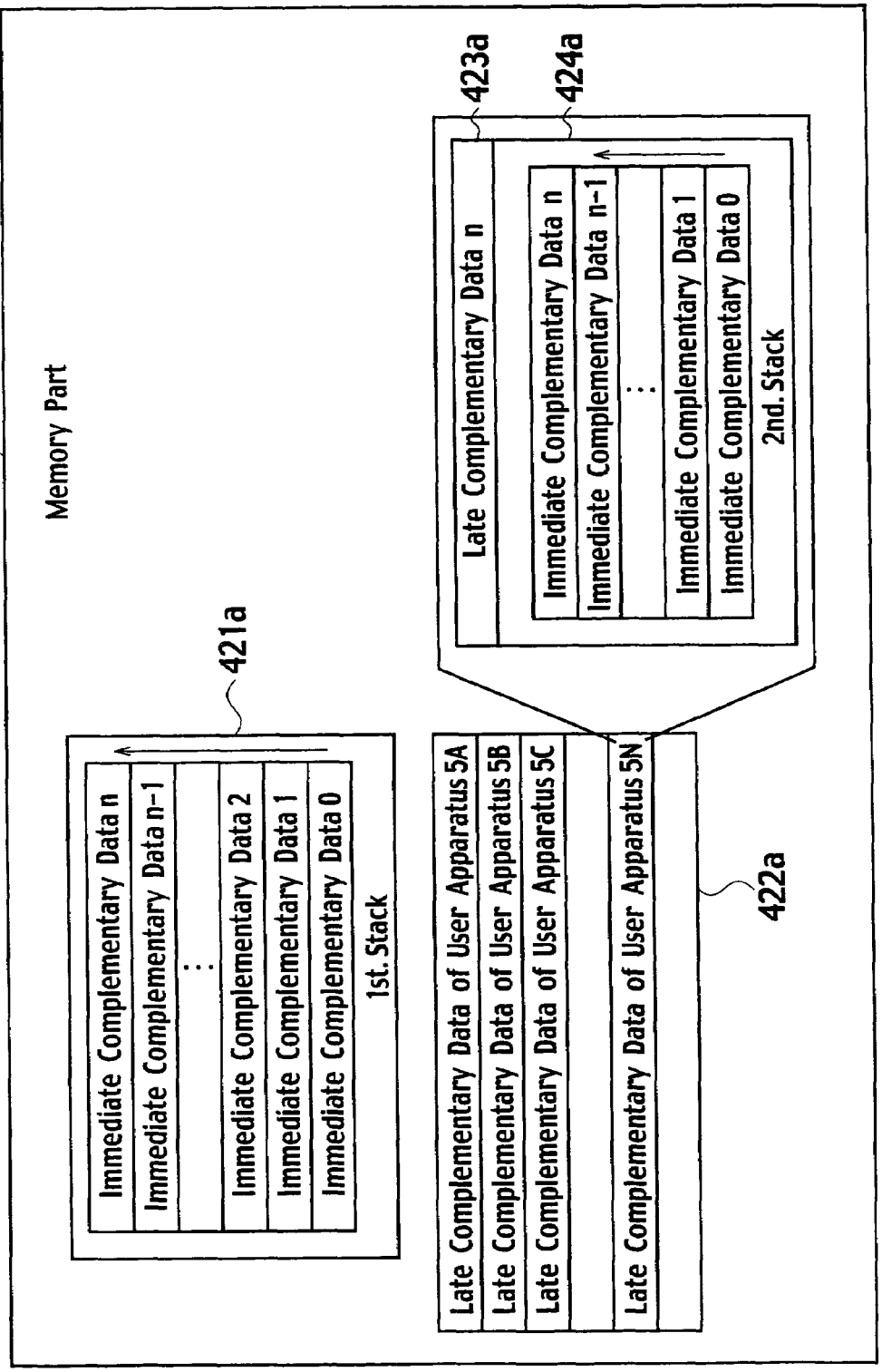
FIG. 48 is a diagram explaining a second chain complementary procedure in the event-ordering certification system of the fifth embodiment of the present invention.

FIG. 48 is a diagram showing the schematic structure of data stored in the memory part 42a in adopting the method B. The memory part 42a includes a first stack 421a for storing the immediate complementary data (i.e. positional information and assigned values) and a memory part 422a for storing the late complementary data with respect to each user apparatus 5I. This memory part 422a is formed by a second stack 424a storing an immediately-preceding registration point (positional information) 423a and the late complementary data (i.e. positional information and assigned values) 424a. Note that data forming elements of the first and second stacks is called "stack frame".

In the above stacks, the first stack is provided with data structure used up to now. For instance, R. Markle discloses one recursive procedure H(a, b) for calculating an assigned value for a root node of a binary tree (see Secrecy, Authentication, and Public Key System, UMI Research Press, 1982, page 36). When applying this recursive procedure H(a, b) on one stack for its standard packaging, this stack will be treated in the similar way as the above first stack.

Figure 49:
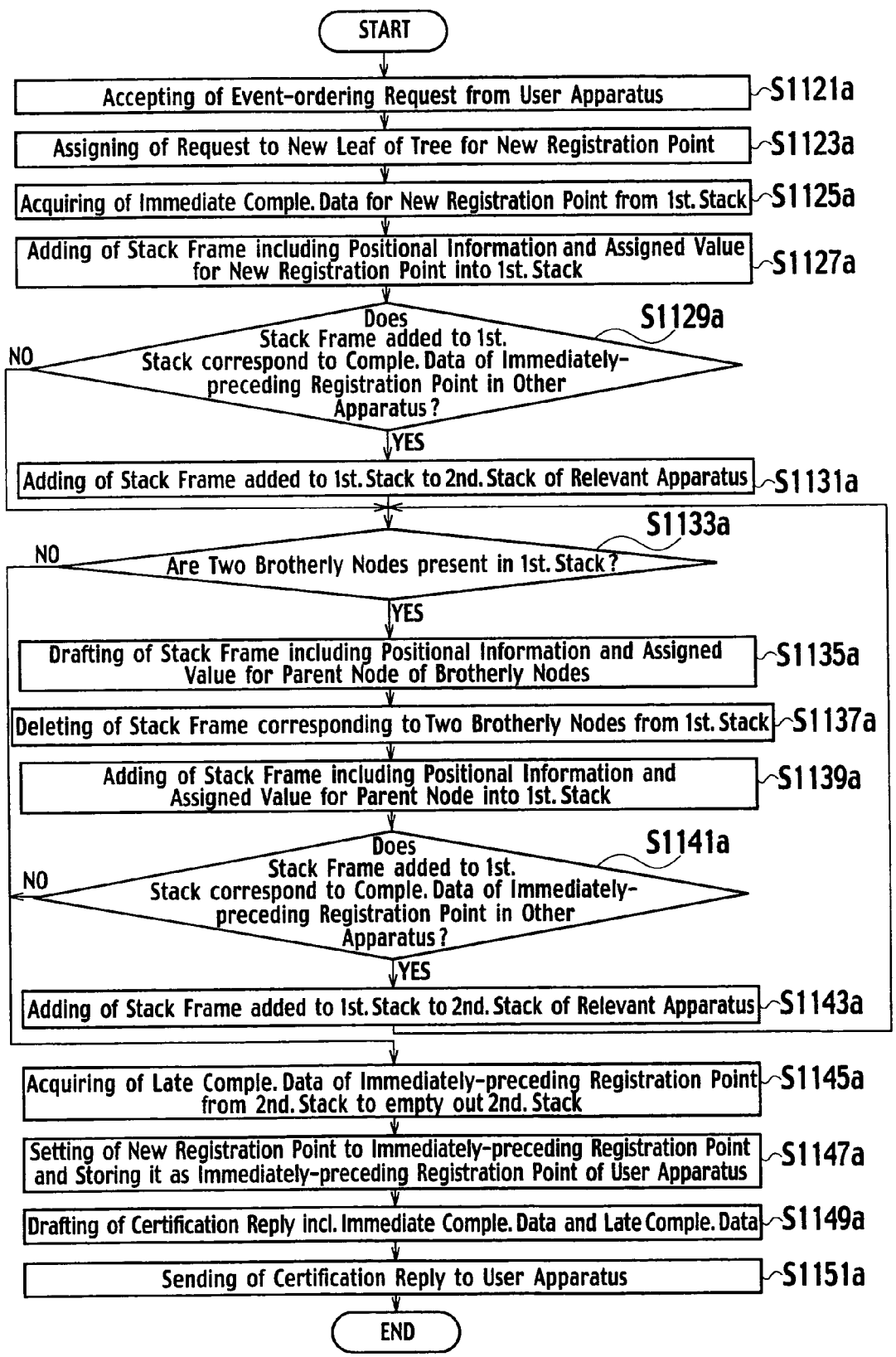
FIG. 49 is a flow chart explaining the operation of drafting a proof response by the second chain complementary procedure in the event-ordering certification system of the fifth embodiment of the present invention.

The operation of the certification apparatus 4a in the method B will be described with reference to FIG. 49. FIG. 49 is a flow chart showing the functions of the event-ordering request aggregation part 12a and the event-ordering reply drafting part 41a.

First, when receiving an event-ordering request from the user apparatus 5I, the certification apparatus 4a drafts a sequentially assigned data-item from the event-ordering request and assigns the data-item to a new leaf of the sequential aggregation tree to make a new registration point (steps S1121a, S1123a).

Next, the certification apparatus 4a acquires the immediate complementary data of the new registration point from the first stack 421a (step S1125a).

Next, it is carried out to add a stack frame including the positional information of the new registration point and its assigned value to the first stack (step S1127a). At this time, if the above stack frame corresponds to the complementary data for an immediately-preceding registration point in any one of the other user apparatuses 5I, the stack frame is added to the second stack of the relevant user apparatus 5I (steps S1129a, S1131a).

Next, so long as the first stack includes two stack frames corresponding to two nodes as the brotherly nodes, the certification apparatus 4a produces a stack frame including the positional information about a parent node for the two nodes above and its assigned value, next deletes the stack frames corresponding to the two nodes from the first stack and instead adds the so-produced new stack frame to the first stack (steps S1133a, S1135a, 1137a, 1139a). At this time, if the new stack frame corresponds to the complementary data for an immediately-preceding registration point in any one of the other user apparatuses 5I, the stack frame is added to the second stack of the relevant user apparatus 5I (steps S1141a, S1143a).

Next, the certification apparatus 4a acquires the late complementary data of the immediately-preceding registration point at the new registration point from the second stack for the relevant user apparatus and simultaneously empties the second stack (step S1145a).

Next, the certification apparatus 4a replaces the immediately-preceding registration point with the new registration point and stores it as an immediately-preceding registration point for the relevant user apparatus 5I, drafts a certification reply including the immediate complementary data and the late complementary data acquired at steps S1125a and S1145a, and sends the certification reply to the user apparatus 5I (steps S1147a, S1149a, S1151a).

The above-mentioned operation will be described with a concrete example of FIG. 37, in detail. Suppose that X4 denotes a new registration point.

First, when receiving an event-ordering request from the user apparatus 5I, the certification apparatus 4a drafts a sequentially assigned data-item from the event-ordering request and assigns the data-item to a new leaf (i.e. the registration point X4) of the sequential aggregation tree to make the new registration point (steps S1121a, S1123a).

Next, it is carried out to acquire an assigned value for node(3, 0) being the immediate complementary data of the new registration point X4 from a stack frame 0 of the first stack 421a, an assigned value for node(2, 4) from a stack frame 1 of the first stack 421a and an assigned value for node(0, 20) from a stack frame 2 of the first stack 421a, respectively (step S1125a).

Next, a stack frame 3 including the positional information about the new registration point (0, 21) and its assigned value is added to the first stack (step S1127a). Then, if the stack frame newly added to the first stack corresponds to the complementary data for an immediately-preceding registration point in any one of the other user apparatuses 5I, the same stack frame is added to the second stack of the relevant user apparatus 5I (steps S1129a, S1131a).

Next, since the first stack includes two stack frames (2 and 3) corresponding to the brotherly nodes, the certification apparatus 4a produces a stack frame including the positional information about node (1, 10) corresponding a parent node of the two nodes and its assigned value, next deletes stack frames (2a and 3a) corresponding to the brotherly nodes from the first stack and adds the so-produced new stack frame to the first stack, as a new stack frame 2a (steps S1133a, S1135a, 1137a, 1139a). At this time, if the stack frame newly added to the first stack corresponds to the complementary data for an immediately-preceding registration point in any one of the other user apparatuses 5I, the stack frame is added to the second stack of the relevant user apparatus 5I (steps S1141a, S1143a).

Next, it is carried out to acquire an assigned value for node (0, 19), which is the late complementary data of the immediately-preceding registration point X3 at the new registration point X4, from the stack frame 0 of the second stack 424a for the relevant user apparatus 5I and simultaneously empty the second stack (step S1145a).

Next, it is carried out to replace the immediately-preceding registration point X3 with the new registration point X4 and store it as an immediately-preceding registration point 423a for the relevant user apparatus 5I, draft a certification reply including the immediate complementary data and the late complementary data acquired at steps S1125a and S1145a, and send the certification reply to the user apparatus 5I (steps S1147a, S1149a, S1151a).

(Packaging Example of 2$^{nd}$ Method)

We now explain one packaging example when the certification apparatus 4a using the second method drafts a certification reply.

Figure 50:
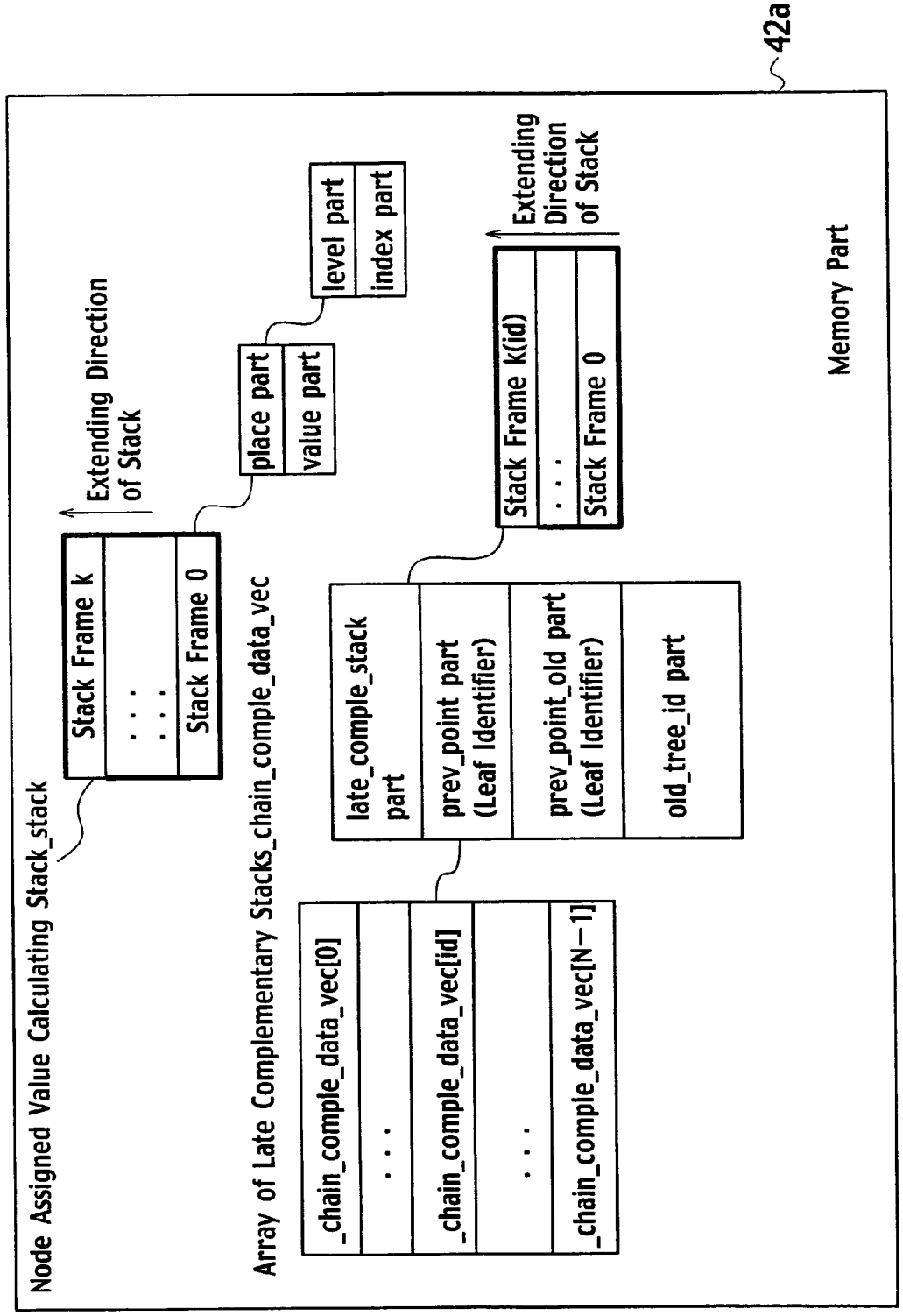
FIG. 50 is a diagram showing one example of a data structure in the second chain complementary procedure in the event-ordering certification system of the fifth embodiment of the present invention.

FIG. 50 is a diagram showing the structure of the memory part 42a of the certification apparatus 4a. As shown in FIG. 50, the memory part 42a includes a node assigned-value calculating stack for calculating node assigned values for a sequential aggregation tree (referred to as "_stack" after) and an array for late complementary data structure (referred to as "_chain_comple_data_vec" after). An element of "_stack" consists of stack frames providing a stack structure. Each of the stack frames is composed of a "place" part and a "value" part. The "place" part carries a place representing the position of a node in the sequential aggregation tree. The "place" part is composed of a level part representing a level of the node and an index part representing a number in the level. The "value" part carries an assigned value of the node.

The terminology "_chain_comple_data_vec" designates an array of data structure "chain_comple_data". The data structure "chain_comple_data" comprises a "late_comple_stack" part, a "prev_point" part, a "prev_point_old" part, and an "old_tree_id" part. The late_comple_stack part has a stack structure of stack frames, as similar to the _stack. The prev_point part represents an identification number (nonnegative integer or nil) showing an immediately-preceding point. The prev_point old part represents an identification number (nonnegative integer or nil) showing an immediately-preceding point in a sequential aggregation tree produced in advance of the present sequential aggregation tree. The old_tree_id part represents an identification number (nonnegative integer or nil) of a sequential aggregation tree to which a registration point indicated with the prev_point_old part belongs when the prev_point_old part is not nil.

Figure 51:
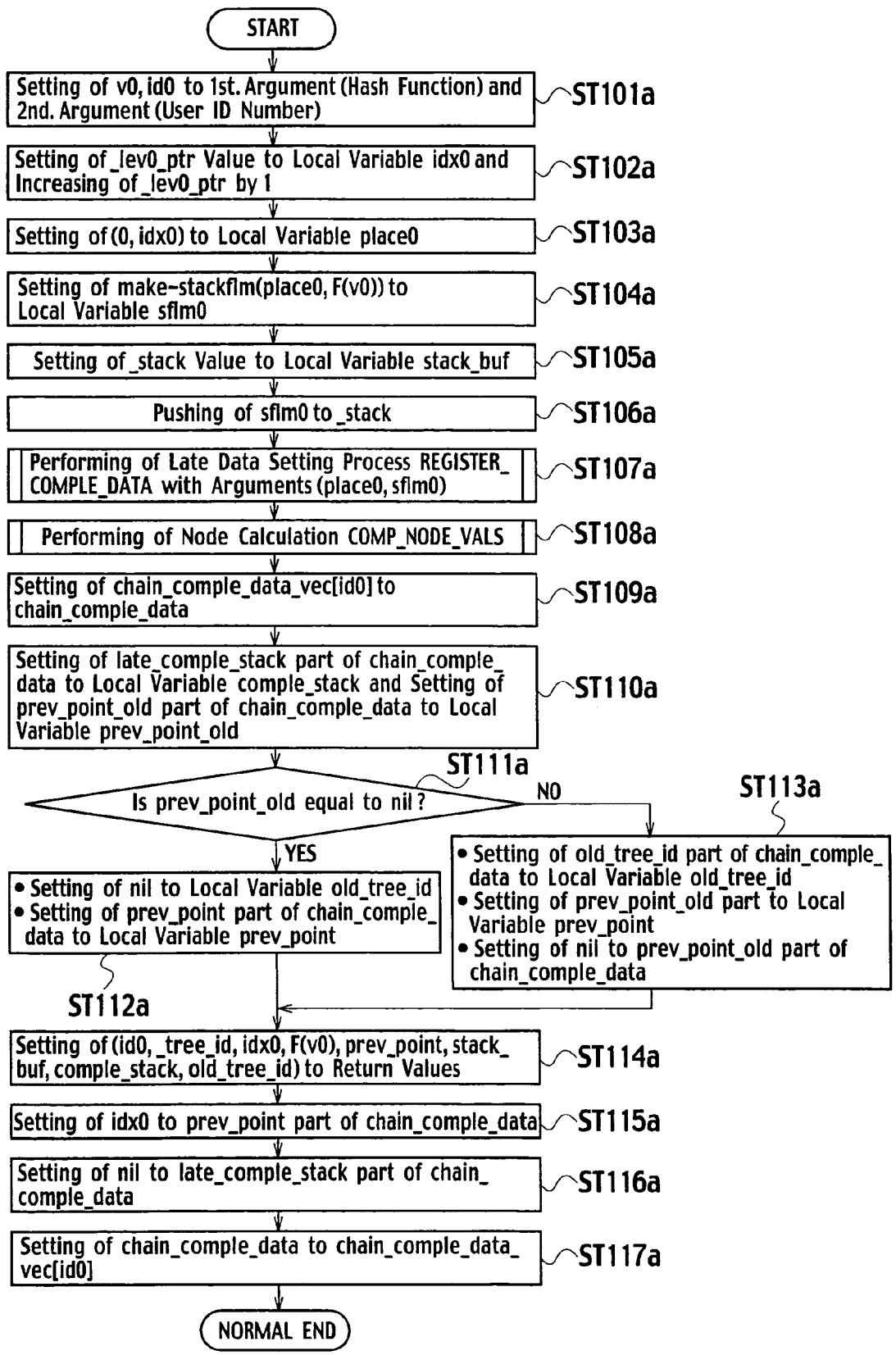
FIG. 51 is a flow chart explaining one example of a calculating procedure of immediate complementary data and delay complementary data in the chain complementary procedure in the event-ordering certification system of the fifth embodiment of the present invention.

FIG. 51 shows a chain complementary procedure GET_REG in the certification apparatus 4a. Variables and functions used in this procedure are as follows:

v0: a variable for retaining digital data (hash function, normally);

idx0: a variable for retaining an integer representing a user identification number;

_lev0_ptr: a variable for retaining a leaf identification number to which an event-ordering request on next acceptance will be assigned; initial value: 0;

place0: a variable for retaining a place representing a node position in a sequential aggregation tree;

sflm0: a variable for retaining a stack frame;

F(v0): a function to convert the digital data v0 included in an event-ordering request to data for assigning a leaf in a sequential aggregation tree. The function F(v0) may be equal to v0 or may be a result of applying a designated hash function (e.g. SHA1);

_tree_id: a variable for retaining an identification number of a sequential aggregation tree;

_make-stackflm(place0, V0): a function for returning the stack frame The function has place and digital data V0 as both arguments, place0 as the place part and V0 as the value part;

stack_buf: a variable for retaining a stack condition in a certain moment; and handle_chain_comple(id0, tree_id0, idx0, V0, prev_point0, immed_stack_data0, late_stack_0): a function for drafting a receipt formed by: the identifier of sequential aggregation tree tree_id0; the leaf identifier idx0; the assigned data V0; the immediate complementary data mmed_stack_data0; and the late complementary data late_stack_0, and for sending the receipt to the user apparatus 5I having the user identification number id0.

On establishment of V0 as the digital data from a demander and id0 as an identification number of the demander whenever the certification apparatus 4a receives an event-ordering request, this procedure is called out (steps ST101a to ST117a).

Figure 52:
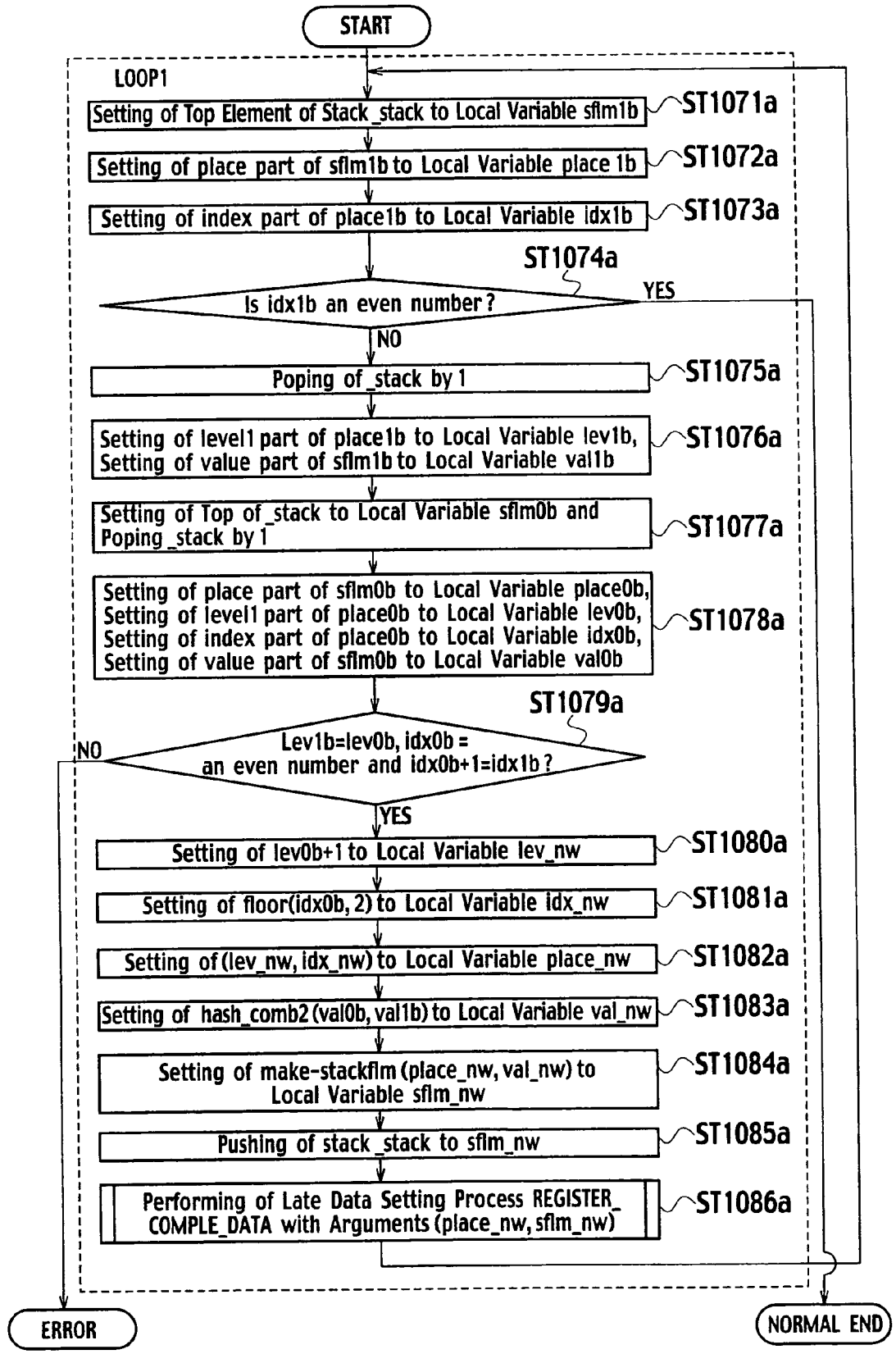
FIG. 52 is a flow chart explaining one example of a calculating procedure of a node value in the chain complementary procedure in the event-ordering certification system of the fifth embodiment of the present invention.
Figure 53:
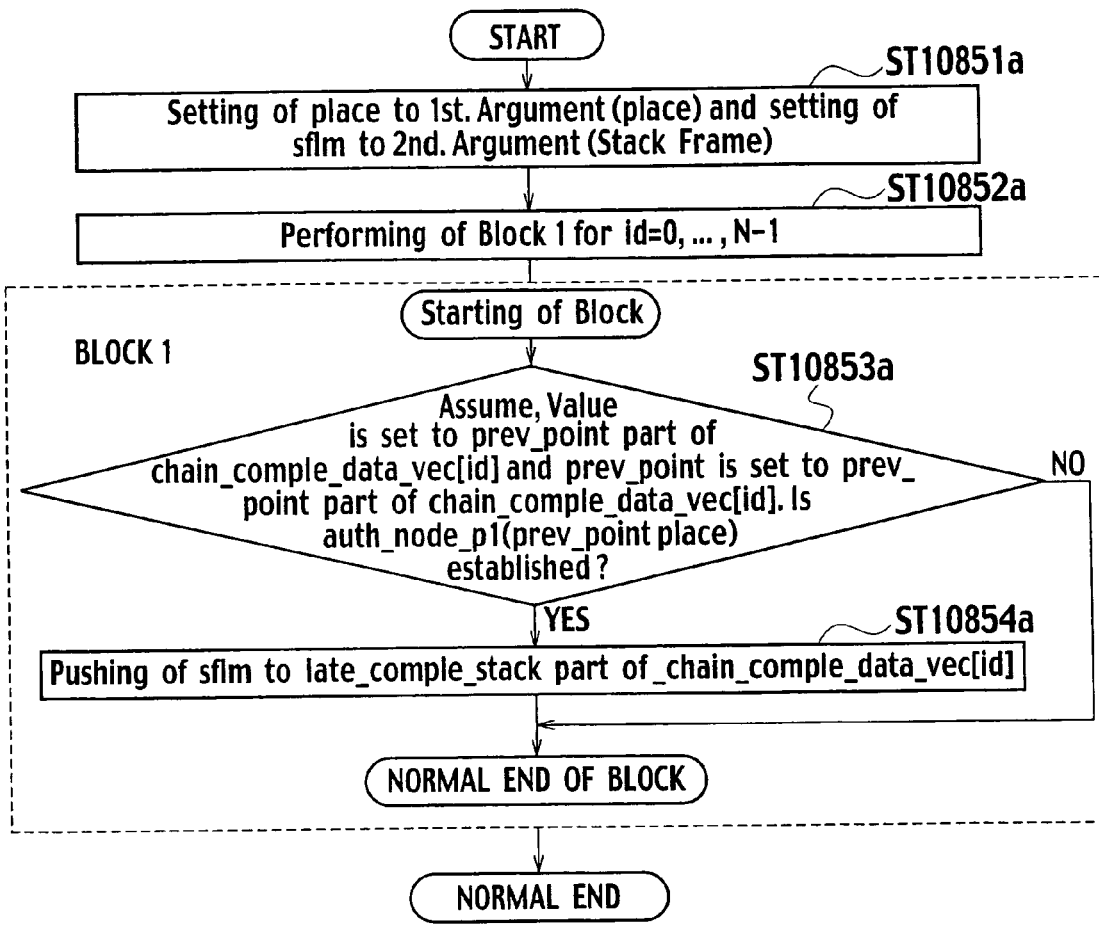
FIG. 53 is a flow chart explaining one example of a delay-data setting procedure in the chain complementary procedure in the event-ordering certification system of the fifth embodiment of the present invention.

FIG. 52 shows a node-value calculation procedure COMP_NODE_VALS which is called out from the procedure GET_REQ of FIG. 51. Variables and functions used in this procedure are as follows:

sflm1b: a variable for retaining a stack frame;
place1b: a variable for retaining a place;
idx1b: a variable for retaining an integer;
lev1b: a variable for retaining a stack frame;
val1b: a variable for retaining digital data (hash function, normally);
sflm0b: a variable for retaining a stack frame;
place0b: a variable for retaining a place;
lev0b: a variable for retaining a stack frame;
lev_nw and idx_nw: variables for retaining a stack frame;
floor(x): a function for returning a maximum integer that does not exceed x (x: an actual number as argument). For y ($\neq$0), floor(x, y)=floor(x/y). That is, floor(x, y) is an integral quotient as a result of dividing x by y; and
hash_comp2 (val0, val1): a function for returning a result of applying a designated hash function (SHA1 etc.) on a junction between val0 and val1 (val0, val1: two digital data represented by bit rows as arguments):

FIG. 53 shows a late data setting procedure REGISTER_COMPLE_DATA which is called out from the procedure GET_REQ of FIG. 51 and the procedure COMP_NODE_VALS. Variables and functions used in this procedure are as follows:

place: a variable for retaining a place; sflm: a variable for retaining a stack frame;
id: a variable for retaining an integer representing a user identification number;
N: a variable for retaining the total number of users on registration;
auth_node_p1 (prev_pont, place): Having arguments of a sequential leaf identification number "prev_pont" and "place", the "auth_node_p1 (prev_pont, place)" is a function for returning "true" or "false" when an assigned value of the "place" is to be included in the late complementary data of "prev_pont". In connection, if assuming "place"=(j, i), the requisite/sufficient condition to accomplish "true" in the auth_node_p1 (prev_pont, place) is to attain "floor(prev_pont, $2^j$)" is an even number, and i=floor(prev_pont, $2^j$)+1.

Figure 54:
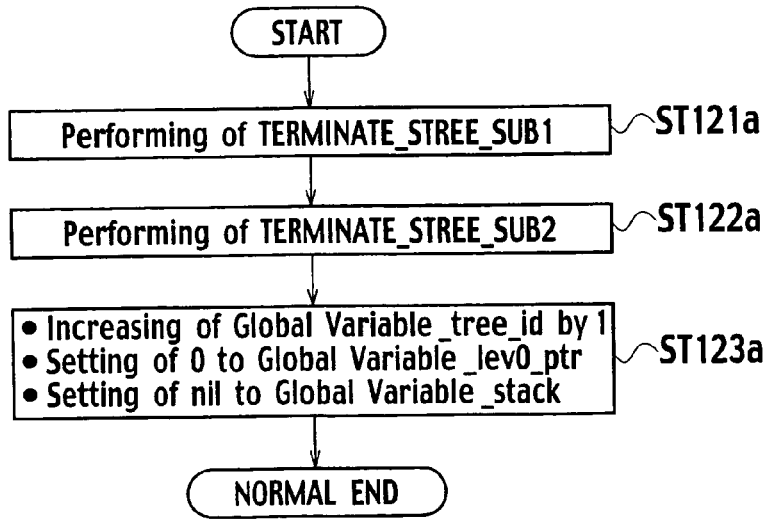
FIG. 54 is a flow chart explaining one example of a switching process of a sequential aggregation tree in the chain complementary procedure in the event-ordering certification system of the fifth embodiment of the present invention.
Figure 55:
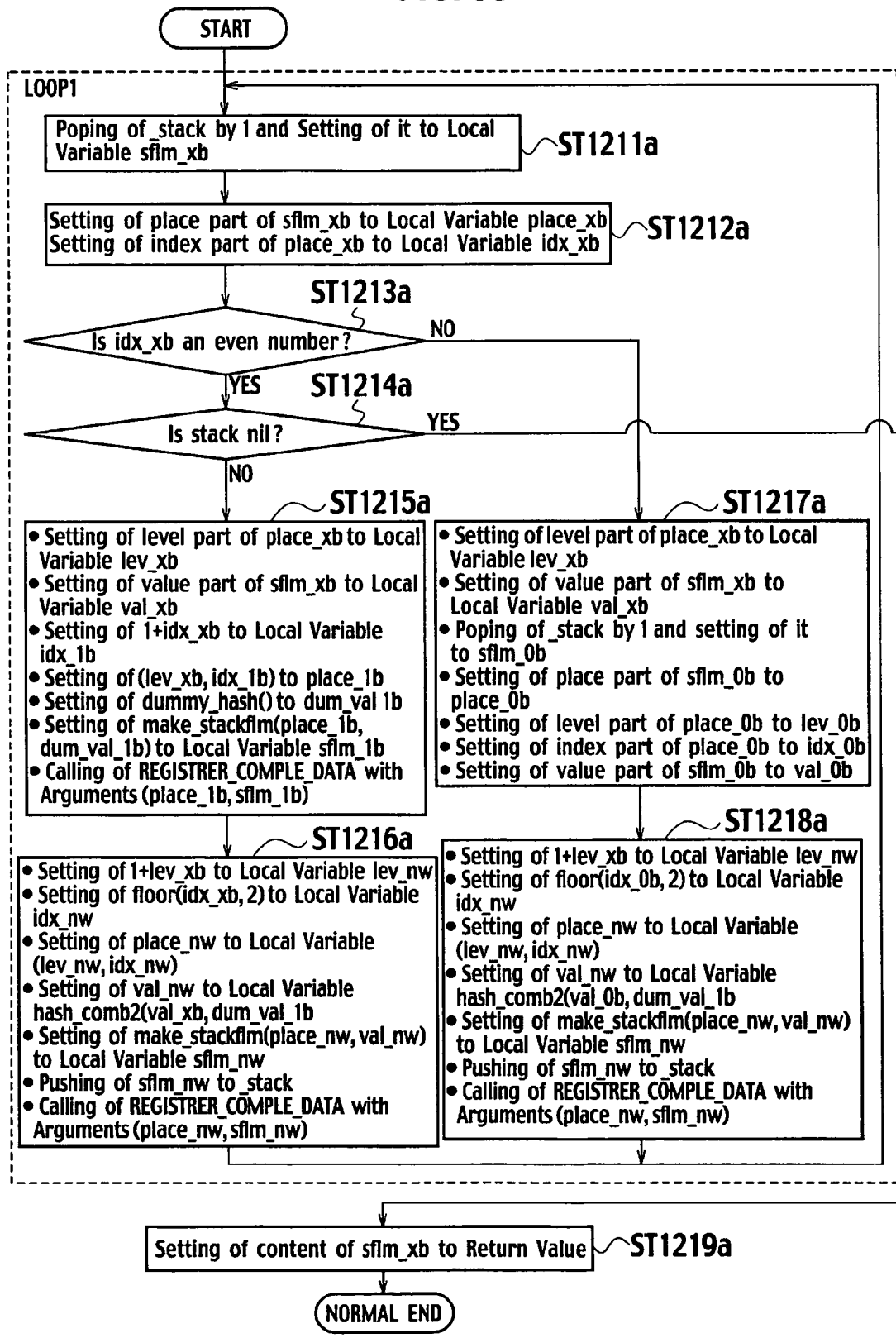
FIG. 55 is a flow chart explaining one example of a subroutine of a terminal-switching process of the sequential aggregation tree in the chain complementary procedure in the event-ordering certification system of the fifth embodiment of the present invention.
Figure 56:
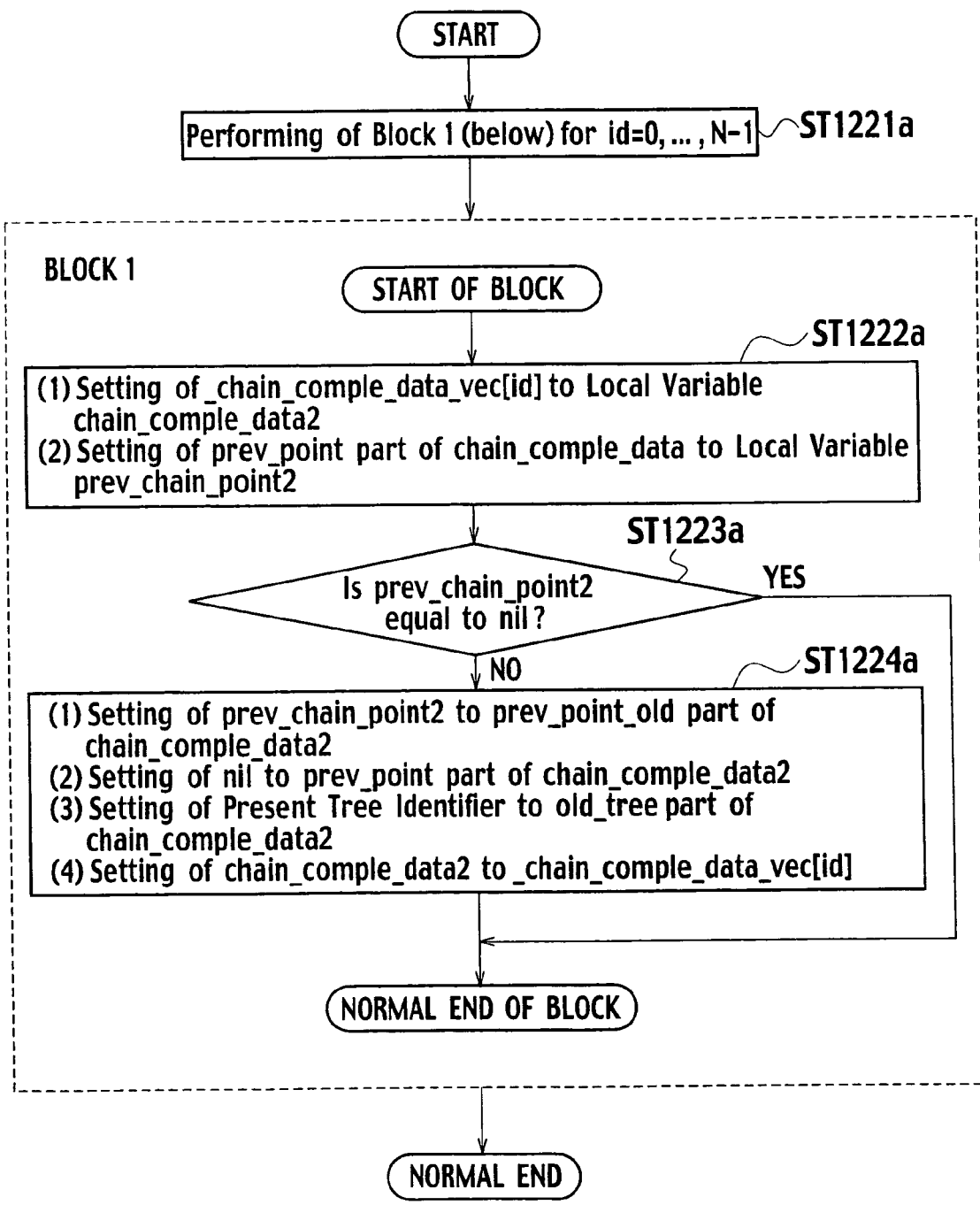
FIG. 56 is a flow chart explaining one example of a subroutine of the switching process of the sequential aggregation tree in the chain complementary procedure in the event-ordering certification system of the fifth embodiment of the present invention.

Referring to FIGS. 54 to 56, we now describe a "sequential aggregation tree" changing process of completing to form a sequential aggregation tree on completion of one aggregating period and successively initializing to form a next sequential aggregation tree for a next aggregation period.

FIG. 54 shows a main routine of the sequential aggregation tree changing process. In the routine, after executing a subroutine TERMINATE_STREE_SUB1 of FIG. 55 and a subroutine TERMINATE_STREE_SUB2 of FIG. 56, a global variable "_tree_id" is increased by 1 to initialize two global variables "_lev0_ptr" and "_stack" and thereafter, the routine is ended. These global variables are ones that are used in the procedure GET_REQ of FIG. 51.

In the subroutine TERMINATE_STREE_SUB1 of FIG. 55, there are is executed to add nodes as occasion demands on a basis of a sequential aggregation tree under construction at the point of completing the aggregation period, assign designated hash values to these nodes in accordance with a predetermined procedure and further define a root value of the relevant sequential aggregation tree.

Figure 57:
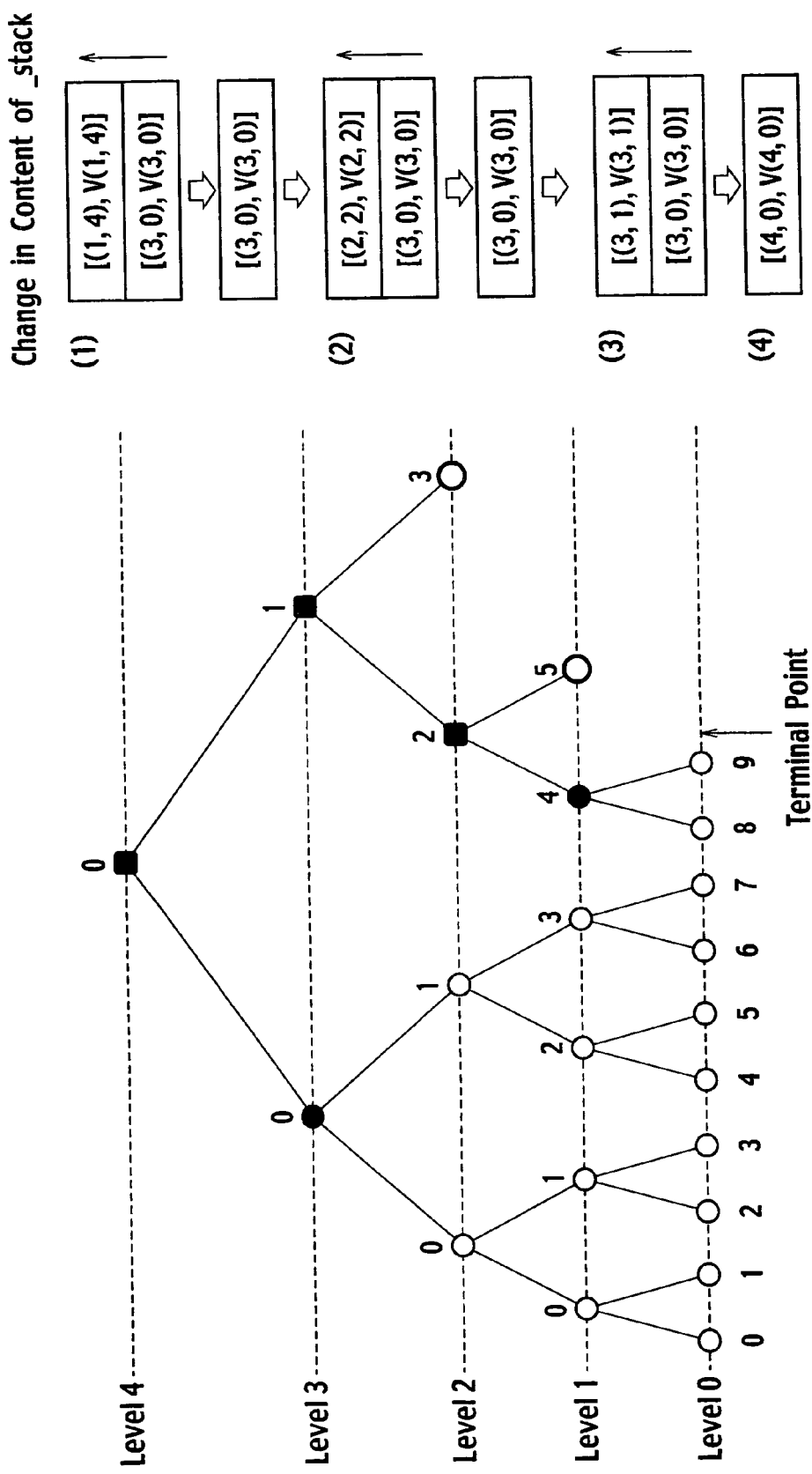
FIG. 57 is a diagram explaining the process of FIG. 55 in detail.

Referring to FIG. 57, the operation of TERMINATE_STREE_SUB1 will be described in response to a specific situation, in detail. Suppose a situation where the aggregation period has finished after completing the process of a leaf identification number (ID. No.) 9 and before staring the process of a leaf ID. No. 10 and therefore, the operation of TERMINATE_STREE_SUB 1 is called out. It is noted that "_stack" contains [(1, 4), V(1, 4)] and [(3, 0), V(3, 0)] in view from top. Owing to the operation of TERMINATE_STREE_SUB1, it becomes possible to assign dummy hash values to nodes (1, 5) and (2, 3) thereby determining a root value of this sequential aggregation tree and simultaneously possible to define the perfect authentication path data (i.e. an aggregate of authentication path nodes allowing calculation of a root value), as follows.

(1) At step ST1211a, it is executed to set [(1, 4), V(1, 4)] to the local variable sfml_xb, so that "_stack" contains [(3, 0), V(3, 0)] only. Next, at step ST1212a, it is executed to set (1, 4) to the local variable place_xb and 4 to the local variable idx_xb.

At step ST1213a, it is executed to judge whether the idx_xb is an even number or an odd number. In this case, because of "4", the routine goes to step ST1214a.

At step ST1214a, it is executed to judge whether the _stack is nil or not. In this case, as the _stack is not nil, the routine goes to step ST1215a.

At step ST1215a, it is executed to set 1 to the local variable lev_xb, V(1, 4) to val_xb and set 5(=1+4) to idx_1b. Further, (lev_xb, idx_1b)=(1, 5) is set to place_1b. This positional information (1, 5) represents a first dummy node. Then, it is executed to call out a function "dummy hash" to calculate a hash value to be assigned to the first dummy node and further executed to set its return value to "dum_val_1b". Additionally, it is executed to set "sfml_1b" as make-stackflm(place_1b, dum_val_1b)=[(1, 5), dum_val_1b].

Here, "make-stackflm" is a function of producing a stack frame while setting the positional information about node and its hash value as arguments. Here, while setting place_1b and sfml_1b as arguments, there is called out REGISTER_COMPLE_DATA (defined with FIG. 53).

At next step S1216a, it is executed to set 2 to "lev_nw", floor(idx_xb, 2)=floor(4, 2)=2 to "idex_nw" and set(2, 2) to "place_nw". In succession, it is executed to set hash_comb2 (val_xb, dum_val_1b) to "val_nw". On establishment of two hash values as arguments, "hash_comb2" is a function of returning a result of applying a designated hash function to a junction between these hash values. Setting "make_stackflm (place_nw, val_nw)" to "sflm_nw", "sflm_nw" is pushed against "_stack". Consequently, "_stack" has a structure including [(2, 2), V(2, 2)] and [(3, 0), V(3, 0)]. Further setting both place_nw and sflm_nw as arguments, there is called out REGISTER_COMPLE_DATA. Then, the routine is returned to step S1211a.

(2) At step ST1211a, it is execute to pop "_stack" by one and set [(2, 2), V(2, 2)] to "sflm_xb" (Here, the state of "_stack" becomes [(3, 0), V(3, 0)].). Additionally, it is executed to set (2, 2) and 2 to "place_xb" and "idx_xb', respectively.

At step S1213a, it is judged that the value "idx_xb" of 2 is an even number and successively, the routine goes to step S1214a. As the value "_stack" is not nil, the routine goes to step S1215a. At this step, there are established 2 for "lev_xb", V(2, 2) for "val__1b", 3 for "idx__1b", (2, 3) for "place__1b" and a return value of dummy_hash for "dum_val__1b", respectively. Assume that this return value of dummy_hash is represented by V(2, 3). Further, it is executed to set make-stackflm(place__1b, dum_val__1b)=[(2, 3), V(2, 3)] to "sflm__1b". Here, setting both "place__1b" and "sflm__1b" as arguments, there is called out REGISTER_COMPLE_DATA.

Next, at step ST1216a, it is executed to set 3 to "lev_nw", floor(val_xb, 2)=floor(2, 2)=1 to "idex_nw" and set (3, 1) to "place_nw". In succession, it is executed to set hash_comb2 (val_xb, dum_val__1b) to "val_nw". This value is represented by V(3, 1). Setting "make_stackflm((3, 1), V(3, 1))" to "sflm_nw", "sflm_nw" is pushed against "_stack". Consequently, "stack" has a structure including [(3, 1), V(3, 1)] and [(3, 0), V(3, 0)]. Further setting both place_nw and sflm_nw as arguments, there is called out REGISTER_COMPLE_DATA. Then, the routine is returned to step S1211a.

(3) At step ST1211a, it is execute to pop "_stack" by one and set[(3, 1), V(3, 1)] to "sflm_xb" (Here, the state of "_stack" becomes [(3, 0), V(3, 0)].). Additionally, it is executed to set (3, 1) and 1 to "place_xb" and "idx_xb', respectively.

At step S1213a, it is judged that the value "idx_xb" of I is an odd number and successively, the routine goes to step S1217a. At this step, there are established 3 for "lev_xb" and V(3, 1) for "val__1b", respectively. It is execute to pop "_stack" by one and further establish so-popped [(3, 0), V(3, 0)] to "sflm0b". Further, there are established "place__0b" of (3, 0), "lev__0b" of 0, "idx__0b" of 0 and "val__0b" of V(3, 0), respectively.

Next, at step ST1211a, it is executed to set 4 to "lev_nw", floor(1, 2)=0 to "idex_nw" and set (4, 0) to "place_nw". In succession, it is executed to set hash_comb2(V(3, 0), V(3, 1)) to "val_nw". This value is represented by V(4, 1). Setting "make_stackflm((4, 0), V(4, 0))" to "sfml_nw", "sfml_nw" is pushed against "_stack". Consequently, "_stack" has a structure including [(4, 0), V(4, 0)]. Further setting both place_nw and sflm_nw as arguments, there is called out REGISTER_COMPLE_DATA. Then, the routine is returned to step S1211a.

(4) At step ST1211a, it is execute to pop "_stack" by one and set [(4, 0), V(4, 0)] to "sflm_xb" (Here, the state of "_stack" becomes nil.). Additionally, it is executed to set (4, 0) and 0 to "place_xb" and "idx_xb', respectively. At step S1213a, it is judged that the value "idx_xb" of 0 is an even number and successively, the routine goes to step S1214a. As the value "_stack" is nil, the routine goes to step S1219a to set V(4, 0) as a return value and thereafter, the routine is ended.

Consequently, the return value in this procedure becomes V(4, 0) that is a root value of the relevant sequential aggregation tree.

Next, we describe a subroutine TERMINATE_STREE_SUB2 of FIG. 56.

First, the following variables and functions are employed:
a variable id for retaining a nonnegative integer as the identifier of the user apparatus;
a constant number N representing the total number of user apparatuses;

"chain_comple_data2" having the same structure as respective elements forming the array_chain_comple_data_vec for a late complementary stack of FIG. 50;
a variable prev_chain_point2 for retaining a nonnegative integer or nil.

Next, the operation of TERMINATE_STREE_SUB2 will be described.

For each "id" (id=0, 1, . . . , N−1), the block 1 of FIG. 56 is carried out.

In the block, the following operations are performed:

It is executed to set "_chain_comple_data_vec[id]" to "chain_comple_data2" and further set "prev_point" part of "chain_comple_data" to "prev_chain_point2" (step ST1222a);

If "prev_chain_point2" is nil, then it is executed to complete the block 1 (step ST1223a).

If not, there are established "prev_chain_point2" for "prev_point_old" part of "chain_comple_data2", nil for "prev_point" part, the present sequential aggregation tree for "old_tree" part, respectively. Next, "chain_comple_data2" is set to "_chain_comple_data_vec[id]" (step ST1224a).

<5-4. Incremental Completion in User Apparatus 5I>

Next, the incremental completion in each user apparatus 5I will be described in detail. The incremental completion is roughly classified to (1) incremental individual completion and (2) incremental aggregate completion, either of which is carried out by the user apparatus 5I. Note that the above-mentioned "propagation procedure of completion" relates to an explanation of one function of the incremental aggregate completion.

(Incremental Individual Completion)

Assume that a registration point af is a provisional terminal point that belongs a certain aggregation interval I of the user apparatus 5A or coincides with a first registration point in the next aggregation interval.

In case of the first registration point in the next aggregation interval to the certain aggregation interval, "af" will be referred to as "postscript point to the relevant aggregation interval".

Assume that an aggregate of registration points registered till the provisional terminal point af during the aggregation interval I is represented by a(0), a(1), . . . , a(n). [Note, although there is normally established a(n)=af, this relationship is not realized in case of "af" of a postscript point.]

Then, by the aggregate of registration points, one or more sequential aggregation small trees are formed with the provisional terminal point of "af". This aggregate of sequential aggregation small trees will be referred to as "sequential aggregation forest having the provisional terminal point af", after.

Figure 58:
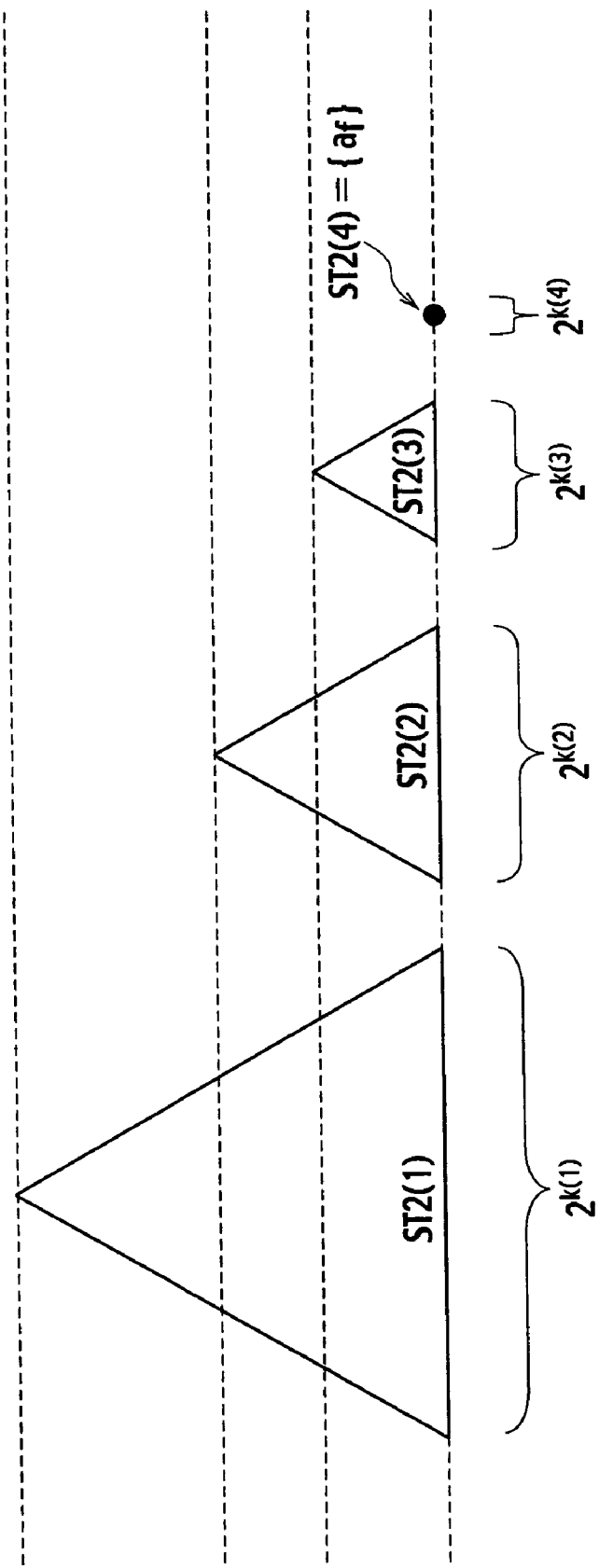
FIG. 58 is a diagram explaining a sequential aggregation forest and a sequential aggregation tree.

Referring to FIG. 58, the sequential aggregation forest and small trees will be described in detail.

When "af" is in the relevant aggregation interval, it is assumed that "af" represents a leaf number (nonnegative integer) and that "1" stands at $k(1), k(2), \ldots, k(m)$-digit in the binary-coded notation of "af". However, the minimum digit is established as 0-digit. In FIG. 58, "m" is set to 4 (m=4). Here, k(m) may be equal to 0. The relationship of $k(1)>k(2)>k(3)> \ldots >k(m)$ has to be established. Then, the number of leaves in the $n^{-th}$. sequential aggregation small tree belonging to the above sequential aggregation forest amounts to $2^{k(n)}$. In FIG. 58, ST2(1), . . . , ST2(4) denote sequential aggregation small trees.

The incremental individual completion is to perform the following calculations (1) to (3) for designated $a \in \{a(0), a(1), \ldots, a(n)\}$:

(1) Calculating of a sequential aggregation small tree (determined uniquely) belonging to a;

(2) Calculating of one or more assigned values for one or more roots of one or more sequential aggregation small trees positioned on the left of the above ST in the sequential aggregation forest from the complementary data at the leaves a(0), . . . , a(n) (and "af"); and (3) Calculating of assigned values of nodes belonging to authPathST(a) from the complementary data at the leaves a(0), . . . , a(n) (and "af"). Here "authPathST(a)" represents an authentication path of a in ST.

Note that the definition of incremental individual completion may be accomplished with the use of a "present-moment" sequential aggregation tree defined as follows. In connection with the "present-moment" sequential aggregation tree, a minimum binary tree including a sequential aggregation tree having the provisional terminal point "af" will be referred to as "present-moment sequential aggregation tree having the provisional terminal point af", after.

Figure 59:
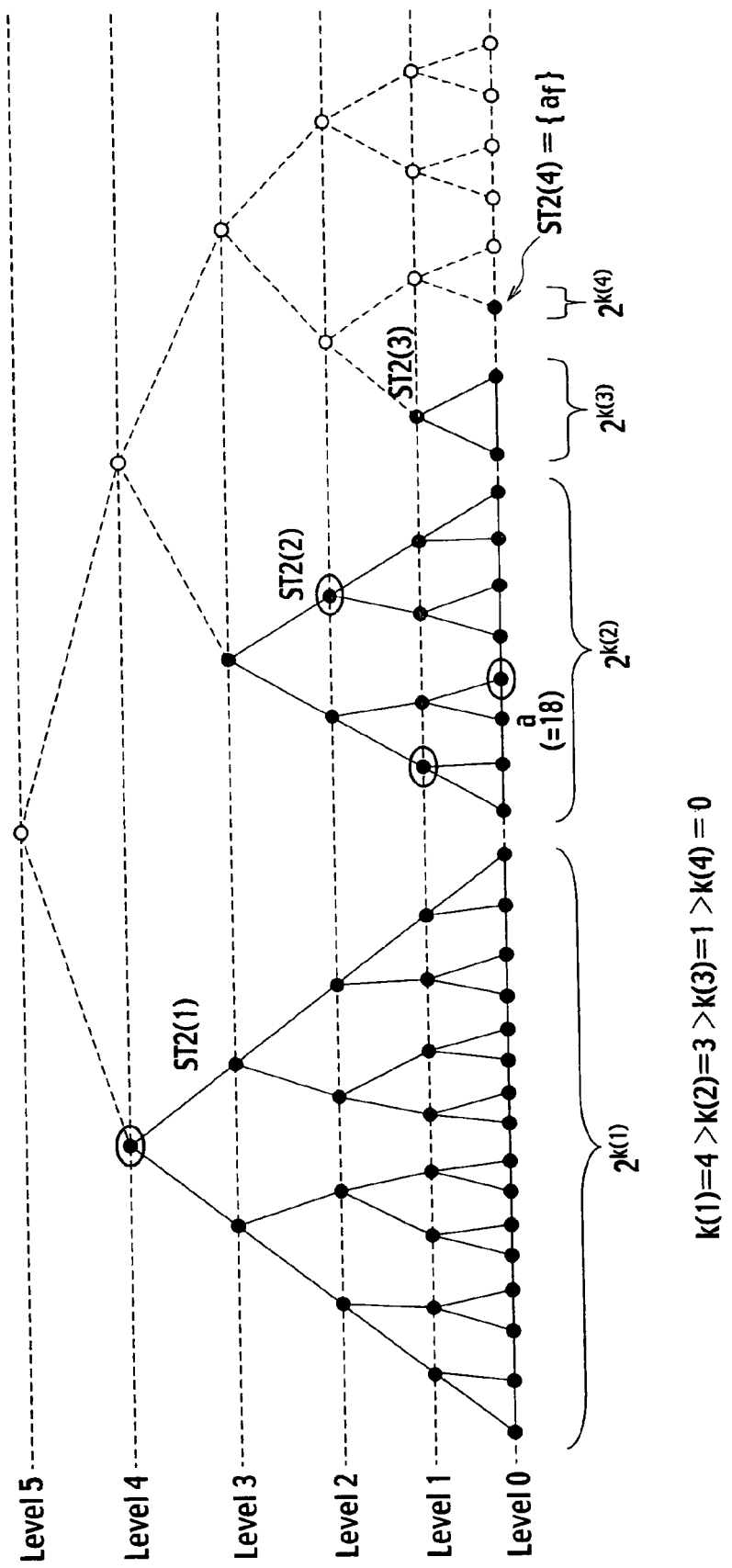
FIG. 59 is a diagram explaining the sequential aggregation forest and a sequential aggregation tree of the moment.

FIG. 59 shows a present-moment sequential aggregation tree where its branches are indicated with solid and broken lines. In the branches, branches indicated with broken lines are branches that are not included in a sequential aggregation forest but added in order to form the present-moment sequential aggregation tree. Black circles designate nodes included in the sequential aggregation tree, while white circles designate node added in order to form the present-moment sequential aggregation tree. The present-moment sequential aggregation tree is represented by CST, while the authentication path of a in CST is represented by authPathCST(a). The incremental individual completion is equivalent to the calculating of assigned values of nodes, which belong to authPathCST(a) and of which assigned values have been already determined, from the complementary data acquired at leaves a(0), . . . , a(n) (and "af") about designated a∈{a(0), a(1), . . . , a(n)}.

Note that if the total number of leaves in the sequential aggregation forest is represented by N, a height h of the sequential aggregation tree at the present moment becomes a minimum nonnegative integer k satisfying $N \leq 2^k$.

Returning to FIG. 38 for explanation of the second validation function in the light of the above-mentioned argument, when performing the incremental individual completion with "af" as the provisional terminal point against the registration point a, it becomes possible to calculate an assigned value V(o) for an authentication point o. Consequently, if the immediate complementary data acquired at the registration point b contains the calculated assigned value V(o) for an authentication point o of the registration point a by the registration point b in the present-moment sequential aggregation tree having the registration point "af" as the present moment, the it is possible to certify that the registration of the registration point a occurred in advance of the registration of the registration point b.

Figure 60:
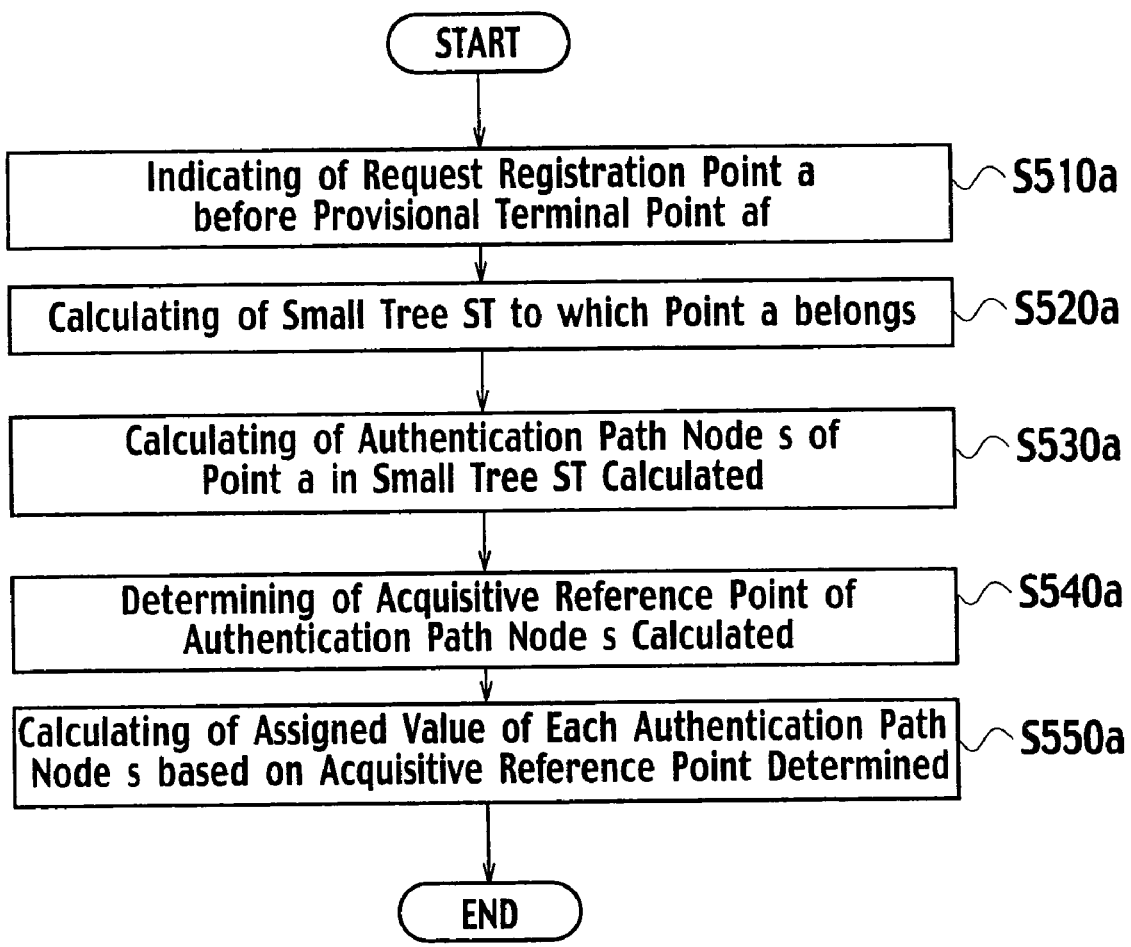
FIG. 60 is a flow chart explaining the operation of an incremental perfect individualization in the chain complementary procedure in the event-ordering certification system of the fifth embodiment of the present invention.
Figure 61:
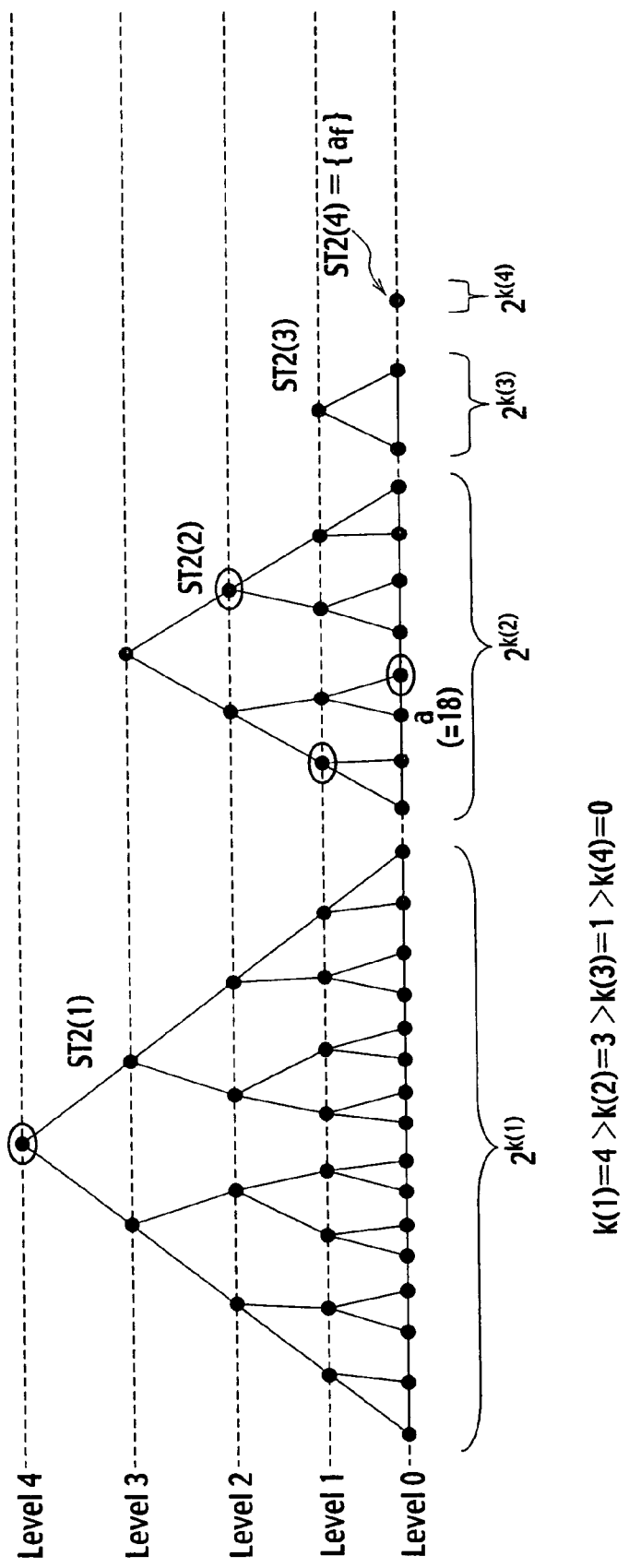
FIG. 61 is a diagram explaining the process of FIG. 60 in detail.

Next, referring to FIGS. 60 and 61, the operation of incremental individual completion will be described. FIG. 60 is a flow chart showing the operation of incremental individual completion.

First, it is executed to indicate one registration point a which precedes the provisional registration point af and belongs to the aggregation interval I (step S510a). In a sequential aggregation forest of FIG. 61, a leaf with index 18 [i.e. node(0, 18)] constitutes a.

Next, it is executed to calculate the sequential aggregation small tree ST to which the registration point a (step S520a). In the sequential aggregation forest shown in FIG. 61, the second sequential aggregation small tree ST2(2) from the left constitutes the tree ST.

Next, it is executed to calculate respective late authentication path nodes s of the registration point a in the tree ST (step S530a). In the sequential aggregation forest of FIG. 61. Both leaf (node(0, 19)) of index 19 and node(2, 5) of index 5 at level 2 form the late authentication path nodes.

Next, it is executed to determine acquisitive reference points of the respective late authentication path nodes s (step S540a). Now, we describe the acquisitive reference points and acquisitive timing points. Note that in the following descriptions, a combination between the immediate complementary data of a certain registration point a and the late complementary data of the point a acquired at the next registration point a1 will be referred to as "chain complementary data of the registration point a", hereinafter.

If a registration point a0 is given, a requested registration point that allows information enough to calculate an assigned value V(j, s(j)) of a node (j, s(j)) at level j in the authPath(a0) to be acquired from either its complementary data or a calculation based on the complementary data, will be referred to as "acquisitive reference point of V(j, s(j))". Then, we refer to a registration point to receive the above necessary complementary data as "acquisitive timing point".

For instance, if a registration point X3 is given in the sequential aggregation tree of FIG. 38, the acquisitive reference point of a node(0, 19) being one of the late complementary data becomes a registration point X3 (node(0, 18)), while the acquisitive timing point becomes a registration point X4 (node(0, 21)). Again, if the registration point X3 is given, the acquisitive reference point and acquisitive timing point of a node(0, 4) being one of the immediate complementary data become a registration point X3 (node(0, 18)). As for the immediate complementary data, generally, the acquisitive reference point coincides with the acquisitive timing point.

Next, based on the acquisitive reference point determined at step S540a, it is executed to calculate assigned value for the respective authentication path nodes s (step S550a).

In this way, the procedure for incremental completion at the registration point a is completed. When applying a "collision-resistant" hash function on an input containing the assigned value for the registration point a, with the use of the above calculation result, it becomes possible to calculate V(root(ST)). Note that the possibility of the above-mentioned calculation is based on the premise that both of the acquisitive reference point of each path node s and the acquisitive timing point are together positioned formerly of the provisional registration point af (Packaging Example of Incremental Individual Completion)

We now describe one example of the above-mentioned incremental individual completion.

Figure 62:
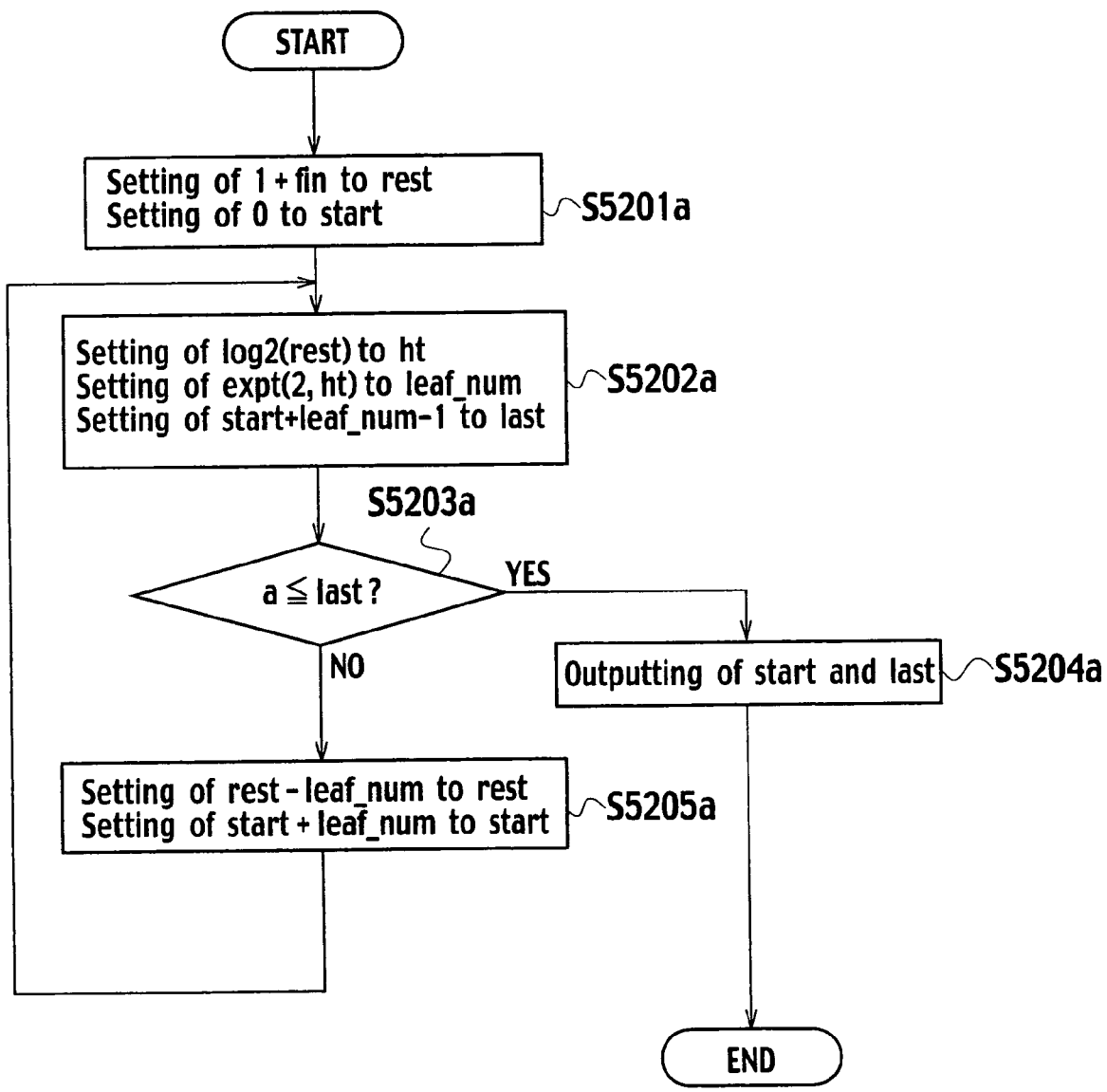
FIG. 62 is a flow chart explaining one example of a calculating procedure to determine a sequential aggregation small-tree in the incremental perfect individualization in the chain complementary procedure in the event-ordering certification system of the fifth embodiment of the present invention.

FIG. 62 shows a calculation procedure FOREST_SST for determining the sequential aggregation small tree ST. This routine corresponds to step S520a of FIG. 60.

Variables and functions used in this procedure are as follows:

as inputs, a leaf identifier a (nonnegative integer) and an identifier "fin" (nonnegative integer) of provisional terminal point;

as outputs, a leftmost leaf identifier "start" (nonnegative integer) in a sequential aggregation small tree containing a and a rightmost leaf identifier "last" (nonnegative integer) in the sequential aggregation small tree containing a;

as variables, respective variables "rest", "ht" and "leaf_rum" for retaining nonnegative integers; and as usable functions, $\log_2(x)$: a maximum integer less than $\log_2(x)$; expt(x, y): $x^y$.

Inputting the leaf identifier a (nonnegative integer) and the identifier "fin" (nonnegative integer) of the provisional terminal point and further assuming that "ST" represents a sequential aggregation small tree containing a and also belonging to the sequential aggregation tree at the point of completing the registration of the provisional terminal point, this algorithm outputs the leftmost leaf identifier "start" (nonnegative integer) and the rightmost leaf identifier "last" (nonnegative integer) in pairs. The number of leaves in the relevant sequential aggregation small tree amounts to "last–start+1" and the height of the relevant sequential aggregation small tree becomes $\log_2(\text{last–start+1})$.

The concrete example of FIG. 61 on application of the procedure of FIG. 62 is as follows. Let the leaf identifier a and the identifier "fin" of the provisional terminal point be 18 and 26, respectively. Then, the calculation in accordance with the procedure of FIG. 62 allows 16 to be returned as "start" while 23 to be returned as "last". From these outputs, it will be found that a sequential aggregation small tree to which "a" belongs is the tree ST2(2) in FIG. 61.

Figure 63:
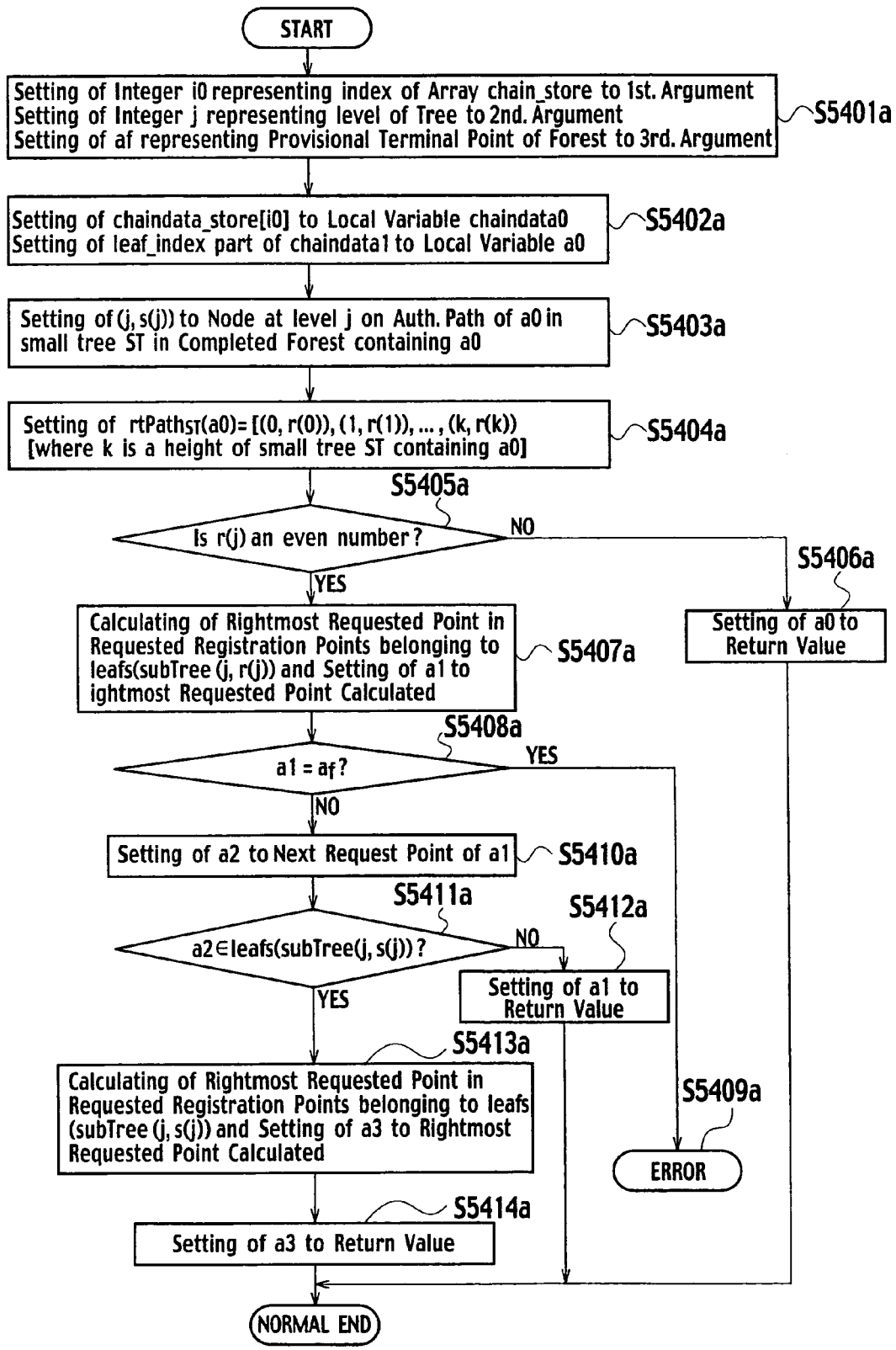
FIG. 63 is a flow chart explaining one example of a calculating procedure to determine an acquisition reference point in the incremental perfect individualization in the chain complementary procedure in the event-ordering certification system of the fifth embodiment of the present invention.

FIG. 63 shows a procedure DECIDE_GET_POINT_A of deciding an acquisitive reference point of an "authentication path node" assigned value in the incremental completion. This procedure is provided to decide which of requested registration points does provide, through its immediate complementary data or late complementary data, the assigned value for the authentication path node characterized by a designated requested registration point and a designated level. The procedure corresponds to step S540a of FIG. 60.

Figure 64:
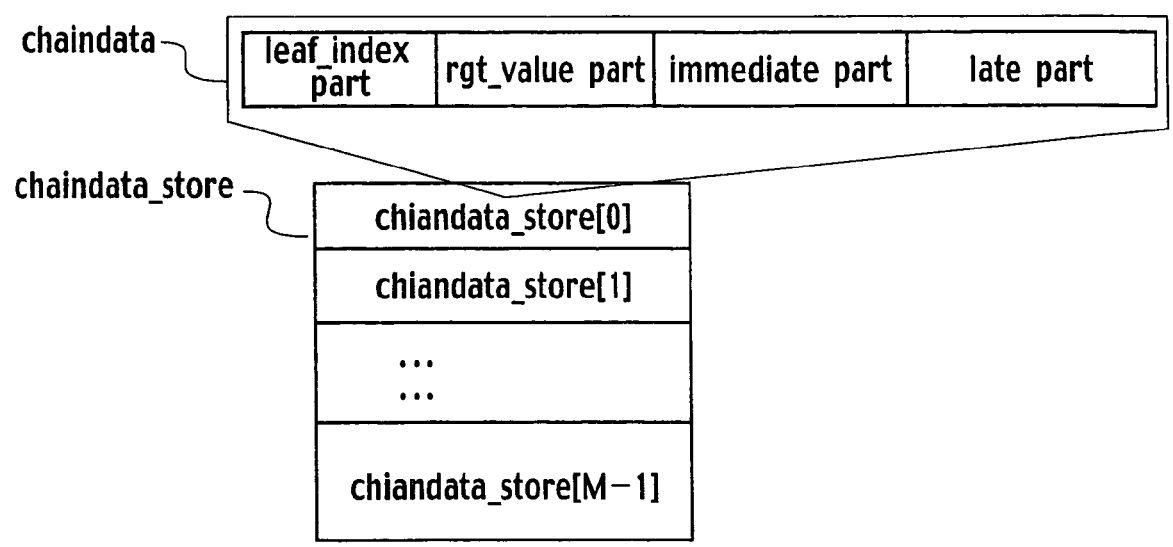
FIG. 64 is a diagram showing one example of a data structure for accumulating chain complementary data in the incremental individual completion in the chain complementary procedure in the event-ordering certification system of the fifth embodiment of the present invention.
Figure 65A:
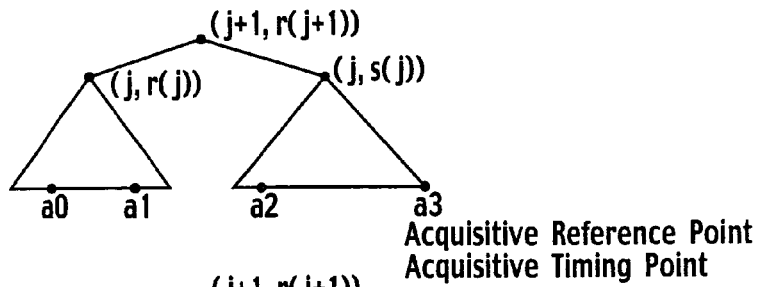
FIGS. 65A to 65F are diagrams explaining an algorism for the incremental perfect individualization in the chain complementary procedure in the event-ordering certification system of the fifth embodiment of the present invention.
Figure 65B:
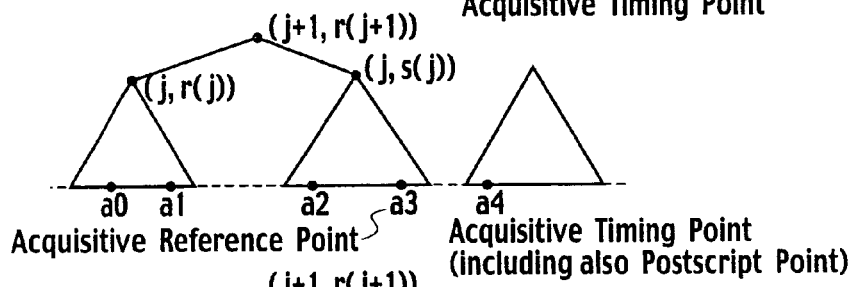
Figure 65C:
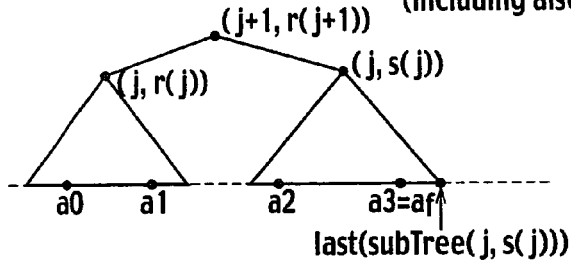
Figure 65D:
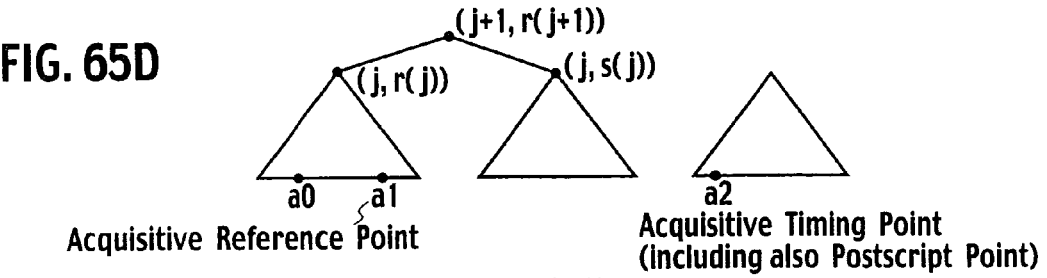
Figure 65E:
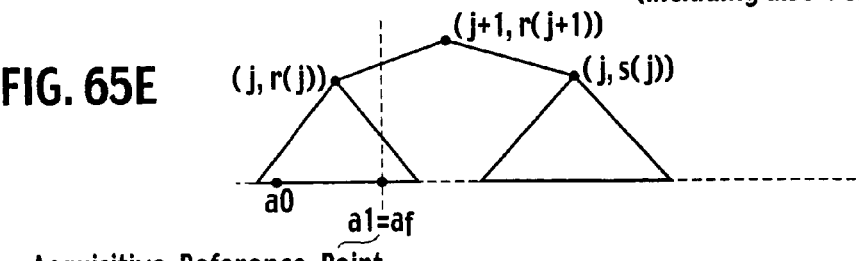
Figure 65F:
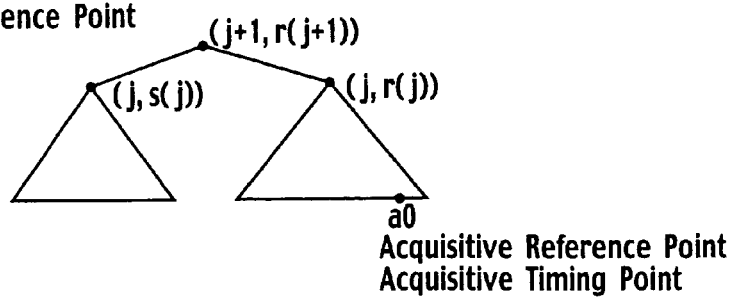

FIG. 64 shows a data structure and variables (part) employed in the procedure DECIDE_GET_POINT_A. The data structure "chaindata" comprises a leaf_index part, a rgt_value part, an immediate part and a late part. Let M be a maximum number of event-ordering requests transmitted from one user apparatus 5I during one aggregation interval.

The other variables and functions used in this procedure are as follows:

A variable "chaindata_store" is an array of elements (M: the number of elements) each retaining a data structure "chaindata" (see FIG. 64);

"chaindata0" is a variable for retaining the data structure "chaindata";

"a0" is a variable for retaining the data structure "chaindata";

For a node (j, i) of the sequential aggregation tree, "subTree (j, i)" represents a sub-tree forming a sequential aggregation tree having a root(j, i);

For a sub-tree ST of the sequential aggregation tree, "leafs (ST)" represents an aggregate of leaves in the tree ST. For instance, "leafs(subTree(j, i))" represents an aggregate of leaves of the subTree(j, i). Additionally, "height (ST)" represents a height of the tree ST.

Next, with reference to FIGS. 65A to 65F, we describe grounds for algorithm of the procedure (DECIDE_GET_POINT_A) of deciding the acquisitive reference point of the "authentication path node" assigned value in the incremental completion of FIG. 63.

Assume here that a sequential aggregation small tree that "a0" belongs to, which is one of small trees in the completed forest having the provisional terminal point of "af", is represented by "ST" (a0∈leafs(ST)).

Further, the authentication path of "a0" in the small tree ST is represented by authPathST(a0) where authPath*ST*(*a0*)=[(0, *s*(0)), (1, *s*(1)), . . . , (*k*–1, *s*(*k*–1))].

(Note that k is a height of the sequential aggregation small tree ST that "a0" in the completed forest belongs to. That is, k=height(ST).) In the following descriptions, for nonnegative integers n and m, it is assumed that [n . . . m] represents an aggregate of integers more than n and less than m.

For each j∈[0 . . . k–1], the algorithm to decide which of requested registration points does provide (j, s(j)) through its complementary data will be shown below.

Let "rtPathST(a0) ST" denote a root path of "a0" in the tree ST, where rtPathST(a0)=[(0, r(0)), (1, r(1)), . . . , (k–1, r(k–1)), (k, r(k))], r(0)=a0, and root(ST)=(k, r(k)). Assume that j∈[0 . . . k–1].

(1) If a node (j, r(j)) is a left-child of (j+1, r(j+1)), then s(j)=r(j)+1 while a node (j, s(j)) becomes a right-child of (j+1, r(j+1)). A rightmost point in the requested registration points belonging to leafs(subTree(j, r(j))) is calculated and represented by "a1".

(1-1) If a1≠af, it is assumes that the next requested registration point to "a1" is represented by "a2" (there exists such "a2" where a2≦af because a1≠af).

(1-1-1) If a2∈leafs(subTree(j, s(j))), a rightmost point in the requested registration points belonging to leafs(subTree(j, s(j))) is represented by "a3".

(1-1-1-1) If a3=last(leafs(subTree(j, s(j)))) (see FIG. 65A), the immediate complementary data immedData(a3) contains complete complementary data cmpltDATA(subTree(j, s(j)), a3) of the point "a3" in a tree subTree(j, s(j)). Thus, immedData(a3)|–V(j,s(j))

is established. (Note that "X|–Y" represents that Y can be calculated from X.)

Then, both the acquisitive reference point and the acquisitive timing point of V(j, s(j)) may be set to "a3" together.

(1-1-1-2) If a3≠last(leafs(subTree, s(j)))):

(1-1-1-2-1) If a3≠af (see FIG. 65B), the next requested registration point to "a3" is represented by "a4" (there exists such "a4" where a4≦af because a3≠af. The point "a4" may be a postscript point.).

If the level of an authentication point of "a3" by "a4" is represented by j', then j'≧j+1.

Thus, by the feature of a sequential aggregation tree, V(j, s(j)) can be calculated from the immediate complementary data acquired at "a3" and the late complementary data (for "a3") acquired at "a4". That is, immedData(a3)∪lateData(a3,a4)|–V(j,s(j))

is established. (Provided that a is an authentication point of "a3" by "a4", V(a) is included in the immediate complementary data "immedData(a4)". However it should be noted that it does not necessarily mean that V(a) coincides with V(j, s(j)).)

Then, the acquisitive reference point of V(j, s(j)) and its acquisitive timing point may be set to "a3" and "a4", respectively. Then, a3≦af and a4≦af.

(1-1-1-2-2) If a3=af (see FIG. 65C):

Then, in the completed forest having the provisional terminal point of "af", there is no sequential aggregation small tree containing (j, s(j)).

Therefore, there is no possibility that ST contains (j, s(j)). That is, such a situation is impossible.

(1-1-2) If not a2∈leafs(subTree(j, s(j))) (see FIG. 65D), there is realized V(j, s(j))∈lateData(a1, a2).

The acquisitive reference point of V(j, s(j)) may be set to "a1" while setting the acquisitive timing point V(j, s(j)) to "a2".

Then, a1≦af and a2≦af.

(1-2) If a1=af (see FIG. 65E):

Then, in the completed forest having the provisional terminal point of "af", there is no sequential aggregation small tree containing (j, s(j)).

Therefore, there is no possibility that ST contains (j, s(j)). That is, such a situation is impossible.

(2) If a node (j, r(j)) is a right-child of (j+1, r(j+1)) (see FIG. 65F), then r(j)=s(j)+1 while a node (j, s(j)) becomes a left-child of (j+1, r(j+1)).

V(j, s(j))∈immedData(a).

Both the acquisitive reference point of V(j, s(j)) and the acquisitive timing point may be set to "a0" together. Then, a0≦af.

From above, since the procedure (DECIDE_GET_POINT_A) of deciding the acquisitive reference point of the "authentication path node" assigned value in the incremental completion of FIG. 63 is formed by steps on consideration of all situations, it is found that the algorithm of FIG. 63 is reasonable.

Figure 66:
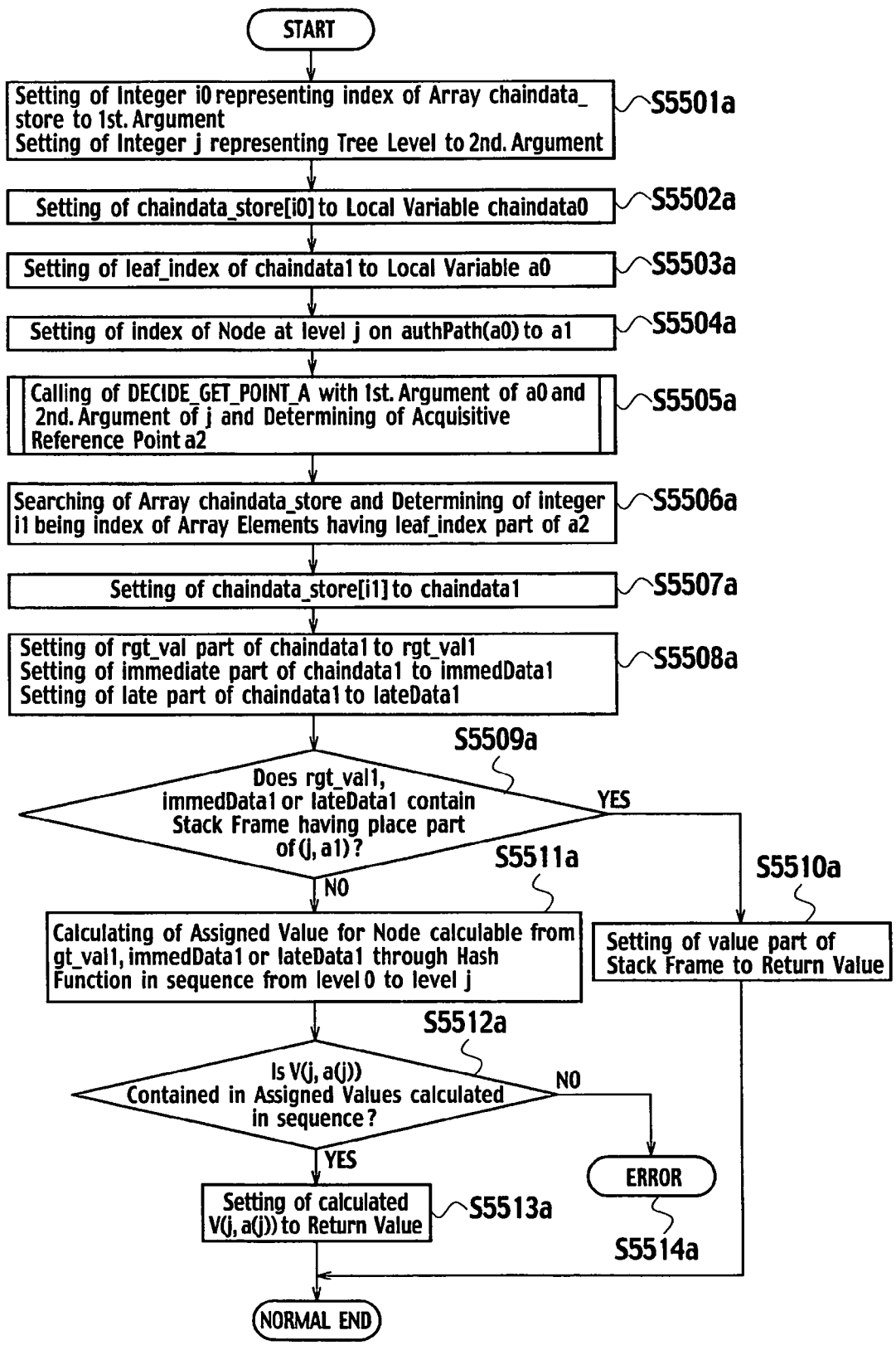
FIG. 66 is a flow chart explaining one example of a calculating procedure of a quota of an authentication path node for the incremental perfect individualization in the chain complementary procedure in the event-ordering certification system of the fifth embodiment of the present invention.

FIG. 66 shows a procedure COMPLETION_SUB1 for calculating an assigned value V(j, a(j)) of a node (j, s(j)) at level j contained in an authPath(a) when the requested registration point a is provided (note: 0≦j k; and "k" is a height of sequential aggregation tree.). In detail, FIG. 66 is a flow chart explaining step S550a of FIG. 70 mainly.

Variables and functions employed in this procedure are as follows:

chaindata0, chaindata1: variables for retaining a data structure "chaindata";

immedData1, lateData1: variables for retaining the linear list of a data structure "stackflm"; and chaindata_store: an array for storing data brought as certification replies at respective registration points during a relevant aggregation period.

Each element forming the array has a structure of "chaindata" defined with FIG. 64. In the array, an $i^{-th}$. element contains the immediate complementary data of an $i^{-th}$. registration point in the relevant aggregation period and the late complementary data of the $i^{-th}$. registration point, which is acquired at a registration point just behind the $i^{-th}$. registration point.

(1) It is executed to establish an integer i0 representing an index of the array chaindata_store as the first argument, and an integer j representing level of a sequential aggregation tree as the second argument (step S5501a).

(2) It is executed to establish chaindata_store[i0] for the local variable chaindata0 (step S5502a), leaf_index part of chaindata1 for the local variable a0 (step S5503a) and establish indexes of respective nodes at level j in authPath(a0) for the variable "a1" (step S5504a).

(3) In accordance with the above procedure DECIDE_GET_POINT_A described with FIG. 63, it is executed to determine an acquisitive reference point a2 of V(j, a(j)) (step S5505a). Note that "a2" is one of registration points, which allows a calculating of V(j, a(j)) from the chain complementary data acquired at the one registration point.

(4) It is executed to search the array chaindata_store and decide an integer "i1" forming the index of an array element whose leaf_index part is "a2" (step S5506a).

(5) It is executed to establish chaindata_store[i1] for the variable chaindata1 (step S5507a).

(6) It is executed to establish "rgt_val" part of chaindata1 for the variable rgt_val1, "immediate part" of chaindata1 for the variable immedData1 and establish "late" part of chaindata1 for the variable lateData1 (step S5508a).

(7) It is executed to judge whether a stack frame having its "place" part of (j, a1) is included in any one of "rgt_val1", "immedData1" or "lateData1" or not (step S5509a).

(7-1) If included, then it is executed to return the value (step S5510a).

(7-2) If not included, it is executed to calculate assigned values of nodes 'from level 0 up to level j) which are calculable from both "immedData1" and "lateData1" through a hash function, sequentially (step S5511a).

(7-2-1) It is executed to judge whether V(j, a(j)) is included in the above-calculated assigned values or not (step S5512a).

(7-2-1-1) If included, it is executed to return the value (step S5513a).

(7-2-1-2) If not included, it is executed to output "error" (step S5514a).

Figure 67:
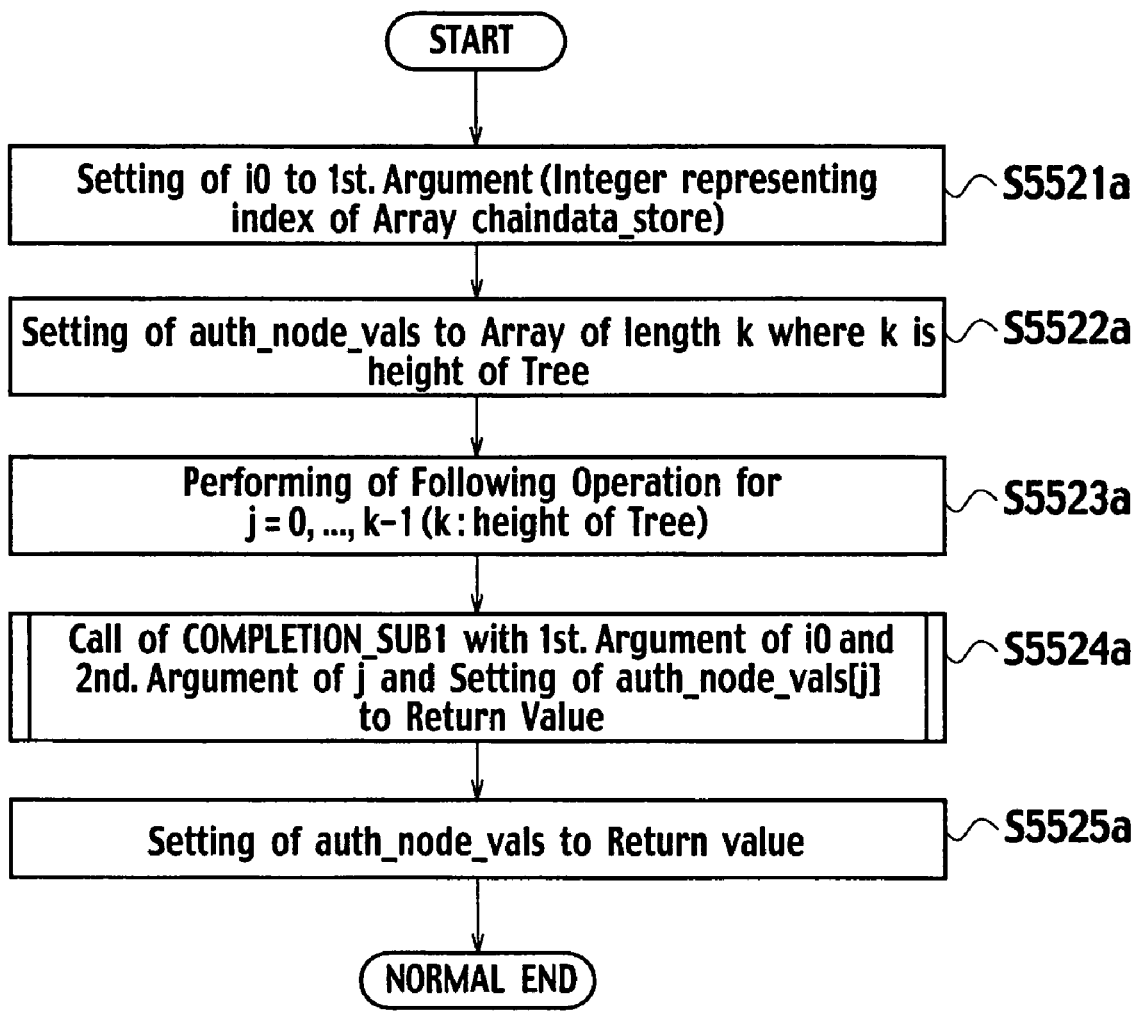
FIG. 67 is a flow chart explaining one example of a calculating procedure of respective quotas of the authentication path node for the incremental perfect individualization in the chain complementary procedure in the event-ordering certification system of the fifth embodiment of the present invention.

FIG. 67 shows a procedure COMPLETION_SUB1 for calculating a list [V(0, a(0)), V(1, a(1)), . . . , V(k−1, a(k−1))] of an assigned value V(j, a(j)) of a node (j, s(j)) at level j contained in an authPath(a) when the requested registration point a is provided (note that 0≦j<k and "k" is a height of sequential aggregation tree.).

Variables and functions employed in this procedure are as follows:

k: height of a sequential aggregation tree;

auth_node_vals: array (length: k) formed by array elements each retaining hash values.

First, it is executed to calculate assigned values of respective nodes belonging to authPath(a) by applying the procedure COMPLETION_SUB1 of FIG. 66 on each j (0≦j<k) and further store the calculation results in the array auth_node_vals (steps S5523a, S5524a).

Next, it is executed to establish the array auth_node_vals as return values and the routine is ended (step S5525a).

(Incremental "Bulk" Completion)

The above-mentioned incremental completion is a method of designating a receipt as an object for completion and further accomplishing an individual completion of the designated receipt. The following incremental completion is a method of designating a series of receipts acquired in sequence by one user apparatus 5I in block and further calculating the same data as those of the above incremental "individual" completion. This kind of incremental completion will be referred to as "incremental bulk completion", hereinafter. That is, the incremental bulk completion is to calculate the same data as those calculated by the above incremental "individual" completion, against all of successive registration points a(0), a(1), . . . , a(n).

The incremental bulk completion can be accomplished by the following procedure adopting the above-mentioned propagation procedure for completion.

(1) Assume that a(0), . . . , a(n) constitute a series of registration points belonging to a certain aggregation period I by a certain user apparatus 5I.

(2) Let "af" denotes the next registration point to a(n) of the user apparatus 5I. The point "af" may be a postscript point.

Figure 68:
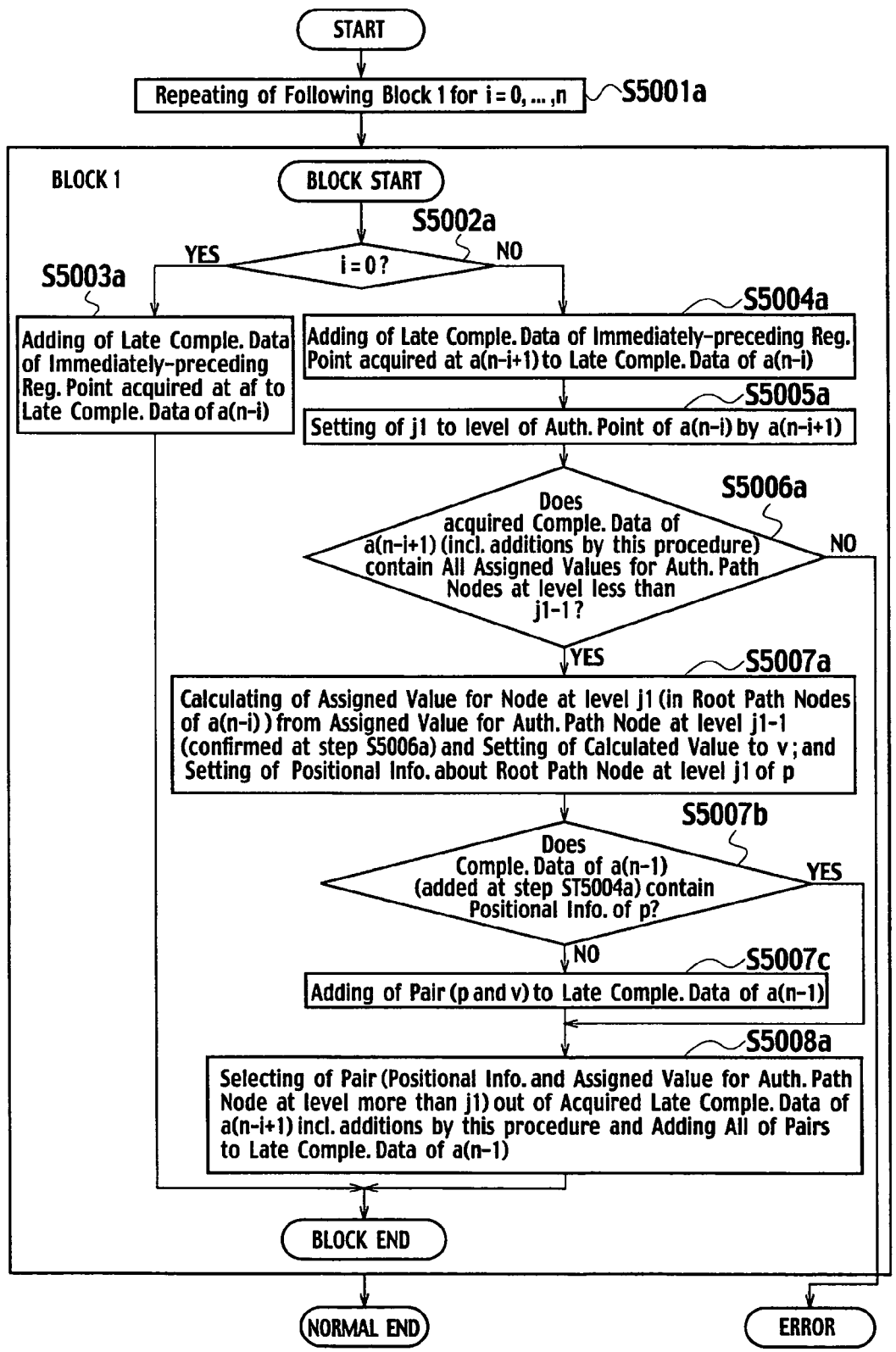
FIG. 68 is a flow chart explaining one example of a procedure of an incremental aggregated individualization in the chain complementary procedure in the event-ordering certification system of the fifth embodiment of the present invention.

(3) According to the procedure COMPLETION_BULK_BACKWARD1 of FIG. 68, it is executed to apply the incremental completion on a=a(n), . . . , a(0), in this order.

Figure 69:
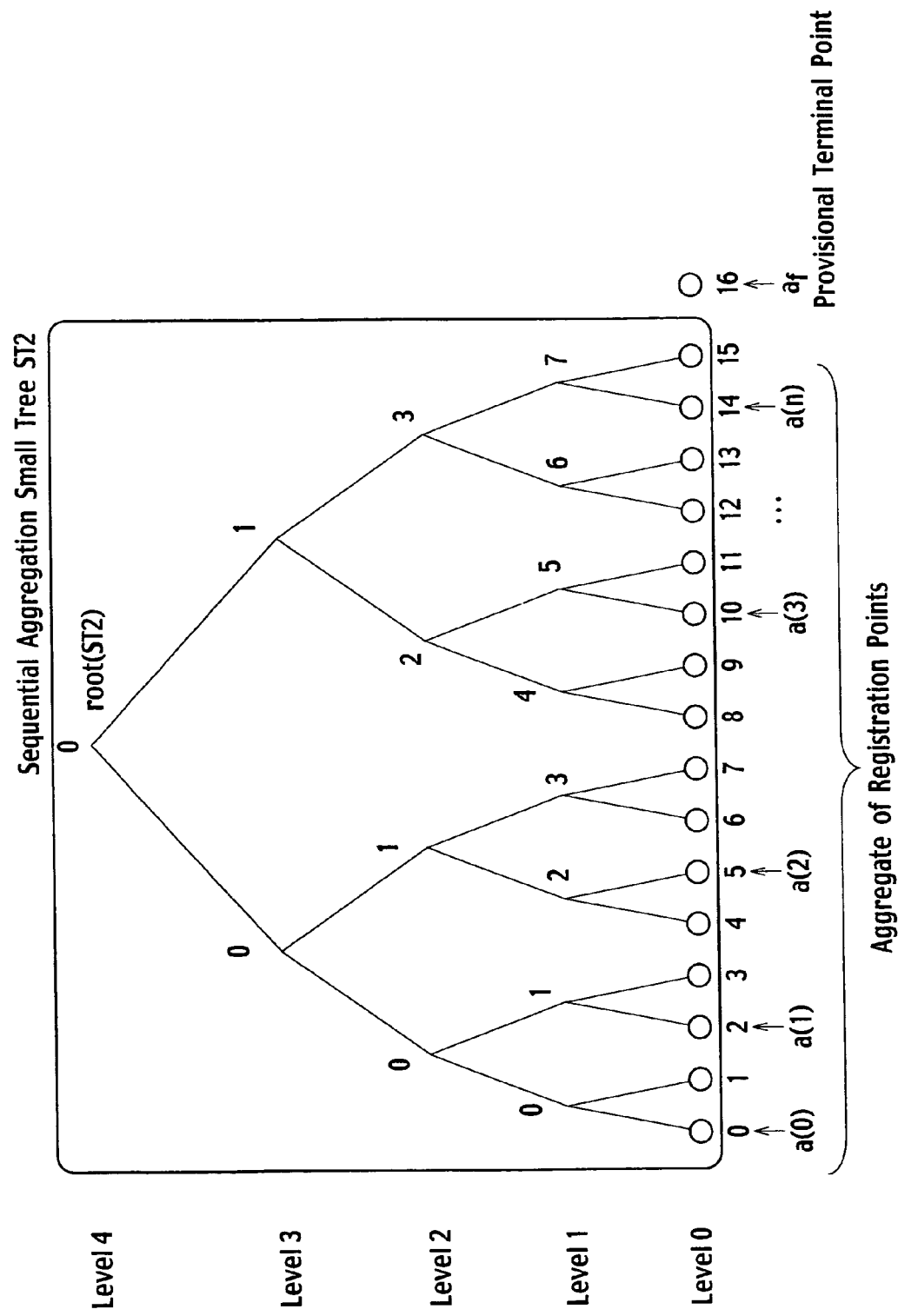
FIG. 69 is a diagram explaining grounds for the incremental aggregated individualization in the chain complementary procedure in the event-ordering certification system of the fifth embodiment of the present invention.
Figure 70:
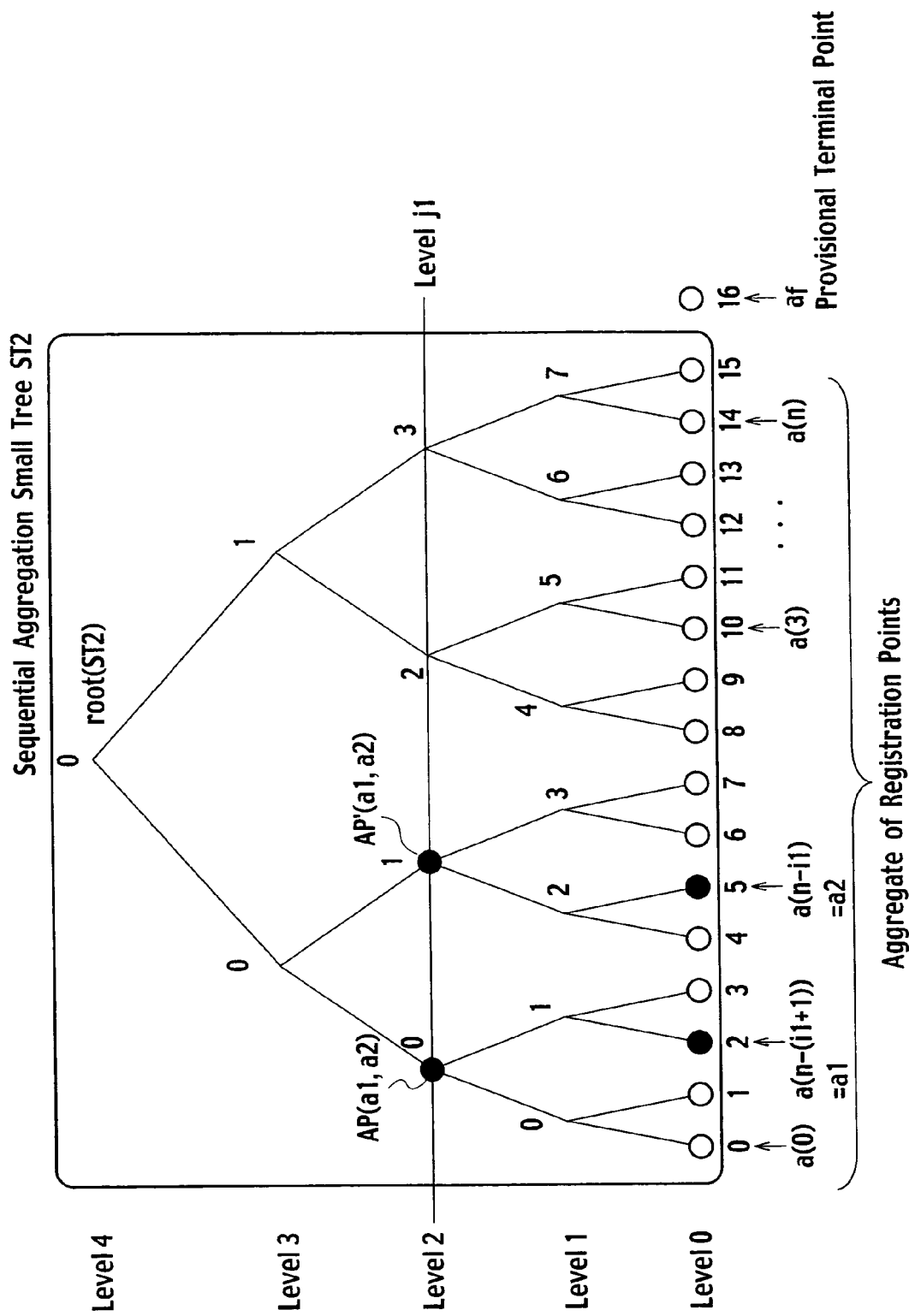
FIG. 70 is a diagram explaining grounds for the incremental aggregated individualization in the chain complementary procedure in the event-ordering certification system of the fifth embodiment of the present invention.

By mathematical induction, it is certified that the above procedure allows the incremental individual completion to be accomplished for such a situation that "af" as the provisional terminal point is established to each registration point a(n−i)

where i=0, ..., n, as follows (see FIGS. 69 and 70). In the following description, for the sake of simplicity, it is supposed that a(0), ..., a(n) belong to a common sequential aggregation small tree ST2, while "af" is positioned on the left of respective leaves of ST2. Note that much the same is true on a general case.

For each i=0, ..., n, it has only to certify a combination between the late complementary data of a(n−i) containing additions by the procedure COMPLETION_BULK_BACKWARD1 and the immediate complementary data at a(n−i) includes assigned values for all authentication path nodes of a(n−i) in the tree ST2.

(1) Base of Inductive Method

Suppose that i=0. Then, a(n−i)=a(n). By the procedure COMPLETION_BULK_BACKWARD1, a(n) is tacked on the late complementary data of a(n) at the completion of a registration process of a(n) (step S5003a of FIG. 68). Here, as a root value of the sequential aggregation small tree has already become definite at the completion of the registration process of a(n), the combination between the late complementary data of a(n−i) containing additions by the procedure COMPLETION_BULK_BACKWARD1 and the immediate complementary data at a(n−i) includes the assigned values for all authentication path nodes of a(n) in the tree ST2.

(2) Inductive Step

If given i1∈{0, ..., n−1} and i=i1, it is presumed that the combination between the late complementary data of a(n−i) containing additions by the procedure COMPLETION_BACKWARD1 and the immediate complementary data at a(n−i) includes the assigned values for all authentication path nodes of a(n−i) in the tree ST2. In this case, it has only to certify that the same is applicable to i=i1+1. It is possible to certify this applicability by using the propagation procedure for completion as follows.

Assume that a2=a(n−i1) and a1=a(n−(i1+1)). Further, let AP(a1, a2) be an authentication point of a1 by a2. Further, brotherly nodes of the authentication point are represented by AP'(a1, a2). Let j1 denotes a level of AP(a1, a2) (see FIG. 70).

In the authentication path nodes of a1 in the small tree ST2, due to the feature of a sequential aggregation tree mentioned below, assigned values for nodes whose level is less than j1 are included in data added at step S5004a of FIG. 68.

In the authentication path nodes of a1 in the small tree ST2, assigned values for nodes whose level is equal to j1 are included in data added at step S5007a of FIG. 68.

In the authentication path nodes of a1 in the small tree ST2, assigned values for nodes whose level is more than j1 are included in data added at step S5008a of FIG. 68.

From above, it is elicited that the combination between the late complementary data of a1=a(n−(i+1)) containing additions by the procedure COMPLETION_BULK_BACKWARD1 and the immediate complementary data at a(n−i+1)) includes the assigned values for all authentication path nodes of a(n−(i+1)) in the tree ST2.

From the above (1) and (2), it becomes obvious that for each i=0, ..., n, the combination between the late complementary data of a(n−i) containing additions by the procedure COMPLETION_BULK_BACKWARD1 and the immediate complementary data at a(n−i) includes assigned values for all authentication path nodes of a(n−i) in the tree ST2.

Note that by the similar inductive method, it is obvious that there is no possibility of a judgment of "NO" at step S5006a causing an output of "error".

(Efficiency of Memory)

The above descriptions are directed to a processing method in a situation such that it is possible to allow the computer to store data that the user apparatus has acquired as the event-ordering certification during one aggregation interval by the chain complementary method, in a memory of the computer. On the contrary, if the acquisition data cannot be stored in the memory of the computer due to weight of numbers of registration points acquired by the user apparatus 5I during the aggregation period, it is possible to calculate the complete authentication path data about all of the registration points during the relevant aggregation period by firstly reading part of the acquisition data into the memory and secondly calculating the complete authentication path data in incremental steps in accordance with a method described below.

The above calculation is carried out by the following steps (1) to (5).

(1) Extract and thin out only specific data from complementary data that a certain user apparatus 5I has received during a certain aggregation interval, the specific data each having a registration point whose index meets a specified condition, to form thinned-out extraction data.

Figure 71:
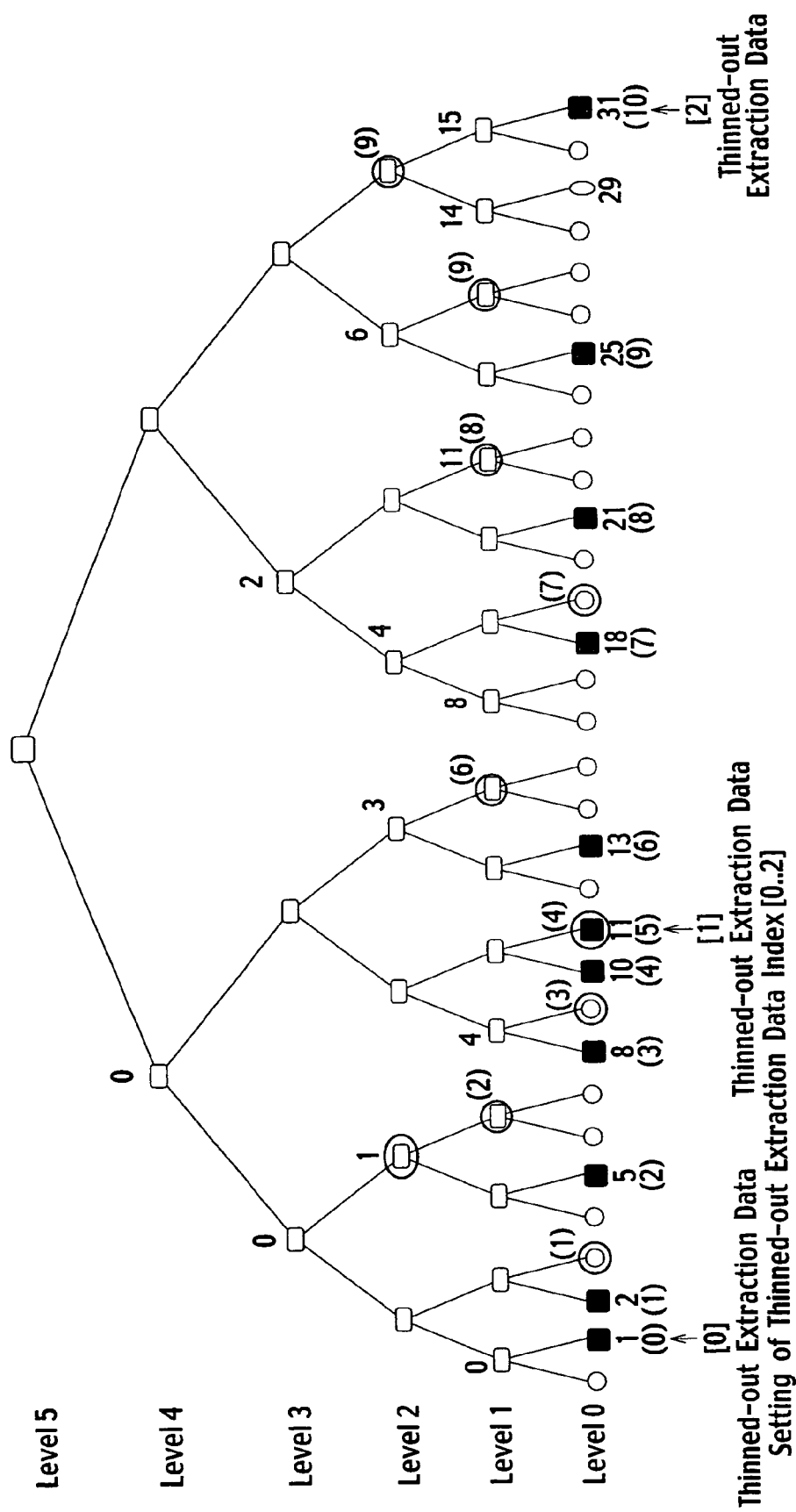
FIG. 71 is a diagram explaining an incremental completion (i.e. method of executing in multistage upon storing a part in memory) in the chain complementary procedure in the event-ordering certification system of the fifth embodiment of the present invention.

Upon designating a positive integer m for sampling interval as the specified condition for extraction, it may be carried out to extract only the specific data each having a registration point whose index is dividable by m. In a concrete example of FIG. 71, upon designating "5" for sampling interval, only registration points having indexes dividable by "5" are extracted from the registration points having indexes from 0 to 10 (shown with black circles). In this case, the registration points of indexes 0, 5, 10 are extracted to form the above thinned-out extraction data.

(2) Form local data. The local data is composed of both registration value and complementary data about a registration point whose index is interposed between adjoining thinned-out extraction data. In general, the local data is provided in plural.

Figure 72:
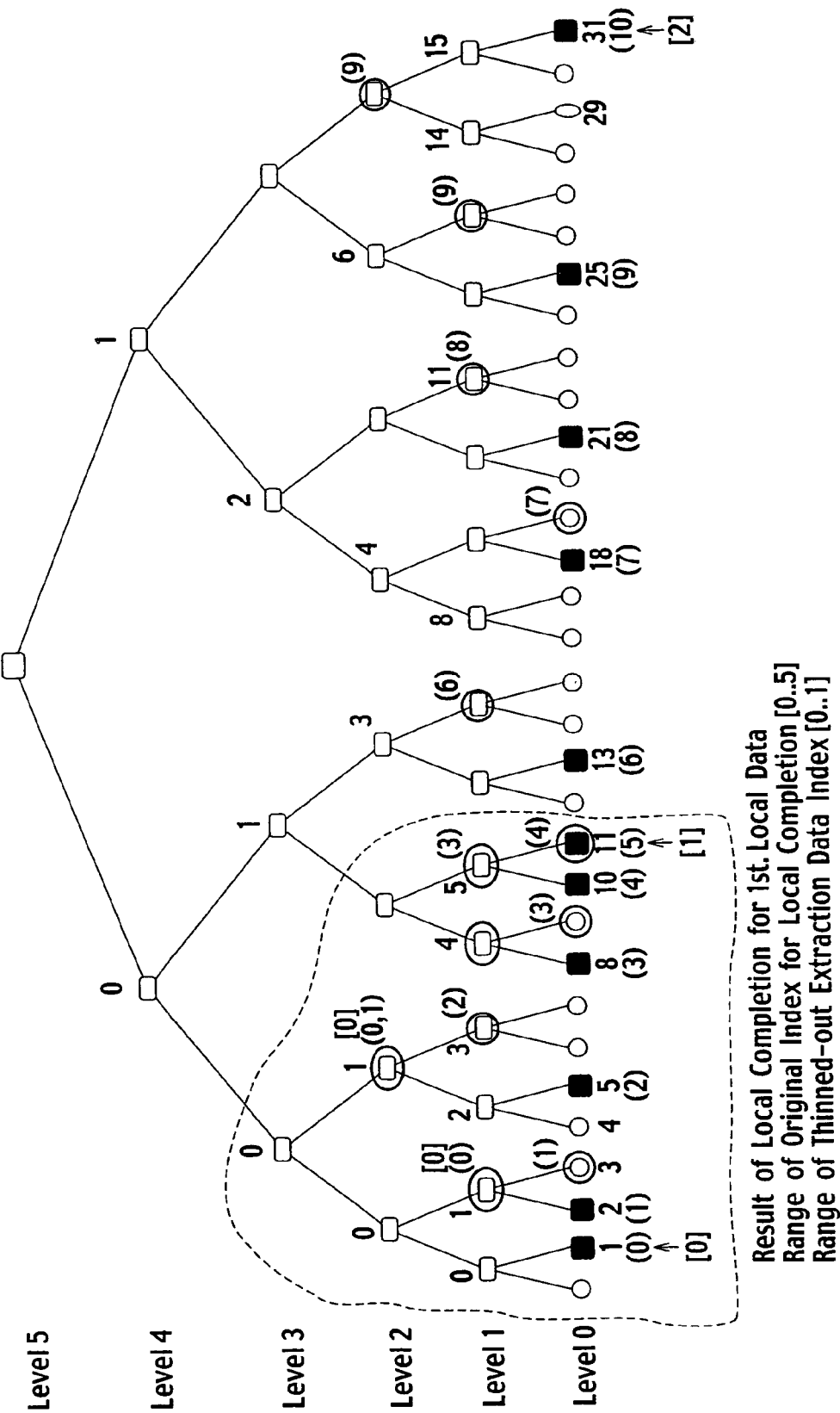
FIG. 72 is a diagram explaining the incremental completion (i.e. method of executing in multistage upon storing a part in memory) in the chain complementary procedure in the event-ordering certification system of the fifth embodiment of the present invention.
Figure 73:
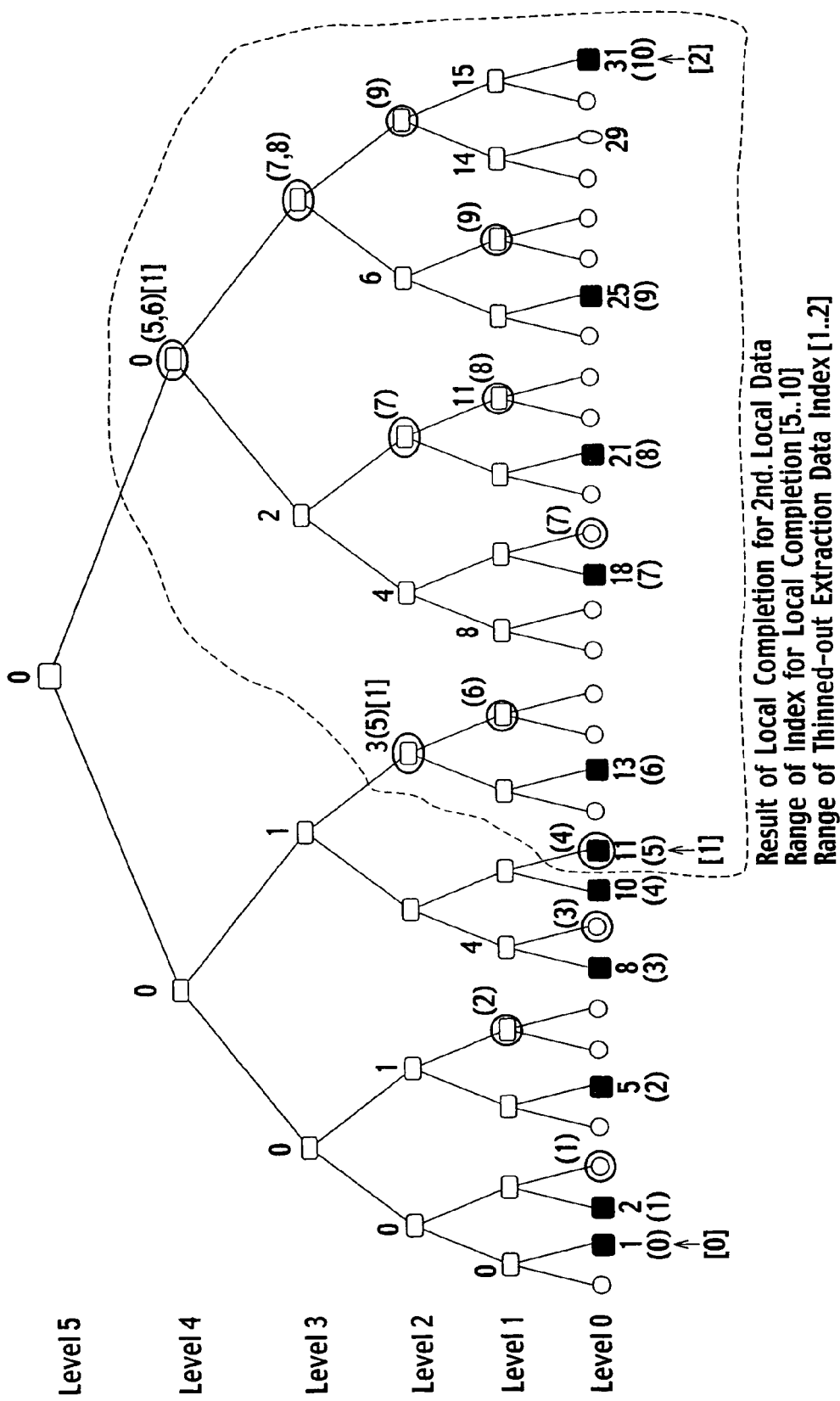
FIG. 73 is a diagram explaining the incremental completion (i.e. method of executing in multistage upon storing a part in memory) in the chain complementary procedure in the event-ordering certification system of the fifth embodiment of the present invention.

In a concrete example of FIG. 72, there are collected registration points having indexes each interposed between the index "0" of the first thinned-out extraction data and the index "5" of the second thinned-out extraction data, in order to form the first local data. In a concrete example of FIG. 73, there are collected registration points having indexes each interposed between the index "5" of the second thinned-out extraction data and the index "10" of the third thinned-out extraction data, in order to form the second local data.

(3) Apply the above incremental completion on the respective local data formed at (2) while handling a rightmost registration point of each local data as the provisional terminal point. This application of incremental completion will be referred to as "local completion for local data", after.

Using the late complementary data calculated in the above process, it is assumed that a rightmost point of respective registration points belonging to local data in question is represented by a1 and that an authentication point of a (i.e. the respective registration points) by a1 is represented by AP(a, a1). Then, in the authentication path nodes of a, it is possible to calculate assigned values for nodes lower than level(AP(a, a1)). Further, the so-calculated assigned values of the nodes contain all of assigned values that have become definite at the completion of the processing of a1 in the authentication path nodes of a. That is, the so-calculated assigned values contain the late complementary data of the registration point a at a1.

In the concrete example of FIG. 72, there are calculated assigned values for node(1, 0) and node(2, 1) as the late complementary data of the registration point numbered index 0, an assigned value for node(2, 1) as the late complementary data of the registration point numbered index 1, and an assigned value for node(5, 1) as the late complementary data of the registration point numbered index 3, by the above local completion for local data.

Assuming that the rightmost point (index: 5) of respective registration points belonging to the relevant local data is represented by a1, it is possible to calculate assigned values for nodes lower than level(AP(a, a1)) in the respective registration points a belonging to the local data. For instance, if a is a registration point of index 0, then AP(a, a1) becomes (3, 0), allowing a calculation of assigned values of nodes (0, 0), (1, 0), (2, 1) which are lower than level 3. Since the late complementary data of a at a1 comprises assigned values for nodes (1, 0), (2, 1), it will be understood that it is possible to calculate the late complementary data at a1. Much the same is true on other registration points belonging to this local data.

As a result of the processing of the above section (3), about two adjoining registration points a1 and a2 in the thinned-out extraction data, it is possible to acquire the late complementary data of a1 at a2. By applying the above main routine COMPLETION_MAIN_1 for completing a certificate on the late complementary data, it is executed to complete certificates acquired at respective registration points contained in the thinned-out extraction data, namely, calculating of assigned values of all of the authentication path nodes of these registration points. This operation will be referred to as "global completion for thinned-out extraction data" after.

Figure 74:
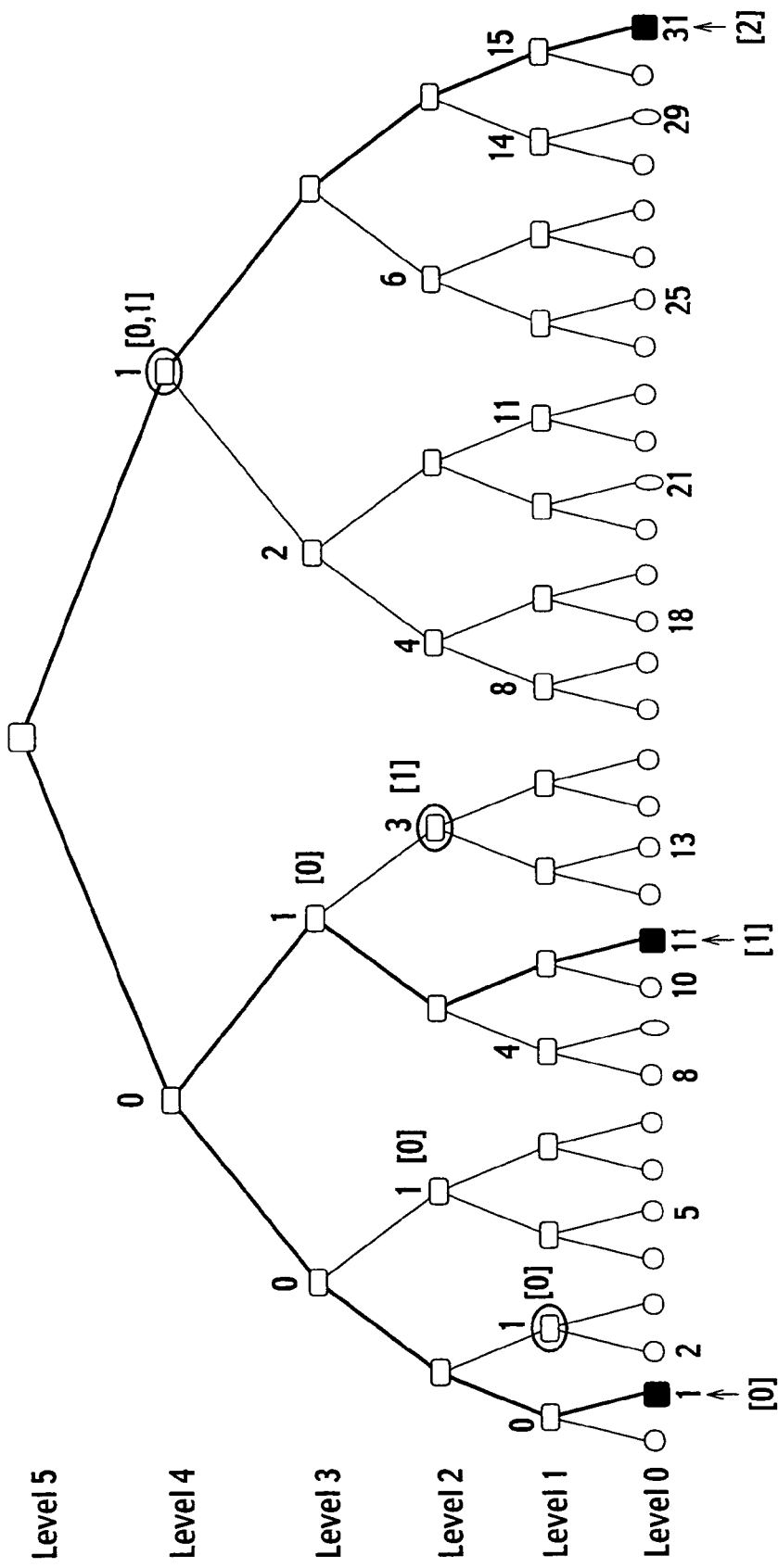
FIG. 74 is a diagram explaining the incremental completion (i.e. method of executing in multistage upon storing a part in memory) in the chain complementary procedure in the event-ordering certification system of the fifth embodiment of the present invention.

In a concrete example of FIG. 74, when completing certificates of registration points in the thinned-out extraction data numbered indexes 0, 1 and 2, in other words, the registration points of leaf numbers 1, 11, and 31 it is possible to calculate assigned values of all of the authentication path nodes of three registration points. For instance, as for one registration point in the thinned-out extraction data numbered index 0, it is possible to calculated assigned values for nodes (0, 0), (1, 1), (2, 1), (3, 1), and (4, 1).

(5) Using each of the local data subjected to the local completion of the above section (3) and the thinned-out extraction data subjected to the global completion of the above section (4), it is performed to complete certificates of respective registration points contained in local data in question. This operation will be referred to as "global completion for local data", hereinafter.

The detailed procedure of the global completion for local data is as follows:

(5-1) Suppose that registration points of certain local data is formed by a(0), a(1), . . . , a(n)=a1. Then, assigned values for all authentication path nodes of a1 have been already calculated at step (4). Assume that these assigned values are represented by V(0), V(1), . . . , V(k−1);

(5-2) Thus, it is possible to calculate assigned values of respective nodes belonging to the root path of a1. Assume that these assigned values are represented by V'(0), V'(1), . . . , V'(k−1), V'(k);

(5-3) For each a=a(0), . . . , a(n−1), it is assumed that an authentication point of a by a1 is represented by AP(a, a1) and k1=level (AP(a, a(n));

(5-4) In the authentication path nodes of a, assigned values for nodes whose level is smaller than k1 have been already calculated by step (3).

(5-5) Further, the authentication path node (at level k1) of a coincide with a node at level k1 belonging to the root path of a1. Accordingly, an assigned value of such an authentication path node becomes V'(k1) by the calculation at (5-2).

(5-6) For j satisfying k1>j>k, the authentication path node (at level j) of a coincide with a node at level j belonging to the root path of a1. Accordingly, an assigned value of the authentication path node becomes V'(j) by the calculation at (5-1).

In this way, by (5-1) to (5-6), it is possible to calculate the assigned values of all authentication path nodes of a with respect to each a=a(0), . . . , a(n−1).

Figure 75:
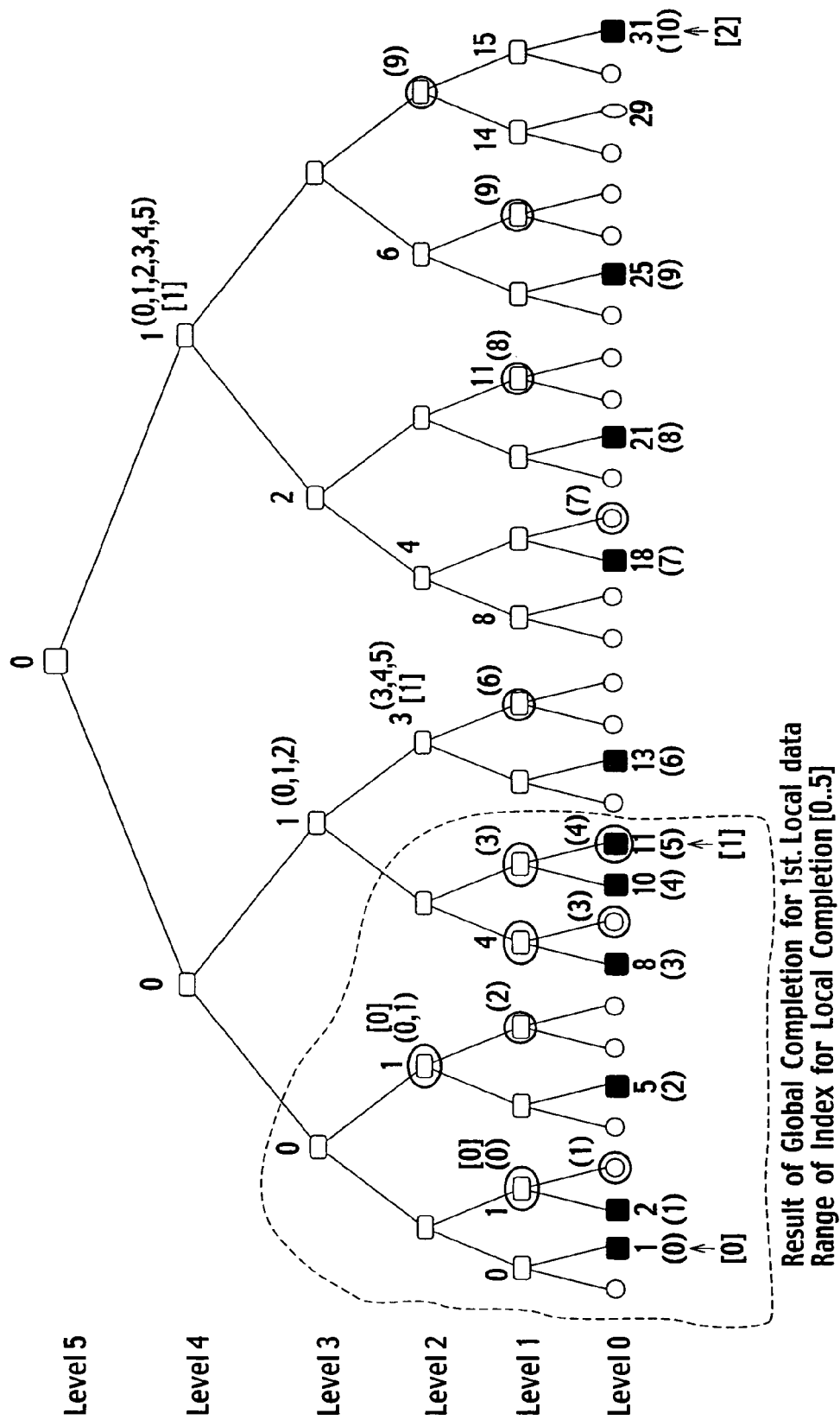
FIG. 75 is a diagram explaining the incremental completion (i.e. method of executing in multistage upon storing a part in memory) in the chain complementary procedure in the event-ordering certification system of the fifth embodiment of the present invention.

As for the concrete example of FIG. 72, the authentication path nodes of a registration point numbered index 2 (leaf ID No. 5) comprises nodes (0, 4), (1, 3), (2, 0), (3, 1) and (4, 1). If a1 is a registration point numbered index 5 (leaf ID No. 11), then AP(a, a1)=(3, 0) and k1=level(AP(a, a1))=3. In the authentication path nodes of a, assigned values for nodes (0, 4), (1, 3), and (2, 0) at each level smaller than k1=3 can be calculated at the above step (5-3) (see FIGS. 72 and 75). Additionally, an assigned value for an authentication path node (3, 1) at level k1=3 can be calculated at the above step (5-2) (see FIGS. 74 and 75). An assigned value for a node (4, 1) at level more than k1=3 can be calculated at the step (5-1) (see FIGS. 74 and 75).

Owing to the procedure of the above steps (1) to (5), indispensable data that a memory has to retain simultaneously in view of accomplishing the completion of acquired certificates is the thinned-out extraction data and the single local data only. Assuming that the total number of registration points is represented by N and the thinned-out interval used at the step (1) is represented by m, then the number of indispensable registration points that a memory has to retain simultaneously becomes (N/m)+m. If m=√N, then there is established (N/m)+m=2·√N, allowing the order of necessary memory capacity to be reduced from N to √N.

<5-5. Root-Value Calculation of User Apparatus 5I by Complementary Data>

Next, the root-value calculation of the user apparatus 5I by the complementary data will be described. This is a detailed explanation about root-value calculation by the first validation function of the user apparatus 5I.

When a certain aggregation interval I1 comes to an end, the user apparatus 5I can calculate complete authentication path data with its executing of the individual completion of a receipt in response to one event-ordering request RQ that the apparatus 5I sent during the aggregation interval I1 in accordance with the above-mentioned method. From the so-calculated complete authentication path data, it is possible to further calculate an assigned value for a root of a sequential aggregation tree for the relevant aggregation interval in accordance with the steps (1) to (5) as below.

It is firstly noted that the complete authentication path data consists of both immediate complementary data and late complementary data. Assume that each of the immediate complementary data and the late complementary data consists of complementary data elements in the form of "(positional information, LR-tag, assigned value (hash value))". Note that either tag of "L" or tag of "R" is selected in the term of "LR-tag". The above positional information contains level information. Assume that there is defined, among the level information, a binary relationship "<<" as follows.

About a voluntary registration point, it is assumed that complementary data elements contained in the authentication path data are represented by.

"(positional information P(i), LR-tag T(i), assigned value H(i))"

where i=1, . . . , n. Additionally, assume the level information contained in the positional information P(i) is represented by level(P(i)). Then, it is assumed that the binary relationship "<<" defines a linear ordering among level(P(1)), . . . , level(P(n)).

Suppose, the positional information consists of a combination of level (represented by a nonnegative integer) in one sequential aggregation tree with in-level index and additionally, the level information of the positional information coincides with a first element in the combination. In this case, it has only to select an integer magnitude relation "<" as the binary relationship "<<".

Figure 76:
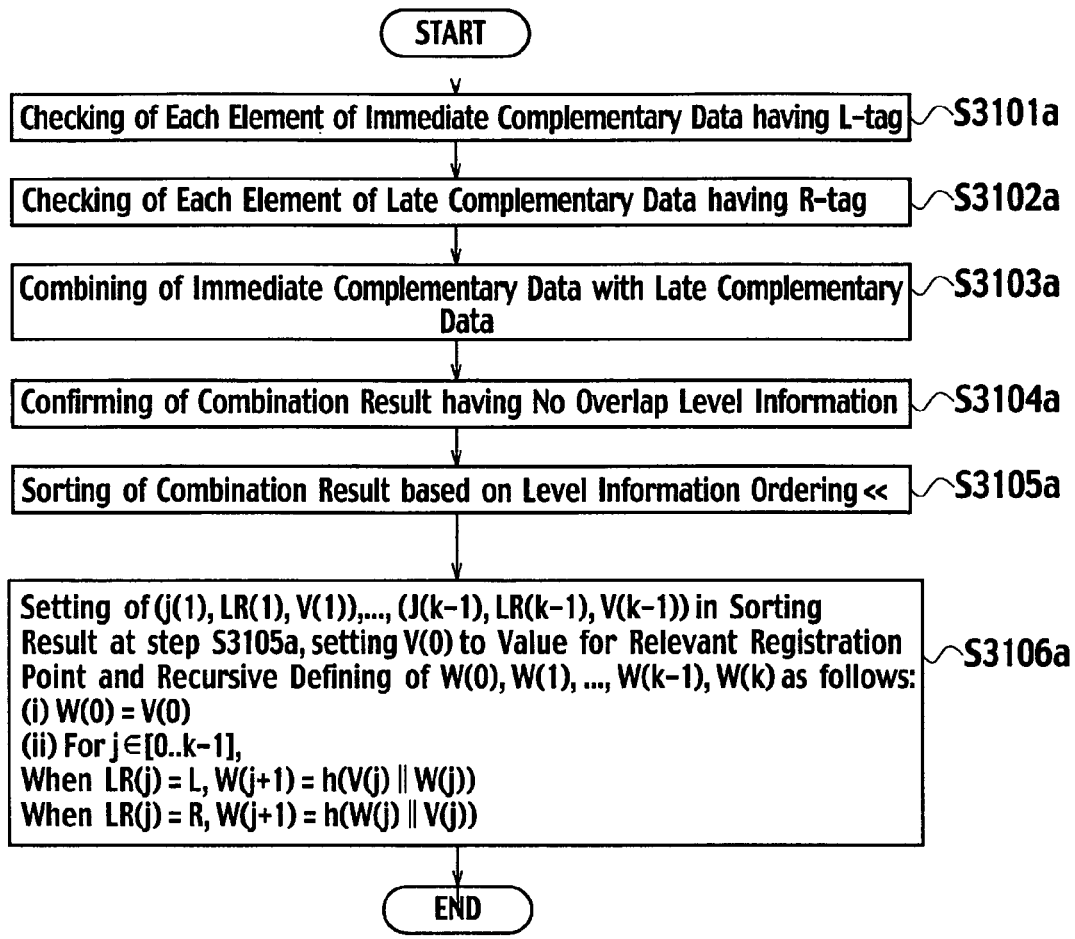
FIG. 76 is a flow chart explaining a calculating method of a root value in a sequential aggregation tree by perfect authentication path data.

FIG. 76 is a flow chart showing a method of calculating a root value of a sequential aggregation tree from the complete authentication path data. According to the figure, the method comprises various stops of: checking the complete authentication path data, i.e. whether the immediate complementary data has a L-tag or not and whether the late complementary data has a R-tag or not; incorporating the immediate complementary data with the late complementary data; confirming that there is no overlapping level information in the complete authentication path data; sorting the complete authentication path in order of the level information; connecting respective assigned values with each other so as to accord with the L/R-tags to calculate a root value (steps S3101a, S3102a, S3103a, S3104a, S3105a, S3106a).

Figure 77:
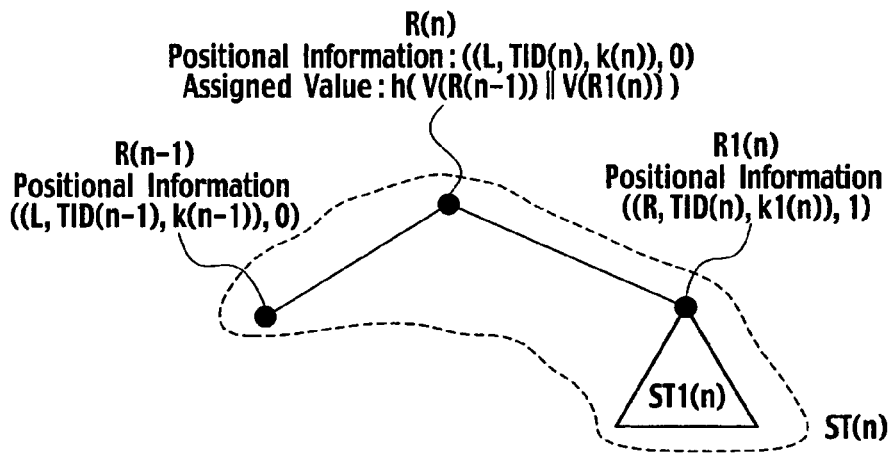
FIG. 77 is a diagram explaining a sequential aggregation tree in case of adopting, as one leaf of a sequential aggregation tree at certain aggregation intervals, a root value of the sequential aggregation tree at previous aggregation intervals.
Figure 78:
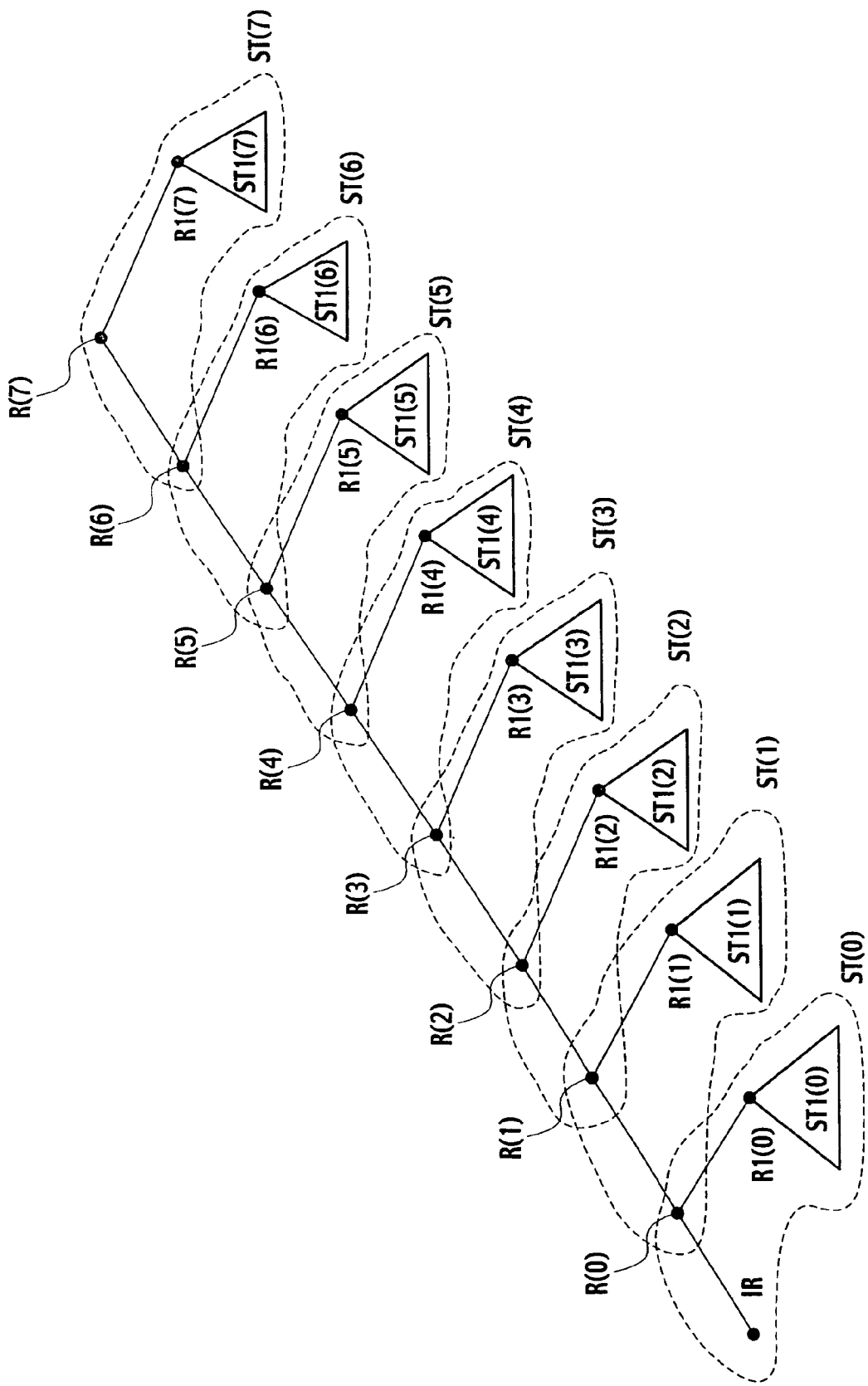
FIG. 78 is a diagram explaining a sequential aggregation tree in case of adopting, as one leaf of a sequential aggregation tree at certain aggregation intervals, a root value of the sequential aggregation tree at previous aggregation intervals.

Referring to FIGS. 77 and 78, we now describe a case of adopting, as one leaf of a sequential aggregation tree in a certain aggregation interval, a root value of another sequential aggregation tree completed in the previous aggregation interval. In such a case, it is possible to verify the temporal context in publishing receipts between different sequential aggregation trees with ease. In FIG. 78, for instance, when a registration point a of a user apparatus 2A is assigned to one leaf of a partial tree ST1(5) of a sequential aggregation tree ST(5) and when a registration point b of a user apparatus 2B is assigned to one leaf of a partial tree ST1(6) of a sequential aggregation tree ST(6), the confluent point between a and b becomes a node R(6), while the authentication point of a by b becomes a node R(5). Accordingly, if a value of the authentication point R(5) calculated from the registration point a is included in the immediate complementary data at the registration point b, then it becomes possible to certify that the registration of the point a occurred in advance of the registration of the point b.

FIG. 77 shows one sequential aggregation tree ST(n) abstracted from a plurality of sequential aggregation trees linked to each other as shown in FIG. 78.

Here, it is noted that a root R(n−1) is a node in common with one sequential aggregation tree ST(n−1) and another sequential aggregation tree ST(n), which is characterized by:
Level information (L, TID(n−1), k1($n$));
In-level index 0; and
Positional Information ((L, TID(n−1), k1($n$)), 0).

Note that the above level information consists of (LR-tag, nonnegative integer tree number, nonnegative integer in-tree level information). As for the term of "LR-tag", either tag of "L" or tag of "R" is selected.

Further, a root R1($n$) of a partial tree ST1($n$) is characterized by:
Level information (R, TID(n−1), k1($n$));
In-level index 1; and
Positional information ((R, TID(N−1), k1($n$)), 1)

where k1($n$) is a height of the tree ST1($n$).

Further, regarding a partial tree ST1($n$), nodes except a root R1($n$) are characterized by:
Level information (R, TID(n), j); and
Positional information ((R, TID(n), j), i).

Here, j and i are nonnegative integers. The positional information of each element forming Leafs(ST1($n$)) can be represented by ((R, TD(n), 0), i).

Again, R(n) is a node in common with small trees ST(n) and ST(n+1) and is characterized by:
Level information (L, TID(n), k(n));
In-level index 0;

Positional information ((L, TID(n), k(n), 0) where k(n) k1($n$)+1; and
Assigned value V(R(n))=h(V(R(n−1))∥V(R1($n$)).

A binary tree composed the sequential aggregation small tree ST1($n$), the root R(n−1) and the root R(n) is represented by ST(n). That is, root(ST($n$))=R($n$), leftChild(R($n$))=R($n$−1), and rightChild(R($n$))=R1($n$).

A sequential aggregation tree corresponding to the n$^{-th}$. aggregation period is ST(n).

However, for n=0, R(n−1) is replaced by a node IR (see FIG. 78). The positional information about the node IR is represented by ((L, −1, 0), 0).

Then, the order "<<" between two extended level information is defined as follows:

$\forall j1,j2,T1,T2 \geq 0[(R,T2,j2)<<(L,T1,j1)$;

$\forall j1,j2,T1,T2 \geq 0[T1<T2 \Rightarrow (L,T1,j1)<<(L,T2,j2)]$; and $\forall j1,j2,T1 \geq 0[j1<j2 \Rightarrow (R,T1,j1)<<(R,T1,j2)$.

From this definition, it is implied that the binary relationship "<<" is provided to determine a linear ordering against an aggregate of authentication path nodes of a voluntary registration point.

Figure 79:
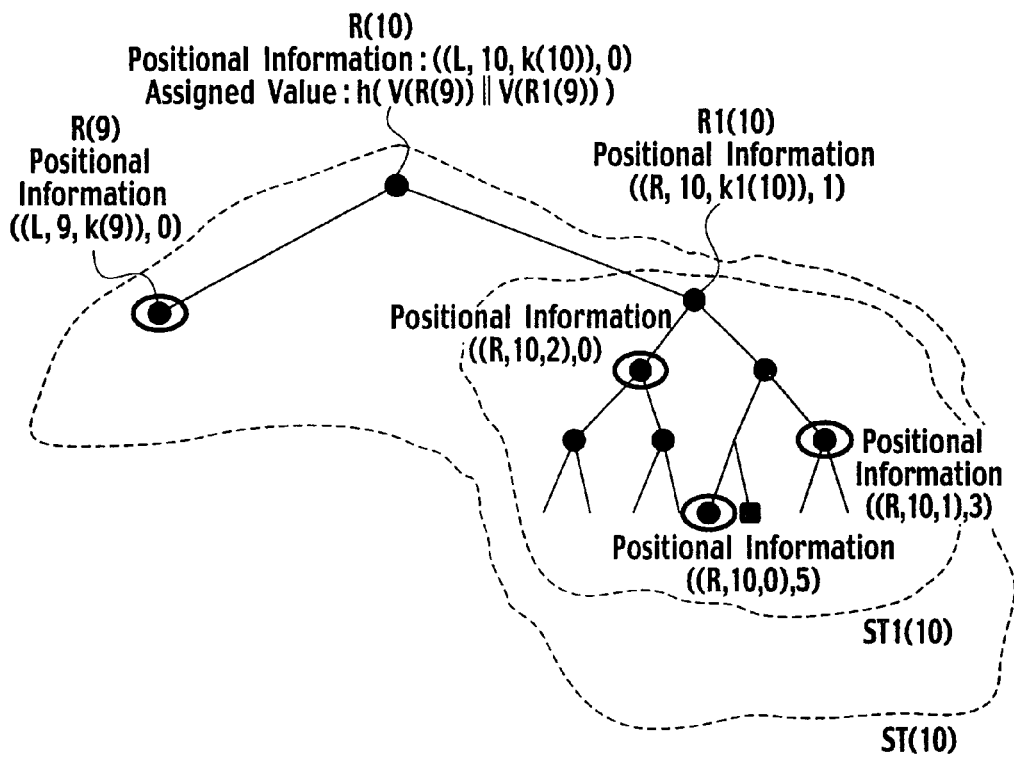
FIG. 79 is a diagram explaining a calculating method of a root value in a sequential aggregation tree by perfect authentication path data in case of adopting, as one leaf of a sequential aggregation tree at certain aggregation intervals, a root value of the sequential aggregation tree at previous aggregation intervals.

FIG. 79 shows one example of calculating a root value of a sequential aggregation tree by complementary data with the use of the so-defined binary relationship. The calculation is as follows.

For a node by the positional information ((R, 10, 0), 5), the immediate complementary data becomes
[(((L, 9, k(9)), 0), L, V(R(9))),
(((R, 10, 2), 0), L, V((R, 10, 2), 0)),
(((R, 10, 0), 4), L, V((R, 10, 0), 4))]

where, (R, 10, 2)<<(L, 9, 10).

The late complementary data becomes [(((R, 10, 1), 3), R, V((R, 10, 1), 3))].

The calculation of the root value from the complementary data is accomplished in accordance with the flow chart of FIG. 76.

(1) Check that elements of the immediate complementary data have L-tag each.→pass (2) Check that elements of the late complementary data have R-tag each.→pass (3) Incorporate the immediate complementary data with the late complementary data.

The incorporation results in
[(((L, 9, k(9)), 0), L, V(R(9))),
(((R, 10, 2), 0), L, V((R, 10, 2), 0)),
(((R, 10, 0), 4), L, V((R, 10, 0), 4)),
(((R, 10, 1), 3), R, V((R, 10, 1), 3))].

(4) Confirm that there is no overlapping level information in the incorporation.

(5) Sort the incorporation result, based on the order of the level information <<.

The sorting results in
[(((R, 10, 0), 4), L, V((R, 10, 0), 4)),
(((R, 10, 1), 3), R, V((R, 10, 1), 3)),
(((R, 10, 2), 0), L, V((R, 10, 2), 0)),
(((L, 9, k(9)), 0), L, V(R(9)))].

(6) Setting the sorting result of step (5) to (J(0), LR(0), V(0), . . . , (J(k−1), LR(k−1), V(k−1)) and also setting a registration value of the relevant registration point to V(0), the root values are recursively defined as follows:

W(0), W(1), ..., W(k−1), W(k).

$$W(0)=V(0) \quad \text{(i)}$$

If $LR(j)=L$, then $W(j+1)=h(V(j)\|W(j))$. (ii)

If $LR(j)=R$, then $W(j+1)=h(W(j)\|V(j))$.

When calculating in accordance with the above definition, there is obtained k=4 and W(j) can be calculated as follows:

$$W(0)=V(R,10,0),5),$$

$$W(1)=h((R,10,0),4)\|V(R,10,0),5)),$$

$$W(2)=h(W(1)\|V((R,10,1),3)),$$

$$W(3)=h(V((R,10,2),0)\|W(2)), \text{ and}$$

$$W(4)=h(V(R(9))\|W(3)).$$

Thus, $$W(3)=V((R1(10)) \text{ and } W(4)=V(R(10)).$$

The event-ordering certification system 200a of the fifth embodiment has the same effects as those of the fourth embodiment. As for the event-ordering certification system 200a for certifying the event ordering with the use of a tree structure, it is supposed that the certification apparatus 4a on receipt of an event-ordering request from the user apparatus 5I publishes a certification reply in the chain complementary method including a receipt against the request (note: the certification reply containing the immediate complementary data of a registration point and the late complementary data of another registration point just before the registration point). Even then, if the user apparatus 5I performs the incremental completion while using the certification reply, it becomes possible for the user apparatus 5I to verify the temporal context in publishing respective receipts between the user apparatuses 5I. Therefore, even if this validation occurred in advance of the electronic publication of public data collecting up the event-ordering requests, it is possible to verify the validity of the receipts.

Additionally, the chain complementary method has the effect of reducing amount of data contained in the certification reply in comparison with the sequence complementary method. Also in the chain complementary method, of course, as the certification apparatus 4a can employ not only the method of storing sequential aggregation trees in the memory part but a storing method using a stack structure, it is possible to reduce storage capacity required for the certification apparatus 4a remarkably.

Additionally, since the incremental completion process by the user apparatus 5I includes both individual completion and bulk completion, the apparatus 5I can verify the validity of a receipt by executing an appropriate incremental completion according to the situation. Further, since the incremental completion can be accomplished even in a method where only partial local data is stored in the memory of the user apparatus 5I in place of storing all of the certification reply data-items, it is possible to reduce storage capacity required for the user apparatus 5I remarkably.

After completing the sequential aggregation period, since the incremental completion allows the user apparatus 5I to acquire the complete complementary data, the user apparatus 5I can calculate a root value of the sequential aggregation tree. Further, when utilizing the root value of a sequential aggregation tree in the previous aggregation interval as an assigned value for the next sequential aggregation tree, it is possible to verify the temporal context in the publication of receipts bridging these sequential aggregation trees with ease.

Various changes and modifications may be made within the scope of the present invention. For instance, the binary decision trees in the above-mentioned embodiments may be replaced by directed trees where each parent has a plurality of children.

Additionally, the user apparatus 2I (or 5I) may be equipped with "user's side" means for electronic information publication. In operation, when the certification apparatus 1a (or 4a) stops its operation or vanishes data necessary for calculating a root value of the sequential aggregation tree before completing a constant aggregation interval, the "user's side" means operates to select one or more of nodes whose assigned values are calculable and whose parents' assigned values are not calculable, from certification replies that the user apparatus has already received and stored by the time of stopping the operation of the apparatus 1a (or 4a) or vanishing the data. In succession, the "user's side" means operates to publish the positional information and assigned value(s) of the selected node(s) electronically. In connection, there may be further provided a designated validation organization that verifies whether the above electronic information published by the user apparatus 2I (or 5I) is consistent or not.

<Feature of Sequential Aggregation Tree>

We now describe the feature of the sequential aggregation tree in the fourth and fifth embodiments, in detail.

Regarding the leaf number i in the sequential aggregation tree, a series of processes of: accepting an event-ordering request, which forms the origin of sequentially assigning assigned values to leaves identified with i; and successively assigning the assigned values to these leaves, will be referred to as "processing round" and represented by. "round (i)".

Now assume that C is a user apparatus, Z an audit apparatus and both i0 and i1 denote two leaf numbers where i0<i1. It is further presumed that the apparatus C received a receipt at round(i0), while the apparatus Z received an audit receipt at round(i1). Then, an authentication point of "i0" by "i1" has characteristics as follows:

(1) An assigned value for the authentication point is included in the immediate complementary data at the audit point, i.e. node (0, i1);

(2) Let (j', i') denote the above authentication point. Let ST2 be a sequential aggregation small tree where the leaf (0, i0) belongs to when round (j1) is ended. In connection, an authentication path of (0, i0) in ST2 is represented by authPathST2(0, i0)). As for various nodes belonging to the authPathST2(0, i0)), assigned values for nodes at each level smaller than j' are included in either the late complementary data that the user would receive on and after the round corresponding to node (0, i1) or a receipt (incl. immediate complementary data) that the user has received at node (0, i1).

That is, if i1≦i2, then assigned values for the nodes belonging to authPath((0, i0), j1) and having each level smaller than j' are included in either immedData(i0) or lateData(i0, i2); and (3) Assume that a root oath of leaf (0, i0) in ST2 is represented by rtPathST2(0, i0). Then, it is possible to calculate an assigned value for the above authentication point and assigned values of nodes belonging to rtPath((0, i0), i2), the nodes each having level smaller than the level of the authentication point, from the late complementary data that the user would receive on and after the round corresponding to node (0, i1) and the receipt (incl. immediate complementary data) that the user has received at node (0, i1).

Certification of Feature

We now describe a case of incorporating immediate complementary data into a receipt to be delivered to a user. Even when not incorporating the immediate complementary data into the receipt but instead incorporating the same information into late complementary data, the same conclusion could be attained with similar argument.

(1) First, item (1) will be described with reference to FIGS. 80 and 81.

Figure 80:
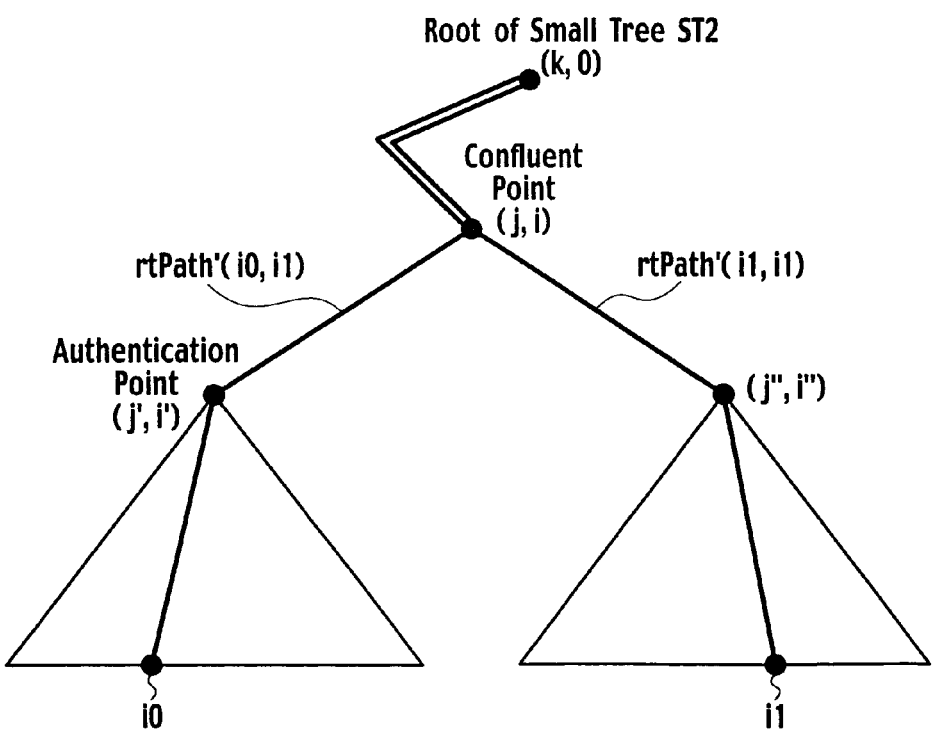
FIG. 80 is a diagram explaining that quotas at authentication points are included in in-receipt supplemental data at an audit point.

(Case 1) First of all, we refer to FIG. 80. Suppose a situation that both i0 and i1 belong to one sequential aggregation small tree ST2 in a sequential aggregation forest at the point of i1. Assume here, (j, i) denotes a confluent point between i0 and i1. Let (j', i') be an authentication point being a left child of the confluent point. In a root path rtPathST2((0, i1), i1) of node (0, i1), it is assumed that (j", i") represents a node originating in node (0, i1) and just before the confluent point. Then, the authentication point coincides with a left complementary point of (j", i"). Thus, according to the definition of the authentication path authPathTST2(i1), ((j', i'), L) is included in the authentication path of node (0, i1) in ST2. The assignment of a value for node (j', i') has been completed before round(i1). Therefore, ((j', i'), L, V(j', i')) is included in the immediate complementary data against node (0, i1).

Figure 81:
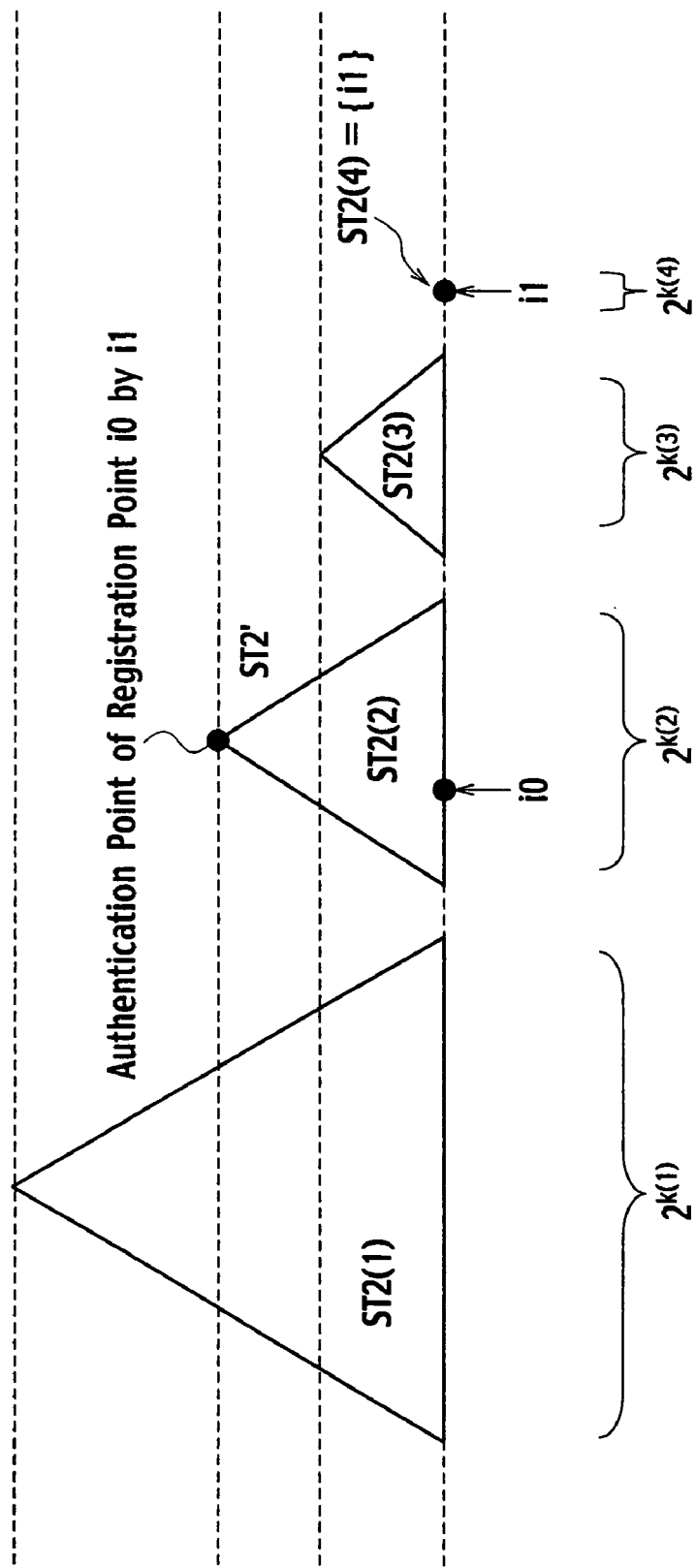
FIG. 81 is a diagram explaining that a quota at an authentication point is included in in-receipt supplemental data at an audit point.

(Case 2) Next, we suppose a situation where both i0 and i1 do not belong to any sequential aggregation small tree in the sequential aggregation forest at the point i1 simultaneously, with reference to FIG. 81. Then, i0 belongs to a certain sequential aggregation small tree ST2' in the sequential aggregation forest at the point i1. At this time, due to the definition of the immediate complementary data for the registration point (0, i1), V(root(ST2')) is included in the immediate complementary data for the registration point (0, i1).

(2) Item (2) will be described with: reference to FIGS. 82 to 85.

Figure 82:
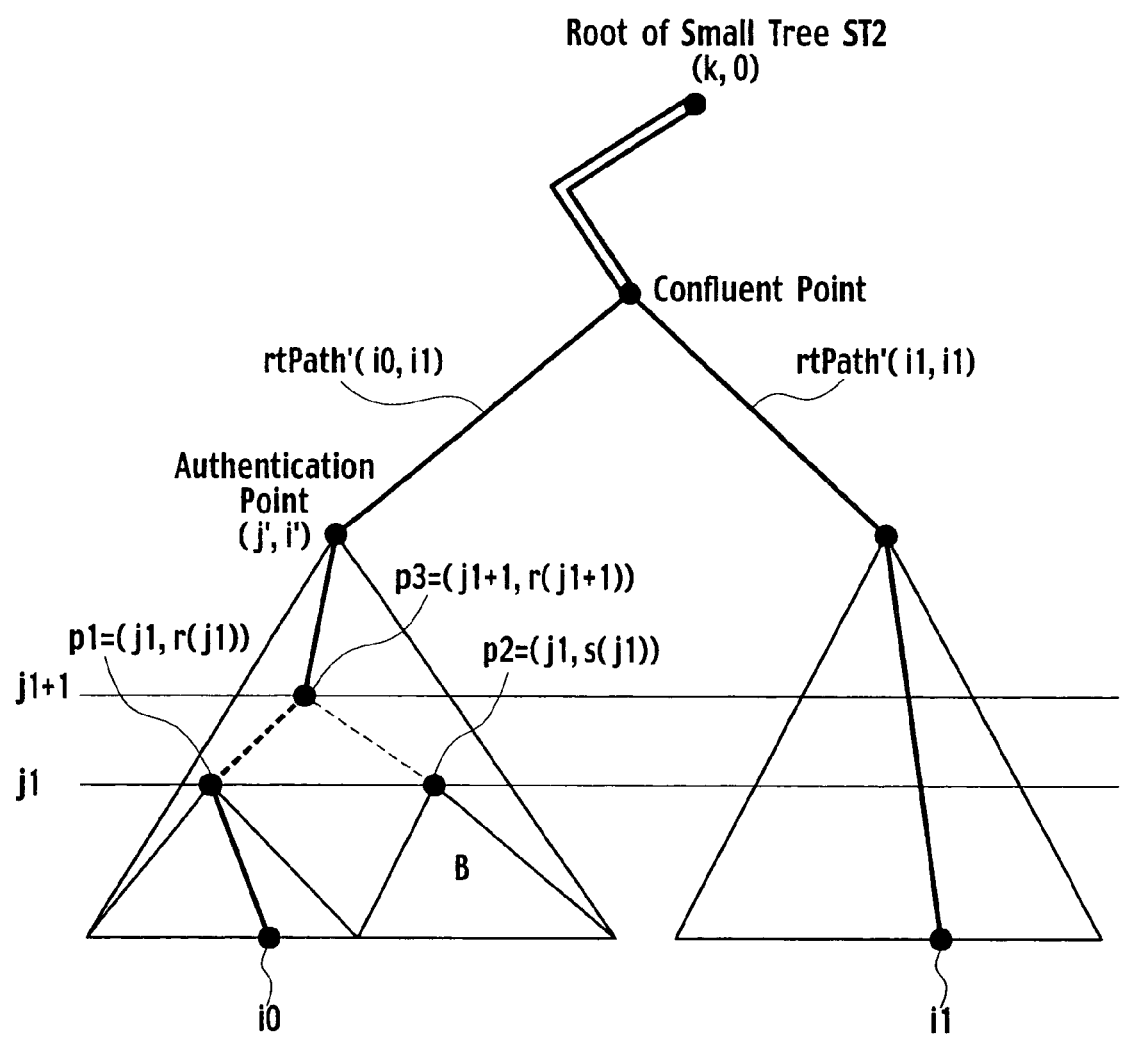
FIG. 82 is a diagram explaining that an authentication path node lower than an authentication point is included in either delay supplemental data or in-receipt supplemental data.
Figure 83:
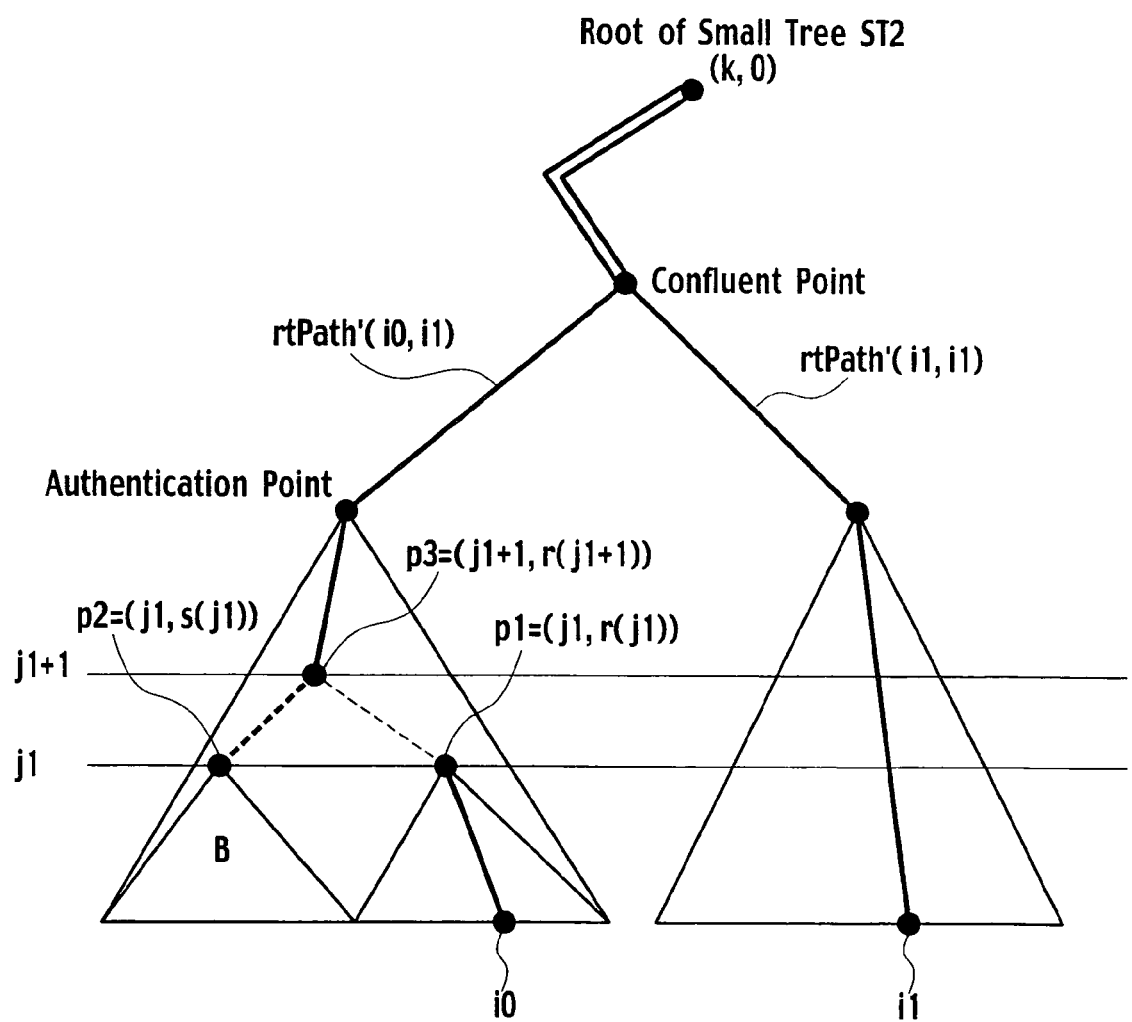
FIG. 83 is a diagram explaining that an authentication path node lower than the authentication point is included in either the delay supplemental data or the in-receipt supplemental data.

(Case 1) First of all, we refer to FIGS. 82 and 83. Suppose a situation that both i0 and i1 belong to the sequential aggregation small tree ST2 in the sequential aggregation forest at the point of i1.

Assume that k=height(ST1).

The authentication point (j', r(j')) is included in the root path rtPathST2(0, i0) for node (0, i0). Assume here that rtPathST2(0, i0)=[(0, r(0)), . . . , (j', r(j')), (j'+1, r(j'+1), . . . , (k, r(k))].

Further, a row of nodes formed by elements of authPathST2 (0, i0) and having each level smaller than j' is represented by [(0, s(0)), . . . , (j'−1, s(j'−1))]. Then, it has only to certify that V(j1, r(j1)) is included in either immedData(i0) or lateData (i0, i2) for each j1 (i.e. j1ϵ[0 . . . j'−1]).

By the definition of authPathST2(0, i0), it is noted that an element p2=(j1, s(j1)) at level j1 of authPathST2((0, i0), i1) is either a right child of an element p3 at level j1+1 of rtPathST2 (0, i0) or the left child. We describe both cases respectively.

(Case 1-1) When p2 is the right child of p3, an assigned value V(p2) of p2 is included in the late complementary data lateData(i0, i2) that the apparatus C can receive at i2 satisfying i1≦j2, as shown in FIG. 82. The reason is that when the event-ordering certification on the round corresponding to leaf(0, i1) is completed, it has already become possible to calculate an assigned value for an "ST2" partial tree indicated with B of FIG. 82. As a matter of fact, the assigned values have been already calculated and assigned. Accordingly, the late complementary data for the registration point i0 published on and after the above point of completion contains the assigned value V(p2) for the root p2 of the partial tree B.

(Case 1-2) When p2 is the left child of p3, an assigned value V(p2) for node p2 is included in the immediate complementary data for the registration point i0, as shown in FIG. 83. Because, for the partial tree B having the root p1 of FIG. 83, there is established:

∀Iϵleafs(B) [i<i0].

Accordingly, when starting the round identified with i0, an assigned value for leafs(B) has already become definite. Thus, an assigned value for p2=root(B) has become definite on the round i0. Therefore, p2 is included in an aggregate of authentication path nodes of i0 whose assigned values have already becomes definite at the point i0.

Figure 84:
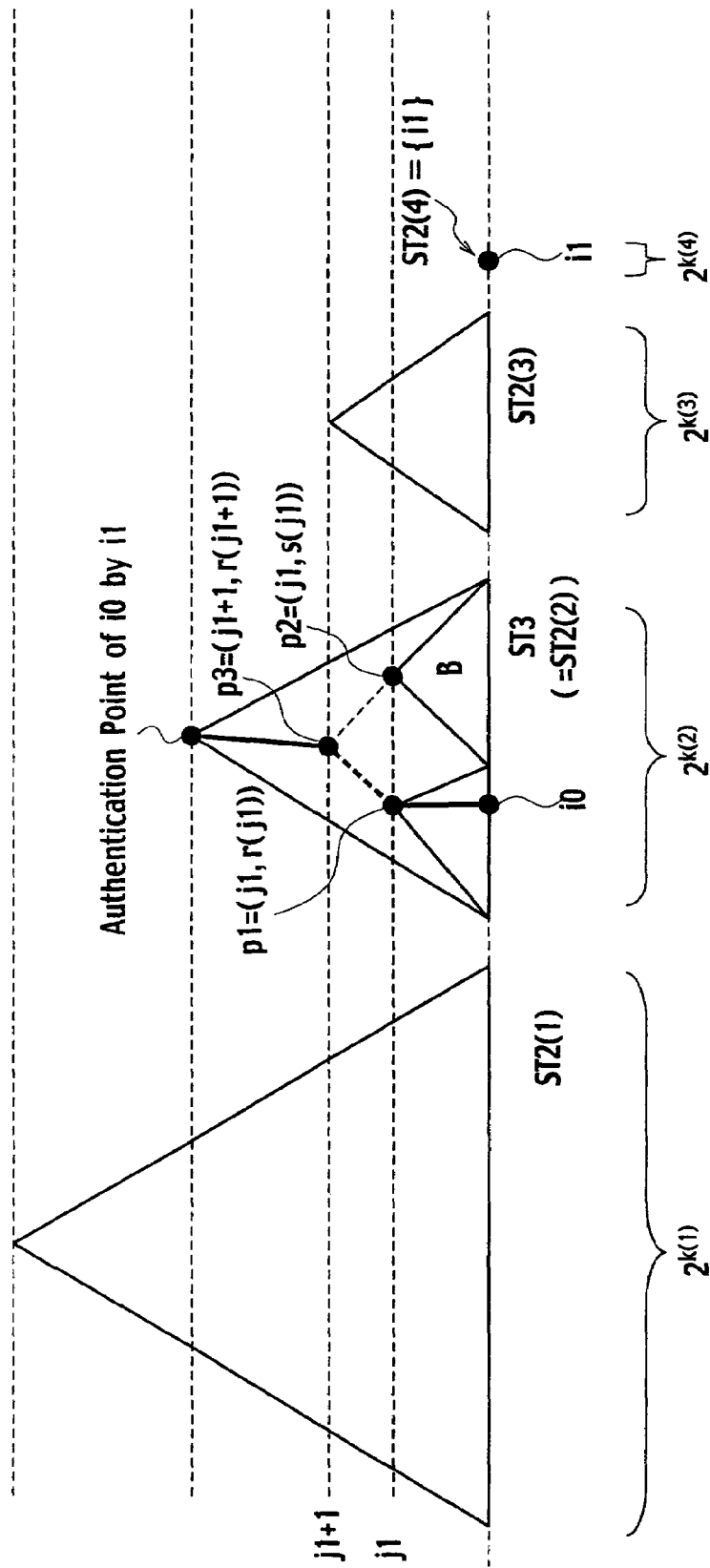
FIG. 84 is a diagram explaining that an authentication path node lower than an authentication point is included in either delay supplemental data or in-receipt supplemental data.
Figure 85:
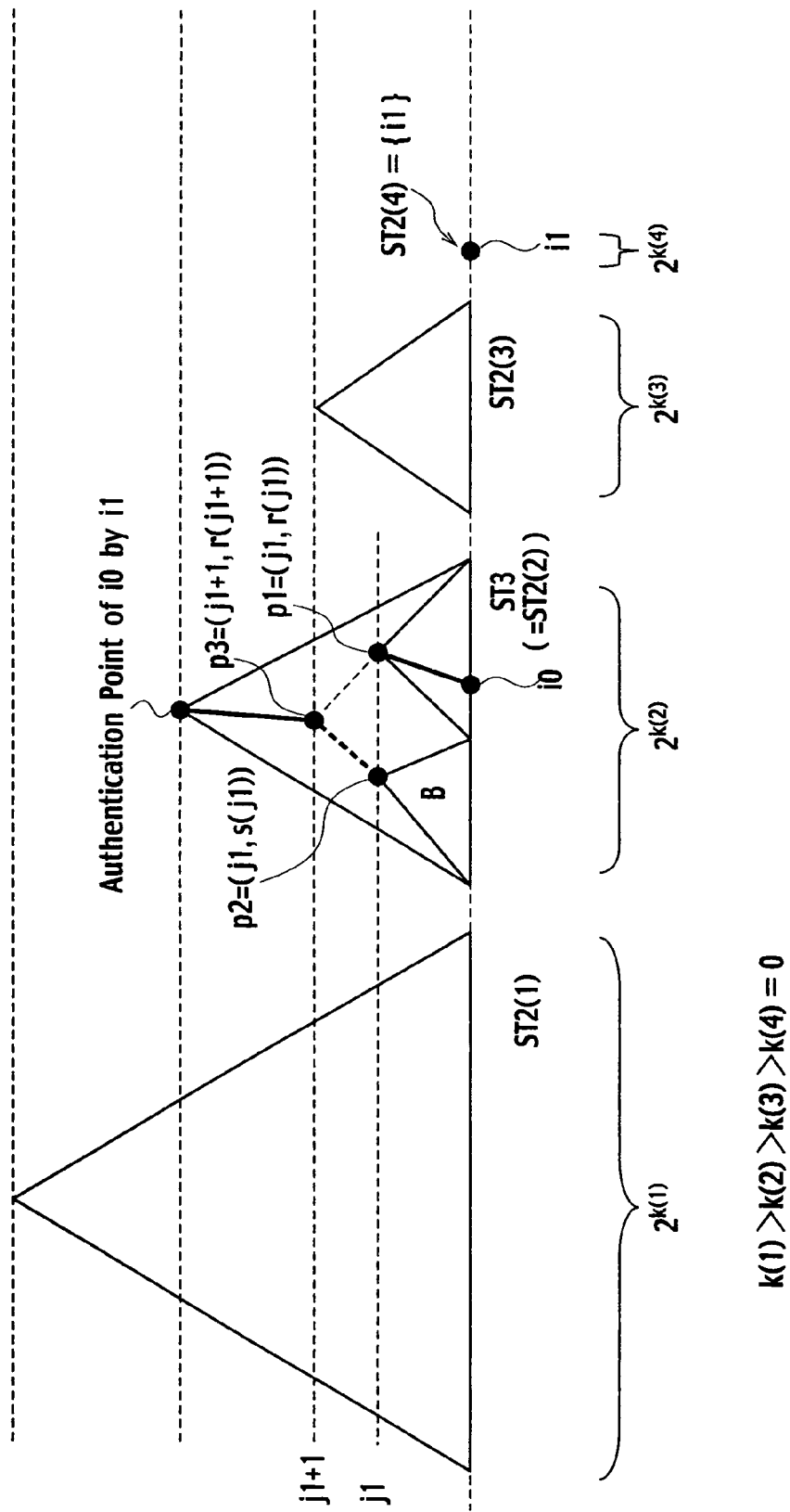
FIG. 85 is a diagram explaining that an authentication path node lower than the authentication point is included in either the delay supplemental data or the in-receipt supplemental data.

(Case 2) Next, we refer to FIGS. 84 and 85. Suppose a situation that both i0 and i1 do not belong to any sequential aggregation small tree in the sequential aggregation forest at the point of i1 simultaneously. Then, i0 belongs to a certain sequential aggregation small tree ST3 in the sequential aggregation forest at i1, so that root(ST3) constitutes an authentication point of i0 by i1. Here assume that k=height(ST3). An authentication point (j', i') is included in a root path rtPathST3 (0, i0) of (0, i0). Assume here that rtPathST3(0, i0)=[(0, r(0)), . . . , (j', r(j')), (j'+1, r(j'+1), . . . , (k, r(k))].

Further, a row of nodes formed by elements of authPathST3 (0, i0) and having each level smaller than j' is represented by [(0, s(0)), . . . , (j'−1, s(j'−1))]. Then, it has only to certify that V(j1, r(j1)) is included in either immedData(i0) or lateData (i0, i2) for each j1 (i.e. j1ϵ[0 . . . j'−1]).

By the definition of authPathST3(0, i0), it is noted that an element p2=(j1, s(j1)) at level j1 of authPathST3((0, i0), i1) is either a right child of an element p3=(j1+1, r(j+1)) at level j1+1 of rtPathST3(0, i0) or the left child. We describe both cases respectively.

(Case 2-1) When p2 is the right child of p3, an assigned value V(p2) of p2 is included in the late complementary data lateData(i0, i2) that the apparatus C can receive at i2 satisfying i1≦j2, as shown in FIG. 84. The reason is as follows. When the event-ordering certification on the round corresponding to leaf (0, i1) is completed, it has already become possible to calculate an assigned value for an "ST3" partial tree indicated with B of FIG. 84. As a matter of fact, the assigned values have been already calculated and assigned. Accordingly, the late complementary data for the registration point i0 published on and after the above point of completion contains the assigned value V(p2) for the root p2 of the partial tree B.

(Case 2-2) When p2 is the left child of p3, an assigned value V(p2) for node p2 is included in the immediate complementary data for the registration point i0, as shown in FIG. 85. Because, about the partial tree B having the root p1 of FIG. 85, there is established:

∀Iϵleafs(B) [I<i0].

Accordingly, when starting the round identified with i0, an assigned value for leafs(B) has already become definite. Thus, an assigned value for p2=root(B) has become definite on the round i0. Therefore, p2 is included in an aggregate of authentication path nodes of i0 whose assigned values have already becomes definite at the point i0.

(3) By the definition of authentication path and item (2), it is possible to calculate V(j1, r(j1)) for each j1ϵ[0 . . . j'] recursively, as follows.

First, assume that V(j1, r(j1)) denotes an assigned value for node (0, i0) included in a receipt.

Assume that (V(j1, r(j1)) was calculated for j1ϵ[0 . . . j'−1]. Then, V(j1+1, r(j1+1)) is calculated as follows:

If r(j1)<s(j1), then there is established, $$V(j1+1, r(j1+1)) = h(V(j1, r(j1)) \| V(j1, s(j1))).$$

If s(j1)<r(j1), then there is established, $$V(j1+1, r(j1+1)) = h(V(j1, s(j1)) \| V(j1, r(j1))).$$

INDUSTRIAL APPLICABILITY

In the event-ordering certification system for certifying the event-ordering while using a tree structure, according to the present invention, it is possible to verify the event-ordering receipt published from the event-ordering certification organization without using public data where the event-ordering requests are gathered up.

Consequently, even if being in the middle of a publishing period, it is possible to verify the validity of an event-ordering receipt that the user apparatus has received, enhancing the convenience of a user. Additionally, even if failures occur in an event-ordering certification organization, it is possible to construct an event-ordering certification system resistant to an obstacle.

The invention claimed is:

1. An event-ordering certification method for an event-ordering certification system having a user apparatus performing an event-ordering request for certifying a chronological sequence of a certain event in time-series events generating a designated digital information, a certification apparatus for drafting a certificate for the event-ordering request of the user apparatus, an audit apparatus for auditing authenticity of the certificate and a communication network for connecting the user apparatus, the certification apparatus and the audit apparatus with each other, the method comprising:

an event-ordering request receiving step where the certification apparatus receives the event-ordering request from the user apparatus;

a sequentially assigned data-item calculating step where the certification apparatus drafts a sequentially assigned data-item from the digital information included in the event-ordering request in accordance with a predetermined procedure;

an event-ordering request aggregating step where, in sequential aggregation trees each of which is completed at regular time intervals by sequentially assigning a series of sequentially assigned data-items to leaves of a directed tree from left thereof, the certification apparatus calculates assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected;

a certificate drafting step where the certification apparatus drafts a certificate containing the sequentially assigned data-item and a first sequential aggregation tree specifying information for specifying the sequential aggregation tree and a leaf thereof both having the sequentially assigned data-item assigned thereto;

a certificate sending step where the certification apparatus sends the certificate to the user apparatus;

assuming that: a leaf of the sequential aggregation tree to which the event-ordering request is assigned is defined as a registration point; an information about nodes necessary to calculate a root value of the sequential aggregation tree from the registration point is defined as a complementary information of the certificate; and in the complementary information, a complementary information acquirable at a point of assigning the event-ordering request to the sequential aggregation tree is defined as an immediate complementary information, an audit certificate drafting step where after assigning the event-ordering request to the sequential aggregation tree, the certification apparatus assigns a first audit request to the sequential aggregation tree thereby drafting a first audit certificate in the same way as drafting the certificate, acquires a first immediate complementary information for audit at the point of assigning the first audit request to the sequential aggregation tree, from the sequential aggregation tree and incorporates the first immediate complementary information into the first audit certificate;

an audit certificate sending step where the certification apparatus sends the first audit certificate to the audit apparatus;

a complementary information request receiving step where after assigning the first audit request to the sequential aggregation tree, the certification apparatus receives a request of the complementary information of the certificate from the user apparatus;

a late complementary information drafting step where the certification apparatus acquires a second sequential aggregation tree specifying information for specifying the sequential aggregation tree and a leaf thereof both having the request of the complementary information assigned thereto and a complementary information acquirable at the point of assigning the request of the complementary information, from the sequential aggregation tree, thereby forming a late complementary information; and a late complementary information sending step where the certification apparatus sends the late complementary information about the certificate to the user apparatus.

2. The event-ordering certification method of claim 1, wherein at the certificate drafting step, the certification apparatus incorporates the immediate complementary information of the certificate into the first sequential aggregation tree specifying information.

3. The event-ordering certification method of claim 2, further comprising, for a plurality of event-ordering requests from the user apparatus:

a sequential aggregation tree storing step where the certification apparatus stores an information about the sequential aggregation tree produced at the event-ordering request aggregating step; and, assuming that: the late complementary information of a leaf a1 determined at the point of completing an assignation for a leaf a2 on the right of the leaf a1 in the sequential aggregation tree is defined as "late complementary information of the leaf a1 at the leaf a2"; and further a leaf of the sequential aggregation tree to which the sequential assigned data-item drafted by a new event-ordering request is defined as a new registration point, a registration point storing step where the certification apparatus stores an information about the registration points of the plural event-ordering requests, wherein at the certificate drafting step, the certification apparatus drafts a certificate for the new registration point from the information stored at both of the sequential aggregation tree storing step and the registration point storing step by integrating: the sequential assigned data-item of the new registration point; the first sequential aggregation tree specifying information for specifying the sequential aggregation tree and the leaf thereof both having the sequentially assigned data-item assigned thereto; the immediate complementary information of the new registration point; and the late complementary information of all of the passed registration points of the user apparatus at the new registration point.

4. The event-ordering certification method of claim 3, wherein at the sequential aggregation tree storing step, the certification apparatus stores respective positions of nodes in the sequential aggregation tree, which have been subjected to an assignation, and respective assigned values for the nodes, as the information about the sequential aggregation tree.

5. The event-ordering certification method of claim 3, further comprising an electronic information publishing step where the certification apparatus electronically publishes the root value of the sequential aggregation tree after completing the regular time interval.

6. The event-ordering certification method of claim 3, further comprising a user's side electronic information publishing step where when the certification apparatus stops an operation thereof or vanishes data necessary for calculating the root value of the sequential aggregation tree before completing the regular time interval, the user apparatus electronically publishes both positional information and assigned values for one or more nodes whose assigned values are calculable and whose parents' assigned values are not calculable, from the certificates that the user apparatus has already received and stored by the time of stopping the operation of the certification apparatus or vanishing the data.

7. The event-ordering certification method of claim 3, wherein at the event-ordering request aggregating step after completing the regular time interval, the certification apparatus assigns the root value of the sequential aggregation tree to a leaf of a next sequential aggregation tree so as to form the immediate complementary information about a new registration point assigned to the leaf of the next sequential aggregation tree.

8. The event-ordering certification method of claim 2, further comprising, for a plurality of event-ordering requests from the user apparatus:
  a sequential aggregation tree storing step where the certification apparatus stores an information about the sequential aggregation tree produced at the event-ordering request aggregating step; and,
  assuming that: the late complementary information of a leaf a1 determined at the point of completing an assignation for a leaf a2 on the right of the leaf a1 in the sequential aggregation tree is defined as "late complementary information of the leaf a1 at the leaf a2"; and further a leaf of the sequential aggregation tree to which the sequential assigned data-item drafted by a new event-ordering request is defined as a new registration point,
  a registration point storing step where the certification apparatus stores an information about an immediately preceding registration point to the new registration point, wherein
  at the certificate drafting step, the certification apparatus drafts a certificate for the new registration point from the information stored at both of the sequential aggregation tree storing step and the registration point storing step by integrating: the sequential assigned data-item of the new registration point; the sequential aggregation tree specifying information for specifying the sequential aggregation tree and the leaf thereof both having the sequentially assigned data-item assigned thereto; the immediate complementary information of the new registration point; and the late complementary information of the immediately preceding registration point of the user apparatus at the new registration point.

9. The event-ordering certification method of claim 8, wherein at the sequential aggregation tree storing step, the certification apparatus stores respective positions of nodes in the sequential aggregation tree, which have been subjected to an assignation, and respective assigned values for the nodes, as the information about the sequential aggregation tree.

10. The event-ordering certification method of claim 9, wherein the certification apparatus stores the immediate complementary information of the new registration point and the late complementary information of the immediately preceding registration point of the user apparatus at the new registration point, individually in stack.

11. The event-ordering certification method of claim 8, further comprising an electronic information publishing step where the certification apparatus electronically publishes the root value of the sequential aggregation tree after completing the regular time interval.

12. The event-ordering certification method of claim 8, further comprising a user's side electronic information publishing step where when the certification apparatus stops an operation thereof or vanishes data necessary for calculating the root value of the sequential aggregation tree before completing the regular time interval, the user apparatus electronically publishes both positional information and assigned values for one or more nodes whose assigned values are calculable and whose parents' assigned values are not calculable, from the certificates that the user apparatus has already received and stored by the time of stopping the operation of the certification apparatus or vanishing the data.

13. The event-ordering certification method of claim 8, wherein at the event-ordering request aggregating step after completing the regular time interval, the certification apparatus assigns the root value of the sequential aggregation tree to a leaf of a next sequential aggregation tree so as to form the immediate complementary information about a new registration point assigned to the leaf of the next sequential aggregation tree.

14. The event-ordering certification method of claim 1, wherein:
  the audit certificate drafting step further includes a step where before assigning the event-ordering request to the sequential aggregation tree, the certification apparatus assigns a second audit request to the sequential aggregation tree thereby drafting a second audit certificate in the same way as drafting the certificate, acquires a second immediate complementary information for audit at the point of assigning the second audit request to the sequential aggregation tree, from the sequential aggregation tree and incorporates the second immediate complementary information into the second audit certificate; the event-ordering certification method further comprising:
  an audit late complementary information drafting step where after completing the regular time interval, the certification apparatus acquires all of the complementary information about the first and second audit certificates drafted at the audit certificate drafting step, from the sequential aggregation tree thereby forming a late complementary information about the first and second audit certificates; and an audit late complementary information sending step where the certification apparatus sends the late complementary information about the first and second audit certificates to the audit apparatus.

15. The event-ordering certification method of claim 1, wherein at the sequentially assigned data-item calculating step, the sequentially assigned data-item calculated by the certification apparatus comprises a result value obtained by applying a designated collision-resistant hash function on the digital information contained in the event-ordering request.

16. The event-ordering certification method of claim 1, wherein at the certificate drafting step, the certification apparatus applies a digital signature on the certificate drafted.

17. The event-ordering certification method of claim 1, further comprising an electronic information publishing step where the certification apparatus electronically publishes the root value of the sequential aggregation tree after completing the regular time interval.

18. The event-ordering certification method of claim 1, wherein for a plurality of event-ordering requests from the user apparatus, the certificate sending step further includes a step where the certification apparatus sends respective certificates for the event-ordering requests in chronological sequence of assigning the event-ordering requests to the sequential aggregation tree.

19. A computer-executable event-ordering certification program embodied in a computer-readable recording medium for allowing the certification apparatus to perform the respective steps of the event-ordering certification method of claim 1.

20. An event-ordering certification audit method for an event-ordering certification system having at least one user apparatus performing an event-ordering request for certifying a chronological sequence of a certain event in time-series events generating a designated digital information, a certification apparatus for drafting a certificate for the event-ordering request of the user apparatus, an audit apparatus for auditing authenticity of the certificate and a communication network for connecting the user apparatus, the certification apparatus and the audit apparatus with each other, the method comprising:

an event-ordering request receiving step where the certification apparatus receives a first event-ordering request from the user apparatus;

a sequentially assigned data-item calculating step where the certification apparatus drafts a sequentially assigned data-item from a digital information included in the first event-ordering request in accordance with a predetermined procedure;

an event-ordering request aggregating step where, in sequential aggregation trees each of which is completed at regular time intervals by sequentially assigning a series of sequentially assigned data-items to leaves of a directed tree from left thereof, the certification apparatus calculates assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected;

a certificate drafting step where the certification apparatus drafts a first certificate containing the sequentially assigned data-item and a first sequential aggregation tree specifying information for specifying the sequential aggregation tree and a leaf thereof both having the sequentially assigned data-item assigned thereto;

a certificate sending step where the certification apparatus sends the first certificate to the user apparatus;

assuming that: a leaf of the sequential aggregation tree to which the first event-ordering request is assigned is defined as a registration point; an information about nodes necessary to calculate a root value of the sequential aggregation tree from the registration point is defined as a complementary information of the first certificate; and in the complementary information, a complementary information acquirable at a point of assigning the first event-ordering request to the sequential aggregation tree is defined as an immediate complementary information, an audit certificate drafting step where the certification apparatus assigns a plurality of audit requests to the sequential aggregation tree thereby drafting a plurality of audit certificates in the same way as drafting the certificate, acquires immediate complementary information for audit at the point of assigning the respective audit requests to the sequential aggregation tree, from the sequential aggregation tree and incorporates the immediate complementary information for audit into the respective audit certificates;

an audit certificate sending step where the certification apparatus sends the audit certificates to the audit apparatus;

a complementary information request receiving step where after sending the first certificate to the user apparatus, the certification apparatus receives a request of the complementary information of the first certificate from the user apparatus;

a late complementary information drafting step where the certification apparatus acquires a second sequential aggregation tree specifying information for specifying the sequential aggregation tree and a leaf thereof both having the request of the complementary information assigned thereto and a complementary information acquirable at the point of assigning the request of the complementary information, from the sequential aggregation tree, thereby forming a late complementary information;

a late complementary information sending step where the certification apparatus sends the late complementary information about the first certificate to the user apparatus;

an audit certificate receiving step where the audit apparatus receives the audit certificates from the certification apparatus;

an audit request receiving step where the audit apparatus receives an audit request for the first certificate from the user apparatus, the audit request containing the first certificate and the late complementary information about the first certificate;

a first audit certificate selecting step where the audit apparatus selects an audit certificate from the audit certificates on a basis of the first and second sequential aggregation tree specifying information in the audit request for the first certificate, the one audit certificate being generated after the first certificate and before the late complementary information in chronological sequence;

a first certificate audit step where the audit apparatus audits validity of the first certificate by verifying, for a specified node in the sequential aggregation tree, whether an assigned value for the specified node contained in the audit certificate selected at the first audit certificate selecting step coincides with an assigned value for the specified node calculated from the audit request for the first certificate or not and, where the audit apparatus further certifies a temporal context between a receipt time of the event-ordering request for the first certificate and a receipt time of the audit request for the audit certificate selected at the first audit certificate selecting step; and an audit result sending step where the audit apparatus sends an audit result of the first certificate to the user apparatus.

21. The event-ordering certification audit method of claim 20, wherein:

the audit certificate receiving step further includes a step of acquiring a first time when the audit apparatus received the audit certificate selected at the first audit certificate selecting step, from a time offering apparatus; and at the first certificate audit step, the audit apparatus incorporates a block-time certificate representing that the receipt time of the event-ordering request for the first certificate is temporally ahead of the first time into the audit result.

22. The event-ordering certification audit method of claim 20, further comprising an audit late complementary information drafting step where after completing the regular time interval, the certification apparatus acquires all of the complementary information about the audit certificates drafted at the audit certificate drafting step, from the sequential aggregation tree thereby forming a late complementary information about the audit certificates;

an audit late complementary information sending step where the certification apparatus sends the late complementary information about the audit certificates to the audit apparatus;

a second audit certificate selecting step where the audit apparatus selects an audit certificate from the audit certificates on a basis of the first sequential aggregation tree specifying information in the audit request for the first certificate, the audit certificate being generated before the first certificate in chronological sequence; and a second certificate audit step where the audit apparatus audits validity of the first certificate by verifying, for a specified node in the sequential aggregation tree, whether an assigned value for the specified node contained in the audit request for the first certificate coincides with an assigned value for the specified node calculated from the audit certificate selected at the second audit certificate selecting step and the late complementary information in the audit certificate or not and, where the audit apparatus further certifies a temporal context between a receipt time of the event-ordering request for the first certificate and a receipt time of the audit request for the audit certificate selected at the second audit certificate selecting step.

23. The event-ordering certification audit method of claim 22, further comprising, for a second event-ordering request from the user apparatus or the other user apparatus, an inter-certificate ordering judgment step where the audit apparatus judges the temporal context between the receipt time of the event-ordering request for the first certificate and the receipt time of the event-ordering request for the second certificate on a basis of validation of the audit result for the second certificate drafted for the second event-ordering request and the first sequential aggregation tree specifying information about the first and second certificates, wherein at the audit result sending step, the audit apparatus incorporates a chronological sequence in receiving the requests in between the plural certificates into the audit result.

24. The event-ordering certification audit method of claim 22, further comprising:

a root-value calculating step where the audit apparatus calculates a root value of the sequential aggregation tree from the plural audit certificates and the late complementary information about the plural audit certificates; and a root-value validation step where the audit apparatus verifies whether a root value of the sequential aggregation tree published electronically coincides with the root value calculated at the root-value calculating step.

25. The event-ordering certification audit method of claim 22, further comprising an audit complementary information sending step where the audit apparatus sends the audit certificate selected at the first audit certificate selecting step and the late complementary information about the audit certificate to the user apparatus.

26. The event-ordering certification audit method of claim 22, wherein:

the audit certificate receiving step further includes a step of acquiring a second time when the audit apparatus sent the audit certificate selected at the second audit certificate selecting step to the user apparatus, from a time offering apparatus; and at the second certificate audit step, the audit apparatus incorporates a block-time certificate representing that the receipt time of the event-ordering request for the first certificate is temporally ahead of the second time into the audit result.

27. The event-ordering certification audit method of claim 20, wherein at the first certificate audit step, the audit apparatus applies a digital signature on the audit result.

28. A computer-executable event-ordering certification audit program embodied in a computer-readable recording medium for allowing the certification apparatus to perform the respective steps of the event-ordering certification audit method of claim 20.

29. An event-ordering certification apparatus connected to both a user apparatus performing an event-ordering request for certifying a chronological sequence of a certain event in time-series events generating a designated digital information thereby promoting the event-ordering certification apparatus to draft a certificate and an audit apparatus for auditing authenticity of the certificate through a communication network mutually, for drafting the certificate, for the event-ordering request of the user apparatus, the event-ordering certification apparatus comprising:

event-ordering request receiving means configured to receive the event-ordering request from the user apparatus;

sequentially assigned data-item calculating means configured to draft a sequentially assigned data-item from a digital information included in the event-ordering request in accordance with a predetermined procedure;

event-ordering request aggregating means configured, in sequential aggregation trees each of which is completed at regular time intervals by sequentially assigning a series of sequentially assigned data-items to leaves of a directed tree from left thereof, to calculate assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected;

certificate drafting means configured to draft a certificate containing the sequentially assigned data-item and a first sequential aggregation tree specifying information for specifying the sequential aggregation tree and a leaf thereof both having the sequentially assigned data-item assigned thereto;

certificate sending means configured to send the certificate to the user apparatus;

assuming that: a leaf of the sequential aggregation tree to which the event-ordering request is assigned is defined as a registration point; an information about nodes necessary to calculate a root value of the sequential aggregation tree from the registration point is defined as a complementary information of the certificate; and in the complementary information, a complementary information acquirable at a point of assigning the event-ordering request to the sequential aggregation tree is defined as an immediate complementary information, audit certificate drafting means configured, after assigning the event-ordering request to the sequential aggregation tree, to assign a first audit request to the sequential aggregation tree thereby drafting a first audit certificate in the same way as drafting the certificate, acquire a first immediate complementary information for audit at the point of assigning the first audit request to the sequential aggregation tree, from the sequential aggregation tree and incorporate the first immediate complementary information into the first audit certificate;

audit certificate sending means configured to send the first audit certificate to the audit apparatus;

complementary information request receiving means configured, after assigning the first audit request to the sequential aggregation tree, to receive a request of the complementary information of the certificate from the user apparatus;

late complementary information drafting means configured to acquire a second sequential aggregation tree specifying information for specifying the sequential aggregation tree and a leaf thereof both having the request of the complementary information assigned thereto and a complementary information acquirable at the point of assigning the request of the complementary information, from the sequential aggregation tree, thereby forming a late complementary information; and complementary information sending means configured to send the late complementary information about the certificate to the user apparatus.

30. The event-ordering certification apparatus of claim 29, wherein the certificate drafting means incorporates the immediate complementary information of the certificate into the first sequential aggregation tree specifying information.

31. The event-ordering certification apparatus of claim 30, further comprising, for a plurality of event-ordering requests from the user apparatus:

sequential aggregation tree storing means configured to store an information about the sequential aggregation tree produced at the event-ordering request aggregating step; and, assuming that: the late complementary information of a leaf a1 determined at the point of completing an assignation for a leaf a2 on the right of the leaf a1 in the sequential aggregation tree is defined as "late complementary information of the leaf a1 at the leaf a2"; and further a leaf of the sequential aggregation tree to which the sequential assigned data-item drafted by a new event-ordering request is defined as a new registration point, registration point storing means configured to store an information about the registration points of the plural event-ordering requests, wherein the certificate drafting means integrates, from the information stored by both of the sequential aggregation tree storing means and the registration point storing means, the sequential assigned data-item of the new registration point, the first sequential aggregation tree specifying information for specifying the sequential aggregation tree and the leaf thereof both having the sequentially assigned data-item assigned thereto, the immediate complementary information of the new registration point and the late complementary information of all of the passed registration points of the user apparatus at the new registration point, thereby drafting a certificate for the new registration point.

32. The event-ordering certification apparatus of claim 31, wherein the sequential aggregation tree storing means stores respective positions of nodes in the sequential aggregation tree, which have been subjected to an assignation, and respective assigned values for the nodes, as the information about the sequential aggregation tree.

33. The event-ordering certification apparatus of claim 31, further comprising electronic information publishing means configured to electronically publish the root value of the sequential aggregation tree after completing the regular time interval.

34. The event-ordering certification apparatus of claim 31, wherein when the event-ordering certification apparatus stops an operation thereof or vanishes data necessary for calculating the root value of the sequential aggregation tree before completing the regular time interval, the user apparatus further includes user's side electronic information publishing means configured to electronically publish both positional information and assigned values for one or more nodes whose assigned values are calculable and whose parents' assigned values are not calculable, from the certificates that the user apparatus has already received and stored by the time of stopping the operation of the certification apparatus or vanishing the data.

35. The event-ordering certification apparatus of claim 31, wherein after completing the regular time interval, the event-ordering request aggregating means assigns the root value of the sequential aggregation tree to a leaf of a next sequential aggregation tree so as to form the immediate complementary information about a new registration point assigned to the leaf of the next sequential aggregation tree.

36. The event-ordering certification apparatus of claim 30, further comprising, for a plurality of event-ordering requests from the user apparatus, sequential aggregation tree storing step means configured to store an information about the sequential aggregation tree produced at the event-ordering request aggregating means; and, assuming that: the late complementary information of a leaf a1 determined at the point of completing an assignation for a leaf a2 on the right of the leaf a1 in the sequential aggregation tree is defined as "late complementary information of the leaf a1 at the leaf a2"; and further a leaf of the sequential aggregation tree to which the sequential assigned data-item drafted by a new event-ordering request is defined as a new registration point, registration point storing means configured to store an information about an immediately preceding registration point to the new registration point, wherein the certificate drafting means integrates, from the information stored by both of the sequential aggregation tree storing means and the registration point storing means, the sequential assigned data-item of the new registration point, the sequential aggregation tree specifying information for specifying the sequential aggregation tree and the leaf thereof both having the sequentially assigned data-item assigned thereto, the immediate complementary information of the new registration point and the late complementary information of the immediately preceding registration point of the user apparatus at the new registration point, thereby drafting a certificate for the new registration point.

37. The event-ordering certification apparatus of claim 36, wherein the sequential aggregation tree storing means stores respective positions of nodes in the sequential aggregation tree, which have been subjected to an assignation, and respective assigned values for the nodes, as the information about the sequential aggregation tree.

38. The event-ordering certification apparatus of claim 37, wherein the sequential aggregation tree storing means includes a first stack to store the immediate complementary information of the new registration point and a second stack to store the late complementary information of the immediately preceding registration point of the user apparatus at the new registration point.

39. The event-ordering certification apparatus of claim 36, further comprising electronic information publishing means configured to electronically publish the root value of the sequential aggregation tree after completing the regular time interval.

40. The event-ordering certification apparatus of claim 36, wherein when the event-ordering certification apparatus stops an operation thereof or vanishes data necessary for calculating the root value of the sequential aggregation tree before completing the regular time interval, the user apparatus further includes user's side electronic information publishing means configured to electronically publish both positional information and assigned values for one or more nodes whose assigned values are calculable and whose parents' assigned values are not calculable, from the certificates that the user apparatus has already received and stored by the time of stopping the operation of the certification apparatus or vanishing the data.

41. The event-ordering certification apparatus of claim 36, wherein after completing the regular time interval, the event-ordering request aggregating means assigns the root value of the sequential aggregation tree to a leaf of a next sequential aggregation tree so as to form the immediate complementary information about a new registration point assigned to the leaf of the next sequential aggregation tree.

42. The event-ordering certification apparatus of claim 29, wherein:

the audit certificate drafting means frirther includes means configured, before assigning the event-ordering request to the sequential aggregation tree, to assign a second audit request to the sequential aggregation tree thereby drafting a second audit certificate in the same way as drafting the certificate, acquire a second immediate complementary information for audit at the point of assigning the second audit request to the sequential aggregation tree from the sequential aggregation tree and incorporate the second immediate complementary information into the second audit certificate; the event-ordering certification apparatus further comprises:

an audit late complementary information drafting means configured, after completing the regular time interval, to acquire all of the complementary information about the first and second audit certificates drafted at the audit certificate drafting step, from the sequential aggregation tree thereby forming a late complementary information about the first and second audit certificates; and an audit late complementary information sending means configured to send the late complementary information about the first and second audit certificates to the audit apparatus.

43. The event-ordering certification apparatus of claim 29, wherein the sequentially assigned data-item calculating means calculates a result value obtained by applying a designated collision-resistant hash function on the digital information contained in the event-ordering request, as the sequentially assigned data-item.

44. The event-ordering certification apparatus of claim 29, wherein the certificate drafting means applies a digital signature on the certificate drafted.

45. The event-ordering certification apparatus of claim 29, further comprising electronic information publishing means configured to publish the root value of the sequential aggregation tree electronically after completing the regular time interval.

46. The event-ordering certification apparatus of claim 29, wherein for a plurality of event-ordering requests from the user apparatus, the certificate sending means further includes means configured to send respective certificates for the event-ordering requests in chronological sequence of assigning the event-ordering requests to the sequential aggregation tree.

47. An event-ordering certification audit apparatus connected to both at least one user apparatus performing an event-ordering request for certifying a chronological sequence of a certain event in time-series events generating a designated digital information and a certification apparatus for drafting a certificate for the event-ordering request of the user apparatus, through a communication network, for auditing authenticity of the certificate, wherein the certification apparatus comprises:

event-ordering request receiving means configured to receive a first event-ordering request from the user apparatus;

sequentially assigned data-item calculating means configured to draft a sequentially assigned data-item from a digital information included in the first event-ordering request in accordance with a predetermined procedure;

event-ordering request aggregating means configured, in sequential aggregation trees each of which is completed at regular time intervals by sequentially assigning a series of sequentially assigned data-items to leaves of a directed tree from left thereof, to calculate assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected;

certificate drafting means configured to draft a first certificate containing the sequentially assigned data-item and a first sequential aggregation tree specifying information for specifying the sequential aggregation tree and a leaf thereof both having the sequentially assigned data-item assigned thereto;

certificate sending means configured to send the first certificate to the user apparatus;

assuming that: a leaf of the sequential aggregation tree to which the first event-ordering request is assigned is defined as a registration point; an information about nodes necessary to calculate a root value of the sequential aggregation tree from the registration point is defined as a complementary information of the first certificate; and in the complementary information, a complementary information acquirable at a point of assigning the first event-ordering request to the sequential aggregation tree is defined as an immediate complementary information, audit certificate drafting means configured to assign a plurality of audit requests to the sequential aggregation tree thereby drafting a plurality of audit certificates in the same way as drafting the certificate, acquire immediate complementary information for audit at the point of assigning the respective audit requests to the sequential aggregation tree from the sequential aggregation tree and incorporate the immediate complementary information for audit into the respective audit certificates;

audit certificate sending means configured to send the audit certificates to the audit apparatus;

complementary information request receiving means configured, after sending the first certificate to the user apparatus, to receive a request of the complementary information of the first certificate from the user apparatus;

late complementary information drafting means configured to acquire a second sequential aggregation tree specifying information for specifying the sequential aggregation tree and a leaf thereof both having the request of the complementary information assigned thereto and a complementary information acquirable at the point of assigning the request of the complementary information, from the sequential aggregation tree, thereby forming a late complementary information; and late complementary information sending means configured to send the late complementary information about the first certificate to the user apparatus, and wherein the event-ordering certification audit apparatus comprises:

audit certificate receiving means configured to receive the audit certificates from the certification apparatus;

audit request receiving means configured to receive an audit request for the first certificate from the user apparatus, the audit request containing the first certificate and the late complementary information about the first certificate;

first audit certificate selecting means configured to select an audit certificate from the audit certificates on a basis of the first and second sequential aggregation tree specifying information in the audit request for the first certificate, the audit certificate being generated after the first certificate and before the late complementary information in chronological sequence;

first certificate audit means configured to audit validity of the first certificate by verifying, for a specified node in the sequential aggregation tree, whether an assigned value for the specified node contained in the audit certificate selected by the first audit certificate selecting means coincides with an assigned value for the specified node calculated from the audit request for the first certificate or not and, also configured to frirther certify a temporal context between a receipt time of the event-ordering request for the first certificate and a receipt time of the audit request for the audit certificate selected by the first audit certificate selecting means; and audit result sending means configured to send an audit result of the first certificate to the user apparatus.

48. The event-ordering certification audit apparatus of claim 47, wherein:

the audit certificate receiving means further includes means configured to acquire a first time when the audit apparatus received the audit certificate selected by the first audit certificate selecting means, from a time offering apparatus; and the first certificate audit means incorporates a block-time certificate representing that the receipt time of the event-ordering request for the first certificate is temporally ahead of the first time into the audit result.

49. The event-ordering certification audit apparatus of claim 47, wherein the certification apparatus further comprises:

audit late complementary information drafting means configured to acquire all of the complementary information about the audit certificates drafted by the audit certificate drafting means from the sequential aggregation tree after completing the regular time interval, thereby forming a late complementary information about the audit certificates; and audit late complementary information sending means configured to send the late complementary information about the audit certificates to the audit apparatus, and wherein the event-ordering certification audit apparatus further comprises:

second audit certificate selecting means configured to select an audit certificate from the audit certificates on a basis of the first sequential aggregation tree specifying information in the audit request for the first certificate, the audit certificate being generated before the first certificate in chronological sequence; and second certificate audit means configured to audit validity of the first certificate by verifying, for a specified node in the sequential aggregation tree, whether an assigned value for the specified node contained in the audit request for the first certificate coincides with an assigned value for the specified node calculated from the audit certificate selected by the second audit certificate selecting means and the late complementary information in the audit certificate or not and, where the audit apparatus further certifies a temporal context between a receipt time of the event-ordering request for the first certificate and a receipt time of the audit request for the audit certificate selected by the second audit certificate selecting means.

50. The event-ordering certification audit apparatus of claim 49, further comprising, for a second event-ordering request from the user apparatus or the other user apparatus, inter-certificate ordering judgment means configured to judge the temporal context between the receipt time of the event-ordering request for the first certificate and the receipt time of the event-ordering request for the second certificate on a basis of validation of the audit result for the second certificate drafted for the second event-ordering request and the first sequential aggregation tree specifying information about the first and second certificates, wherein the audit result sending means incorporates a chronological sequence in receiving the requests in between the plural certificates into the audit result.

51. The event-ordering certification audit apparatus of claim 49, further comprising:
   root-value calculating means configured to calculate a root value of the sequential aggregation tree from the plural audit certificates and the late complementary information about the plural audit certificates; and
   root-value validation means configured to verify whether a root value of the sequential aggregation tree published electronically coincides with the root value calculated at the root-value calculating step.

52. The event-ordering certification audit apparatus of claim 49, further comprising audit complementary information sending means configured to send the audit certificate selected by the first audit certificate selecting means and the late complementary information about the audit certificate to the user apparatus.

53. The event-ordering certification audit apparatus of claim 49, wherein:
   the audit certificate receiving means further includes means configured to acquire a second time when the event-ordering certification audit apparatus sent the audit certificate selected by the second audit certificate selecting means to the user apparatus, from a time offering apparatus; and
   the second certificate audit means incorporates a block-time certificate representing that the receipt time of the event-ordering request for the first certificate is temporally ahead of the second time into the audit result.

54. The event-ordering certification audit apparatus of claim 49, wherein the first certificate audit means applies a digital signature on the audit result.

55. A computer-executable program embodied in a computer-readable recording medium for validation of event-ordering certificates for a user apparatus in an event-ordering certification audit system where at least one user apparatus performing an event-ordering request for certifying a chronological sequence of a certain event in time-series events generating a designated digital information, a certification apparatus for drafting a certificate for the event-ordering request of the user apparatus and an audit apparatus for auditing authenticity of the certificate are connected with each other through a communication network,
   wherein the certification apparatus comprises:
   event-ordering request receiving means configured to receive a first event-ordering request from the user apparatus;
   sequentially assigned data-item calculating means configured to draft a sequentially assigned data-item from a digital information included in the first event-ordering request in accordance with a predetermined procedure;
   event-ordering request aggregating means configured, in sequential aggregation trees each of which is completed at regular time intervals by sequentially assigning a series of sequentially assigned data-items to leaves of a directed tree from left thereof, to calculate assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected;
   certificate drafting means configured to draft a first certificate containing the sequentially assigned data-item and a first sequential aggregation tree specifying information for specifying the sequential aggregation tree and a leaf thereof both having the sequentially assigned data-item assigned thereto;
   certificate sending means configured to send the first certificate to the user apparatus;
   assuming that: a leaf of the sequential aggregation tree to which the first event-ordering request is assigned is defined as a registration point; an information about nodes necessary to calculate a root value of the sequential aggregation tree from the registration point is defined as a complementary information of the first certificate; and in the complementary information, a complementary information acquirable at a point of assigning the first event-ordering request to the sequential aggregation tree is defined as an immediate complementary information,
   audit certificate drafting means configured to assign a plurality of audit requests to the sequential aggregation tree thereby drafting a plurality of audit certificates in the same way as drafting the certificate, acquire immediate complementary information for audit at the point of assigning the respective audit requests to the sequential aggregation tree from the sequential aggregation tree and incorporate the immediate complementary information for audit into the respective audit certificates;
   audit certificate sending means configured to send the audit certificates to the audit apparatus;
   complementary information request receiving means configured, after sending the first certificate to the user apparatus, to receive a request of the complementary information of the first certificate from the user apparatus;
   late complementary information drafting means configured to acquire a second sequential aggregation tree specifying information for specifying the sequential aggregation tree and a leaf thereof both having the request of the complementary information assigned thereto and a complementary information acquirable at the point of assigning the request of the complementary information, from the sequential aggregation tree, thereby forming a late complementary information; and
   late complementary information sending means configured to send the late complementary information about the first certificate to the user apparatus, and
   wherein the audit apparatus comprises:
   audit certificate receiving means configured to receive the audit certificates from the certification apparatus;
   audit request receiving means configured to receive an audit request for the first certificate from the user apparatus, the audit request containing the first certificate and the late complementary information about the first certificate;
   first audit certificate selecting means configured to select an audit certificate from the audit certificates on a basis of the first and second sequential aggregation tree specifying information in the audit request for the first certificate, the audit certificate being generated after the first certificate and before the late complementary information in chronological sequence;
   first certificate audit means configured to audit validity of the first certificate by verifying, for a specified node in the sequential aggregation tree, whether an assigned value for the specified node contained in the audit certificate selected by the first audit certificate selecting means coincides with an assigned value for the specified node calculated from the audit request for the first certificate or not and, also configured to further certify a temporal context between a receipt time of the event-ordering request for the first certificate and a receipt time of the audit request for the audit certificate selected by the first audit certificate selecting means; and audit result sending means configured to send an audit result of the first certificate to the user apparatus, and wherein the event-ordering certification program allows the user apparatus to perform:

an event-ordering request sending step of sending the first event-ordering request to the certification apparatus;

a certificate receiving step of receiving first event-ordering request from the certification apparatus a complementary information request sending step of sending the request of the complementary information of the first certificate to the certification apparatus;

a complementary information receiving step of receiving the complementary information of the first certificate from the certification apparatus;

an audit request sending step of sending the audit request to the audit apparatus; and an audit result receiving step of receiving the audit result for the first certificate.

56. The computer-executable program for validation of event-ordering certificates of claim 55, wherein:

the audit certificate receiving means further includes means configured to acquire a first time when the audit apparatus received the audit certificate selected by the second audit certificate selecting means from a time offering apparatus; and the first certificate audit means incorporates a block-time certificate representing that the receipt time of the event-ordering request for the first certificate is temporally ahead of the first time into the audit result, and wherein the program for validation of event-ordering certificates allows the user apparatus to perform an event-ordering request drafting step of acquiring a third time at the point of sending the first event-ordering request to the certification apparatus from the time offering apparatus and incorporating a value as a result of calculating the third time in accordance with a designated procedure into the first event-ordering request.

57. The computer-executable program for validation of event-ordering certificates of claim 56, wherein:

the audit certificate receiving means further includes means configured to acquire a second time when the event-ordering certification audit apparatus sent the audit certificate selected by the second audit certificate selecting means to the user apparatus, from a time offering apparatus;

the second certificate audit means incorporates a block-time certificate representing that the receipt time of the event-ordering request for the first certificate is temporally ahead of the second time into the audit result; and the program for validation of event-ordering certificates allows the user apparatus to perform an event-ordering request drafting step of acquiring a third time at the point of sending the first event-ordering request to the certification apparatus from the time offering apparatus and incorporating a value as a result of calculating the third time in accordance with a designated procedure into the first event-ordering request.

58. A computer-executable event-time validation program embodied in a computer-readable recording medium that verifies a time when the user apparatus executing the program for validation of event-ordering certificates of claim 56 applies on the event-ordering request, wherein the event-time validation program allows the computer to perform:

an audit result acquiring step of acquiring the audit result;

an event-ordering request acquiring step of acquiring the event-ordering request corresponding to the audit result;

a time validation step of judging validity of the third time on a basis of a time difference between the third time and at least either the first time or the second time; and a step of outputting the judgment.

59. The computer-executable program for validation of event-ordering certificates of claim 55, wherein the certification apparatus further comprises:

audit late complementary information drafting means configured to acquire all of the complementary information about the audit certificates drafted by the audit certificate drafting means from the sequential aggregation tree after completing the regular time interval, thereby forming a late complementary information about the audit certificates; and audit late complementary information sending means configured to send the late complementary information about the audit certificates to the audit apparatus, and wherein the audit apparatus further comprises:

second audit certificate selecting means configured to select an audit certificate from the audit certificates on a basis of the first sequential aggregation tree specifying information in the audit request for the first certificate, the audit certificate being generated before the first certificate in chronological sequence; and second certificate audit means configured to audit validity of the first certificate by verifying, for a specified node in the sequential aggregation tree, whether an assigned value for the specified node contained in the audit request for the first certificate coincides with an assigned value for the specified node calculated from the audit certificate selected by the second audit certificate selecting means and the late complementary information in the audit certificate or not and, where the audit apparatus further certifies a temporal context between a receipt time of the event-ordering request for the first certificate and a receipt time of the audit request for the audit certificate selected by the second audit certificate selecting means.

60. The computer-executable program for validation of event-ordering certificates of claim 59, wherein:

the audit apparatus includes, for a second event-ordering request from the user apparatus or the other user apparatus, inter-certificate ordering judgment means configured to judge the temporal context between the receipt time of the event-ordering request for the first certificate and the receipt time of the event-ordering request for the second certificate on a basis of validation of the audit result for the second certificate drafted for the second event-ordering request and the first sequential aggregation tree specifying information about the first and second certificates;

the audit result sending means incorporates a chronological sequence in receiving the requests in between the first and second certificates into the audit result; and the audit request for the first certificate includes a request for judging its chronological sequence in relation to the second certificate.

61. The computer-executable program for validation of event-ordering certificates of claim 59, wherein:

the audit apparatus includes audit complementary information sending means configured to send the audit certificate selected by the first audit certificate selecting means and the late complementary information about the audit certificate to the user apparatus; and the program for validation of event-ordering certificates allows the user apparatus to perform a step of receiving the audit certificate and its late complementary information sent from the audit apparatus.

62. The computer-executable program for validation of event-ordering certificates of claim 55, wherein the program for validation of event-ordering certificates allows the user apparatus to perform:

a root-value calculating step of calculating a root value of the sequential aggregation tree from the first certificate sent from the certification apparatus and all of the late complementary information about the first certificate acquired after completing the regular time interval; and a root-value validation step of verifying whether a root value for the sequential aggregation tree published electronically after completing the regular time interval coincides with the root value calculated at the root-value calculating step.

63. The computer-executable program for validation of event-ordering certificates of claim 55, wherein the certification apparatus further comprising, for a plurality of event-ordering requests from the user apparatus:

sequential aggregation tree storing means configured to store an information about the sequential aggregation tree produced by the event-ordering request aggregating means;

assuming that: the late complementary information of a leaf a1 determined at the point of completing an assignation for a leaf a2 on the right of the leaf a1 in the sequential aggregation tree is defined as "late complementary information of the leaf a1 at the leaf a2"; and further a leaf of the sequential aggregation tree to which the sequential assigned data-item drafted by a new event-ordering request is defined as a new registration point, registration point storing means configured to store an information about the immediately preceding registration point, certificate drafting means configured to integrate, from the information stored in the respective storing means, a sequentially assigned data-item for the new registration point, a sequential aggregation tree specifying information for specifying the sequential aggregation tree and a leaf thereof both having the sequentially assigned data-item assigned thereto, an immediate complementary information about the new registration point and a late complementary information about the immediately preceding registration point of each of the user apparatuses at the new registration point, thereby drafting a certificate for the new registration point; and certificate sending means configured to send the certificates to the user apparatuses; and defining that a rightmost registration point of the respective registration points of each of the user apparatuses is referred to as a provisional terminal point and that to calculate all of the complementary information about a designated registration point acquirable at a point of completing an assignment for the provisional terminal point is referred to as an incremental completion for a certificate of the designated registration point, wherein the program for validation of event-ordering certificates allows the computer to perform:

an event-ordering request sending step of sending the event-ordering requests to the certification apparatus;

a certificate receiving step of receiving the certificates for the event-ordering requests from the certification apparatus;

a certificate storing step of storing the certificates received; and an incremental completion step of performing the incremental completion to a certificate for validation of the plural certificates received and stored.

64. A computer-executable program embodied in a computer readable recording medium for validation of event-ordering certificates for allowing a computer to verify authenticity of certificates, the computer being connected to first and second user apparatuses, each of which performs an event-ordering request for certifying a chronological sequence of a certain event in time-series events generating a designated digital information, and an event-ordering certification apparatus for drafting the certificates for a plurality of event-ordering requests of the first and second user apparatuses through a communication network, wherein the event-ordering certification apparatus comprises:

event-ordering request receiving means configured to receive the event-ordering requests from the first and second user apparatuses;

sequentially assigned data-item calculating means configured to draft sequentially assigned data-items from digital information included in the event-ordering requests in accordance with a predetermined procedure;

event-ordering request aggregating means configured, in sequential aggregation trees each of which is completed at regular time intervals by sequentially assigning a series of sequentially assigned data-items to leaves of a directed tree from left thereof, to calculate assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected;

sequential aggregation tree storing means configured to store an information about the sequential aggregation trees produced by the event-ordering request aggregating means;

assuming that: a leaf of the sequential aggregation tree to which the sequentially-assigned data-item drafted from each of the event-ordering requests is assigned is defined as a registration point; an information about nodes necessary to calculate a root value of the sequential aggregation tree from the registration point is defined as a complementary information of the registration point; in the complementary information, a complementary information acquirable at a point of assigning each of the sequentially assigned data-item to the sequential aggregation tree is defined as an immediate complementary information, while a complementary information acquirable after the point of assigning each of the sequentially assigned data-item to the sequential aggregation tree is defined as a late complementary information; the late complementary information of a leaf a1 determined at a point of completing an assignation for a leaf a2 on the right of the leaf a1 in the sequential aggregation tree is defined as "late complementary information of the leaf a1 at the leaf a2"; and further a leaf of the sequential aggregation tree to which the sequential assigned data-item drafted by a new event-ordering request is defined as a new registration point, registration point storing means configured to store an information about the registration points of the event-ordering requests with respect to each of the user apparatuses;

certificate drafting means configured to integrate, from the information stored in the respective storing means, a sequentially assigned data-item for the new registration point, a sequential aggregation tree specifying information for specifying the sequential aggregation tree and a leaf thereof both having the sequentially assigned data-item assigned thereto, an immediate complementary information about the new registration point and a late complementary information of all past registration points of each of the user apparatuses, thereby drafting a certificate for the new registration point; and certificate sending means configured to send the certificates to the user apparatuses;

wherein each of the user apparatuses comprises:

event-ordering request sending means configured to send the event-ordering requests to the event-ordering certification apparatus;

certificate receiving means configured to receive the certificates for the event-ordering requests from the event-ordering certification apparatus;

certificate storing means configured to store the certificates received;

validation request sending means configured to send a certificate for validation to the computer; and validation result receiving means configured to receive a validation result of the certificate for validation from the computer;

wherein the program for validation of event-ordering certificates allows the computer to perform:

a certificate receiving step of receiving two certificates for validation from the first and second user apparatuses respectively or two certificates for validation from the first user apparatus;

assuming that one of the two certificates judged as being temporally former in publishing order is a first certificate, while the other of the two certificates judged as being temporally latter in publishing order is a second certificate, based on the sequential aggregation tree specifying information of the two certificates received, a sequential aggregation tree specifying information sending step of sending the sequential aggregation tree specifying information in the second certificate to the user apparatus receiving the first certificate;

a late complementary information receiving step of receiving the late complementary information about the first certificate at a registration point after publishing the second certificate, from the user apparatus receiving the first certificate;

a validation step of verifying, for a specified node in the sequential aggregation tree, whether an assigned value for the specified node contained in the second certificate coincides with an assigned value for the specified node calculated from the first certificate and the late complementary information or not, thereby certifying validity of the first and second certificates and that the registration point of the first certificate is temporally ahead of the registration point of the second certificate, based on a validation result; and a validation result sending step of sending the validation result to both or either of the first and second user apparatuses.

65. The computer-executable program for validation of event-ordering certificates of claim 64, wherein when the event-ordering certification apparatus stops an operation thereof or vanishes data necessary for calculating the root value of the sequential aggregation tree before completing the regular time interval, each of the user apparatuses includes user's side electronic information publishing means configured to electronically publish both positional information and assigned values for one or more nodes whose assigned values are calculable and whose parents' assigned values are not calculable, from the certificates that the user apparatus has already received and stored by the time of stopping the operation of the certification apparatus or vanishing the data, and when the event-ordering certification apparatus stops an operation thereof or vanishes data necessary for calculating the root value of the sequential aggregation tree before completing the regular time interval, the program for validation of event-ordering certificates allows the computer to perform a "by user's side publishing value" validation step of verifying that both received data at the certificate receiving step and received data at the late complementary information receiving step are not tampered by judging whether each assigned value for the one or more nodes published by the user apparatus through the user's side electronic information publishing means coincides with an assigned value calculated by both the received data at the certificate receiving step and the received data at the late complementary information receiving step.

66. A computer-executable program for validation of event-ordering certificates for allowing a computer to verify authenticity of certificates, the computer being connected to first and second user apparatuses, each of which performs an event-ordering request for certifying a chronological sequence of a certain event in time-series events generating a designated digital information, and an event-ordering certification apparatus for drafting the certificates for a plurality of event-ordering requests of the first and second user apparatuses through a communication network, wherein the event-ordering certification apparatus comprises:

event-ordering request receiving means configured to receive the event-ordering requests from the first and second user apparatuses;

sequentially assigned data-item calculating means configured to draft sequentially assigned data-items from digital information included in the event-ordering requests in accordance with a predetermined procedure;

event-ordering request aggregating means configured, in sequential aggregation trees each of which is completed at regular time intervals by sequentially assigning a series of sequentially assigned data-items to leaves of a directed tree from left thereof, to calculate assigned values for calculable nodes and a root value to be assigned for a root of each sequential aggregation tree after completion of each regular time interval, in accordance with a calculating method of establishing, as an assigned value for a parent, a result value obtained by applying a designated collision-resistant hash function on a juncture value to which respective assigned values assigned to a plurality of nodes having a parent in common are connected;

sequential aggregation tree storing means configured to store an information about the sequential aggregation trees produced by the event-ordering request aggregating means;

assuming that: a leaf of the sequential aggregation tree to which the sequentially-assigned data-item drafted from each of the event-ordering requests is assigned is defined as a registration point; an information about other nodes necessary to calculate a root value of the sequential aggregation tree from the registration point is defined as a complementary information of the registration point; in the complementary information, a complementary information acquirable at a point of assigning each of the sequentially assigned data-item to the sequential aggregation tree is defined as an immediate complementary information, while a complementary information acquirable after the point of assigning each of the sequentially assigned data-item to the sequential aggregation tree is defined as a late complementary information; the late complementary information of a leaf a1 determined at a point of completing an assignation for a leaf a2 on the right of the leaf a1 in the sequential aggregation tree is defined as "late complementary information of the leaf a1 at the leaf a2"; and further a leaf of the sequential aggregation tree to which the sequential assigned data-item drafted by a new event-ordering request is defined as a new registration point, registration point storing means configured to store an information about an immediately preceding registration point with respect to each of the user apparatuses;

certificate drafting means configured to integrate, from the information stored in the respective storing means, a sequentially assigned data-item for the new registration point, a sequential aggregation tree specifying information for specifying the sequential aggregation tree and a leaf thereof both having the sequentially assigned data-item assigned thereto, an immediate complementary information about the new registration point and a late complementary information about the immediately preceding registration point of each of the user apparatuses at the new registration point, thereby drafting a certificate for the new registration point; and certificate sending means configured to send the certificates to the user apparatuses;

defining that a rightmost registration point of the respective registration points of each of the user apparatuses is referred to as a provisional terminal point and that to calculate all of the complementary information about a designated registration point acquirable at a point of completing an assignment for the provisional terminal point is referred to as an incremental completion for a certificate of the designated registration point, wherein each of the user apparatuses comprises:

event-ordering request sending means configured to send the event-ordering requests to the event-ordering certification apparatus;

certificate receiving means configured to receive the certificates for the event-ordering requests from the event-ordering certification apparatus;

certificate storing means configured to store the certificates received;

incremental completion means configured to perform the incremental completion to a certificate for validation of the plural certificates received and stored;

validation request sending means configured to send a certificate for validation to the computer; and validation result receiving means configured to receive a validation result of the certificate for validation from the computer;

wherein the program for validation of event-ordering certificates allows the computer to perform:

a certificate receiving step of receiving two certificates for validation from the first and second user apparatuses respectively or two certificates for validation from the first user apparatus;

assuming that one of the two certificates judged as being temporally former in publishing order is a first certificate, while the other of the two certificates judged as being temporally latter in publishing order is a second certificate, based on the sequential aggregation tree specifying information of the two certificates received, a sequential aggregation tree specifying information sending step of sending the sequential aggregation tree specifying information in the second certificate to the user apparatus receiving the first certificate;

a late complementary information receiving step of receiving the late complementary information about the first certificate at a registration point after publishing the second certificate, from the user apparatus receiving the first certificate;

a validation step of verifying, for a specified node in the sequential aggregation tree, whether an assigned value for the specified node contained in the second certificate coincides with an assigned value for the specified node calculated from the first certificate and the late complementary information or not, thereby certifying validity of the first and second certificates and that the registration point of the first certificate is temporally ahead of the registration point of the second certificate, based on a validation result; and a validation result sending step of sending the validation result to both or either of the first and second user apparatuses.

67. The computer-executable program for validation of event-ordering certificates of claim 66, wherein when the event-ordering certification apparatus stops an operation thereof or vanishes data necessary for calculating the root value of the sequential aggregation tree before completing the regular time interval, each of the user apparatuses includes user's side electronic information publishing means configured to electronically publish both positional information and assigned values for one or more nodes whose assigned values are calculable and whose parents' assigned values are not calculable, from the certificates that the user apparatus has already received and stored by the time of stopping the operation of the certification apparatus or vanishing the data, and when the event-ordering certification apparatus stops an operation thereof or vanishes data necessary for calculating the root value of the sequential aggregation tree before completing the regular time interval, the program for validation of event-ordering certificates allows the computer to perform a "by user's side publishing value" validation step of verifying that both received data at the certificate receiving step and received data at the late complementary information receiving step are not tampered by judging whether each assigned value for the one or more nodes published by the user apparatus through the user's side electronic information publishing means coincides with an assigned value calculated by both the received data at the certificate receiving step and the received data at the late complementary information receiving step.

68. The computer-executable program for validation of event-ordering certificates of claim 66, wherein the incremental completion is carried out with the use of the certificates that the user apparatus received from the certification apparatus and further stored therein and without forming a tree structure.

69. The computer-executable program for validation of event-ordering certificates of claim 68, wherein for respective elements forming the complementary information about a designated registration point acquirable at a point of completing an assignment for the provisional terminal point, the incremental completion is carried out by firstly selecting one certificate out of one or more certificates that the user apparatus received from the certification apparatus and further stored therein, the one certificate containing either the elements directly or information enough to calculate the elements, and secondly calculating the elements from the one certificate selected.

70. The computer-executable program for validation of event-ordering certificates of claim 68, wherein the complementary information is carried out to all of registration points positioned on the left of the provisional terminal point of the user apparatus.

71. The computer-executable program for validation of event-ordering certificates of claim 70, defining that, for one registration point a1 of the user apparatus on the left of the provisional terminal point and another registration point a2 of the user apparatus closest to the point a1 on a left side thereof, to calculate all of the complementary information about the registration point a2 acquirable at a point of completing an assignment of the provisional point from all of the complementary information about the registration point a1 acquirable at the point of completing the assignment of the provisional point and receipts at the registration points a1 and a2, is referred to as a propagation procedure for completion, wherein
  the incremental completion is carried out without forming a tree structure by the steps of:
  originating in calculating or acquiring all of the complementary information about a registration point a of the user apparatus, which information is acquirable at a point of completing the assignment of the provisional terminal point, from the certificate that the user apparatus received and stored, the registration point a being closest to the provisional terminal point on a left side thereof;
  starting a calculating process of all of the complementary information about respective registration points on the left of the provisional terminal point, which information is acquirable at a point of completing an assignment of the provisional terminal point, from a rightmost registration point a of the registration points; and
  applying the calculating process on the registration points on the left of the registration point a in sequence while using the propagation procedure for completion.

72. The computer-executable program for validation of event-ordering certificates of claim 66, wherein the incremental completion is accomplished by a method comprising the steps of:
  extracting respective registration points up to the provisional terminal point appropriately;
  dividing into local areas each between the registration points extracted;
  performing an incremental completion on the assumption that a rightmost assigned registration point in each of the local areas is a provisional terminal point; and
  calculating all of acquirable complementary information about the extracted registration points.

73. The computer-executable program for validation of event-ordering certificates of claim 66, wherein
  the certification apparatus has electronic information publishing means configured to publish the root value of the sequential aggregation tree electronically after completing the regular time interval; and
  the program for validation of event-ordering certificates allows the user apparatus to perform:
  a root-value calculating step of calculating a root value of the sequential aggregation tree from an information about the designated registration point and the complementary information calculated at the incremental completion step after completing the regular time interval; and
  a root-value validation step of verifying whether the root value published electronically coincides with the root value calculated.

* * * * *